US010089072B2

(12) United States Patent

Piersol et al.

(10) Patent No.: US 10,089,072 B2
(45) Date of Patent: Oct. 2, 2018

(54) INTELLIGENT DEVICE ARBITRATION AND CONTROL

(71) Applicant: Apple Inc., Cupertino, CA (US)

(72) Inventors: Kurt W. Piersol, Cupertino, CA (US); Ryan M. Orr, Cupertino, CA (US); Daniel J. Mandel, Tucson, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/268,338

(22) Filed: Sep. 16, 2016

(65) Prior Publication Data

US 2017/0357478 A1 Dec. 14, 2017

Related U.S. Application Data

(60) Provisional application No. 62/348,896, filed on Jun. 11, 2016.

(51) Int. Cl.

| | |
|---|---|
| ***G10L 15/22*** | (2006.01) |
| ***G06F 3/16*** | (2006.01) |
| ***G10L 15/30*** | (2013.01) |
| ***G10L 25/84*** | (2013.01) |

(52) U.S. Cl.

CPC .............. *G06F 3/167* (2013.01); *G10L 15/22* (2013.01); *G10L 15/30* (2013.01); *G10L 25/84* (2013.01); *G10L 2015/228* (2013.01)

(58) Field of Classification Search

USPC ......................................... 704/257, 270, 275

See application file for complete search history.

(56) References Cited

U.S. PATENT DOCUMENTS

| | | | |
|---|---|---|---|
| 1,559,320 | A | 10/1925 | Hirsh |
| 2,180,522 | A | 11/1939 | Henne |
| 2,495,222 | A | 1/1950 | Bierig |
| 3,704,345 | A | 11/1972 | Coker et al. |
| 3,710,321 | A | 1/1973 | Rubenstein |

(Continued)

FOREIGN PATENT DOCUMENTS

| | | | |
|---|---|---|---|
| CA | 2666438 | C | 6/2013 |
| CH | 681573 | A5 | 4/1993 |

(Continued)

OTHER PUBLICATIONS

International Search Report and Written Opinion received for PCT Patent Application No. PCT/US2016/051927, dated Feb. 6, 2017, 17 pages.

(Continued)

*Primary Examiner* — Abul Azad

(74) *Attorney, Agent, or Firm* — Dentons US LLP

(57) ABSTRACT

This relates to systems and processes for using a virtual assistant to arbitrate among and/or control electronic devices. In one example process, a first electronic device samples an audio input using a microphone. The first electronic device broadcasts a first set of one or more values based on the sampled audio input. Furthermore, the first electronic device receives a second set of one or more values, which are based on the audio input, from a second electronic device. Based on the first set of one or more values and the second set of one or more values, the first electronic device determines whether to respond to the audio input or forego responding to the audio input.

39 Claims, 28 Drawing Sheets

(56) References Cited

U.S. PATENT DOCUMENTS

| | | | |
|---|---|---|---|
| 3,787,542 | A | 1/1974 | Gallagher et al. |
| 3,828,132 | A | 8/1974 | Flanagan et al. |
| 3,979,557 | A | 9/1976 | Schulman et al. |
| 4,013,085 | A | 3/1977 | Wright |
| 4,081,631 | A | 3/1978 | Feder |
| 4,090,216 | A | 5/1978 | Constable |
| 4,107,784 | A | 8/1978 | Van Bemmelen |
| 4,108,211 | A | 8/1978 | Tanaka |
| 4,159,536 | A | 6/1979 | Kehoe et al. |
| 4,181,821 | A | 1/1980 | Pirz et al. |
| 4,204,089 | A | 5/1980 | Key et al. |
| 4,241,286 | A | 12/1980 | Gordon |
| 4,253,477 | A | 3/1981 | Eichman |
| 4,278,838 | A | 7/1981 | Antonov |
| 4,282,405 | A | 8/1981 | Taguchi |
| 4,310,721 | A | 1/1982 | Manley et al. |
| 4,332,464 | A | 6/1982 | Bartulis et al. |
| 4,348,553 | A | 9/1982 | Baker et al. |
| 4,384,169 | A | 5/1983 | Mozer et al. |
| 4,386,345 | A | 5/1983 | Narveson et al. |
| 4,433,377 | A | 2/1984 | Eustis et al. |
| 4,451,849 | A | 5/1984 | Fuhrer |
| 4,485,439 | A | 11/1984 | Rothstein |
| 4,495,644 | A | 1/1985 | Parks et al. |
| 4,513,379 | A | 4/1985 | Wilson et al. |
| 4,513,435 | A | 4/1985 | Sakoe et al. |
| 4,555,775 | A | 11/1985 | Pike |
| 4,577,343 | A | 3/1986 | Oura |
| 4,586,158 | A | 4/1986 | Brandle |
| 4,587,670 | A | 5/1986 | Levinson et al. |
| 4,589,022 | A | 5/1986 | Prince et al. |
| 4,611,346 | A | 9/1986 | Bednar et al. |
| 4,615,081 | A | 10/1986 | Lindahl |
| 4,618,984 | A | 10/1986 | Das et al. |
| 4,642,790 | A | 2/1987 | Minshull et al. |
| 4,653,021 | A | 3/1987 | Takagi |
| 4,654,875 | A | 3/1987 | Srihari et al. |
| 4,655,233 | A | 4/1987 | Laughlin |
| 4,658,425 | A | 4/1987 | Julstrom |
| 4,670,848 | A | 6/1987 | Schramm |
| 4,677,570 | A | 6/1987 | Taki |
| 4,680,429 | A | 7/1987 | Murdock et al. |
| 4,680,805 | A | 7/1987 | Scott |
| 4,686,522 | A | 8/1987 | Hernandez et al. |
| 4,688,195 | A | 8/1987 | Thompson et al. |
| 4,692,941 | A | 9/1987 | Jacks et al. |
| 4,698,625 | A | 10/1987 | McCaskill et al. |
| 4,709,390 | A | 11/1987 | Atal et al. |
| 4,713,775 | A | 12/1987 | Scott et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| RE32,632 | E | 3/1988 | Atkinson |
| 4,736,296 | A | 4/1988 | Katayama et al. |
| 4,750,122 | A | 6/1988 | Kaji et al. |
| 4,754,489 | A | 6/1988 | Bokser |
| 4,755,811 | A | 7/1988 | Slavin et al. |
| 4,759,070 | A | 7/1988 | Voroba et al. |
| 4,776,016 | A | 10/1988 | Hansen |
| 4,783,804 | A | 11/1988 | Juang et al. |
| 4,783,807 | A | 11/1988 | Marley |
| 4,785,413 | A | 11/1988 | Atsumi |
| 4,790,028 | A | 12/1988 | Ramage |
| 4,797,930 | A | 1/1989 | Goudie |
| 4,802,223 | A | 1/1989 | Lin et al. |
| 4,803,729 | A | 2/1989 | Baker |
| 4,807,752 | A | 2/1989 | Chodorow |
| 4,811,243 | A | 3/1989 | Racine |
| 4,813,074 | A | 3/1989 | Marcus |
| 4,819,271 | A | 4/1989 | Bahl et al. |
| 4,827,518 | A | 5/1989 | Feustel et al. |
| 4,827,520 | A | 5/1989 | Zeinstra |
| 4,829,576 | A | 5/1989 | Porter |
| 4,829,583 | A | 5/1989 | Monroe et al. |
| 4,831,551 | A | 5/1989 | Schalk et al. |
| 4,833,712 | A | 5/1989 | Bahl et al. |
| 4,833,718 | A | 5/1989 | Sprague |
| 4,837,798 | A | 6/1989 | Cohen et al. |
| 4,837,831 | A | 6/1989 | Gillick et al. |
| 4,839,853 | A | 6/1989 | Deerwester et al. |
| 4,852,168 | A | 7/1989 | Sprague |
| 4,862,504 | A | 8/1989 | Nomura |
| 4,875,187 | A | 10/1989 | Smith |
| 4,878,230 | A | 10/1989 | Murakami et al. |
| 4,887,212 | A | 12/1989 | Zamora et al. |
| 4,896,359 | A | 1/1990 | Yamamoto et al. |
| 4,903,305 | A | 2/1990 | Gillick et al. |
| 4,905,163 | A | 2/1990 | Garber et al. |
| 4,908,867 | A | 3/1990 | Silverman |
| 4,914,586 | A | 4/1990 | Swinehart et al. |
| 4,914,590 | A | 4/1990 | Loatman et al. |
| 4,918,723 | A | 4/1990 | Iggulden et al. |
| 4,926,491 | A | 5/1990 | Maeda et al. |
| 4,928,307 | A | 5/1990 | Lynn |
| 4,931,783 | A | 6/1990 | Atkinson |
| 4,935,954 | A | 6/1990 | Thompson et al. |
| 4,939,639 | A | 7/1990 | Lee et al. |
| 4,941,488 | A | 7/1990 | Marxer et al. |
| 4,944,013 | A | 7/1990 | Gouvianakis et al. |
| 4,945,504 | A | 7/1990 | Nakama et al. |
| 4,953,106 | A | 8/1990 | Gansner et al. |
| 4,955,047 | A | 9/1990 | Morganstein et al. |
| 4,965,763 | A | 10/1990 | Zamora |
| 4,972,462 | A | 11/1990 | Shibata |
| 4,974,191 | A | 11/1990 | Amirghodsi et al. |
| 4,975,975 | A | 12/1990 | Filipski |
| 4,977,598 | A | 12/1990 | Doddington et al. |
| 4,980,916 | A | 12/1990 | Zinser |
| 4,985,924 | A | 1/1991 | Matsuura |
| 4,992,972 | A | 2/1991 | Brooks et al. |
| 4,994,966 | A | 2/1991 | Hutchins |
| 4,994,983 | A | 2/1991 | Landell et al. |
| 5,001,774 | A | 3/1991 | Lee |
| 5,003,577 | A | 3/1991 | Ertz et al. |
| 5,007,095 | A | 4/1991 | Nara et al. |
| 5,007,098 | A | 4/1991 | Kumagai |
| 5,010,574 | A | 4/1991 | Wang |
| 5,016,002 | A | 5/1991 | Levanto |
| 5,020,112 | A | 5/1991 | Chou |
| 5,021,971 | A | 6/1991 | Lindsay |
| 5,022,081 | A | 6/1991 | Hirose et al. |
| 5,027,110 | A | 6/1991 | Chang et al. |
| 5,027,406 | A | 6/1991 | Roberts et al. |
| 5,027,408 | A | 6/1991 | Kroeker et al. |
| 5,029,211 | A | 7/1991 | Ozawa |
| 5,031,217 | A | 7/1991 | Nishimura |
| 5,032,989 | A | 7/1991 | Tornetta |
| 5,033,087 | A | 7/1991 | Bahl et al. |
| 5,040,218 | A | 8/1991 | Vitale et al. |
| 5,046,099 | A | 9/1991 | Nishimura |
| 5,047,614 | A | 9/1991 | Bianco |
| 5,047,617 | A | 9/1991 | Shepard et al. |
| 5,050,215 | A | 9/1991 | Nishimura |
| 5,053,758 | A | 10/1991 | Cornett et al. |
| 5,054,084 | A | 10/1991 | Tanaka et al. |
| 5,057,915 | A | 10/1991 | Von Kohorn |
| 5,062,143 | A | 10/1991 | Schmitt |
| 5,067,158 | A | 11/1991 | Arjmand |
| 5,067,503 | A | 11/1991 | Stile |
| 5,072,452 | A | 12/1991 | Brown et al. |
| 5,075,896 | A | 12/1991 | Wilcox et al. |
| 5,079,723 | A | 1/1992 | Herceg et al. |
| 5,083,119 | A | 1/1992 | Trevett et al. |
| 5,083,268 | A | 1/1992 | Hemphill et al. |
| 5,086,792 | A | 2/1992 | Chodorow |
| 5,090,012 | A | 2/1992 | Kajiyama et al. |
| 5,091,790 | A | 2/1992 | Silverberg |
| 5,091,945 | A | 2/1992 | Kleijn |
| 5,103,498 | A | 4/1992 | Lanier et al. |
| 5,109,509 | A | 4/1992 | Katayama et al. |
| 5,111,423 | A | 5/1992 | Kopec, Jr. et al. |
| 5,119,079 | A | 6/1992 | Hube et al. |
| 5,122,951 | A | 6/1992 | Kamiya |

(56) References Cited

U.S. PATENT DOCUMENTS

| | | | |
|---|---|---|---|
| 5,123,103 | A | 6/1992 | Ohtaki et al. |
| 5,125,022 | A | 6/1992 | Hunt et al. |
| 5,125,030 | A | 6/1992 | Nomura et al. |
| 5,127,043 | A | 6/1992 | Hunt et al. |
| 5,127,053 | A | 6/1992 | Koch |
| 5,127,055 | A | 6/1992 | Larkey |
| 5,128,672 | A | 7/1992 | Kaehler |
| 5,133,011 | A | 7/1992 | McKiel, Jr. |
| 5,133,023 | A | 7/1992 | Bokser |
| 5,142,584 | A | 8/1992 | Ozawa |
| 5,144,875 | A | 9/1992 | Nakada |
| 5,148,541 | A | 9/1992 | Lee et al. |
| 5,153,913 | A | 10/1992 | Kandefer et al. |
| 5,157,610 | A | 10/1992 | Asano et al. |
| 5,157,779 | A | 10/1992 | Washburn et al. |
| 5,161,102 | A | 11/1992 | Griffin et al. |
| 5,163,809 | A | 11/1992 | Akgun et al. |
| 5,164,900 | A | 11/1992 | Bernath |
| 5,164,982 | A | 11/1992 | Davis |
| 5,165,007 | A | 11/1992 | Bahl et al. |
| 5,167,004 | A | 11/1992 | Netsch et al. |
| 5,175,536 | A | 12/1992 | Aschliman et al. |
| 5,175,803 | A | 12/1992 | Yeh |
| 5,175,814 | A | 12/1992 | Anick et al. |
| 5,179,627 | A | 1/1993 | Sweet et al. |
| 5,179,652 | A | 1/1993 | Rozmanith et al. |
| 5,194,950 | A | 3/1993 | Murakami et al. |
| 5,195,034 | A | 3/1993 | Garneau et al. |
| 5,195,167 | A | 3/1993 | Bahl et al. |
| 5,197,005 | A | 3/1993 | Shwartz et al. |
| 5,199,077 | A | 3/1993 | Wilcox et al. |
| 5,201,034 | A | 4/1993 | Matsuura et al. |
| 5,202,952 | A | 4/1993 | Gillick et al. |
| 5,208,862 | A | 5/1993 | Ozawa |
| 5,210,689 | A | 5/1993 | Baker et al. |
| 5,212,638 | A | 5/1993 | Bernath |
| 5,212,821 | A | 5/1993 | Gorin et al. |
| 5,216,747 | A | 6/1993 | Hardwick et al. |
| 5,218,700 | A | 6/1993 | Beechick |
| 5,220,629 | A | 6/1993 | Kosaka et al. |
| 5,220,639 | A | 6/1993 | Lee |
| 5,220,657 | A | 6/1993 | Bly et al. |
| 5,222,146 | A | 6/1993 | Bahl et al. |
| 5,230,036 | A | 7/1993 | Akamine et al. |
| 5,231,670 | A | 7/1993 | Goldhor et al. |
| 5,235,680 | A | 8/1993 | Bijnagte |
| 5,237,502 | A | 8/1993 | White et al. |
| 5,241,619 | A | 8/1993 | Schwartz et al. |
| 5,252,951 | A | 10/1993 | Tannenbaum et al. |
| 5,253,325 | A | 10/1993 | Clark |
| 5,255,386 | A | 10/1993 | Prager |
| 5,257,387 | A | 10/1993 | Richek et al. |
| 5,260,697 | A | 11/1993 | Barrett et al. |
| 5,266,931 | A | 11/1993 | Tanaka |
| 5,266,949 | A | 11/1993 | Rossi |
| 5,267,345 | A | 11/1993 | Brown et al. |
| 5,268,990 | A | 12/1993 | Cohen et al. |
| 5,274,771 | A | 12/1993 | Hamilton et al. |
| 5,274,818 | A | 12/1993 | Vasilevsky et al. |
| 5,276,616 | A | 1/1994 | Kuga et al. |
| 5,276,794 | A | 1/1994 | Lamb, Jr. |
| 5,278,980 | A | 1/1994 | Pedersen et al. |
| 5,282,265 | A | 1/1994 | Rohra Suda et al. |
| 5,283,818 | A | 2/1994 | Klausner et al. |
| 5,287,448 | A | 2/1994 | Nicol et al. |
| 5,289,562 | A | 2/1994 | Mizuta et al. |
| RE34,562 | E | 3/1994 | Murakami et al. |
| 5,291,286 | A | 3/1994 | Murakami et al. |
| 5,293,254 | A | 3/1994 | Eschbach |
| 5,293,448 | A | 3/1994 | Honda |
| 5,293,452 | A | 3/1994 | Picone et al. |
| 5,296,642 | A | 3/1994 | Konishi |
| 5,297,170 | A | 3/1994 | Eyuboglu et al. |
| 5,297,194 | A | 3/1994 | Hunt et al. |
| 5,299,125 | A | 3/1994 | Baker et al. |
| 5,299,284 | A | 3/1994 | Roy |
| 5,301,109 | A | 4/1994 | Landauer et al. |
| 5,303,406 | A | 4/1994 | Hansen et al. |
| 5,305,205 | A | 4/1994 | Weber et al. |
| 5,305,421 | A | 4/1994 | Li et al. |
| 5,305,768 | A | 4/1994 | Gross et al. |
| 5,309,359 | A | 5/1994 | Katz et al. |
| 5,315,689 | A | 5/1994 | Kanazawa et al. |
| 5,317,507 | A | 5/1994 | Gallant |
| 5,317,647 | A | 5/1994 | Pagallo |
| 5,325,297 | A | 6/1994 | Bird et al. |
| 5,325,298 | A | 6/1994 | Gallant |
| 5,325,462 | A | 6/1994 | Farrett |
| 5,326,270 | A | 7/1994 | Ostby et al. |
| 5,327,342 | A | 7/1994 | Roy |
| 5,327,498 | A | 7/1994 | Hamon |
| 5,329,608 | A | 7/1994 | Bocchieri et al. |
| 5,333,236 | A | 7/1994 | Bahl et al. |
| 5,333,266 | A | 7/1994 | Boaz et al. |
| 5,333,275 | A | 7/1994 | Wheatley et al. |
| 5,335,011 | A | 8/1994 | Addeo et al. |
| 5,335,276 | A | 8/1994 | Thompson et al. |
| 5,341,293 | A | 8/1994 | Vertelney et al. |
| 5,341,466 | A | 8/1994 | Perlin et al. |
| 5,345,536 | A | 9/1994 | Hoshimi et al. |
| 5,349,645 | A | 9/1994 | Zhao |
| 5,353,374 | A | 10/1994 | Wilson et al. |
| 5,353,376 | A | 10/1994 | Oh et al. |
| 5,353,377 | A | 10/1994 | Kuroda et al. |
| 5,353,408 | A | 10/1994 | Kato et al. |
| 5,353,432 | A | 10/1994 | Richek et al. |
| 5,357,431 | A | 10/1994 | Nakada et al. |
| 5,367,640 | A | 11/1994 | Hamilton et al. |
| 5,369,575 | A | 11/1994 | Lamberti et al. |
| 5,369,577 | A | 11/1994 | Kadashevich et al. |
| 5,371,853 | A | 12/1994 | Kao et al. |
| 5,371,901 | A | 12/1994 | Reed et al. |
| 5,373,566 | A | 12/1994 | Murdock |
| 5,377,103 | A | 12/1994 | Lamberti et al. |
| 5,377,301 | A | 12/1994 | Rosenberg et al. |
| 5,377,303 | A | 12/1994 | Firman |
| 5,384,671 | A | 1/1995 | Fisher |
| 5,384,892 | A | 1/1995 | Strong |
| 5,384,893 | A | 1/1995 | Hutchins |
| 5,386,494 | A | 1/1995 | White |
| 5,386,556 | A | 1/1995 | Hedin et al. |
| 5,390,236 | A | 2/1995 | Klausner et al. |
| 5,390,279 | A | 2/1995 | Strong |
| 5,390,281 | A | 2/1995 | Luciw et al. |
| 5,392,419 | A | 2/1995 | Walton |
| 5,396,625 | A | 3/1995 | Parkes |
| 5,400,434 | A | 3/1995 | Pearson |
| 5,404,295 | A | 4/1995 | Katz et al. |
| 5,406,305 | A | 4/1995 | Shimomura et al. |
| 5,408,060 | A | 4/1995 | Muurinen |
| 5,412,756 | A | 5/1995 | Bauman et al. |
| 5,412,804 | A | 5/1995 | Krishna |
| 5,412,806 | A | 5/1995 | Du et al. |
| 5,418,951 | A | 5/1995 | Damashek |
| 5,422,656 | A | 6/1995 | Allard et al. |
| 5,424,947 | A | 6/1995 | Nagao et al. |
| 5,425,108 | A | 6/1995 | Hwang et al. |
| 5,428,731 | A | 6/1995 | Powers, III |
| 5,434,777 | A | 7/1995 | Luciw |
| 5,440,615 | A | 8/1995 | Caccuro et al. |
| 5,442,598 | A | 8/1995 | Haikawa et al. |
| 5,442,780 | A | 8/1995 | Takanashi et al. |
| 5,444,823 | A | 8/1995 | Nguyen |
| 5,449,368 | A | 9/1995 | Kuzmak |
| 5,450,523 | A | 9/1995 | Zhao |
| 5,455,888 | A | 10/1995 | Iyengar et al. |
| 5,457,768 | A | 10/1995 | Tsuboi et al. |
| 5,459,488 | A | 10/1995 | Geiser |
| 5,463,696 | A | 10/1995 | Beernink et al. |
| 5,463,725 | A | 10/1995 | Henckel et al. |
| 5,465,401 | A | 11/1995 | Thompson |
| 5,469,529 | A | 11/1995 | Bimbot et al. |
| 5,471,611 | A | 11/1995 | McGregor |
| 5,473,728 | A | 12/1995 | Luginbuhl et al. |

(56) References Cited

U.S. PATENT DOCUMENTS 5,475,587 A 12/1995 Anick et al.
5,475,796 A 12/1995 Iwata
5,477,447 A 12/1995 Luciw et al.
5,477,448 A 12/1995 Golding et al.
5,477,451 A 12/1995 Brown et al.
5,479,488 A 12/1995 Lennig et al.
5,481,739 A 1/1996 Staats
5,483,261 A 1/1996 Yasutake
5,485,372 A 1/1996 Golding et al.
5,485,543 A 1/1996 Aso
5,488,204 A 1/1996 Mead et al.
5,488,727 A 1/1996 Agrawal et al.
5,490,234 A 2/1996 Narayan
5,491,758 A 2/1996 Bellegarda et al.
5,491,772 A 2/1996 Hardwick et al.
5,493,677 A 2/1996 Balogh et al.
5,495,604 A 2/1996 Harding et al.
5,497,319 A 3/1996 Chong et al.
5,500,903 A 3/1996 Gulli
5,500,905 A 3/1996 Martin et al.
5,500,937 A 3/1996 Thompson-Rohrlich
5,502,774 A 3/1996 Bellegarda et al.
5,502,790 A 3/1996 Yi
5,502,791 A 3/1996 Nishimura et al.
5,515,475 A 5/1996 Gupta et al.
5,521,816 A 5/1996 Roche et al.
5,524,140 A 6/1996 Klausner et al.
5,530,861 A 6/1996 Diamant et al.
5,533,182 A 7/1996 Bates et al.
5,535,121 A 7/1996 Roche et al.
5,536,902 A 7/1996 Serra et al.
5,537,317 A 7/1996 Schabes et al.
5,537,618 A 7/1996 Boulton et al.
5,537,647 A 7/1996 Hermansky et al.
5,543,588 A 8/1996 Bisset et al.
5,543,897 A 8/1996 Altrieth, III
5,544,264 A 8/1996 Bellegarda et al.
5,548,507 A 8/1996 Martino et al.
5,555,343 A 9/1996 Luther
5,555,344 A 9/1996 Zunkler
5,559,301 A 9/1996 Bryan, Jr. et al.
5,559,945 A 9/1996 Beaudet et al.
5,564,446 A 10/1996 Wiltshire
5,565,888 A 10/1996 Selker
5,568,536 A 10/1996 Tiller et al.
5,568,540 A 10/1996 Greco et al.
5,570,324 A 10/1996 Geil
5,572,576 A 11/1996 Klausner et al.
5,574,823 A 11/1996 Hassanein et al.
5,574,824 A 11/1996 Slyh et al.
5,577,135 A 11/1996 Grajski et al.
5,577,164 A 11/1996 Kaneko et al.
5,577,241 A 11/1996 Spencer
5,578,808 A 11/1996 Taylor
5,579,037 A 11/1996 Tahara et al.
5,579,436 A 11/1996 Chou et al.
5,581,484 A 12/1996 Prince
5,581,652 A 12/1996 Abe et al.
5,581,655 A 12/1996 Cohen et al.
5,583,993 A 12/1996 Foster et al.
5,584,024 A 12/1996 Shwartz
5,586,540 A 12/1996 Marzec et al.
5,594,641 A 1/1997 Kaplan et al.
5,596,260 A 1/1997 Moravec et al.
5,596,676 A 1/1997 Swaminathan et al.
5,596,994 A 1/1997 Bro
5,608,624 A 3/1997 Luciw
5,608,698 A 3/1997 Yamanoi et al.
5,608,841 A 3/1997 Tsuboka
5,610,812 A 3/1997 Schabes et al.
5,613,036 A 3/1997 Strong
5,613,122 A 3/1997 Burnard et al.
5,615,378 A 3/1997 Nishino et al.
5,615,384 A 3/1997 Allard et al.
5,616,876 A 4/1997 Cluts
5,617,386 A 4/1997 Choi
5,617,507 A 4/1997 Lee et al.
5,617,539 A 4/1997 Ludwig et al.
5,619,583 A 4/1997 Page et al.
5,619,694 A 4/1997 Shimazu
5,621,859 A 4/1997 Schwartz et al.
5,621,903 A 4/1997 Luciw et al.
5,627,939 A 5/1997 Huang et al.
5,634,084 A 5/1997 Malsheen et al.
5,636,325 A 6/1997 Farrett
5,638,425 A 6/1997 Meador, III et al.
5,638,489 A 6/1997 Tsuboka
5,638,523 A 6/1997 Mullet et al.
5,640,487 A 6/1997 Lau et al.
5,642,464 A 6/1997 Yue et al.
5,642,466 A 6/1997 Narayan
5,642,519 A 6/1997 Martin
5,644,656 A 7/1997 Akra et al.
5,644,727 A 7/1997 Atkins
5,644,735 A 7/1997 Luciw et al.
5,649,060 A 7/1997 Ellozy et al.
5,652,828 A 7/1997 Silverman
5,652,884 A 7/1997 Palevich
5,652,897 A 7/1997 Linebarger et al.
5,661,787 A 8/1997 Pocock
5,664,055 A 9/1997 Kroon
5,664,206 A 9/1997 Murow et al.
5,670,985 A 9/1997 Cappels, Sr. et al.
5,675,704 A 10/1997 Juang et al.
5,675,819 A 10/1997 Schuetze
5,678,039 A 10/1997 Hinks et al.
5,678,053 A 10/1997 Anderson
5,682,475 A 10/1997 Johnson et al.
5,682,539 A 10/1997 Conrad et al.
5,684,513 A 11/1997 Decker
5,687,077 A 11/1997 Gough, Jr.
5,689,287 A 11/1997 Mackinlay et al.
5,689,616 A 11/1997 Li
5,689,618 A 11/1997 Gasper et al.
5,692,205 A 11/1997 Berry et al.
5,696,962 A 12/1997 Kupiec
5,697,793 A 12/1997 Huffman et al.
5,699,082 A 12/1997 Marks et al.
5,701,400 A 12/1997 Amado
5,706,442 A 1/1998 Anderson et al.
5,708,659 A 1/1998 Rostoker et al.
5,708,822 A 1/1998 Wical
5,710,886 A 1/1998 Christensen et al.
5,710,922 A 1/1998 Alley et al.
5,712,949 A 1/1998 Kato et al.
5,712,957 A 1/1998 Waibel et al.
5,715,468 A 2/1998 Budzinski
5,717,877 A 2/1998 Orton et al.
5,721,827 A 2/1998 Logan et al.
5,721,949 A 2/1998 Smith et al.
5,724,406 A 3/1998 Juster
5,724,985 A 3/1998 Snell et al.
5,726,672 A 3/1998 Hernandez et al.
5,727,950 A 3/1998 Cook et al.
5,729,694 A 3/1998 Holzrichter et al.
5,729,704 A 3/1998 Stone et al.
5,732,216 A 3/1998 Logan et al.
5,732,390 A 3/1998 Katayanagi et al.
5,732,395 A 3/1998 Silverman
5,734,750 A 3/1998 Arai et al.
5,734,791 A 3/1998 Acero et al.
5,736,974 A 4/1998 Selker
5,737,487 A 4/1998 Bellegarda et al.
5,737,609 A 4/1998 Reed et al.
5,737,734 A 4/1998 Schultz
5,739,451 A 4/1998 Winksy et al.
5,740,143 A 4/1998 Suetomi
5,742,705 A 4/1998 Parthasarathy
5,742,736 A 4/1998 Haddock
5,745,116 A 4/1998 Pisutha-Arnond
5,745,843 A 4/1998 Wetters et al.
5,745,873 A 4/1998 Braida et al.
5,748,512 A 5/1998 Vargas
5,748,974 A 5/1998 Johnson

(56) References Cited

U.S. PATENT DOCUMENTS 5,749,071 A 5/1998 Silverman
5,749,081 A 5/1998 Whiteis
5,751,906 A 5/1998 Silverman
5,757,358 A 5/1998 Osga
5,757,979 A 5/1998 Hongo et al.
5,758,024 A 5/1998 Alleva
5,758,079 A 5/1998 Ludwig et al.
5,758,083 A 5/1998 Singh et al.
5,758,314 A 5/1998 McKenna
5,758,318 A 5/1998 Kojima et al.
5,759,101 A 6/1998 Von Kohorn
5,761,640 A 6/1998 Kalyanswamy et al.
5,761,687 A 6/1998 Hon et al.
5,764,852 A 6/1998 Williams
5,765,131 A 6/1998 Stentiford et al.
5,765,168 A 6/1998 Burrows
5,771,276 A 6/1998 Wolf
5,774,834 A 6/1998 Visser
5,774,855 A 6/1998 Foti et al.
5,774,859 A 6/1998 Houser et al.
5,777,614 A 7/1998 Ando et al.
5,778,405 A 7/1998 Ogawa
5,790,978 A 8/1998 Olive et al.
5,794,050 A 8/1998 Dahlgren et al.
5,794,182 A 8/1998 Manduchi et al.
5,794,207 A 8/1998 Walker et al.
5,794,237 A 8/1998 Gore, Jr.
5,797,008 A 8/1998 Burrows
5,799,268 A 8/1998 Boguraev
5,799,269 A 8/1998 Schabes et al.
5,799,276 A 8/1998 Komissarchik et al.
5,799,279 A 8/1998 Gould et al.
5,801,692 A 9/1998 Muzio et al.
5,802,466 A 9/1998 Gallant et al.
5,802,526 A 9/1998 Fawcett et al.
5,806,021 A 9/1998 Chen et al.
5,812,697 A 9/1998 Sakai et al.
5,812,698 A 9/1998 Platt et al.
5,815,142 A 9/1998 Allard et al.
5,815,225 A 9/1998 Nelson
5,818,142 A 10/1998 Edleblute et al.
5,818,451 A 10/1998 Bertram et al.
5,818,924 A 10/1998 King et al.
5,822,288 A 10/1998 Shinada
5,822,720 A 10/1998 Bookman et al.
5,822,730 A 10/1998 Roth et al.
5,822,743 A 10/1998 Gupta et al.
5,825,349 A 10/1998 Meier et al.
5,825,352 A 10/1998 Bisset et al.
5,825,881 A 10/1998 Colvin, Sr.
5,826,261 A 10/1998 Spencer
5,828,768 A 10/1998 Eatwell et al.
5,828,999 A 10/1998 Bellegarda et al.
5,832,433 A 11/1998 Yashchin et al.
5,832,435 A 11/1998 Silverman
5,833,134 A 11/1998 Ho et al.
5,835,077 A 11/1998 Dao et al.
5,835,079 A 11/1998 Shieh
5,835,721 A 11/1998 Donahue et al.
5,835,732 A 11/1998 Kikinis et al.
5,835,893 A 11/1998 Ushioda
5,839,106 A 11/1998 Bellegarda
5,841,902 A 11/1998 Tu
5,842,165 A 11/1998 Raman et al.
5,845,255 A 12/1998 Mayaud
5,848,410 A 12/1998 Walls et al.
5,850,480 A 12/1998 Scanlon
5,850,629 A 12/1998 Holm et al.
5,852,801 A 12/1998 Hon et al.
5,854,893 A 12/1998 Ludwig et al.
5,855,000 A 12/1998 Waibel et al.
5,857,184 A 1/1999 Lynch
5,859,636 A 1/1999 Pandit
5,860,063 A 1/1999 Gorin et al.
5,860,064 A 1/1999 Henton
5,860,075 A 1/1999 Hashizume et al.
5,862,223 A 1/1999 Walker et al.
5,862,233 A 1/1999 Poletti
5,864,806 A 1/1999 Mokbel et al.
5,864,815 A 1/1999 Rozak et al.
5,864,844 A 1/1999 James et al.
5,864,855 A 1/1999 Ruocco et al.
5,864,868 A 1/1999 Contois
5,867,799 A 2/1999 Lang et al.
5,870,710 A 2/1999 Ozawa et al.
5,873,056 A 2/1999 Liddy et al.
5,873,064 A 2/1999 De Armas et al.
5,875,427 A 2/1999 Yamazaki
5,875,429 A 2/1999 Douglas
5,875,437 A 2/1999 Atkins
5,876,396 A 3/1999 Lo et al.
5,877,751 A 3/1999 Kanemitsu et al.
5,877,757 A 3/1999 Baldwin et al.
5,878,393 A 3/1999 Hata et al.
5,878,394 A 3/1999 Muhling
5,878,396 A 3/1999 Henton
5,880,411 A 3/1999 Gillespie et al.
5,880,731 A 3/1999 Liles et al.
5,884,039 A 3/1999 Ludwig et al.
5,884,323 A 3/1999 Hawkins et al.
5,890,117 A 3/1999 Silverman
5,890,122 A 3/1999 Van et al.
5,891,180 A 4/1999 Greeninger et al.
5,893,126 A 4/1999 Drews et al.
5,893,132 A 4/1999 Huffman et al.
5,895,448 A 4/1999 Vysotsky et al.
5,895,464 A 4/1999 Bhandari et al.
5,895,466 A 4/1999 Goldberg et al.
5,896,321 A 4/1999 Miller et al.
5,896,500 A 4/1999 Ludwig et al.
5,899,972 A 5/1999 Miyazawa et al.
5,905,498 A 5/1999 Diament et al.
5,907,597 A 5/1999 Mark
5,909,666 A 6/1999 Gould et al.
5,912,951 A 6/1999 Checchio et al.
5,912,952 A 6/1999 Brendzel
5,913,185 A 6/1999 Martino et al.
5,913,193 A 6/1999 Huang et al.
5,915,001 A 6/1999 Uppaluru et al.
5,915,236 A 6/1999 Gould et al.
5,915,238 A 6/1999 Tjaden
5,915,249 A 6/1999 Spencer
5,917,487 A 6/1999 Ulrich
5,918,303 A 6/1999 Yamaura et al.
5,920,327 A 7/1999 Seidensticker, Jr.
5,920,836 A 7/1999 Gould et al.
5,920,837 A 7/1999 Gould et al.
5,923,757 A 7/1999 Hocker et al.
5,924,068 A 7/1999 Richard et al.
5,926,769 A 7/1999 Valimaa et al.
5,926,789 A 7/1999 Barbara et al.
5,930,408 A 7/1999 Seto
5,930,751 A 7/1999 Cohrs et al.
5,930,754 A 7/1999 Karaali et al.
5,930,769 A 7/1999 Rose
5,930,783 A 7/1999 Li et al.
5,933,477 A 8/1999 Wu
5,933,806 A 8/1999 Beyerlein et al.
5,933,822 A 8/1999 Braden-Harder et al.
5,936,926 A 8/1999 Yokouchi et al.
5,937,163 A 8/1999 Lee et al.
5,940,811 A 8/1999 Norris
5,940,841 A 8/1999 Schmuck et al.
5,941,944 A 8/1999 Messerly
5,943,043 A 8/1999 Furuhata et al.
5,943,049 A 8/1999 Matsubara et al.
5,943,052 A 8/1999 Allen et al.
5,943,429 A 8/1999 Haendel et al.
5,943,443 A 8/1999 Itonori et al.
5,943,670 A 8/1999 Prager
5,946,647 A 8/1999 Miller et al.
5,946,648 A 8/1999 Halstead et al.
5,948,040 A 9/1999 DeLorme et al.
5,949,961 A 9/1999 Sharman

(56) References Cited

U.S. PATENT DOCUMENTS 5,950,123 A 9/1999 Schwelb et al.
5,952,992 A 9/1999 Helms
5,953,541 A 9/1999 King et al.
5,956,021 A 9/1999 Kubota et al.
5,956,699 A 9/1999 Wong et al.
5,960,385 A 9/1999 Skiena et al.
5,960,394 A 9/1999 Gould et al.
5,960,422 A 9/1999 Prasad
5,963,208 A 10/1999 Dolan et al.
5,963,924 A 10/1999 Williams et al.
5,963,964 A 10/1999 Nielsen
5,966,126 A 10/1999 Szabo
5,970,446 A 10/1999 Goldberg et al.
5,970,474 A 10/1999 LeRoy et al.
5,973,612 A 10/1999 Deo et al.
5,973,676 A 10/1999 Kawakura
5,974,146 A 10/1999 Randle et al.
5,977,950 A 11/1999 Rhyne
5,982,352 A 11/1999 Pryor
5,982,370 A 11/1999 Kamper
5,982,891 A 11/1999 Ginter et al.
5,982,902 A 11/1999 Terano
5,983,179 A 11/1999 Gould et al.
5,983,184 A 11/1999 Noguchi
5,983,216 A 11/1999 Kirsch et al.
5,987,132 A 11/1999 Rowney
5,987,140 A 11/1999 Rowney et al.
5,987,401 A 11/1999 Trudeau
5,987,404 A 11/1999 Della Pietra et al.
5,987,440 A 11/1999 O'Neil et al.
5,990,887 A 11/1999 Redpath et al.
5,991,441 A 11/1999 Jourjine
5,995,460 A 11/1999 Takagi et al.
5,995,590 A 11/1999 Brunet et al.
5,995,918 A 11/1999 Kendall et al.
5,998,972 A 12/1999 Gong
5,999,169 A 12/1999 Lee
5,999,895 A 12/1999 Forest
5,999,908 A 12/1999 Abelow
5,999,927 A 12/1999 Tukey et al.
6,005,495 A 12/1999 Connolly et al.
6,006,274 A 12/1999 Hawkins et al.
6,009,237 A 12/1999 Hirabayashi et al.
6,011,585 A 1/2000 Anderson
6,014,428 A 1/2000 Wolf
6,016,471 A 1/2000 Kuhn et al.
6,017,219 A 1/2000 Adams, Jr. et al.
6,018,705 A 1/2000 Gaudet
6,018,711 A 1/2000 French-St. George et al.
6,020,881 A 2/2000 Naughton et al.
6,023,536 A 2/2000 Visser
6,023,676 A 2/2000 Erell
6,023,684 A 2/2000 Pearson
6,024,288 A 2/2000 Gottlich et al.
6,026,345 A 2/2000 Shah et al.
6,026,375 A 2/2000 Hall et al.
6,026,388 A 2/2000 Liddy et al.
6,026,393 A 2/2000 Gupta et al.
6,029,132 A 2/2000 Kuhn et al.
6,029,135 A 2/2000 Krasle
6,035,267 A 3/2000 Watanabe et al.
6,035,303 A 3/2000 Baer et al.
6,035,336 A 3/2000 Lu et al.
6,038,533 A 3/2000 Buchsbaum et al.
6,040,824 A 3/2000 Maekawa et al.
6,041,023 A 3/2000 Lakhansingh
6,047,255 A 4/2000 Williamson
6,047,300 A 4/2000 Walfish et al.
6,052,654 A 4/2000 Gaudet et al.
6,052,656 A 4/2000 Suda et al.
6,054,990 A 4/2000 Tran
6,055,514 A 4/2000 Wren
6,055,531 A 4/2000 Bennett et al.
6,061,646 A 5/2000 Martino et al.
6,064,767 A 5/2000 Muir et al.
6,064,951 A 5/2000 Park et al.
6,064,959 A 5/2000 Young et al.
6,064,960 A 5/2000 Bellegarda et al.
6,064,963 A 5/2000 Gainsboro
6,067,519 A 5/2000 Lowry
6,069,648 A 5/2000 Suso et al.
6,070,138 A 5/2000 Iwata
6,070,139 A 5/2000 Miyazawa et al.
6,070,140 A 5/2000 Tran
6,070,147 A 5/2000 Harms et al.
6,073,033 A 6/2000 Campo
6,073,036 A 6/2000 Heikkinen et al.
6,073,091 A 6/2000 Kanevsky et al.
6,073,097 A 6/2000 Gould et al.
6,076,051 A 6/2000 Messerly et al.
6,076,060 A 6/2000 Lin et al.
6,076,088 A 6/2000 Paik et al.
6,078,885 A 6/2000 Beutnagel
6,078,914 A 6/2000 Redfern
6,081,750 A 6/2000 Hoffberg et al.
6,081,774 A 6/2000 de Hita et al.
6,081,780 A 6/2000 Lumelsky
6,085,204 A 7/2000 Chijiwa et al.
6,088,671 A 7/2000 Gould et al.
6,088,731 A 7/2000 Kiraly et al.
6,092,036 A 7/2000 Hamann et al.
6,092,038 A 7/2000 Kanevsky et al.
6,092,043 A 7/2000 Squires et al.
6,094,649 A 7/2000 Bowen et al.
6,097,391 A 8/2000 Wilcox
6,101,468 A 8/2000 Gould et al.
6,101,470 A 8/2000 Eide et al.
6,105,865 A 8/2000 Hardesty
6,108,627 A 8/2000 Sabourin
6,108,640 A 8/2000 Slotznick
6,111,562 A 8/2000 Downs et al.
6,111,572 A 8/2000 Blair et al.
6,115,686 A 9/2000 Chung et al.
6,116,907 A 9/2000 Baker et al.
6,119,101 A 9/2000 Peckover
6,121,960 A 9/2000 Carroll et al.
6,122,340 A 9/2000 Darley et al.
6,122,614 A 9/2000 Kahn et al.
6,122,616 A 9/2000 Henton
6,122,647 A 9/2000 Horowitz et al.
6,125,284 A 9/2000 Moore et al.
6,125,346 A 9/2000 Nishimura et al.
6,125,356 A 9/2000 Brockman et al.
6,129,582 A 10/2000 Wilhite et al.
6,138,098 A 10/2000 Shieber et al.
6,138,158 A 10/2000 Boyle et al.
6,141,642 A 10/2000 Oh
6,141,644 A 10/2000 Kuhn et al.
6,144,377 A 11/2000 Oppermann et al.
6,144,380 A 11/2000 Shwarts et al.
6,144,938 A 11/2000 Surace et al.
6,144,939 A 11/2000 Pearson et al.
6,151,401 A 11/2000 Annaratone
6,154,551 A 11/2000 Frenkel
6,154,720 A 11/2000 Onishi et al.
6,157,935 A 12/2000 Tran et al.
6,161,084 A 12/2000 Messerly et al.
6,161,087 A 12/2000 Wightman et al.
6,161,944 A 12/2000 Leman
6,163,769 A 12/2000 Acero et al.
6,163,809 A 12/2000 Buckley
6,167,369 A 12/2000 Schulze
6,169,538 B1 1/2001 Nowlan et al.
6,172,948 B1 1/2001 Keller et al.
6,173,194 B1 1/2001 Vanttila
6,173,251 B1 1/2001 Ito et al.
6,173,261 B1 1/2001 Arai et al.
6,173,263 B1 1/2001 Conkie
6,173,279 B1 1/2001 Levin et al.
6,177,905 B1 1/2001 Welch
6,177,931 B1 1/2001 Alexander et al.
6,179,432 B1 1/2001 Zhang et al.
6,182,028 B1 1/2001 Karaali et al.
6,182,099 B1 1/2001 Nakasato

(56) References Cited

U.S. PATENT DOCUMENTS 6,185,533 B1 2/2001 Holm et al.
6,188,391 B1 2/2001 Seely et al.
6,188,967 B1 2/2001 Kurtzberg et al.
6,188,999 B1 2/2001 Moody
6,191,939 B1 2/2001 Burnett
6,192,253 B1 2/2001 Charlier et al.
6,192,340 B1 2/2001 Abecassis
6,195,641 B1 2/2001 Loring et al.
6,199,076 B1 3/2001 Logan et al.
6,205,456 B1 3/2001 Nakao
6,208,044 B1 3/2001 Viswanadham et al.
6,208,932 B1 3/2001 Ohmura et al.
6,208,956 B1 3/2001 Motoyama
6,208,964 B1 3/2001 Sabourin
6,208,967 B1 3/2001 Pauws et al.
6,208,971 B1 3/2001 Bellegarda et al.
6,212,564 B1 4/2001 Harter et al.
6,216,102 B1 4/2001 Martino et al.
6,216,131 B1 4/2001 Liu et al.
6,217,183 B1 4/2001 Shipman
6,222,347 B1 4/2001 Gong
6,226,403 B1 5/2001 Parthasarathy
6,226,533 B1 5/2001 Akahane
6,226,614 B1 5/2001 Mizuno et al.
6,226,655 B1 5/2001 Borman et al.
6,230,322 B1 5/2001 Saib et al.
6,232,539 B1 5/2001 Looney et al.
6,232,966 B1 5/2001 Kurlander
6,233,545 B1 5/2001 Datig
6,233,547 B1 5/2001 Denber et al.
6,233,559 B1 5/2001 Balakrishnan
6,233,578 B1 5/2001 Machihara et al.
6,237,025 B1 5/2001 Ludwig et al.
6,240,303 B1 5/2001 Katzur
6,243,681 B1 6/2001 Guji et al.
6,246,981 B1 6/2001 Papineni et al.
6,248,946 B1 6/2001 Dwek
6,249,606 B1 6/2001 Kiraly et al.
6,259,436 B1 7/2001 Moon et al.
6,259,826 B1 7/2001 Pollard et al.
6,260,011 B1 7/2001 Heckerman et al.
6,260,013 B1 7/2001 Sejnoha
6,260,016 B1 7/2001 Holm et al.
6,260,024 B1 7/2001 Shkedy
6,266,098 B1 7/2001 Cove et al.
6,266,637 B1 7/2001 Donovan et al.
6,268,859 B1 7/2001 Andresen et al.
6,269,712 B1 8/2001 Zentmyer
6,271,835 B1 8/2001 Hoeksma
6,272,456 B1 8/2001 De Campos
6,272,464 B1 8/2001 Kiraz et al.
6,275,795 B1 8/2001 Tzirkel-Hancock
6,275,824 B1 8/2001 O'Flaherty et al.
6,278,443 B1 8/2001 Amro et al.
6,278,970 B1 8/2001 Milner
6,282,507 B1 8/2001 Horiguchi et al.
6,282,511 B1 8/2001 Mayer
6,285,785 B1 9/2001 Bellegarda et al.
6,285,786 B1 9/2001 Seni et al.
6,289,085 B1 9/2001 Miyashita et al.
6,289,124 B1 9/2001 Okamoto
6,289,301 B1 9/2001 Higginbotham et al.
6,289,353 B1 9/2001 Hazlehurst et al.
6,292,772 B1 9/2001 Kantrowitz
6,292,778 B1 9/2001 Sukkar
6,295,390 B1 9/2001 Kobayashi et al.
6,295,541 B1 9/2001 Bodnar et al.
6,297,818 B1 10/2001 Ulrich et al.
6,298,314 B1 10/2001 Blackadar et al.
6,298,321 B1 10/2001 Karlov et al.
6,300,947 B1 10/2001 Kanevsky
6,304,844 B1 10/2001 Pan et al.
6,304,846 B1 10/2001 George et al.
6,307,548 B1 10/2001 Flinchem et al.
6,308,149 B1 10/2001 Gaussier et al.
6,310,610 B1 10/2001 Beaton et al.
6,311,152 B1 10/2001 Bai et al.
6,311,157 B1 10/2001 Strong
6,311,189 B1 10/2001 deVries et al.
6,317,237 B1 11/2001 Nakao et al.
6,317,594 B1 11/2001 Gossman et al.
6,317,707 B1 11/2001 Bangalore et al.
6,317,831 B1 11/2001 King
6,321,092 B1 11/2001 Fitch et al.
6,321,179 B1 11/2001 Glance et al.
6,323,846 B1 11/2001 Westerman et al.
6,324,499 B1 11/2001 Lewis et al.
6,324,502 B1 11/2001 Handel et al.
6,324,512 B1 11/2001 Junqua et al.
6,324,514 B2 11/2001 Matulich et al.
6,330,538 B1 12/2001 Breen
6,330,539 B1 * 12/2001 Takayama ........... G10L 15/1822 704/251
6,331,867 B1 12/2001 Eberhard et al.
6,332,175 B1 12/2001 Birrell et al.
6,334,103 B1 12/2001 Surace et al.
6,335,722 B1 1/2002 Tani et al.
6,336,365 B1 1/2002 Blackadar et al.
6,336,727 B1 1/2002 Kim
6,340,937 B1 1/2002 Stepita-Klauco
6,341,316 B1 1/2002 Kloba et al.
6,343,267 B1 1/2002 Kuhn et al.
6,345,240 B1 2/2002 Havens
6,345,250 B1 2/2002 Martin
6,351,522 B1 2/2002 Vitikainen
6,351,762 B1 2/2002 Ludwig et al.
6,353,442 B1 3/2002 Masui
6,353,794 B1 3/2002 Davis et al.
6,356,287 B1 3/2002 Ruberry et al.
6,356,854 B1 3/2002 Schubert et al.
6,356,864 B1 3/2002 Foltz et al.
6,356,905 B1 3/2002 Gershman et al.
6,357,147 B1 3/2002 Darley et al.
6,359,572 B1 3/2002 Vale
6,359,970 B1 3/2002 Burgess
6,360,227 B1 3/2002 Aggarwal et al.
6,360,237 B1 3/2002 Schulz et al.
6,363,348 B1 3/2002 Besling et al.
6,366,883 B1 4/2002 Campbell et al.
6,366,884 B1 4/2002 Bellegarda et al.
6,374,217 B1 4/2002 Bellegarda
6,374,226 B1 4/2002 Hunt et al.
6,377,530 B1 4/2002 Burrows
6,377,925 B1 4/2002 Greene, Jr. et al.
6,377,928 B1 4/2002 Saxena et al.
6,381,593 B1 4/2002 Yano et al.
6,385,586 B1 5/2002 Dietz
6,385,662 B1 5/2002 Moon et al.
6,389,114 B1 5/2002 Dowens et al.
6,397,183 B1 5/2002 Baba et al.
6,397,186 B1 5/2002 Bush et al.
6,400,806 B1 6/2002 Uppaluru
6,400,996 B1 6/2002 Hoffberg et al.
6,401,065 B1 6/2002 Kanevsky et al.
6,401,085 B1 6/2002 Gershman et al.
6,405,169 B1 6/2002 Kondo et al.
6,405,238 B1 6/2002 Votipka
6,408,272 B1 6/2002 White et al.
6,411,924 B1 6/2002 De Hita et al.
6,411,932 B1 6/2002 Molnar et al.
6,415,250 B1 7/2002 Van Den Akker
6,417,873 B1 7/2002 Fletcher et al.
6,421,305 B1 7/2002 Gioscia et al.
6,421,672 B1 7/2002 McAllister et al.
6,421,707 B1 7/2002 Miller et al.
6,424,944 B1 7/2002 Hikawa
6,430,531 B1 8/2002 Polish
6,430,551 B1 8/2002 Thelen et al.
6,434,522 B1 8/2002 Tsuboka
6,434,524 B1 8/2002 Weber
6,434,529 B1 8/2002 Walker et al.
6,434,604 B1 8/2002 Harada et al.
6,437,818 B1 8/2002 Ludwig et al.
6,438,523 B1 8/2002 Oberteuffer et al.

(56) References Cited

U.S. PATENT DOCUMENTS

| | | | |
|---|---|---|---|
| 6,442,518 | B1 | 8/2002 | Van Thong et al. |
| 6,442,523 | B1 | 8/2002 | Siegel |
| 6,446,076 | B1 | 9/2002 | Burkey et al. |
| 6,448,485 | B1 | 9/2002 | Barile |
| 6,448,986 | B1 | 9/2002 | Smith |
| 6,449,620 | B1 | 9/2002 | Draper et al. |
| 6,453,281 | B1 | 9/2002 | Walters et al. |
| 6,453,292 | B2 | 9/2002 | Ramaswamy et al. |
| 6,453,312 | B1 | 9/2002 | Goiffon et al. |
| 6,453,315 | B1 | 9/2002 | Weissman et al. |
| 6,456,616 | B1 | 9/2002 | Rantanen |
| 6,456,972 | B1 | 9/2002 | Gladstein et al. |
| 6,460,015 | B1 | 10/2002 | Hetherington et al. |
| 6,460,029 | B1 | 10/2002 | Fries et al. |
| 6,462,778 | B1 | 10/2002 | Abram et al. |
| 6,463,128 | B1 | 10/2002 | Elwin |
| 6,463,413 | B1 | 10/2002 | Applebaum et al. |
| 6,466,654 | B1 | 10/2002 | Cooper et al. |
| 6,467,924 | B2 | 10/2002 | Shipman |
| 6,469,712 | B1 | 10/2002 | Hilpert, Jr. et al. |
| 6,469,722 | B1 | 10/2002 | Kinoe et al. |
| 6,469,732 | B1 | 10/2002 | Chang et al. |
| 6,470,347 | B1 | 10/2002 | Gillam |
| 6,473,630 | B1 | 10/2002 | Baranowski et al. |
| 6,473,754 | B1 | 10/2002 | Matsubayashi et al. |
| 6,477,488 | B1 | 11/2002 | Bellegarda |
| 6,477,494 | B2 | 11/2002 | Hyde-Thomson et al. |
| 6,487,533 | B2 | 11/2002 | Hyde-Thomson et al. |
| 6,487,534 | B1 | 11/2002 | Thelen et al. |
| 6,487,663 | B1 | 11/2002 | Jaisimha et al. |
| 6,489,951 | B1 | 12/2002 | Wong et al. |
| 6,490,547 | B1 | 12/2002 | Atkin et al. |
| 6,490,560 | B1 | 12/2002 | Ramaswamy et al. |
| 6,493,006 | B1 | 12/2002 | Gourdol et al. |
| 6,493,428 | B1 | 12/2002 | Hillier |
| 6,493,652 | B1 | 12/2002 | Ohlenbusch et al. |
| 6,493,667 | B1 | 12/2002 | De Souza et al. |
| 6,499,013 | B1 | 12/2002 | Weber |
| 6,499,014 | B1 | 12/2002 | Chihara |
| 6,499,016 | B1 | 12/2002 | Anderson et al. |
| 6,501,937 | B1 | 12/2002 | Ho et al. |
| 6,502,194 | B1 | 12/2002 | Berman et al. |
| 6,505,158 | B1 | 1/2003 | Conkie |
| 6,505,175 | B1 | 1/2003 | Silverman et al. |
| 6,505,183 | B1 | 1/2003 | Loofbourrow et al. |
| 6,507,829 | B1 | 1/2003 | Richards et al. |
| 6,510,406 | B1 | 1/2003 | Marchisio |
| 6,510,412 | B1 | 1/2003 | Sasai et al. |
| 6,510,417 | B1 | 1/2003 | Woods et al. |
| 6,513,006 | B2 | 1/2003 | Howard et al. |
| 6,513,008 | B2 | 1/2003 | Pearson et al. |
| 6,513,063 | B1 | 1/2003 | Julia et al. |
| 6,519,565 | B1 | 2/2003 | Clements et al. |
| 6,519,566 | B1 | 2/2003 | Boyer et al. |
| 6,523,026 | B1 | 2/2003 | Gillis |
| 6,523,061 | B1 | 2/2003 | Halverson et al. |
| 6,523,172 | B1 | 2/2003 | Martinez-Guerra et al. |
| 6,526,351 | B2 | 2/2003 | Whitham |
| 6,526,382 | B1 | 2/2003 | Yuschik |
| 6,526,395 | B1 | 2/2003 | Morris |
| 6,529,592 | B1 | 3/2003 | Khan |
| 6,529,608 | B2 | 3/2003 | Gersabeck et al. |
| 6,532,444 | B1 | 3/2003 | Weber |
| 6,532,446 | B1 | 3/2003 | King |
| 6,535,610 | B1 | 3/2003 | Stewart |
| 6,535,852 | B2 | 3/2003 | Eide |
| 6,535,983 | B1 | 3/2003 | McCormack et al. |
| 6,536,139 | B2 | 3/2003 | Darley et al. |
| 6,538,665 | B2 | 3/2003 | Crow et al. |
| 6,542,171 | B1 | 4/2003 | Satou et al. |
| 6,542,584 | B1 | 4/2003 | Sherwood et al. |
| 6,542,868 | B1 | 4/2003 | Badt et al. |
| 6,546,262 | B1 | 4/2003 | Freadman |
| 6,546,367 | B2 | 4/2003 | Otsuka |
| 6,546,388 | B1 | 4/2003 | Edlund et al. |
| 6,549,497 | B2 | 4/2003 | Miyamoto et al. |
| 6,553,343 | B1 | 4/2003 | Kagoshima et al. |
| 6,553,344 | B2 | 4/2003 | Bellegarda et al. |
| 6,556,971 | B1 | 4/2003 | Rigsby et al. |
| 6,556,983 | B1 | 4/2003 | Altschuler et al. |
| 6,560,903 | B1 | 5/2003 | Darley |
| 6,563,769 | B1 | 5/2003 | Van Der Meulen |
| 6,564,186 | B1 | 5/2003 | Kiraly et al. |
| 6,567,549 | B1 | 5/2003 | Marianetti et al. |
| 6,570,557 | B1 | 5/2003 | Westerman et al. |
| 6,570,596 | B2 | 5/2003 | Frederiksen |
| 6,582,342 | B2 | 6/2003 | Kaufman |
| 6,583,806 | B2 | 6/2003 | Ludwig et al. |
| 6,584,464 | B1 | 6/2003 | Warthen |
| 6,587,403 | B1 | 7/2003 | Keller et al. |
| 6,587,404 | B1 | 7/2003 | Keller et al. |
| 6,590,303 | B1 | 7/2003 | Austin et al. |
| 6,591,379 | B1 | 7/2003 | LeVine et al. |
| 6,594,673 | B1 | 7/2003 | Smith et al. |
| 6,594,688 | B2 | 7/2003 | Ludwig et al. |
| 6,597,345 | B2 | 7/2003 | Hirshberg |
| 6,598,021 | B1 | 7/2003 | Shambaugh et al. |
| 6,598,022 | B2 | 7/2003 | Yuschik |
| 6,598,039 | B1 | 7/2003 | Livowsky |
| 6,598,054 | B2 | 7/2003 | Schuetze et al. |
| 6,601,026 | B2 | 7/2003 | Appelt et al. |
| 6,601,234 | B1 | 7/2003 | Bowman-Amuah |
| 6,603,837 | B1 | 8/2003 | Kesanupalli et al. |
| 6,604,059 | B2 | 8/2003 | Strubbe et al. |
| 6,606,101 | B1 | 8/2003 | Malamud et al. |
| 6,606,388 | B1 | 8/2003 | Townsend et al. |
| 6,606,632 | B1 | 8/2003 | Saulpaugh et al. |
| 6,611,789 | B1 | 8/2003 | Darley |
| 6,615,172 | B1 | 9/2003 | Bennett et al. |
| 6,615,175 | B1 | 9/2003 | Gazdzinski |
| 6,615,176 | B2 | 9/2003 | Lewis et al. |
| 6,615,220 | B1 | 9/2003 | Austin et al. |
| 6,621,768 | B1 | 9/2003 | Keller et al. |
| 6,621,892 | B1 | 9/2003 | Banister et al. |
| 6,622,121 | B1 | 9/2003 | Crepy et al. |
| 6,622,136 | B2 | 9/2003 | Russell |
| 6,623,529 | B1 | 9/2003 | Lakritz |
| 6,625,583 | B1 | 9/2003 | Silverman et al. |
| 6,628,808 | B1 | 9/2003 | Bach et al. |
| 6,631,186 | B1 | 10/2003 | Adams et al. |
| 6,631,346 | B1 | 10/2003 | Karaorman et al. |
| 6,633,741 | B1 | 10/2003 | Posa et al. |
| 6,633,846 | B1 | 10/2003 | Bennett et al. |
| 6,633,932 | B1 | 10/2003 | Bork et al. |
| 6,642,940 | B1 | 11/2003 | Dakss et al. |
| 6,643,401 | B1 | 11/2003 | Kashioka et al. |
| 6,643,824 | B1 | 11/2003 | Bates et al. |
| 6,647,260 | B2 | 11/2003 | Dusse et al. |
| 6,650,735 | B2 | 11/2003 | Burton et al. |
| 6,651,042 | B1 | 11/2003 | Field et al. |
| 6,651,218 | B1 | 11/2003 | Adler et al. |
| 6,654,740 | B2 | 11/2003 | Tokuda et al. |
| 6,658,389 | B1 | 12/2003 | Alpdemir |
| 6,658,408 | B2 | 12/2003 | Yano et al. |
| 6,658,577 | B2 | 12/2003 | Huppi et al. |
| 6,661,438 | B1 | 12/2003 | Shiraishi et al. |
| 6,662,023 | B1 | 12/2003 | Helle |
| 6,665,639 | B2 | 12/2003 | Mozer et al. |
| 6,665,640 | B1 | 12/2003 | Bennett et al. |
| 6,665,641 | B1 | 12/2003 | Coorman et al. |
| 6,671,672 | B1 | 12/2003 | Heck |
| 6,671,683 | B2 | 12/2003 | Kanno |
| 6,671,856 | B1 | 12/2003 | Gillam |
| 6,675,169 | B1 | 1/2004 | Bennett et al. |
| 6,675,233 | B1 | 1/2004 | Du et al. |
| 6,677,932 | B1 | 1/2004 | Westerman |
| 6,680,675 | B1 | 1/2004 | Suzuki |
| 6,684,187 | B1 | 1/2004 | Conkie |
| 6,684,376 | B1 | 1/2004 | Kerzman et al. |
| 6,690,387 | B2 | 2/2004 | Zimmerman et al. |
| 6,690,800 | B2 | 2/2004 | Resnick |
| 6,690,828 | B2 | 2/2004 | Meyers |
| 6,691,064 | B2 | 2/2004 | Vroman |
| 6,691,090 | B1 | 2/2004 | Laurila et al. |

(56) References Cited

U.S. PATENT DOCUMENTS 6,691,111 B2 2/2004 Lazaridis et al.
6,691,151 B1 2/2004 Cheyer et al.
6,694,295 B2 2/2004 Lindholm et al.
6,694,297 B2 2/2004 Sato
6,697,780 B1 2/2004 Beutnagel et al.
6,697,824 B1 2/2004 Bowman-Amuah
6,701,294 B1 3/2004 Ball et al.
6,701,305 B1 3/2004 Holt et al.
6,701,318 B2 3/2004 Fox et al.
6,704,015 B1 3/2004 Bovarnick et al.
6,704,034 B1 3/2004 Rodriguez et al.
6,704,698 B1 3/2004 Paulsen, Jr. et al.
6,704,710 B2 3/2004 Strong
6,708,153 B2 3/2004 Brittan et al.
6,711,585 B1 3/2004 Copperman et al.
6,714,221 B1 3/2004 Christie et al.
6,716,139 B1 4/2004 Hosseinzadeh-Dolkhani et al.
6,718,324 B2 4/2004 Edlund et al.
6,718,331 B2 4/2004 Davis et al.
6,720,980 B1 4/2004 Lui et al.
6,721,728 B2 4/2004 McGreevy
6,721,734 B1 4/2004 Subasic et al.
6,724,370 B2 4/2004 Dutta et al.
6,725,197 B1 4/2004 Wuppermann et al.
6,728,675 B1 4/2004 Maddalozzo, Jr. et al.
6,728,681 B2 4/2004 Whitham
6,728,729 B1 4/2004 Jawa et al.
6,731,312 B2 5/2004 Robbin
6,732,142 B1 5/2004 Bates et al.
6,735,562 B1 5/2004 Zhang et al.
6,735,632 B1 5/2004 Kiraly et al.
6,738,738 B2 5/2004 Henton
6,738,742 B2 5/2004 Badt et al.
6,741,264 B1 5/2004 Lesser
6,742,021 B1 5/2004 Halverson et al.
6,751,592 B1 6/2004 Shiga
6,751,595 B2 6/2004 Busayapongchai et al.
6,751,621 B1 6/2004 Calistri-Yeh et al.
6,754,504 B1 6/2004 Reed
6,757,362 B1 6/2004 Cooper et al.
6,757,365 B1 6/2004 Bogard
6,757,646 B2 6/2004 Marchisio
6,757,653 B2 6/2004 Buth et al.
6,757,718 B1 6/2004 Halverson et al.
6,760,412 B1 7/2004 Loucks
6,760,700 B2 7/2004 Lewis et al.
6,760,754 B1 7/2004 Isaacs et al.
6,762,741 B2 7/2004 Weindorf
6,762,777 B2 7/2004 Carroll
6,763,089 B2 7/2004 Feigenbaum
6,766,294 B2 7/2004 MacGinite et al.
6,766,295 B1 7/2004 Murveit et al.
6,766,320 B1 7/2004 Wang et al.
6,766,324 B2 7/2004 Carlson et al.
6,768,979 B1 7/2004 Menendez-Pidal et al.
6,771,982 B1 8/2004 Toupin
6,772,123 B2 8/2004 Cooklev et al.
6,772,195 B1 8/2004 Hatlelid et al.
6,772,394 B1 8/2004 Kamada
6,775,358 B1 8/2004 Breitenbach et al.
6,778,951 B1 8/2004 Contractor
6,778,952 B2 8/2004 Bellegarda
6,778,962 B1 8/2004 Kasai et al.
6,778,970 B2 8/2004 Au
6,778,979 B2 8/2004 Grefenstette et al.
6,782,510 B1 8/2004 Gross et al.
6,784,901 B1 8/2004 Harvey et al.
6,789,094 B2 9/2004 Rudoff et al.
6,789,231 B1 9/2004 Reynar et al.
6,790,704 B2 9/2004 Doyle et al.
6,792,082 B1 9/2004 Levine
6,792,083 B2 9/2004 Dams et al.
6,792,086 B1 9/2004 Saylor et al.
6,792,407 B2 9/2004 Kibre et al.
6,794,566 B2 9/2004 Pachet
6,795,059 B2 9/2004 Endo
6,799,226 B1 9/2004 Robbin et al.
6,801,604 B2 10/2004 Maes et al.
6,801,964 B1 10/2004 Mahdavi
6,803,905 B1 10/2004 Capps et al.
6,804,649 B2 10/2004 Miranda
6,804,677 B2 10/2004 Shadmon et al.
6,807,536 B2 10/2004 Achlioptas et al.
6,807,574 B1 10/2004 Partovi et al.
6,809,724 B1 10/2004 Shiraishi et al.
6,810,379 B1 10/2004 Vermeulen et al.
6,813,218 B1 11/2004 Antonelli et al.
6,813,491 B1 11/2004 McKinney
6,813,607 B1 11/2004 Faruquie et al.
6,816,578 B1 11/2004 Kredo et al.
6,820,055 B2 11/2004 Saindon et al.
6,829,018 B2 12/2004 Lin et al.
6,829,603 B1 12/2004 Chai et al.
6,832,194 B1 12/2004 Mozer et al.
6,832,381 B1 12/2004 Mathur et al.
6,836,651 B2 12/2004 Segal et al.
6,836,760 B1 12/2004 Bellegarda et al.
6,839,464 B2 1/2005 Hawkins et al.
6,839,669 B1 1/2005 Gould et al.
6,839,670 B1 1/2005 Stammler et al.
6,839,742 B1 1/2005 Dyer et al.
6,842,767 B1 1/2005 Partovi et al.
6,847,966 B1 1/2005 Sommer et al.
6,847,979 B2 1/2005 Allemang et al.
6,850,775 B1 2/2005 Berg
6,850,887 B2 2/2005 Epstein et al.
6,851,115 B1 2/2005 Cheyer et al.
6,856,259 B1 2/2005 Sharp
6,857,800 B2 2/2005 Zhang et al.
6,859,931 B1 2/2005 Cheyer et al.
6,862,568 B2 3/2005 Case
6,862,710 B1 3/2005 Marchisio
6,862,713 B1 3/2005 Kraft et al.
6,865,533 B2 3/2005 Addison et al.
6,868,045 B1 3/2005 Schroder
6,868,385 B1 3/2005 Gerson
6,870,529 B1 3/2005 Davis
6,871,346 B1 3/2005 Kumbalimutt et al.
6,873,953 B1 3/2005 Lennig
6,873,986 B2 3/2005 McConnell et al.
6,876,947 B1 4/2005 Darley et al.
6,877,003 B2 4/2005 Ho et al.
6,879,957 B1 4/2005 Pechter et al.
6,882,335 B2 4/2005 Saarinen
6,882,337 B2 4/2005 Shetter
6,882,747 B2 4/2005 Thawonmas et al.
6,882,955 B1 4/2005 Ohlenbusch et al.
6,882,971 B2 4/2005 Craner
6,885,734 B1 4/2005 Eberle et al.
6,889,361 B1 5/2005 Bates et al.
6,895,084 B1 5/2005 Saylor et al.
6,895,257 B2 5/2005 Boman et al.
6,895,380 B2 5/2005 Sepe, Jr.
6,895,558 B1 5/2005 Loveland
6,898,550 B1 5/2005 Blackadar et al.
6,901,364 B2 5/2005 Nguyen et al.
6,901,399 B1 5/2005 Corston et al.
6,904,405 B2 6/2005 Suominen
6,907,112 B1 6/2005 Guedalia et al.
6,907,140 B2 6/2005 Matsugu et al.
6,910,004 B2 6/2005 Tarbouriech et al.
6,910,007 B2 6/2005 Stylianou et al.
6,910,012 B2 6/2005 Hartley et al.
6,910,186 B2 6/2005 Kim
6,911,971 B2 6/2005 Suzuki et al.
6,912,407 B1 6/2005 Clarke et al.
6,912,498 B2 6/2005 Stevens et al.
6,912,499 B1 6/2005 Sabourin et al.
6,915,138 B2 7/2005 Kraft
6,915,246 B2 7/2005 Gusler et al.
6,915,294 B1 7/2005 Singh et al.
6,917,373 B2 7/2005 Vong et al.
6,918,677 B2 7/2005 Shipman
6,924,828 B1 8/2005 Hirsch

(56) References Cited

U.S. PATENT DOCUMENTS 6,925,438 B2 8/2005 Mohamed et al.
6,928,149 B1 8/2005 Panjwani et al.
6,928,614 B1 8/2005 Everhart
6,931,255 B2 8/2005 Mekuria
6,931,384 B1 8/2005 Horvitz et al.
6,932,708 B2 8/2005 Yamashita et al.
6,933,928 B1 8/2005 Lilienthal et al.
6,934,394 B1 8/2005 Anderson
6,934,684 B2 8/2005 Alpdemir et al.
6,934,756 B2 8/2005 Maes
6,934,812 B1 8/2005 Robbin et al.
6,937,975 B1 8/2005 Elworthy
6,937,986 B2 8/2005 Denenberg et al.
6,944,593 B2 9/2005 Kuzunuki et al.
6,944,846 B2 9/2005 Ryzhov
6,948,094 B2 9/2005 Schultz et al.
6,950,087 B2 9/2005 Knox et al.
6,950,502 B1 9/2005 Jenkins
6,952,799 B2 10/2005 Edwards et al.
6,954,755 B2 10/2005 Reisman
6,954,899 B1 10/2005 Anderson
6,956,845 B2 10/2005 Baker et al.
6,957,076 B2 10/2005 Hunzinger
6,957,183 B2 10/2005 Malayath et al.
6,960,734 B1 11/2005 Park
6,961,699 B1 11/2005 Kahn et al.
6,961,912 B2 11/2005 Aoki et al.
6,963,759 B1 11/2005 Gerson
6,963,841 B2 11/2005 Handal et al.
6,964,023 B2 11/2005 Maes et al.
6,965,376 B2 11/2005 Tani et al.
6,965,863 B1 11/2005 Zuberec et al.
6,968,311 B2 11/2005 Knockeart et al.
6,970,820 B2 11/2005 Junqua et al.
6,970,881 B1 11/2005 Mohan et al.
6,970,915 B1 11/2005 Partovi et al.
6,970,935 B1 11/2005 Maes
6,976,090 B2 12/2005 Ben-Shaul et al.
6,978,127 B1 12/2005 Bulthuis et al.
6,978,239 B2 12/2005 Chu et al.
6,980,949 B2 12/2005 Ford
6,980,953 B1 12/2005 Kanevsky et al.
6,980,955 B2 12/2005 Okutani et al.
6,983,251 B1 1/2006 Umemoto et al.
6,985,858 B2 1/2006 Frey et al.
6,985,865 B1 1/2006 Packingham et al.
6,985,958 B2 1/2006 Zwiegincew et al.
6,988,063 B2 1/2006 Tokuda et al.
6,988,071 B1 1/2006 Gazdzinski
6,990,450 B2 1/2006 Case et al.
6,996,520 B2 2/2006 Levin
6,996,531 B2 2/2006 Korall et al.
6,996,575 B2 2/2006 Cox et al.
6,999,066 B2 2/2006 Litwiller
6,999,914 B1 2/2006 Boerner et al.
6,999,925 B2 2/2006 Fischer et al.
6,999,927 B2 2/2006 Mozer et al.
7,000,189 B2 2/2006 Dutta et al.
7,002,556 B2 2/2006 Tsukada et al.
7,003,099 B1 2/2006 Zhang et al.
7,003,463 B1 2/2006 Maes et al.
7,003,522 B1 2/2006 Reynar et al.
7,006,969 B2 2/2006 Atal
7,006,973 B1 2/2006 Genly et al.
7,007,026 B2 2/2006 Wilkinson et al.
7,007,239 B1 2/2006 Hawkins et al.
7,010,581 B2 3/2006 Brown et al.
7,013,289 B2 3/2006 Horn et al.
7,013,308 B1 3/2006 Tunstall-Pedoe
7,013,429 B2 3/2006 Fujimoto et al.
7,015,894 B2 3/2006 Morohoshi
7,020,685 B1 3/2006 Chen et al.
7,024,363 B1 4/2006 Comerford et al.
7,024,364 B2 4/2006 Guerra et al.
7,024,366 B1 4/2006 Deyoe et al.
7,024,460 B2 4/2006 Koopmas et al.
7,027,568 B1 4/2006 Simpson et al.
7,027,974 B1 4/2006 Busch et al.
7,027,990 B2 4/2006 Sussman
7,028,252 B1 4/2006 Baru et al.
7,030,861 B1 4/2006 Westerman et al.
7,031,530 B2 4/2006 Driggs et al.
7,031,909 B2 4/2006 Mao et al.
7,035,794 B2 4/2006 Sirivara
7,035,801 B2 4/2006 Jimenez-Feltstrom
7,035,807 B1 4/2006 Brittain et al.
7,036,128 B1 4/2006 Julia et al.
7,036,681 B2 5/2006 Suda et al.
7,038,659 B2 5/2006 Rajkowski
7,039,588 B2 5/2006 Okutani et al.
7,043,420 B2 5/2006 Ratnaparkhi
7,043,422 B2 5/2006 Gao et al.
7,046,230 B2 5/2006 Zadesky et al.
7,046,850 B2 5/2006 Braspenning et al.
7,047,193 B1 5/2006 Bellegarda
7,050,550 B2 5/2006 Steinbiss et al.
7,050,725 B2 5/2006 Jingu
7,050,796 B2 * 5/2006 Humphrey .......... H04M 1/7253
455/177.1
7,050,976 B1 5/2006 Packingham
7,050,977 B1 5/2006 Bennett
7,051,096 B1 5/2006 Krawiec et al.
7,054,419 B2 5/2006 Culliss
7,054,888 B2 5/2006 LaChapelle et al.
7,057,607 B2 6/2006 Mayoraz et al.
7,058,569 B2 6/2006 Coorman et al.
7,058,888 B1 6/2006 Gjerstad et al.
7,058,889 B2 6/2006 Trovato et al.
7,062,223 B2 6/2006 Gerber et al.
7,062,225 B2 6/2006 White
7,062,428 B2 6/2006 Hogenhout et al.
7,062,438 B2 6/2006 Kobayashi et al.
7,065,185 B1 6/2006 Koch
7,065,485 B1 6/2006 Chong-White et al.
7,069,213 B2 6/2006 Thompson
7,069,220 B2 6/2006 Coffman et al.
7,069,560 B1 6/2006 Cheyer et al.
7,072,686 B1 7/2006 Schrager
7,072,941 B2 7/2006 Griffin et al.
7,076,527 B2 7/2006 Bellegarda et al.
7,079,713 B2 7/2006 Simmons
7,082,322 B2 7/2006 Harano
7,084,758 B1 8/2006 Cole
7,084,856 B2 8/2006 Huppi
7,085,723 B2 8/2006 Ross et al.
7,085,960 B2 8/2006 Bouat et al.
7,088,345 B2 8/2006 Robinson et al.
7,089,292 B1 8/2006 Roderick et al.
7,092,370 B2 8/2006 Jiang et al.
7,092,887 B2 8/2006 Mozer et al.
7,092,928 B1 8/2006 Elad et al.
7,092,950 B2 8/2006 Wong et al.
7,093,693 B1 8/2006 Gazdzinski
7,095,733 B1 8/2006 Yarlagadda et al.
7,096,183 B2 8/2006 Junqua
7,100,117 B1 8/2006 Chwa et al.
7,103,548 B2 9/2006 Squibbs et al.
7,107,204 B1 9/2006 Liu et al.
7,111,248 B2 9/2006 Mulvey et al.
7,111,774 B2 9/2006 Song
7,113,803 B2 9/2006 Dehlin
7,113,943 B2 9/2006 Bradford et al.
7,115,035 B2 10/2006 Tanaka
7,117,231 B2 10/2006 Fischer et al.
7,120,865 B1 10/2006 Horvitz et al.
7,123,696 B2 10/2006 Lowe
7,124,081 B1 10/2006 Bellegarda
7,124,082 B2 10/2006 Freedman
7,124,164 B1 10/2006 Chemtob
7,127,046 B1 10/2006 Smith et al.
7,127,394 B2 10/2006 Strong et al.
7,127,396 B2 10/2006 Chu et al.
7,127,403 B1 10/2006 Saylor et al.
7,129,932 B1 10/2006 Klarlund et al.

(56) References Cited

U.S. PATENT DOCUMENTS

| | | | |
|---|---|---|---|
| 7,133,900 | B1 | 11/2006 | Szeto |
| 7,136,710 | B1 | 11/2006 | Hoffberg et al. |
| 7,136,818 | B1 | 11/2006 | Cosatto et al. |
| 7,137,126 | B1 | 11/2006 | Coffman et al. |
| 7,139,697 | B2 | 11/2006 | Häkkinen et al. |
| 7,139,714 | B2 | 11/2006 | Bennett et al. |
| 7,139,722 | B2 | 11/2006 | Perrella et al. |
| 7,143,028 | B2 | 11/2006 | Hillis et al. |
| 7,143,038 | B2 | 11/2006 | Katae |
| 7,143,040 | B2 | 11/2006 | Durston et al. |
| 7,146,319 | B2 | 12/2006 | Hunt |
| 7,146,437 | B2 | 12/2006 | Robbin et al. |
| 7,149,319 | B2 | 12/2006 | Roeck |
| 7,149,695 | B1 | 12/2006 | Bellegarda |
| 7,149,964 | B1 | 12/2006 | Cottrille et al. |
| 7,152,070 | B1 | 12/2006 | Musick et al. |
| 7,152,093 | B2 | 12/2006 | Ludwig et al. |
| 7,154,526 | B2 | 12/2006 | Foote et al. |
| 7,155,668 | B2 | 12/2006 | Holland et al. |
| 7,158,647 | B2 | 1/2007 | Azima et al. |
| 7,159,174 | B2 | 1/2007 | Johnson et al. |
| 7,162,412 | B2 | 1/2007 | Yamada et al. |
| 7,162,482 | B1 | 1/2007 | Dunning |
| 7,165,073 | B2 | 1/2007 | Vandersluis |
| 7,166,791 | B2 | 1/2007 | Robbin et al. |
| 7,171,350 | B2 | 1/2007 | Lin et al. |
| 7,171,360 | B2 | 1/2007 | Huang et al. |
| 7,174,042 | B1 | 2/2007 | Simmons et al. |
| 7,174,295 | B1 | 2/2007 | Kivimaki |
| 7,174,297 | B2 | 2/2007 | Guerra et al. |
| 7,174,298 | B2 | 2/2007 | Sharma |
| 7,177,794 | B2 | 2/2007 | Mani et al. |
| 7,177,798 | B2 | 2/2007 | Hsu et al. |
| 7,177,817 | B1 | 2/2007 | Khosla et al. |
| 7,181,386 | B2 | 2/2007 | Mohri et al. |
| 7,181,388 | B2 | 2/2007 | Tian |
| 7,184,064 | B2 | 2/2007 | Zimmerman et al. |
| 7,185,276 | B2 | 2/2007 | Keswa |
| 7,188,085 | B2 | 3/2007 | Pelletier |
| 7,190,351 | B1 | 3/2007 | Goren |
| 7,190,794 | B2 | 3/2007 | Hinde |
| 7,191,118 | B2 | 3/2007 | Bellegarda |
| 7,191,131 | B1 | 3/2007 | Nagao |
| 7,193,615 | B2 | 3/2007 | Kim et al. |
| 7,194,186 | B1 | 3/2007 | Strub et al. |
| 7,194,413 | B2 | 3/2007 | Mahoney et al. |
| 7,194,471 | B1 | 3/2007 | Nagatsuka et al. |
| 7,194,611 | B2 | 3/2007 | Bear et al. |
| 7,194,699 | B2 | 3/2007 | Thomson et al. |
| 7,197,120 | B2 | 3/2007 | Luehrig et al. |
| 7,197,460 | B1 | 3/2007 | Gupta et al. |
| 7,200,550 | B2 | 4/2007 | Menezes et al. |
| 7,200,558 | B2 | 4/2007 | Kato et al. |
| 7,200,559 | B2 | 4/2007 | Wang |
| 7,203,297 | B2 | 4/2007 | Vitikainen et al. |
| 7,203,646 | B2 | 4/2007 | Bennett |
| 7,206,809 | B2 | 4/2007 | Ludwig et al. |
| 7,212,827 | B1 | 5/2007 | Veschi |
| 7,216,008 | B2 | 5/2007 | Sakata |
| 7,216,073 | B2 | 5/2007 | Lavi et al. |
| 7,216,080 | B2 | 5/2007 | Tsiao et al. |
| 7,218,920 | B2 | 5/2007 | Hyon |
| 7,218,943 | B2 | 5/2007 | Klassen et al. |
| 7,219,063 | B2 | 5/2007 | Schalk et al. |
| 7,219,123 | B1 | 5/2007 | Fiechter et al. |
| 7,225,125 | B2 | 5/2007 | Bennett et al. |
| 7,228,278 | B2 | 6/2007 | Nguyen et al. |
| 7,231,343 | B1 | 6/2007 | Treadgold et al. |
| 7,231,597 | B1 | 6/2007 | Braun et al. |
| 7,233,790 | B2 | 6/2007 | Kjellberg et al. |
| 7,233,904 | B2 | 6/2007 | Luisi |
| 7,234,026 | B2 | 6/2007 | Robbin et al. |
| 7,236,932 | B1 | 6/2007 | Grajski |
| 7,240,002 | B2 | 7/2007 | Minamino et al. |
| 7,243,130 | B2 | 7/2007 | Horvitz et al. |
| 7,243,305 | B2 | 7/2007 | Schabes et al. |
| 7,246,118 | B2 | 7/2007 | Chastain et al. |
| 7,246,151 | B2 | 7/2007 | Isaacs et al. |
| 7,248,900 | B2 | 7/2007 | Deeds et al. |
| 7,251,313 | B1 | 7/2007 | Miller et al. |
| 7,251,454 | B2 | 7/2007 | White |
| 7,254,773 | B2 | 8/2007 | Bates et al. |
| 7,257,537 | B2 | 8/2007 | Ross et al. |
| 7,259,752 | B1 | 8/2007 | Simmons |
| 7,260,529 | B1 | 8/2007 | Lengen |
| 7,260,567 | B2 | 8/2007 | Parikh et al. |
| 7,263,373 | B2 | 8/2007 | Mattisson |
| 7,266,189 | B1 | 9/2007 | Day |
| 7,266,495 | B1 | 9/2007 | Beaufays et al. |
| 7,266,496 | B2 | 9/2007 | Wang et al. |
| 7,266,499 | B2 * | 9/2007 | Surace .................. G10L 13/033 704/270 |
| 7,269,544 | B2 | 9/2007 | Simske |
| 7,269,556 | B2 | 9/2007 | Kiss et al. |
| 7,272,224 | B1 | 9/2007 | Normile et al. |
| 7,275,063 | B2 | 9/2007 | Horn |
| 7,277,088 | B2 | 10/2007 | Robinson et al. |
| 7,277,854 | B2 | 10/2007 | Bennett et al. |
| 7,277,855 | B1 | 10/2007 | Acker et al. |
| 7,280,958 | B2 | 10/2007 | Pavlov et al. |
| 7,283,072 | B1 | 10/2007 | Plachta et al. |
| 7,289,102 | B2 | 10/2007 | Hinckley et al. |
| 7,290,039 | B1 | 10/2007 | Lisitsa et al. |
| 7,292,579 | B2 | 11/2007 | Morris |
| 7,292,979 | B2 | 11/2007 | Karas et al. |
| 7,292,980 | B1 | 11/2007 | August et al. |
| 7,296,019 | B1 | 11/2007 | Chandrasekar et al. |
| 7,296,230 | B2 | 11/2007 | Fukatsu et al. |
| 7,299,033 | B2 | 11/2007 | Kjellberg et al. |
| 7,302,392 | B1 | 11/2007 | Thenthiruperai et al. |
| 7,302,394 | B1 | 11/2007 | Baray et al. |
| 7,302,686 | B2 | 11/2007 | Togawa |
| 7,308,404 | B2 | 12/2007 | Venkataraman et al. |
| 7,308,408 | B1 | 12/2007 | Stifelman et al. |
| 7,310,329 | B2 | 12/2007 | Vieri et al. |
| 7,310,600 | B1 | 12/2007 | Garner et al. |
| 7,310,605 | B2 | 12/2007 | Janakiraman et al. |
| 7,313,523 | B1 | 12/2007 | Bellegarda et al. |
| 7,315,809 | B2 | 1/2008 | Xun |
| 7,315,818 | B2 | 1/2008 | Stevens et al. |
| 7,318,020 | B1 | 1/2008 | Kim |
| 7,319,957 | B2 | 1/2008 | Robinson et al. |
| 7,321,783 | B2 | 1/2008 | Kim |
| 7,322,023 | B2 | 1/2008 | Shulman et al. |
| 7,324,833 | B2 | 1/2008 | White et al. |
| 7,324,947 | B2 | 1/2008 | Jordan et al. |
| 7,328,155 | B2 | 2/2008 | Endo et al. |
| 7,328,250 | B2 | 2/2008 | Wang et al. |
| 7,345,670 | B2 | 3/2008 | Armstrong |
| 7,345,671 | B2 | 3/2008 | Robbin et al. |
| 7,349,953 | B2 | 3/2008 | Lisitsa et al. |
| 7,353,139 | B1 | 4/2008 | Burrell et al. |
| 7,359,493 | B1 | 4/2008 | Wang et al. |
| 7,359,671 | B2 | 4/2008 | Richenstein et al. |
| 7,359,851 | B2 | 4/2008 | Tong et al. |
| 7,360,158 | B1 | 4/2008 | Beeman |
| 7,362,738 | B2 | 4/2008 | Taube et al. |
| 7,363,227 | B2 | 4/2008 | Mapes-Riordan et al. |
| 7,363,586 | B1 | 4/2008 | Briggs et al. |
| 7,365,260 | B2 | 4/2008 | Kawashima |
| 7,366,461 | B1 | 4/2008 | Brown |
| 7,373,291 | B2 | 5/2008 | Garst |
| 7,373,612 | B2 | 5/2008 | Risch et al. |
| 7,376,556 | B2 | 5/2008 | Bennett |
| 7,376,632 | B1 | 5/2008 | Sadek et al. |
| 7,376,645 | B2 | 5/2008 | Bernard |
| 7,378,963 | B1 | 5/2008 | Begault et al. |
| 7,379,874 | B2 | 5/2008 | Schmid et al. |
| 7,380,203 | B2 | 5/2008 | Keely et al. |
| 7,383,170 | B2 | 6/2008 | Mills et al. |
| 7,386,438 | B1 | 6/2008 | Franz et al. |
| 7,386,449 | B2 | 6/2008 | Sun et al. |
| 7,386,799 | B1 | 6/2008 | Clanton et al. |
| 7,389,224 | B1 | 6/2008 | Elworthy |

(56) References Cited

U.S. PATENT DOCUMENTS 7,389,225 B1 6/2008 Jensen et al.
7,392,185 B2 6/2008 Bennett
7,394,947 B2 7/2008 Li et al.
7,398,209 B2 7/2008 Kennewick et al.
7,401,300 B2 7/2008 Nurmi
7,403,938 B2 7/2008 Harrison et al.
7,403,941 B2 7/2008 Bedworth et al.
7,404,143 B2 7/2008 Freelander et al.
7,409,337 B1 8/2008 Potter et al.
7,409,347 B1 8/2008 Bellegarda
7,412,389 B2 8/2008 Yang
7,412,470 B2 8/2008 Masuno et al.
7,415,100 B2 8/2008 Cooper et al.
7,415,469 B2 8/2008 Singh et al.
7,418,389 B2 8/2008 Chu et al.
7,418,392 B1 8/2008 Mozer et al.
7,426,467 B2 9/2008 Nashida et al.
7,426,468 B2 9/2008 Coifman et al.
7,427,024 B1 9/2008 Gazdzinski et al.
7,428,541 B2 9/2008 Houle
7,433,869 B2 10/2008 Gollapudi
7,433,921 B2 10/2008 Ludwig et al.
7,436,947 B2 10/2008 Wadler et al.
7,441,184 B2 10/2008 Frerebeau et al.
7,443,316 B2 10/2008 Lim
7,444,589 B2 10/2008 Zellner
7,447,360 B2 11/2008 Li et al.
7,447,624 B2 11/2008 Fuhrmann et al.
7,447,635 B1 11/2008 Konopka et al.
7,447,637 B1 11/2008 Grant et al.
7,451,081 B1 11/2008 Gajic et al.
7,454,351 B2 11/2008 Jeschke et al.
7,460,652 B2 12/2008 Chang
7,461,043 B2 12/2008 Hess
7,467,087 B1 12/2008 Gillick et al.
7,467,164 B2 12/2008 Marsh
7,472,061 B1 12/2008 Alewine et al.
7,472,065 B2 12/2008 Aaron et al.
7,475,010 B2 1/2009 Chao
7,475,015 B2 1/2009 Epstein et al.
7,475,063 B2 1/2009 Datta et al.
7,477,238 B2 1/2009 Fux et al.
7,477,240 B2 1/2009 Yanagisawa
7,478,037 B2 1/2009 Strong
7,478,091 B2 1/2009 Mojsilovic et al.
7,478,129 B1 1/2009 Chemtob
7,479,948 B2 1/2009 Kim et al.
7,479,949 B2 1/2009 Jobs et al.
7,483,832 B2 1/2009 Tischer
7,483,894 B2 1/2009 Cao
7,487,089 B2 2/2009 Mozer
7,487,093 B2 2/2009 Mutsuno et al.
7,490,034 B2 2/2009 Finnigan et al.
7,490,039 B1 2/2009 Shaffer et al.
7,493,560 B1 2/2009 Kipnes et al.
7,496,498 B2 2/2009 Chu et al.
7,496,512 B2 2/2009 Zhao et al.
7,499,923 B2 3/2009 Kawatani
7,502,738 B2 3/2009 Kennewick et al.
7,505,795 B1 3/2009 Lim et al.
7,508,324 B2 3/2009 Suraqui
7,508,373 B2 3/2009 Lin et al.
7,516,123 B2 4/2009 Betz et al.
7,519,327 B2 4/2009 White
7,519,398 B2 4/2009 Hirose
7,522,927 B2 4/2009 Fitch et al.
7,523,036 B2 4/2009 Akabane et al.
7,523,108 B2 4/2009 Cao
7,526,466 B2 4/2009 Au
7,526,738 B2 4/2009 Ording et al.
7,528,713 B2 5/2009 Singh et al.
7,529,671 B2 5/2009 Rockenbeck et al.
7,529,676 B2 5/2009 Koyama
7,535,997 B1 5/2009 McQuaide, Jr. et al.
7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang
7,562,032 B2 7/2009 Abbosh et al.
7,565,104 B1 7/2009 Brown et al.
7,565,380 B1 7/2009 Venkatachary, Sr.
7,571,092 B1 8/2009 Nieh
7,571,106 B2 8/2009 Cao et al.
7,577,522 B2 8/2009 Rosenberg
7,580,551 B1 8/2009 Srihari et al.
7,580,576 B2 8/2009 Wang et al.
7,580,839 B2 8/2009 Tamura et al.
7,584,093 B2 9/2009 Potter et al.
7,584,278 B2 9/2009 Rajarajan et al.
7,584,429 B2 9/2009 Fabritius
7,593,868 B2 9/2009 Margiloff et al.
7,596,269 B2 9/2009 King et al.
7,596,499 B2 9/2009 Anguera et al.
7,596,606 B2 9/2009 Codignotto
7,596,765 B2 9/2009 Almas
7,599,918 B2 10/2009 Shen et al.
7,603,349 B1 10/2009 Kraft et al.
7,603,381 B2 10/2009 Burke et al.
7,606,444 B1 10/2009 Erol et al.
7,609,179 B2 10/2009 Diaz-Gutierrez et al.
7,610,258 B2 10/2009 Yuknewicz et al.
7,613,264 B2 11/2009 Wells et al.
7,614,008 B2 11/2009 Ording
7,617,094 B2 11/2009 Aoki et al.
7,620,407 B1 11/2009 Donald et al.
7,620,549 B2 11/2009 Di Cristo et al.
7,620,894 B1 11/2009 Kahn
7,623,119 B2 11/2009 Autio et al.
7,624,007 B2 11/2009 Bennett
7,627,481 B1 12/2009 Kuo et al.
7,630,901 B2 12/2009 Omi
7,633,076 B2 12/2009 Huppi et al.
7,634,409 B2 12/2009 Kennewick et al.
7,634,413 B1 12/2009 Kuo et al.
7,634,718 B2 12/2009 Nakajima
7,634,732 B1 12/2009 Blagsvedt et al.
7,636,657 B2 12/2009 Ju et al.
7,640,158 B2 12/2009 Detlef et al.
7,640,160 B2 12/2009 Di Cristo et al.
7,643,990 B1 1/2010 Bellegarda
7,647,225 B2 1/2010 Bennett et al.
7,649,454 B2 1/2010 Singh et al.
7,649,877 B2 1/2010 Vieri et al.
7,653,883 B2 1/2010 Hotelling et al.
7,656,393 B2 2/2010 King et al.
7,657,424 B2 2/2010 Bennett
7,657,828 B2 2/2010 Lucas et al.
7,657,844 B2 2/2010 Gibson et al.
7,657,849 B2 2/2010 Chaudhri et al.
7,663,607 B2 2/2010 Hotelling et al.
7,664,558 B2 2/2010 Lindahl et al.
7,664,638 B2 2/2010 Cooper et al.
7,669,134 B1 2/2010 Christie et al.
7,672,841 B2 3/2010 Bennett
7,672,952 B2 3/2010 Isaacson et al.
7,673,238 B2 3/2010 Girish et al.
7,673,340 B1 3/2010 Cohen et al.

(56) References Cited

U.S. PATENT DOCUMENTS 7,676,026 B1 3/2010 Baxter, Jr.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,683,893 B2 3/2010 Kim
7,684,985 B2 3/2010 Dominach et al.
7,684,990 B2 3/2010 Caskey et al.
7,684,991 B2 3/2010 Stohr et al.
7,689,245 B2 3/2010 Cox et al.
7,689,408 B2 3/2010 Chen et al.
7,689,409 B2 3/2010 Heinecke
7,689,421 B2 3/2010 Li et al.
7,693,715 B2 4/2010 Hwang et al.
7,693,717 B2 4/2010 Kahn et al.
7,693,719 B2 4/2010 Chu et al.
7,693,720 B2 4/2010 Kennewick et al.
7,698,131 B2 4/2010 Bennett
7,702,500 B2 4/2010 Blaedow
7,702,508 B2 4/2010 Bennett
7,703,091 B1 4/2010 Martin et al.
7,706,510 B2 4/2010 Ng
7,707,026 B2 4/2010 Liu
7,707,027 B2 4/2010 Balchandran et al.
7,707,032 B2 4/2010 Wang et al.
7,707,221 B1 4/2010 Dunning et al.
7,707,267 B2 4/2010 Lisitsa et al.
7,710,262 B2 5/2010 Ruha
7,711,129 B2 5/2010 Lindahl et al.
7,711,550 B1 5/2010 Feinberg et al.
7,711,565 B1 5/2010 Gazdzinski
7,711,672 B2 5/2010 Au
7,712,053 B2 5/2010 Bradford et al.
7,716,056 B2 5/2010 Weng et al.
7,716,216 B1 5/2010 Harik et al.
7,720,674 B2 5/2010 Kaiser et al.
7,720,683 B1 5/2010 Vermeulen et al.
7,721,226 B2 5/2010 Barabe et al.
7,721,301 B2 5/2010 Wong et al.
7,724,242 B2 5/2010 Hillis et al.
7,724,696 B1 5/2010 Parekh
7,725,307 B2 5/2010 Bennett
7,725,318 B2 5/2010 Gavalda et al.
7,725,320 B2 5/2010 Bennett
7,725,321 B2 5/2010 Bennett
7,725,838 B2 5/2010 Williams
7,729,904 B2 6/2010 Bennett
7,729,916 B2 6/2010 Coffman et al.
7,734,461 B2 6/2010 Kwak et al.
7,735,012 B2 6/2010 Naik
7,739,588 B2 6/2010 Reynar et al.
7,742,953 B2 6/2010 King et al.
7,743,188 B2 6/2010 Haitani et al.
7,747,616 B2 6/2010 Yamada et al.
7,752,152 B2 7/2010 Paek et al.
7,756,708 B2 7/2010 Cohen et al.
7,756,868 B2 7/2010 Lee
7,756,871 B2 7/2010 Yacoub et al.
7,757,173 B2 7/2010 Beaman
7,757,182 B2 7/2010 Elliott et al.
7,761,296 B1 7/2010 Bakis et al.
7,763,842 B2 7/2010 Hsu et al.
7,774,204 B2 8/2010 Mozer et al.
7,774,388 B1 8/2010 Runchey
7,777,717 B2 8/2010 Fux et al.
7,778,432 B2 8/2010 Larsen
7,778,595 B2 8/2010 White et al.
7,778,632 B2 8/2010 Kurlander et al.
7,778,830 B2 8/2010 Davis et al.
7,779,353 B2 8/2010 Grigoriu et al.
7,779,356 B2 8/2010 Griesmer
7,779,357 B2 8/2010 Naik
7,783,283 B2 8/2010 Kuusinen et al.
7,783,486 B2 8/2010 Rosser et al.
7,788,590 B2 8/2010 Taboada et al.
7,788,663 B2 8/2010 Illowsky et al.
7,796,980 B1 9/2010 McKinney et al.
7,797,265 B2 9/2010 Brinker et al.
7,797,269 B2 9/2010 Rieman et al.
7,797,331 B2 9/2010 Theimer et al.
7,797,629 B2 9/2010 Fux et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,423 B2 11/2010 Schubert
7,831,426 B2 11/2010 Bennett
7,831,432 B2 11/2010 Bodin et al.
7,836,437 B2 11/2010 Kacmarcik et al.
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,865,817 B2 1/2011 Ryan et al.
7,869,999 B2 1/2011 Amato et al.
7,870,118 B2 1/2011 Jiang et al.
7,870,133 B2 1/2011 Krishnamoorthy et al.
7,873,519 B2 1/2011 Bennett
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,184 B2 2/2011 Blumenberg et al.
7,889,185 B2 2/2011 Blumenberg et al.
7,890,330 B2 2/2011 Ozkaragoz et al.
7,890,652 B2 2/2011 Bull et al.
7,895,531 B2 2/2011 Radtke et al.
7,899,666 B2 3/2011 Varone
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.

(56) References Cited

U.S. PATENT DOCUMENTS 7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,861 B2 5/2011 Martin et al.
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,363 B2 10/2011 Cha et al.
8,046,374 B1 10/2011 Bromwich et al.
8,050,500 B1 11/2011 Batty et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,131,557 B2 3/2012 Davis et al.
8,135,115 B1 3/2012 Hogg, Jr. et al.
8,138,912 B2 3/2012 Singh et al.
8,140,335 B2 3/2012 Kennewick et al.
8,140,567 B2 3/2012 Padovitz et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,179,370 B1 5/2012 Yamasani et al.
8,188,856 B2 5/2012 Singh et al.
8,190,359 B2 5/2012 Bourne
8,195,467 B2 6/2012 Mozer et al.
8,195,468 B2 6/2012 Kennewick et al.
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,228,299 B1 7/2012 Maloney et al.
8,239,207 B2 8/2012 Seligman et al.
8,244,712 B2 8/2012 Serlet et al.
8,255,217 B2 8/2012 Stent et al.
8,260,617 B2 9/2012 Dhanakshirur et al.
8,270,933 B2 9/2012 Riemer et al.
8,275,621 B2 9/2012 Alewine et al.
8,279,171 B2 10/2012 Hirai et al.
8,285,546 B2 10/2012 Reich
8,285,551 B2 10/2012 Gazdzinski
8,285,553 B2 10/2012 Gazdzinski
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,801 B2 10/2012 Sweeney et al.
8,301,456 B2 10/2012 Gazdzinski
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,332,218 B2 12/2012 Cross et al.
8,332,224 B2 12/2012 Di Cristo et al.
8,332,748 B1 12/2012 Karam
8,340,975 B1 12/2012 Rosenberger
8,345,665 B2 1/2013 Vieri et al.
8,352,183 B2 1/2013 Thota et al.
8,352,268 B2 1/2013 Naik et al.

(56) References Cited

U.S. PATENT DOCUMENTS 8,352,272 B2 1/2013 Rogers et al.
8,355,919 B2 1/2013 Silverman et al.
8,359,234 B2 1/2013 Vieri
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,406,745 B1 3/2013 Upadhyay et al.
8,423,288 B2 4/2013 Stahl et al.
8,428,758 B2 4/2013 Naik et al.
8,447,612 B2 5/2013 Gazdzinski
8,452,597 B2 5/2013 Bringert et al.
8,458,115 B2 6/2013 Cai et al.
8,458,278 B2 6/2013 Christie et al.
8,464,150 B2 6/2013 Davidson et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,515,750 B1 8/2013 Lei et al.
8,521,513 B2 8/2013 Millett et al.
8,527,276 B1 9/2013 Senior et al.
8,560,229 B1 10/2013 Park et al.
8,583,416 B2 11/2013 Huang et al.
8,589,869 B2 11/2013 Wolfram
8,595,004 B2 11/2013 Koshinaka
8,606,568 B1 12/2013 Tickner et al.
8,620,659 B2 12/2013 Di Cristo et al.
8,620,662 B2 12/2013 Bellegarda
8,626,681 B1 1/2014 Jurca et al.
8,645,137 B2 2/2014 Bellegarda et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,688,446 B2 4/2014 Yanagihara et al.
8,688,453 B1 4/2014 Joshi et al.
8,696,364 B2 4/2014 Cohen
8,706,472 B2 4/2014 Ramerth et al.
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,931 B2 7/2014 Fux et al.
8,781,841 B1 7/2014 Wang
8,798,995 B1 8/2014 Edara et al.
8,805,690 B1 8/2014 LeBeau et al.
8,838,457 B2 9/2014 Cerra et al.
8,855,915 B2 10/2014 Furuhata et al.
8,861,925 B1 10/2014 Ohme
8,868,409 B1 10/2014 Mengibar et al.
8,880,405 B2 11/2014 Cerra et al.
8,886,540 B2 11/2014 Cerra et al.
8,886,541 B2 11/2014 Friedlander
8,903,716 B2 12/2014 Chen et al.
8,930,191 B2 1/2015 Gruber et al.
8,943,423 B2 1/2015 Merrill et al.
8,972,878 B2 3/2015 David et al.
8,983,383 B1 3/2015 Haskin
8,996,381 B2 3/2015 Mozer et al.
9,009,046 B1 4/2015 Stewart
9,070,366 B1 6/2015 Mathias et al.
9,081,411 B2 7/2015 Kalns et al.
9,081,482 B1 7/2015 Zhai et al.
9,098,467 B1 8/2015 Blanksteen et al.
9,123,338 B1 9/2015 Sanders et al.
9,190,062 B2 11/2015 Haughay
9,218,809 B2 12/2015 Bellegarda
9,223,537 B2 12/2015 Brown et al.
9,255,812 B2 2/2016 Maeoka et al.
9,258,604 B1 2/2016 Bilobrov et al.
9,292,487 B1 3/2016 Weber
9,299,344 B2 3/2016 Braho et al.
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,338,493 B2 5/2016 Van Os et al.
9,349,368 B1 5/2016 LeBeau et al.
9,377,871 B2 6/2016 Waddell et al.
9,423,266 B2 8/2016 Clark et al.
2001/0005859 A1 6/2001 Okuyama et al.
2001/0020259 A1 9/2001 Sekiguchi et al.
2001/0027394 A1 10/2001 Theimer
2001/0027396 A1 10/2001 Sato
2001/0029455 A1 10/2001 Chin et al.
2001/0030660 A1 10/2001 Zainoulline
2001/0032080 A1 10/2001 Fukada
2001/0041021 A1 11/2001 Boyle et al.
2001/0042107 A1 11/2001 Palm
2001/0044724 A1 11/2001 Hon et al.
2001/0047264 A1 11/2001 Roundtree
2001/0055963 A1 12/2001 Cloutier
2001/0056342 A1 12/2001 Piehn et al.
2001/0056347 A1 12/2001 Chazan et al.
2002/0001395 A1 1/2002 Davis et al.
2002/0002039 A1 1/2002 Qureshey et al.
2002/0002413 A1 1/2002 Tokue
2002/0002461 A1 1/2002 Tetsumoto
2002/0002465 A1 1/2002 Maes
2002/0004703 A1 1/2002 Gaspard, II
2002/0010581 A1 1/2002 Euler et al.
2002/0010584 A1 1/2002 Schultz et al.
2002/0010589 A1 1/2002 Nashida et al.
2002/0010726 A1 1/2002 Rogson
2002/0010798 A1 1/2002 Ben-Shaul et al.
2002/0013707 A1 1/2002 Shaw et al.
2002/0013784 A1 1/2002 Swanson
2002/0013852 A1 1/2002 Janik
2002/0015024 A1 2/2002 Westerman et al.
2002/0015064 A1 2/2002 Robotham et al.
2002/0021278 A1 2/2002 Hinckley et al.
2002/0026315 A1 2/2002 Miranda
2002/0026456 A1 2/2002 Bradford
2002/0031254 A1 3/2002 Lantrip et al.
2002/0031262 A1 3/2002 Imagawa et al.
2002/0032048 A1 3/2002 Kitao et al.
2002/0032564 A1 3/2002 Ehsani et al.
2002/0032591 A1 3/2002 Mahaffy et al.
2002/0032751 A1 3/2002 Bharadwaj
2002/0035467 A1 3/2002 Morimoto et al.
2002/0035469 A1 3/2002 Holzapfel
2002/0035474 A1 3/2002 Alpdemir
2002/0040297 A1 4/2002 Tsiao et al.

(56) References Cited

U.S. PATENT DOCUMENTS

| | | | |
|---|---|---|---|
| 2002/0040359 | A1 | 4/2002 | Green et al. |
| 2002/0042707 | A1 | 4/2002 | Zhao et al. |
| 2002/0045438 | A1 | 4/2002 | Tagawa et al. |
| 2002/0045961 | A1 | 4/2002 | Gibbs et al. |
| 2002/0046025 | A1 | 4/2002 | Hain |
| 2002/0046315 | A1 | 4/2002 | Miller et al. |
| 2002/0052730 | A1 | 5/2002 | Nakao |
| 2002/0052740 | A1 | 5/2002 | Charlesworth et al. |
| 2002/0052746 | A1 | 5/2002 | Handelman |
| 2002/0052747 | A1 | 5/2002 | Sarukkai |
| 2002/0052913 | A1 | 5/2002 | Yamada et al. |
| 2002/0054094 | A1 | 5/2002 | Matsuda |
| 2002/0055844 | A1 | 5/2002 | L'Esperance et al. |
| 2002/0055934 | A1 | 5/2002 | Lipscomb et al. |
| 2002/0057293 | A1 | 5/2002 | Liao |
| 2002/0059066 | A1 | 5/2002 | O'hagan |
| 2002/0059068 | A1 | 5/2002 | Rose et al. |
| 2002/0065659 | A1 | 5/2002 | Isono et al. |
| 2002/0065797 | A1 | 5/2002 | Meidan et al. |
| 2002/0067308 | A1 | 6/2002 | Robertson |
| 2002/0069063 | A1 | 6/2002 | Buchner et al. |
| 2002/0069071 | A1 | 6/2002 | Knockeart et al. |
| 2002/0069220 | A1 | 6/2002 | Tran |
| 2002/0072816 | A1 | 6/2002 | Shdema et al. |
| 2002/0072908 | A1 | 6/2002 | Case et al. |
| 2002/0072914 | A1 | 6/2002 | Alshawi et al. |
| 2002/0072915 | A1 | 6/2002 | Bower |
| 2002/0073177 | A1 | 6/2002 | Clark et al. |
| 2002/0077082 | A1 | 6/2002 | Cruickshank |
| 2002/0077817 | A1 | 6/2002 | Atal |
| 2002/0078041 | A1 | 6/2002 | Wu |
| 2002/0080163 | A1 | 6/2002 | Morey |
| 2002/0083068 | A1 | 6/2002 | Quass et al. |
| 2002/0085037 | A1 | 7/2002 | Leavitt et al. |
| 2002/0086680 | A1 | 7/2002 | Hunzinger |
| 2002/0087306 | A1 | 7/2002 | Lee et al. |
| 2002/0087508 | A1 | 7/2002 | Hull et al. |
| 2002/0087974 | A1 | 7/2002 | Sprague et al. |
| 2002/0091511 | A1 | 7/2002 | Hellwig et al. |
| 2002/0091529 | A1 | 7/2002 | Whitham |
| 2002/0095286 | A1 | 7/2002 | Ross et al. |
| 2002/0095290 | A1 | 7/2002 | Kahn et al. |
| 2002/0099547 | A1 | 7/2002 | Chu et al. |
| 2002/0099552 | A1 | 7/2002 | Rubin et al. |
| 2002/0101447 | A1 | 8/2002 | Carro |
| 2002/0103641 | A1 | 8/2002 | Kuo et al. |
| 2002/0103644 | A1 | 8/2002 | Brocious et al. |
| 2002/0103646 | A1 | 8/2002 | Kochanski et al. |
| 2002/0107684 | A1 | 8/2002 | Gao |
| 2002/0109709 | A1 | 8/2002 | Sagar |
| 2002/0110248 | A1 | 8/2002 | Kovales et al. |
| 2002/0111198 | A1 | 8/2002 | Heie et al. |
| 2002/0111810 | A1 | 8/2002 | Khan et al. |
| 2002/0116082 | A1 | 8/2002 | Gudorf |
| 2002/0116171 | A1 | 8/2002 | Russell |
| 2002/0116185 | A1 | 8/2002 | Cooper et al. |
| 2002/0116189 | A1 | 8/2002 | Yeh et al. |
| 2002/0116420 | A1 | 8/2002 | Allam et al. |
| 2002/0117384 | A1 | 8/2002 | Marchant |
| 2002/0120697 | A1 | 8/2002 | Generous et al. |
| 2002/0120925 | A1 | 8/2002 | Logan |
| 2002/0122053 | A1 | 9/2002 | Dutta et al. |
| 2002/0123891 | A1 | 9/2002 | Epstein et al. |
| 2002/0123894 | A1 | 9/2002 | Woodward |
| 2002/0126097 | A1 | 9/2002 | Savolainen |
| 2002/0128821 | A1 | 9/2002 | Ehsani et al. |
| 2002/0128827 | A1 | 9/2002 | Bu et al. |
| 2002/0128840 | A1 | 9/2002 | Hinde et al. |
| 2002/0129057 | A1 | 9/2002 | Spielberg |
| 2002/0133347 | A1 | 9/2002 | Schoneburg et al. |
| 2002/0133348 | A1 | 9/2002 | Pearson et al. |
| 2002/0135565 | A1 | 9/2002 | Gordon et al. |
| 2002/0135618 | A1 | 9/2002 | Maes et al. |
| 2002/0137505 | A1 | 9/2002 | Eiche et al. |
| 2002/0138254 | A1 | 9/2002 | Isaka et al. |
| 2002/0138265 | A1 | 9/2002 | Stevens et al. |
| 2002/0138270 | A1 | 9/2002 | Bellegarda et al. |
| 2002/0138616 | A1 | 9/2002 | Basson et al. |
| 2002/0140679 | A1 | 10/2002 | Wen |
| 2002/0143532 | A1 | 10/2002 | McLean et al. |
| 2002/0143533 | A1 | 10/2002 | Lucas et al. |
| 2002/0143542 | A1 | 10/2002 | Eide |
| 2002/0143551 | A1 | 10/2002 | Sharma et al. |
| 2002/0143826 | A1 | 10/2002 | Day et al. |
| 2002/0151297 | A1 | 10/2002 | Remboski et al. |
| 2002/0152045 | A1 | 10/2002 | Dowling et al. |
| 2002/0152255 | A1 | 10/2002 | Smith et al. |
| 2002/0154160 | A1 | 10/2002 | Hosokawa |
| 2002/0156771 | A1 | 10/2002 | Frieder et al. |
| 2002/0161865 | A1 | 10/2002 | Nguyen |
| 2002/0163544 | A1 | 11/2002 | Baker et al. |
| 2002/0164000 | A1 | 11/2002 | Cohen et al. |
| 2002/0165918 | A1 | 11/2002 | Bettis |
| 2002/0166123 | A1 | 11/2002 | Schrader et al. |
| 2002/0167534 | A1 | 11/2002 | Burke |
| 2002/0169592 | A1 | 11/2002 | Aityan |
| 2002/0169605 | A1 | 11/2002 | Damiba et al. |
| 2002/0173273 | A1 | 11/2002 | Spurgat et al. |
| 2002/0173889 | A1 | 11/2002 | Odinak et al. |
| 2002/0173961 | A1 | 11/2002 | Guerra |
| 2002/0173962 | A1 | 11/2002 | Tang et al. |
| 2002/0173966 | A1 | 11/2002 | Henton |
| 2002/0177993 | A1 | 11/2002 | Veditz et al. |
| 2002/0184003 | A1 | 12/2002 | Hakkinen et al. |
| 2002/0184015 | A1 | 12/2002 | Li et al. |
| 2002/0184027 | A1 | 12/2002 | Brittan et al. |
| 2002/0184189 | A1 | 12/2002 | Hay et al. |
| 2002/0189426 | A1 | 12/2002 | Hirade et al. |
| 2002/0191029 | A1 | 12/2002 | Gillespie et al. |
| 2002/0193996 | A1 | 12/2002 | Squibbs et al. |
| 2002/0196911 | A1 | 12/2002 | Gao et al. |
| 2002/0198714 | A1 | 12/2002 | Zhou |
| 2002/0198715 | A1 | 12/2002 | Belrose |
| 2003/0001881 | A1 | 1/2003 | Mannheimer et al. |
| 2003/0002632 | A1 | 1/2003 | Bhogal et al. |
| 2003/0003609 | A1 | 1/2003 | Sauer et al. |
| 2003/0003897 | A1 | 1/2003 | Hyon |
| 2003/0004968 | A1 | 1/2003 | Romer et al. |
| 2003/0009459 | A1 | 1/2003 | Chastain et al. |
| 2003/0013483 | A1 | 1/2003 | Ausems et al. |
| 2003/0016770 | A1 | 1/2003 | Trans et al. |
| 2003/0018475 | A1 | 1/2003 | Basu et al. |
| 2003/0020760 | A1 | 1/2003 | Takatsu et al. |
| 2003/0023420 | A1 | 1/2003 | Goodman et al. |
| 2003/0023426 | A1 | 1/2003 | Pun et al. |
| 2003/0025676 | A1 | 2/2003 | Cappendijk |
| 2003/0026392 | A1 | 2/2003 | Brown et al. |
| 2003/0026402 | A1 | 2/2003 | Clapper |
| 2003/0028380 | A1 | 2/2003 | Freeland et al. |
| 2003/0030645 | A1 | 2/2003 | Ribak et al. |
| 2003/0033148 | A1 | 2/2003 | Silverman et al. |
| 2003/0033152 | A1 | 2/2003 | Cameron |
| 2003/0033153 | A1 | 2/2003 | Olson et al. |
| 2003/0033214 | A1 | 2/2003 | Mikkelsen et al. |
| 2003/0036909 | A1 | 2/2003 | Kato |
| 2003/0037073 | A1 | 2/2003 | Tokuda et al. |
| 2003/0037077 | A1 | 2/2003 | Brill et al. |
| 2003/0037254 | A1 | 2/2003 | Fischer et al. |
| 2003/0038786 | A1 | 2/2003 | Nguyen et al. |
| 2003/0040908 | A1 | 2/2003 | Yang et al. |
| 2003/0046075 | A1 | 3/2003 | Stone |
| 2003/0046401 | A1 | 3/2003 | Abbott et al. |
| 2003/0046434 | A1 | 3/2003 | Flanagin et al. |
| 2003/0048881 | A1 | 3/2003 | Trajkovic et al. |
| 2003/0050781 | A1 | 3/2003 | Tamura et al. |
| 2003/0051136 | A1 | 3/2003 | Curtis et al. |
| 2003/0055537 | A1 | 3/2003 | Odinak et al. |
| 2003/0055623 | A1 | 3/2003 | Epstein et al. |
| 2003/0061317 | A1 | 3/2003 | Brown et al. |
| 2003/0061570 | A1 | 3/2003 | Hatori et al. |
| 2003/0063073 | A1 | 4/2003 | Geaghan et al. |
| 2003/0069893 | A1 | 4/2003 | Kanai et al. |
| 2003/0074195 | A1 | 4/2003 | Bartosik et al. |
| 2003/0074198 | A1 | 4/2003 | Sussman |

(56) References Cited

U.S. PATENT DOCUMENTS

| | | | |
|---|---|---|---|
| 2003/0074457 | A1 | 4/2003 | Kluth |
| 2003/0076301 | A1 | 4/2003 | Tsuk et al. |
| 2003/0078766 | A1 | 4/2003 | Appelt et al. |
| 2003/0078779 | A1 | 4/2003 | Desai et al. |
| 2003/0078780 | A1 | 4/2003 | Kochanski et al. |
| 2003/0078969 | A1 | 4/2003 | Sprague et al. |
| 2003/0079024 | A1 | 4/2003 | Hough et al. |
| 2003/0079038 | A1 | 4/2003 | Robbin et al. |
| 2003/0080991 | A1 | 5/2003 | Crow et al. |
| 2003/0083113 | A1 | 5/2003 | Chua et al. |
| 2003/0083878 | A1 | 5/2003 | Lee et al. |
| 2003/0083884 | A1 | 5/2003 | Odinak et al. |
| 2003/0084350 | A1 | 5/2003 | Eibach et al. |
| 2003/0085870 | A1 | 5/2003 | Hinckley |
| 2003/0086699 | A1 | 5/2003 | Benyamin et al. |
| 2003/0088414 | A1 | 5/2003 | Huang et al. |
| 2003/0088421 | A1 | 5/2003 | Maes et al. |
| 2003/0090467 | A1 | 5/2003 | Hohl et al. |
| 2003/0090474 | A1 | 5/2003 | Schaefer |
| 2003/0095096 | A1 | 5/2003 | Robbin et al. |
| 2003/0097210 | A1 | 5/2003 | Horst et al. |
| 2003/0097379 | A1 | 5/2003 | Ireton |
| 2003/0097407 | A1 | 5/2003 | Litwin et al. |
| 2003/0097408 | A1 | 5/2003 | Kageyama et al. |
| 2003/0098892 | A1 | 5/2003 | Hiipakka |
| 2003/0099335 | A1 | 5/2003 | Tanaka et al. |
| 2003/0101045 | A1 | 5/2003 | Moffatt et al. |
| 2003/0101054 | A1 | 5/2003 | Davis et al. |
| 2003/0115060 | A1 | 6/2003 | Junqua et al. |
| 2003/0115064 | A1 | 6/2003 | Gusler et al. |
| 2003/0115186 | A1 | 6/2003 | Wilkinson et al. |
| 2003/0115552 | A1 | 6/2003 | Jahnke et al. |
| 2003/0117365 | A1 | 6/2003 | Shteyn |
| 2003/0120494 | A1 | 6/2003 | Jost et al. |
| 2003/0122652 | A1 | 7/2003 | Himmelstein et al. |
| 2003/0122787 | A1 | 7/2003 | Zimmerman et al. |
| 2003/0125927 | A1 | 7/2003 | Seme |
| 2003/0125955 | A1 | 7/2003 | Arnold et al. |
| 2003/0126559 | A1 | 7/2003 | Fuhrmann |
| 2003/0128819 | A1 | 7/2003 | Lee et al. |
| 2003/0130847 | A1 | 7/2003 | Case et al. |
| 2003/0131320 | A1 | 7/2003 | Kumhyr et al. |
| 2003/0133694 | A1 | 7/2003 | Yeo |
| 2003/0134678 | A1 | 7/2003 | Tanaka |
| 2003/0135501 | A1 | 7/2003 | Frerebeau et al. |
| 2003/0135740 | A1 | 7/2003 | Talmor et al. |
| 2003/0140088 | A1 | 7/2003 | Robinson et al. |
| 2003/0144846 | A1 | 7/2003 | Denenberge et al. |
| 2003/0145285 | A1 | 7/2003 | Miyahira et al. |
| 2003/0147512 | A1 | 8/2003 | Abburi |
| 2003/0149557 | A1 | 8/2003 | Cox et al. |
| 2003/0149567 | A1 | 8/2003 | Schmitz et al. |
| 2003/0149978 | A1 | 8/2003 | Plotnick |
| 2003/0152203 | A1 | 8/2003 | Berger et al. |
| 2003/0152894 | A1 | 8/2003 | Townshend |
| 2003/0154079 | A1 | 8/2003 | Ota et al. |
| 2003/0154081 | A1 | 8/2003 | Chu et al. |
| 2003/0157968 | A1 | 8/2003 | Boman et al. |
| 2003/0158732 | A1 | 8/2003 | Pi et al. |
| 2003/0158735 | A1 | 8/2003 | Yamada et al. |
| 2003/0158737 | A1 | 8/2003 | Csicsatka |
| 2003/0160702 | A1 | 8/2003 | Tanaka |
| 2003/0160830 | A1 | 8/2003 | Degross |
| 2003/0163316 | A1 | 8/2003 | Addison et al. |
| 2003/0164848 | A1 | 9/2003 | Dutta et al. |
| 2003/0167167 | A1 | 9/2003 | Gong |
| 2003/0167318 | A1 | 9/2003 | Robbin et al. |
| 2003/0167335 | A1 | 9/2003 | Alexander |
| 2003/0171928 | A1 | 9/2003 | Falcon et al. |
| 2003/0171936 | A1 | 9/2003 | Sall et al. |
| 2003/0174830 | A1 | 9/2003 | Boyer et al. |
| 2003/0177046 | A1 | 9/2003 | Socha-Leialoha et al. |
| 2003/0179222 | A1 | 9/2003 | Noma et al. |
| 2003/0182115 | A1 | 9/2003 | Malayath et al. |
| 2003/0182131 | A1 | 9/2003 | Arnold et al. |
| 2003/0187655 | A1 | 10/2003 | Dunsmuir |
| 2003/0187659 | A1 | 10/2003 | Cho et al. |
| 2003/0187775 | A1 | 10/2003 | Du et al. |
| 2003/0187844 | A1 | 10/2003 | Li et al. |
| 2003/0187925 | A1 | 10/2003 | Inala et al. |
| 2003/0188005 | A1 | 10/2003 | Yoneda et al. |
| 2003/0188192 | A1 | 10/2003 | Tang et al. |
| 2003/0190074 | A1 | 10/2003 | Loudon et al. |
| 2003/0191625 | A1 | 10/2003 | Gorin et al. |
| 2003/0191645 | A1 | 10/2003 | Zhou |
| 2003/0193481 | A1 | 10/2003 | Sokolsky |
| 2003/0194080 | A1 | 10/2003 | Michaelis et al. |
| 2003/0195741 | A1 | 10/2003 | Mani et al. |
| 2003/0197736 | A1 | 10/2003 | Murphy |
| 2003/0197744 | A1 | 10/2003 | Irvine |
| 2003/0200085 | A1 | 10/2003 | Nguyen et al. |
| 2003/0200452 | A1 | 10/2003 | Tagawa et al. |
| 2003/0200858 | A1 | 10/2003 | Xie |
| 2003/0202697 | A1 | 10/2003 | Simard et al. |
| 2003/0204392 | A1 | 10/2003 | Finnigan et al. |
| 2003/0204492 | A1 | 10/2003 | Wolf et al. |
| 2003/0206199 | A1 | 11/2003 | Pusa et al. |
| 2003/0208756 | A1 | 11/2003 | Macrae et al. |
| 2003/0210266 | A1 | 11/2003 | Cragun et al. |
| 2003/0212543 | A1 | 11/2003 | Epstein et al. |
| 2003/0212961 | A1 | 11/2003 | Soin et al. |
| 2003/0214519 | A1 | 11/2003 | Smith et al. |
| 2003/0216919 | A1 | 11/2003 | Roushar |
| 2003/0221198 | A1 | 11/2003 | Sloo et al. |
| 2003/0224760 | A1 | 12/2003 | Day |
| 2003/0228863 | A1 | 12/2003 | Vander Veen et al. |
| 2003/0228909 | A1 | 12/2003 | Tanaka et al. |
| 2003/0229490 | A1 | 12/2003 | Etter |
| 2003/0229616 | A1 | 12/2003 | Wong |
| 2003/0233230 | A1 | 12/2003 | Ammicht et al. |
| 2003/0233237 | A1 | 12/2003 | Garside et al. |
| 2003/0233240 | A1 | 12/2003 | Kaatrasalo |
| 2003/0234824 | A1 | 12/2003 | Litwiller |
| 2003/0236663 | A1 | 12/2003 | Dimitrova et al. |
| 2004/0001396 | A1 | 1/2004 | Keller et al. |
| 2004/0006467 | A1 | 1/2004 | Anisimovich et al. |
| 2004/0008277 | A1 | 1/2004 | Nagaishi et al. |
| 2004/0010484 | A1 | 1/2004 | Foulger et al. |
| 2004/0012556 | A1 | 1/2004 | Yong et al. |
| 2004/0013252 | A1 | 1/2004 | Craner |
| 2004/0015342 | A1 | 1/2004 | Garst et al. |
| 2004/0021676 | A1 | 2/2004 | Chen et al. |
| 2004/0022369 | A1 | 2/2004 | Vitikainen et al. |
| 2004/0022373 | A1 | 2/2004 | Suder et al. |
| 2004/0023643 | A1 | 2/2004 | Vander Veen et al. |
| 2004/0030551 | A1 | 2/2004 | Marcu et al. |
| 2004/0030554 | A1 | 2/2004 | Boxberger-Oberoi et al. |
| 2004/0030556 | A1 | 2/2004 | Bennett |
| 2004/0030559 | A1 | 2/2004 | Payne et al. |
| 2004/0030996 | A1 | 2/2004 | Van Liempd et al. |
| 2004/0036715 | A1 | 2/2004 | Warren |
| 2004/0048627 | A1 | 3/2004 | Olvera-Hernandez |
| 2004/0049388 | A1 | 3/2004 | Roth et al. |
| 2004/0049391 | A1 | 3/2004 | Polanyi et al. |
| 2004/0051729 | A1 | 3/2004 | Borden, IV |
| 2004/0052338 | A1 | 3/2004 | Celi, Jr. et al. |
| 2004/0054530 | A1 | 3/2004 | Davis et al. |
| 2004/0054533 | A1 | 3/2004 | Bellegarda |
| 2004/0054534 | A1 | 3/2004 | Junqua |
| 2004/0054535 | A1 | 3/2004 | Mackie et al. |
| 2004/0054541 | A1 | 3/2004 | Kryze et al. |
| 2004/0054690 | A1 | 3/2004 | Hillerbrand et al. |
| 2004/0055446 | A1 | 3/2004 | Robbin et al. |
| 2004/0056899 | A1 | 3/2004 | Sinclair, II et al. |
| 2004/0059577 | A1 | 3/2004 | Pickering |
| 2004/0059790 | A1 | 3/2004 | Austin-Lane et al. |
| 2004/0061717 | A1 | 4/2004 | Menon et al. |
| 2004/0062367 | A1 | 4/2004 | Fellenstein et al. |
| 2004/0064593 | A1 | 4/2004 | Sinclair et al. |
| 2004/0069122 | A1 | 4/2004 | Wilson |
| 2004/0070567 | A1 | 4/2004 | Longe et al. |
| 2004/0070612 | A1 | 4/2004 | Sinclair et al. |
| 2004/0073427 | A1 | 4/2004 | Moore |
| 2004/0073428 | A1 | 4/2004 | Zlokarnik et al. |

(56) References Cited

U.S. PATENT DOCUMENTS

2004/0076086 A1 4/2004 Keller et al.
2004/0078382 A1 4/2004 Mercer et al.
2004/0085162 A1 5/2004 Agarwal et al.
2004/0085368 A1 5/2004 Johnson, Jr. et al.
2004/0086120 A1 5/2004 Akins, III et al.
2004/0093213 A1 5/2004 Conkie
2004/0093215 A1 5/2004 Gupta et al.
2004/0093328 A1 5/2004 Damle
2004/0094018 A1 5/2004 Ueshima et al.
2004/0096105 A1 5/2004 Holtsberg
2004/0098250 A1 5/2004 Kimchi et al.
2004/0100479 A1 5/2004 Nakano et al.
2004/0106432 A1 6/2004 Kanamori et al.
2004/0107169 A1 6/2004 Lowe
2004/0111266 A1 6/2004 Coorman et al.
2004/0111332 A1 6/2004 Baar et al.
2004/0114731 A1 6/2004 Gillett et al.
2004/0120476 A1 6/2004 Harrison et al.
2004/0122656 A1 6/2004 Abir
2004/0122664 A1 6/2004 Lorenzo et al.
2004/0122673 A1 6/2004 Park et al.
2004/0124583 A1 7/2004 Landis
2004/0125088 A1 7/2004 Zimmerman et al.
2004/0125922 A1 7/2004 Specht
2004/0127198 A1 7/2004 Roskind et al.
2004/0127241 A1 7/2004 Shostak
2004/0128137 A1 7/2004 Bush et al.
2004/0128614 A1 7/2004 Andrews et al.
2004/0133817 A1 7/2004 Choi
2004/0135701 A1 7/2004 Yasuda et al.
2004/0135774 A1 7/2004 La Monica
2004/0136510 A1 7/2004 Vander Veen
2004/0138869 A1 7/2004 Heinecke
2004/0145607 A1 7/2004 Alderson
2004/0153306 A1 8/2004 Tanner et al.
2004/0155869 A1 8/2004 Robinson et al.
2004/0160419 A1 8/2004 Padgitt
2004/0162741 A1 8/2004 Flaxer et al.
2004/0170379 A1 9/2004 Yao et al.
2004/0174399 A1 9/2004 Wu et al.
2004/0174434 A1 9/2004 Walker et al.
2004/0176958 A1 9/2004 Salmenkaita et al.
2004/0177319 A1 9/2004 Horn
2004/0178994 A1 9/2004 Kairls, Jr.
2004/0181392 A1 9/2004 Parikh et al.
2004/0183833 A1 9/2004 Chua
2004/0186713 A1 9/2004 Gomas et al.
2004/0186714 A1 9/2004 Baker
2004/0186777 A1 9/2004 Margiloff et al.
2004/0186857 A1 9/2004 Serlet et al.
2004/0193398 A1 9/2004 Chu et al.
2004/0193420 A1 9/2004 Kennewick et al.
2004/0193421 A1 9/2004 Blass
2004/0193426 A1 9/2004 Maddux et al.
2004/0196256 A1 10/2004 Wobbrock et al.
2004/0198436 A1 10/2004 Alden
2004/0199375 A1 10/2004 Ehsani et al.
2004/0199387 A1 10/2004 Wang et al.
2004/0199663 A1 10/2004 Horvitz et al.
2004/0203520 A1 10/2004 Schirtzinger et al.
2004/0205151 A1 10/2004 Sprigg et al.
2004/0205671 A1 10/2004 Sukehiro et al.
2004/0208302 A1 10/2004 Urban et al.
2004/0210442 A1 10/2004 Glynn et al.
2004/0210634 A1 10/2004 Ferrer et al.
2004/0213419 A1 10/2004 Varma et al.
2004/0215731 A1 10/2004 Tzann-en Szeto
2004/0216049 A1 10/2004 Lewis et al.
2004/0218451 A1 11/2004 Said et al.
2004/0220798 A1 11/2004 Chi et al.
2004/0220809 A1 11/2004 Wang et al.
2004/0221235 A1 11/2004 Marchisio et al.
2004/0223485 A1 11/2004 Arellano et al.
2004/0223599 A1 11/2004 Bear et al.
2004/0224638 A1 11/2004 Fadell et al.
2004/0225501 A1 11/2004 Cutaia et al.
2004/0225504 A1 11/2004 Junqua et al.
2004/0225650 A1 11/2004 Cooper et al.
2004/0225746 A1 11/2004 Niell et al.
2004/0230420 A1 11/2004 Kadambe et al.
2004/0230637 A1 11/2004 Lecoueche et al.
2004/0236778 A1 11/2004 Junqua et al.
2004/0242286 A1 12/2004 Benco et al.
2004/0243412 A1 12/2004 Gupta et al.
2004/0243419 A1 12/2004 Wang
2004/0249629 A1 12/2004 Webster
2004/0249637 A1 12/2004 Baker et al.
2004/0249667 A1 12/2004 Oon
2004/0252119 A1 12/2004 Hunleth et al.
2004/0252604 A1 12/2004 Johnson et al.
2004/0252966 A1 12/2004 Holloway et al.
2004/0254791 A1 12/2004 Coifman et al.
2004/0254792 A1 12/2004 Busayapongchai et al.
2004/0257432 A1 12/2004 Girish et al.
2004/0259536 A1 12/2004 Keskar et al.
2004/0260438 A1 12/2004 Chernetsky et al.
2004/0260547 A1 12/2004 Cohen et al.
2004/0260718 A1 12/2004 Fedorov et al.
2004/0261023 A1 12/2004 Bier
2004/0262051 A1 12/2004 Carro
2004/0263636 A1 12/2004 Cutler et al.
2004/0267825 A1 12/2004 Novak et al.
2004/0268253 A1 12/2004 Demello et al.
2004/0268262 A1 12/2004 Gupta et al.
2005/0002507 A1 1/2005 Timmins et al.
2005/0010409 A1 1/2005 Hull et al.
2005/0012723 A1 1/2005 Pallakoff
2005/0015254 A1 1/2005 Beaman
2005/0015751 A1 1/2005 Grassens
2005/0015772 A1 1/2005 Saare et al.
2005/0021330 A1 1/2005 Mano et al.
2005/0022114 A1 1/2005 Shanahan et al.
2005/0024341 A1 2/2005 Gillespie et al.
2005/0024345 A1 2/2005 Eastty et al.
2005/0027385 A1 2/2005 Yueh
2005/0030175 A1 2/2005 Wolfe
2005/0031106 A1 2/2005 Henderson
2005/0033582 A1 2/2005 Gadd et al.
2005/0033771 A1 2/2005 Schmitter et al.
2005/0034164 A1 2/2005 Sano et al.
2005/0038657 A1 2/2005 Roth et al.
2005/0039141 A1 2/2005 Burke et al.
2005/0042591 A1 2/2005 Bloom et al.
2005/0043946 A1 2/2005 Ueyama et al.
2005/0043949 A1 2/2005 Roth et al.
2005/0044569 A1 2/2005 Marcus
2005/0045373 A1 3/2005 Born
2005/0049862 A1 3/2005 Choi et al.
2005/0049870 A1 3/2005 Zhang et al.
2005/0049880 A1 3/2005 Roth et al.
2005/0055212 A1 3/2005 Nagao
2005/0055403 A1 3/2005 Brittan
2005/0058438 A1 3/2005 Hayashi
2005/0060155 A1 3/2005 Chu et al.
2005/0071165 A1 3/2005 Hofstader et al.
2005/0071332 A1 3/2005 Ortega et al.
2005/0071437 A1 3/2005 Bear et al.
2005/0074113 A1 4/2005 Mathew et al.
2005/0075881 A1 4/2005 Rigazio et al.
2005/0080613 A1 4/2005 Colledge et al.
2005/0080620 A1 4/2005 Rao et al.
2005/0080625 A1 4/2005 Bennett et al.
2005/0080632 A1 4/2005 Endo et al.
2005/0080780 A1 4/2005 Colledge et al.
2005/0086059 A1 4/2005 Bennett
2005/0086255 A1 4/2005 Schran et al.
2005/0086605 A1 4/2005 Ferrer et al.
2005/0091118 A1 4/2005 Fano
2005/0094475 A1 5/2005 Naoi
2005/0099398 A1 5/2005 Garside et al.
2005/0100214 A1 5/2005 Zhang et al.
2005/0102144 A1 5/2005 Rapoport
2005/0102614 A1 5/2005 Brockett et al.
2005/0102625 A1 5/2005 Lee et al.

(56) References Cited

U.S. PATENT DOCUMENTS

2005/0105712 A1 5/2005 Williams et al.
2005/0108001 A1 5/2005 Aarskog
2005/0108017 A1 5/2005 Esser et al.
2005/0108074 A1 5/2005 Bloechl et al.
2005/0108338 A1 5/2005 Simske et al.
2005/0108344 A1 5/2005 Tafoya et al.
2005/0108642 A1 5/2005 Sinclair et al.
2005/0114124 A1 5/2005 Liu et al.
2005/0114140 A1 5/2005 Brackett et al.
2005/0114306 A1 5/2005 Shu et al.
2005/0114791 A1 5/2005 Bollenbacher et al.
2005/0119890 A1 6/2005 Hirose
2005/0119897 A1 6/2005 Bennett et al.
2005/0125216 A1 6/2005 Chitrapura et al.
2005/0125226 A1 6/2005 Magee
2005/0125235 A1 6/2005 Lazay et al.
2005/0131951 A1 6/2005 Zhang et al.
2005/0132301 A1 6/2005 Ikeda
2005/0136949 A1 6/2005 Barnes, Jr.
2005/0138305 A1 6/2005 Zellner
2005/0140504 A1 6/2005 Marshall et al.
2005/0143972 A1 6/2005 Gopalakrishnan et al.
2005/0144003 A1 6/2005 Iso-Sipila
2005/0144070 A1 6/2005 Cheshire
2005/0144568 A1 6/2005 Gruen et al.
2005/0148356 A1 7/2005 Ferguson et al.
2005/0149214 A1 7/2005 Yoo et al.
2005/0149330 A1 7/2005 Katae
2005/0149332 A1 7/2005 Kuzunuki et al.
2005/0149510 A1 7/2005 Shafrir
2005/0152558 A1 7/2005 Van Tassel
2005/0152602 A1 7/2005 Chen et al.
2005/0154578 A1 7/2005 Tong et al.
2005/0154591 A1 7/2005 Lecoeuche
2005/0159939 A1 7/2005 Mohler et al.
2005/0159957 A1 7/2005 Roth et al.
2005/0162395 A1 7/2005 Unruh
2005/0165015 A1 7/2005 Ncube et al.
2005/0165607 A1 7/2005 Di Fabbrizio et al.
2005/0166153 A1 7/2005 Eytchison et al.
2005/0177445 A1 8/2005 Church
2005/0181770 A1 8/2005 Helferich
2005/0182616 A1 8/2005 Kotipalli
2005/0182627 A1 8/2005 Tanaka et al.
2005/0182628 A1 8/2005 Choi
2005/0182629 A1 8/2005 Coorman et al.
2005/0182630 A1 8/2005 Miro et al.
2005/0182765 A1 8/2005 Liddy
2005/0184958 A1 8/2005 Gnanamgari et al.
2005/0187770 A1 8/2005 Kompe et al.
2005/0187773 A1 8/2005 Filoche et al.
2005/0190970 A1 9/2005 Griffin
2005/0192801 A1 9/2005 Lewis et al.
2005/0192812 A1 9/2005 Buchholz et al.
2005/0195077 A1 9/2005 Mcculloch et al.
2005/0195429 A1 9/2005 Archbold
2005/0196733 A1 9/2005 Budra et al.
2005/0201572 A1 9/2005 Lindahl et al.
2005/0202854 A1 9/2005 Kortum et al.
2005/0203738 A1 9/2005 Hwang
2005/0203747 A1 9/2005 Lecoeuche
2005/0203991 A1 9/2005 Kawamura et al.
2005/0209848 A1 9/2005 Ishii
2005/0210394 A1 9/2005 Crandall et al.
2005/0216331 A1 9/2005 Ahrens et al.
2005/0222843 A1 10/2005 Kahn et al.
2005/0222973 A1 10/2005 Kaiser
2005/0228665 A1 10/2005 Kobayashi et al.
2005/0245243 A1 11/2005 Zuniga
2005/0246350 A1 11/2005 Canaran
2005/0246365 A1 11/2005 Lowles et al.
2005/0246686 A1 11/2005 Seshadri et al.
2005/0246726 A1 11/2005 Labrou et al.
2005/0251572 A1 11/2005 McMahan et al.
2005/0254481 A1 11/2005 Vishik et al.
2005/0261901 A1 11/2005 Davis et al.
2005/0262440 A1 11/2005 Stanciu et al.
2005/0267738 A1 12/2005 Wilkinson et al.
2005/0267757 A1 12/2005 Iso-Sipila et al.
2005/0268247 A1 12/2005 Baneth
2005/0271216 A1 12/2005 Lashkari
2005/0273332 A1 12/2005 Scott et al.
2005/0273337 A1 12/2005 Erell et al.
2005/0273626 A1 12/2005 Pearson et al.
2005/0278297 A1 12/2005 Nelson
2005/0278643 A1 12/2005 Ukai et al.
2005/0278647 A1 12/2005 Leavitt et al.
2005/0283363 A1 12/2005 Weng et al.
2005/0283364 A1 12/2005 Longe et al.
2005/0283726 A1 12/2005 Lunati
2005/0283729 A1 12/2005 Morris et al.
2005/0288934 A1 12/2005 Omi
2005/0288936 A1 12/2005 Busayapongchai et al.
2005/0289458 A1 12/2005 Kylmanen
2005/0289463 A1 12/2005 Wu et al.
2006/0001652 A1 1/2006 Chiu et al.
2006/0004570 A1 1/2006 Ju et al.
2006/0004640 A1 1/2006 Swierczek
2006/0004744 A1 1/2006 Nevidomski et al.
2006/0007174 A1 1/2006 Shen
2006/0009973 A1 1/2006 Nguyen et al.
2006/0013414 A1 1/2006 Shih
2006/0013446 A1 1/2006 Stephens
2006/0015326 A1 1/2006 Mori et al.
2006/0015341 A1 1/2006 Baker
2006/0015484 A1 1/2006 Weng et al.
2006/0015819 A1 1/2006 Hawkins et al.
2006/0018446 A1 1/2006 Schmandt et al.
2006/0018492 A1 1/2006 Chiu et al.
2006/0020890 A1 1/2006 Kroll et al.
2006/0025999 A1 2/2006 Feng et al.
2006/0026233 A1 2/2006 Tenembaum et al.
2006/0026521 A1 2/2006 Hotelling et al.
2006/0026535 A1 2/2006 Hotelling et al.
2006/0026536 A1 2/2006 Hotelling et al.
2006/0033724 A1 2/2006 Chaudhri et al.
2006/0035632 A1 2/2006 Sorvari et al.
2006/0036946 A1 2/2006 Radtke et al.
2006/0041424 A1 2/2006 Todhunter et al.
2006/0041431 A1 2/2006 Maes
2006/0041590 A1 2/2006 King et al.
2006/0047632 A1 3/2006 Zhang
2006/0050865 A1 3/2006 Kortum et al.
2006/0052141 A1 3/2006 Suzuki
2006/0053007 A1 3/2006 Niemisto et al.
2006/0053365 A1 3/2006 Hollander et al.
2006/0053379 A1 3/2006 Henderson et al.
2006/0053387 A1 3/2006 Ording
2006/0058999 A1 3/2006 Barker et al.
2006/0059424 A1 3/2006 Petri et al.
2006/0059437 A1 3/2006 Conklin
2006/0060762 A1 3/2006 Chan et al.
2006/0061488 A1 3/2006 Dunton
2006/0064693 A1 3/2006 Messer et al.
2006/0067535 A1 3/2006 Culbert et al.
2006/0067536 A1 3/2006 Culbert et al.
2006/0069567 A1 3/2006 Tischer et al.
2006/0069664 A1 3/2006 Ling et al.
2006/0072248 A1 4/2006 Watanabe et al.
2006/0072716 A1 4/2006 Pham
2006/0074628 A1 4/2006 Elbaz et al.
2006/0074651 A1 4/2006 Arun et al.
2006/0074660 A1 4/2006 Waters et al.
2006/0074674 A1 4/2006 Zhang et al.
2006/0074750 A1 4/2006 Clark et al.
2006/0074898 A1 4/2006 Gavalda et al.
2006/0075429 A1 4/2006 Istvan et al.
2006/0077055 A1 4/2006 Basir
2006/0080098 A1 4/2006 Campbell
2006/0085187 A1 4/2006 Barquilla
2006/0085465 A1 4/2006 Nori et al.
2006/0085757 A1 4/2006 Andre et al.
2006/0093998 A1 5/2006 Vertegaal
2006/0095265 A1 5/2006 Chu et al.

(56) References Cited

U.S. PATENT DOCUMENTS

| | | | |
|---|---|---|---|
| 2006/0095790 | A1 | 5/2006 | Nguyen et al. |
| 2006/0095846 | A1 | 5/2006 | Nurmi |
| 2006/0095848 | A1 | 5/2006 | Naik |
| 2006/0097991 | A1 | 5/2006 | Hotelling et al. |
| 2006/0100848 | A1 | 5/2006 | Cozzi et al. |
| 2006/0100849 | A1 | 5/2006 | Chan |
| 2006/0101354 | A1 | 5/2006 | Hashimoto et al. |
| 2006/0103633 | A1 | 5/2006 | Gioeli |
| 2006/0106592 | A1 | 5/2006 | Brockett et al. |
| 2006/0106594 | A1 | 5/2006 | Brockett et al. |
| 2006/0106595 | A1 | 5/2006 | Brockett et al. |
| 2006/0111906 | A1 | 5/2006 | Cross et al. |
| 2006/0111909 | A1 | 5/2006 | Maes et al. |
| 2006/0116874 | A1 | 6/2006 | Samuelsson et al. |
| 2006/0116877 | A1 | 6/2006 | Pickering et al. |
| 2006/0117002 | A1 | 6/2006 | Swen |
| 2006/0119582 | A1 | 6/2006 | Ng et al. |
| 2006/0122834 | A1 | 6/2006 | Bennett |
| 2006/0122836 | A1 | 6/2006 | Cross et al. |
| 2006/0129379 | A1 | 6/2006 | Ramsey et al. |
| 2006/0129929 | A1 | 6/2006 | Weber et al. |
| 2006/0130006 | A1 | 6/2006 | Chitale |
| 2006/0132812 | A1 | 6/2006 | Barnes et al. |
| 2006/0135214 | A1 | 6/2006 | Zhang et al. |
| 2006/0136213 | A1 | 6/2006 | Hirose et al. |
| 2006/0136280 | A1 | 6/2006 | Cho et al. |
| 2006/0136352 | A1 | 6/2006 | Brun et al. |
| 2006/0141990 | A1 | 6/2006 | Zak et al. |
| 2006/0142576 | A1 | 6/2006 | Meng et al. |
| 2006/0142993 | A1 | 6/2006 | Menendez-Pidal et al. |
| 2006/0143007 | A1 | 6/2006 | Koh et al. |
| 2006/0143559 | A1 | 6/2006 | Spielberg et al. |
| 2006/0143576 | A1 | 6/2006 | Gupta et al. |
| 2006/0148520 | A1 | 7/2006 | Baker et al. |
| 2006/0149557 | A1 | 7/2006 | Kaneko et al. |
| 2006/0149558 | A1 | 7/2006 | Kahn et al. |
| 2006/0150087 | A1 | 7/2006 | Cronenberger et al. |
| 2006/0152496 | A1 | 7/2006 | Knaven |
| 2006/0153040 | A1 | 7/2006 | Girish et al. |
| 2006/0156252 | A1 | 7/2006 | Sheshagiri et al. |
| 2006/0156307 | A1 | 7/2006 | Kunjithapatham et al. |
| 2006/0161870 | A1 | 7/2006 | Hotelling et al. |
| 2006/0161871 | A1 | 7/2006 | Hotelling et al. |
| 2006/0161872 | A1 | 7/2006 | Rytivaara et al. |
| 2006/0165105 | A1 | 7/2006 | Shenfield et al. |
| 2006/0167676 | A1 | 7/2006 | Plumb |
| 2006/0168150 | A1 | 7/2006 | Naik et al. |
| 2006/0168507 | A1 | 7/2006 | Hansen |
| 2006/0168539 | A1 | 7/2006 | Hawkins et al. |
| 2006/0172720 | A1 | 8/2006 | Islam et al. |
| 2006/0173683 | A1 | 8/2006 | Roth et al. |
| 2006/0173684 | A1 | 8/2006 | Fischer et al. |
| 2006/0174207 | A1 | 8/2006 | Deshpande |
| 2006/0178868 | A1 | 8/2006 | Billerey-Mosier |
| 2006/0181519 | A1 | 8/2006 | Vernier et al. |
| 2006/0183466 | A1 | 8/2006 | Lee et al. |
| 2006/0184886 | A1 | 8/2006 | Chung et al. |
| 2006/0187073 | A1 | 8/2006 | Lin et al. |
| 2006/0190269 | A1 | 8/2006 | Tessel et al. |
| 2006/0190436 | A1 | 8/2006 | Richardson et al. |
| 2006/0190577 | A1 | 8/2006 | Yamada |
| 2006/0193518 | A1 | 8/2006 | Dong |
| 2006/0194181 | A1 | 8/2006 | Rosenberg |
| 2006/0195206 | A1 | 8/2006 | Moon et al. |
| 2006/0195323 | A1 | 8/2006 | Monne et al. |
| 2006/0197753 | A1 | 9/2006 | Hotelling |
| 2006/0197755 | A1 | 9/2006 | Bawany |
| 2006/0200253 | A1 | 9/2006 | Hoffberg et al. |
| 2006/0200342 | A1 | 9/2006 | Corston-Oliver et al. |
| 2006/0200347 | A1 | 9/2006 | Kim et al. |
| 2006/0205432 | A1 | 9/2006 | Hawkins et al. |
| 2006/0206313 | A1 | 9/2006 | Xu et al. |
| 2006/0206454 | A1 | 9/2006 | Forstall et al. |
| 2006/0206724 | A1 | 9/2006 | Schaufele et al. |
| 2006/0212415 | A1 | 9/2006 | Backer et al. |
| 2006/0217967 | A1 | 9/2006 | Goertzen et al. |
| 2006/0218244 | A1 | 9/2006 | Rasmussen et al. |
| 2006/0221738 | A1 | 10/2006 | Park et al. |
| 2006/0221788 | A1 | 10/2006 | Lindahl et al. |
| 2006/0224570 | A1 | 10/2006 | Quiroga et al. |
| 2006/0229802 | A1 | 10/2006 | Vertelney et al. |
| 2006/0229870 | A1 | 10/2006 | Kobal |
| 2006/0229876 | A1 | 10/2006 | Aaron et al. |
| 2006/0230350 | A1 | 10/2006 | Baluja |
| 2006/0230410 | A1 | 10/2006 | Kurganov et al. |
| 2006/0234680 | A1 | 10/2006 | Doulton |
| 2006/0235550 | A1 | 10/2006 | Csicsatka et al. |
| 2006/0235700 | A1 | 10/2006 | Wong et al. |
| 2006/0235841 | A1 | 10/2006 | Betz et al. |
| 2006/0236262 | A1 | 10/2006 | Bathiche et al. |
| 2006/0239419 | A1 | 10/2006 | Joseph et al. |
| 2006/0239471 | A1 | 10/2006 | Mao et al. |
| 2006/0240866 | A1 | 10/2006 | Eilts et al. |
| 2006/0241948 | A1 | 10/2006 | Abrash et al. |
| 2006/0242190 | A1 | 10/2006 | Wnek |
| 2006/0246955 | A1 | 11/2006 | Nirhamo et al. |
| 2006/0247931 | A1 | 11/2006 | Caskey et al. |
| 2006/0252457 | A1 | 11/2006 | Schrager |
| 2006/0253210 | A1 | 11/2006 | Rosenberg |
| 2006/0253787 | A1 | 11/2006 | Fogg |
| 2006/0256934 | A1 | 11/2006 | Mazor |
| 2006/0258376 | A1 | 11/2006 | Ewell et al. |
| 2006/0262876 | A1 | 11/2006 | LaDue |
| 2006/0265208 | A1 | 11/2006 | Assadollahi |
| 2006/0265503 | A1 | 11/2006 | Jones et al. |
| 2006/0265648 | A1 | 11/2006 | Rainisto et al. |
| 2006/0271627 | A1 | 11/2006 | Szczepanek |
| 2006/0274051 | A1 | 12/2006 | Longe et al. |
| 2006/0274905 | A1 | 12/2006 | Lindahl et al. |
| 2006/0277031 | A1 | 12/2006 | Ramsey et al. |
| 2006/0277058 | A1 | 12/2006 | J'maev et al. |
| 2006/0282264 | A1 | 12/2006 | Denny et al. |
| 2006/0282415 | A1 | 12/2006 | Shibata et al. |
| 2006/0282455 | A1 | 12/2006 | Lee et al. |
| 2006/0286527 | A1 | 12/2006 | Morel |
| 2006/0287864 | A1 | 12/2006 | Pusa et al. |
| 2006/0288024 | A1 | 12/2006 | Braica |
| 2006/0291666 | A1 | 12/2006 | Ball et al. |
| 2006/0293876 | A1 | 12/2006 | Kamatani et al. |
| 2006/0293880 | A1 | 12/2006 | Elshishiny et al. |
| 2006/0293886 | A1 | 12/2006 | Odell et al. |
| 2006/0293889 | A1 | 12/2006 | Kiss et al. |
| 2007/0003026 | A1 | 1/2007 | Hodge et al. |
| 2007/0004451 | A1 | 1/2007 | C. Anderson |
| 2007/0005849 | A1 | 1/2007 | Oliver |
| 2007/0006098 | A1 | 1/2007 | Krumm et al. |
| 2007/0011154 | A1 | 1/2007 | Musgrove et al. |
| 2007/0014280 | A1 | 1/2007 | Cormier et al. |
| 2007/0016563 | A1 | 1/2007 | Omoigui |
| 2007/0016865 | A1 | 1/2007 | Johnson et al. |
| 2007/0021956 | A1 | 1/2007 | Qu et al. |
| 2007/0022380 | A1 | 1/2007 | Swartz et al. |
| 2007/0025704 | A1 | 2/2007 | Tsukazaki et al. |
| 2007/0026852 | A1 | 2/2007 | Logan et al. |
| 2007/0027732 | A1 | 2/2007 | Hudgens |
| 2007/0028009 | A1 | 2/2007 | Robbin et al. |
| 2007/0030824 | A1 | 2/2007 | Ribaudo et al. |
| 2007/0032247 | A1 | 2/2007 | Shaffer et al. |
| 2007/0033003 | A1 | 2/2007 | Morris |
| 2007/0033005 | A1 | 2/2007 | Cristo et al. |
| 2007/0033026 | A1 | 2/2007 | Bartosik et al. |
| 2007/0033054 | A1 | 2/2007 | Snitkovskiy et al. |
| 2007/0036117 | A1 | 2/2007 | Taube et al. |
| 2007/0036286 | A1 | 2/2007 | Champlin et al. |
| 2007/0036294 | A1 | 2/2007 | Chaudhuri et al. |
| 2007/0038436 | A1 | 2/2007 | Cristoe et al. |
| 2007/0038609 | A1 | 2/2007 | Wu |
| 2007/0040813 | A1 | 2/2007 | Kushler et al. |
| 2007/0041361 | A1 | 2/2007 | Iso-Sipila |
| 2007/0042812 | A1 | 2/2007 | Basir et al. |
| 2007/0043568 | A1 | 2/2007 | Dhanakshirur et al. |
| 2007/0043687 | A1 | 2/2007 | Bodart et al. |
| 2007/0043820 | A1 | 2/2007 | George et al. |
| 2007/0044038 | A1 | 2/2007 | Horentrup et al. |

(56) References Cited

U.S. PATENT DOCUMENTS

2007/0046641 A1 3/2007 Lim
2007/0047719 A1 3/2007 Dhawan et al.
2007/0050184 A1 3/2007 Drucker et al.
2007/0050191 A1 3/2007 Weider et al.
2007/0050393 A1 3/2007 Vogel et al.
2007/0050712 A1 3/2007 Hull et al.
2007/0052586 A1 3/2007 Horstemeyer
2007/0055493 A1 3/2007 Lee
2007/0055508 A1 3/2007 Zhao et al.
2007/0055514 A1 3/2007 Beattie et al.
2007/0055525 A1 3/2007 Kennewick et al.
2007/0055529 A1 3/2007 Kanevsky et al.
2007/0058832 A1 3/2007 Hug et al.
2007/0060107 A1 3/2007 Day
2007/0060118 A1 3/2007 Guyette
2007/0061487 A1 3/2007 Moore et al.
2007/0061712 A1 3/2007 Bodin et al.
2007/0061754 A1 3/2007 Ardhanari et al.
2007/0067173 A1 3/2007 Bellegarda
2007/0067272 A1 3/2007 Flynt et al.
2007/0073540 A1 3/2007 Hirakawa et al.
2007/0073541 A1 3/2007 Tian
2007/0073745 A1 3/2007 Scott et al.
2007/0074131 A1 3/2007 Assadollahi et al.
2007/0075965 A1 4/2007 Huppi et al.
2007/0079027 A1 4/2007 Marriott et al.
2007/0080936 A1 4/2007 Tsuk et al.
2007/0083467 A1 4/2007 Lindahl et al.
2007/0083623 A1 4/2007 Nishimura et al.
2007/0088556 A1 4/2007 Andrew
2007/0089132 A1 4/2007 Qureshey et al.
2007/0089135 A1 4/2007 Qureshey et al.
2007/0093277 A1 4/2007 Cavacuiti et al.
2007/0094026 A1 4/2007 Ativanichayaphong et al.
2007/0098195 A1 5/2007 Holmes
2007/0100206 A1 5/2007 Lin et al.
2007/0100602 A1 5/2007 Kim
2007/0100619 A1 5/2007 Purho et al.
2007/0100624 A1 5/2007 Weng et al.
2007/0100635 A1 5/2007 Mahajan et al.
2007/0100709 A1 5/2007 Lee et al.
2007/0100790 A1 5/2007 Cheyer et al.
2007/0100814 A1 5/2007 Lee et al.
2007/0100883 A1 5/2007 Rose et al.
2007/0106491 A1 5/2007 Carter et al.
2007/0106497 A1 5/2007 Ramsey et al.
2007/0106512 A1 5/2007 Acero et al.
2007/0106513 A1 5/2007 Boillot et al.
2007/0106657 A1 5/2007 Brzeski et al.
2007/0106674 A1 5/2007 Agrawal et al.
2007/0106685 A1 5/2007 Houh et al.
2007/0112562 A1 5/2007 Vainio et al.
2007/0116195 A1 5/2007 Thompson et al.
2007/0118351 A1 5/2007 Sumita
2007/0118377 A1 5/2007 Badino et al.
2007/0118378 A1 5/2007 Skuratovsky
2007/0121846 A1 5/2007 Altberg et al.
2007/0124131 A1 5/2007 Chino et al.
2007/0124132 A1 5/2007 Takeuchi et al.
2007/0124149 A1 5/2007 Shen et al.
2007/0124291 A1 5/2007 Hassan et al.
2007/0124676 A1 5/2007 Amundsen et al.
2007/0127888 A1 6/2007 Hayashi et al.
2007/0128777 A1 6/2007 Yin et al.
2007/0129059 A1 6/2007 Nadarajah et al.
2007/0130014 A1 6/2007 Altberg et al.
2007/0130128 A1 6/2007 Garg et al.
2007/0132738 A1 6/2007 Lowles et al.
2007/0133771 A1 6/2007 Stifelman et al.
2007/0135187 A1 6/2007 Kreiner et al.
2007/0135949 A1 6/2007 Snover et al.
2007/0136064 A1 6/2007 Carroll
2007/0136778 A1 6/2007 Birger et al.
2007/0143163 A1 6/2007 Weiss et al.
2007/0149252 A1 6/2007 Jobs et al.
2007/0150403 A1 6/2007 Mock et al.
2007/0150444 A1 6/2007 Chesnais et al.
2007/0150842 A1 6/2007 Chaudhri et al.
2007/0152978 A1 7/2007 Kocienda et al.
2007/0152980 A1 7/2007 Kocienda et al.
2007/0155346 A1 7/2007 Mijatovic et al.
2007/0156410 A1 7/2007 Stohr et al.
2007/0156627 A1 7/2007 D'Alicandro
2007/0157089 A1 7/2007 Van Os et al.
2007/0157268 A1 7/2007 Girish et al.
2007/0162274 A1 7/2007 Ruiz et al.
2007/0162296 A1 7/2007 Altberg et al.
2007/0162414 A1 7/2007 Horowitz et al.
2007/0165003 A1 7/2007 Fux et al.
2007/0167136 A1 7/2007 Groth
2007/0168922 A1 7/2007 Kaiser et al.
2007/0173233 A1 7/2007 Vander Veen et al.
2007/0173267 A1 7/2007 Klassen et al.
2007/0174057 A1 7/2007 Genly
2007/0174188 A1 7/2007 Fish
2007/0174350 A1 7/2007 Pell et al.
2007/0174396 A1 7/2007 Kumar et al.
2007/0179776 A1 8/2007 Segond et al.
2007/0179778 A1 8/2007 Gong et al.
2007/0180383 A1 8/2007 Naik
2007/0182595 A1 8/2007 Ghasabian
2007/0185551 A1 8/2007 Meadows et al.
2007/0185754 A1 8/2007 Schmidt
2007/0185831 A1 8/2007 Churcher
2007/0185917 A1 8/2007 Prahlad et al.
2007/0188901 A1 8/2007 Heckerman et al.
2007/0192026 A1 8/2007 Lee et al.
2007/0192027 A1 8/2007 Lee et al.
2007/0192105 A1 8/2007 Neeracher et al.
2007/0192179 A1 8/2007 Van et al.
2007/0192293 A1 8/2007 Swen
2007/0192403 A1 8/2007 Heine et al.
2007/0192744 A1 8/2007 Reponen
2007/0198267 A1 8/2007 Jones et al.
2007/0198269 A1 8/2007 Braho et al.
2007/0198273 A1 8/2007 Hennecke
2007/0198566 A1 8/2007 Sustik
2007/0203955 A1 8/2007 Pomerantz
2007/0207785 A1 9/2007 Chatterjee et al.
2007/0208555 A1 9/2007 Blass et al.
2007/0208569 A1 9/2007 Subramanian et al.
2007/0208579 A1 9/2007 Peterson
2007/0208726 A1 9/2007 Krishnaprasad et al.
2007/0211071 A1 9/2007 Slotznick et al.
2007/0213099 A1 9/2007 Bast
2007/0213857 A1 9/2007 Bodin et al.
2007/0213984 A1 9/2007 Ativanichayaphong et al.
2007/0217693 A1 9/2007 Kretzschmar, Jr.
2007/0219645 A1 9/2007 Thomas et al.
2007/0219777 A1 9/2007 Chu et al.
2007/0219801 A1 9/2007 Sundaram et al.
2007/0219803 A1 9/2007 Chiu et al.
2007/0219983 A1 9/2007 Fish
2007/0225980 A1 9/2007 Sumita
2007/0225984 A1 9/2007 Milstein et al.
2007/0226652 A1 9/2007 Kikuchi et al.
2007/0229323 A1 10/2007 Plachta et al.
2007/0230729 A1 10/2007 Naylor et al.
2007/0233484 A1 10/2007 Coelho et al.
2007/0233487 A1 10/2007 Cohen et al.
2007/0233490 A1 10/2007 Yao
2007/0233497 A1 10/2007 Paek et al.
2007/0233692 A1 10/2007 Lisa et al.
2007/0233725 A1 10/2007 Michmerhuizen et al.
2007/0238488 A1 10/2007 Scott
2007/0238489 A1 10/2007 Scott
2007/0238520 A1 10/2007 Kacmarcik
2007/0239429 A1 10/2007 Johnson et al.
2007/0240043 A1 10/2007 Fux et al.
2007/0240044 A1 10/2007 Fux et al.
2007/0240045 A1 10/2007 Fux et al.
2007/0241885 A1 10/2007 Clipsham et al.
2007/0244702 A1 10/2007 Kahn et al.
2007/0244976 A1 10/2007 Carroll et al.

(56) References Cited

U.S. PATENT DOCUMENTS

| | | | |
|---|---|---|---|
| 2007/0247441 | A1 | 10/2007 | Kim et al. |
| 2007/0255435 | A1 | 11/2007 | Cohen et al. |
| 2007/0255979 | A1 | 11/2007 | Deily et al. |
| 2007/0257890 | A1 | 11/2007 | Hotelling et al. |
| 2007/0258642 | A1 | 11/2007 | Thota |
| 2007/0260460 | A1 | 11/2007 | Hyatt |
| 2007/0260595 | A1 | 11/2007 | Beatty et al. |
| 2007/0260822 | A1 | 11/2007 | Adams |
| 2007/0261080 | A1 | 11/2007 | Saetti |
| 2007/0265831 | A1 | 11/2007 | Dinur et al. |
| 2007/0265850 | A1 | 11/2007 | Kennewick et al. |
| 2007/0271104 | A1 | 11/2007 | McKay |
| 2007/0271510 | A1 | 11/2007 | Grigoriu et al. |
| 2007/0274468 | A1 | 11/2007 | Cai |
| 2007/0276651 | A1 | 11/2007 | Bliss et al. |
| 2007/0276714 | A1 | 11/2007 | Beringer |
| 2007/0276810 | A1 | 11/2007 | Rosen |
| 2007/0277088 | A1 | 11/2007 | Bodin et al. |
| 2007/0282595 | A1 | 12/2007 | Tunning et al. |
| 2007/0285958 | A1 | 12/2007 | Platchta et al. |
| 2007/0286363 | A1 | 12/2007 | Burg et al. |
| 2007/0286399 | A1 | 12/2007 | Ramamoorthy et al. |
| 2007/0288238 | A1 | 12/2007 | Hetherington et al. |
| 2007/0288241 | A1 | 12/2007 | Cross et al. |
| 2007/0288449 | A1 | 12/2007 | Datta et al. |
| 2007/0291108 | A1 | 12/2007 | Huber et al. |
| 2007/0294077 | A1 | 12/2007 | Narayanan et al. |
| 2007/0294083 | A1 | 12/2007 | Bellegarda et al. |
| 2007/0294199 | A1 | 12/2007 | Nelken et al. |
| 2007/0294263 | A1 | 12/2007 | Punj et al. |
| 2007/0299664 | A1 | 12/2007 | Peters et al. |
| 2007/0299831 | A1 | 12/2007 | Williams et al. |
| 2007/0300140 | A1 | 12/2007 | Makela et al. |
| 2008/0001785 | A1 | 1/2008 | Elizarov et al. |
| 2008/0010355 | A1 | 1/2008 | Vieri et al. |
| 2008/0010605 | A1 | 1/2008 | Frank et al. |
| 2008/0012950 | A1 | 1/2008 | Lee et al. |
| 2008/0013751 | A1 | 1/2008 | Hiselius |
| 2008/0015863 | A1 | 1/2008 | Agapi et al. |
| 2008/0015864 | A1 | 1/2008 | Ross et al. |
| 2008/0016575 | A1 | 1/2008 | Vincent et al. |
| 2008/0021708 | A1 | 1/2008 | Bennett et al. |
| 2008/0021886 | A1 | 1/2008 | Wang-Aryattanwanich et al. |
| 2008/0022208 | A1 | 1/2008 | Morse |
| 2008/0027726 | A1 | 1/2008 | Hansen et al. |
| 2008/0031475 | A1 | 2/2008 | Goldstein |
| 2008/0033719 | A1 | 2/2008 | Hall et al. |
| 2008/0034032 | A1 | 2/2008 | Healey et al. |
| 2008/0034044 | A1 | 2/2008 | Bhakta et al. |
| 2008/0036743 | A1 | 2/2008 | Westerman et al. |
| 2008/0040339 | A1 | 2/2008 | Zhou et al. |
| 2008/0042970 | A1 | 2/2008 | Liang et al. |
| 2008/0043936 | A1 | 2/2008 | Liebermann |
| 2008/0043943 | A1 | 2/2008 | Sipher et al. |
| 2008/0046239 | A1 | 2/2008 | Boo |
| 2008/0046250 | A1 | 2/2008 | Agapi et al. |
| 2008/0046422 | A1 | 2/2008 | Lee et al. |
| 2008/0046820 | A1 | 2/2008 | Lee et al. |
| 2008/0046948 | A1 | 2/2008 | Verosub |
| 2008/0048908 | A1 | 2/2008 | Sato |
| 2008/0052063 | A1 | 2/2008 | Bennett et al. |
| 2008/0052073 | A1 | 2/2008 | Goto et al. |
| 2008/0052077 | A1 | 2/2008 | Bennett et al. |
| 2008/0052080 | A1 | 2/2008 | Narayanan et al. |
| 2008/0052262 | A1 | 2/2008 | Kosinov et al. |
| 2008/0055194 | A1 | 3/2008 | Baudino et al. |
| 2008/0056459 | A1 | 3/2008 | Vallier et al. |
| 2008/0056579 | A1 | 3/2008 | Guha |
| 2008/0059190 | A1 | 3/2008 | Chu et al. |
| 2008/0059200 | A1 | 3/2008 | Puli |
| 2008/0059876 | A1 | 3/2008 | Hantler et al. |
| 2008/0062141 | A1 | 3/2008 | Chaudhri |
| 2008/0065382 | A1 | 3/2008 | Gerl et al. |
| 2008/0065387 | A1 | 3/2008 | Cross et al. |
| 2008/0071529 | A1 | 3/2008 | Silverman et al. |
| 2008/0071544 | A1 | 3/2008 | Beaufays et al. |
| 2008/0075296 | A1 | 3/2008 | Lindahl et al. |
| 2008/0076972 | A1 | 3/2008 | Dorogusker et al. |
| 2008/0077310 | A1 | 3/2008 | Murlidar et al. |
| 2008/0077384 | A1 | 3/2008 | Agapi et al. |
| 2008/0077386 | A1 | 3/2008 | Gao et al. |
| 2008/0077391 | A1 | 3/2008 | Chino et al. |
| 2008/0077393 | A1 | 3/2008 | Gao et al. |
| 2008/0077406 | A1 | 3/2008 | Ganong, III |
| 2008/0077859 | A1 | 3/2008 | Schabes et al. |
| 2008/0079566 | A1 | 4/2008 | Singh et al. |
| 2008/0080411 | A1 | 4/2008 | Cole |
| 2008/0082332 | A1 | 4/2008 | Mallett et al. |
| 2008/0082338 | A1 | 4/2008 | O'Neil et al. |
| 2008/0082390 | A1 | 4/2008 | Hawkins et al. |
| 2008/0082576 | A1 | 4/2008 | Bodin et al. |
| 2008/0082651 | A1 | 4/2008 | Singh et al. |
| 2008/0084974 | A1 | 4/2008 | Dhanakshirur |
| 2008/0091406 | A1 | 4/2008 | Baldwin et al. |
| 2008/0091426 | A1 | 4/2008 | Rempel et al. |
| 2008/0091443 | A1 | 4/2008 | Strope et al. |
| 2008/0096531 | A1 | 4/2008 | Mcquaide et al. |
| 2008/0096726 | A1 | 4/2008 | Riley et al. |
| 2008/0097937 | A1 | 4/2008 | Hadjarian |
| 2008/0098302 | A1 | 4/2008 | Roose |
| 2008/0098480 | A1 | 4/2008 | Henry et al. |
| 2008/0057922 | A1 | 5/2008 | Kokes et al. |
| 2008/0100579 | A1 | 5/2008 | Robinson et al. |
| 2008/0101584 | A1 | 5/2008 | Gray et al. |
| 2008/0103774 | A1 | 5/2008 | White |
| 2008/0109222 | A1 | 5/2008 | Liu |
| 2008/0109402 | A1 | 5/2008 | Wang et al. |
| 2008/0114480 | A1 | 5/2008 | Harb |
| 2008/0114598 | A1 | 5/2008 | Prieto et al. |
| 2008/0114604 | A1 | 5/2008 | Wei et al. |
| 2008/0114841 | A1 | 5/2008 | Lambert |
| 2008/0115084 | A1 | 5/2008 | Scott et al. |
| 2008/0118143 | A1 | 5/2008 | Gordon et al. |
| 2008/0119953 | A1 | 5/2008 | Reed |
| 2008/0120102 | A1 | 5/2008 | Rao |
| 2008/0120112 | A1 | 5/2008 | Jordan et al. |
| 2008/0120196 | A1 | 5/2008 | Reed et al. |
| 2008/0120311 | A1 | 5/2008 | Reed |
| 2008/0120312 | A1 | 5/2008 | Reed |
| 2008/0120330 | A1 | 5/2008 | Reed |
| 2008/0120342 | A1 | 5/2008 | Reed et al. |
| 2008/0122796 | A1 | 5/2008 | Jobs et al. |
| 2008/0124695 | A1 | 5/2008 | Myers et al. |
| 2008/0126075 | A1 | 5/2008 | Thorn et al. |
| 2008/0126077 | A1 | 5/2008 | Thorn |
| 2008/0126091 | A1 | 5/2008 | Clark et al. |
| 2008/0126093 | A1 | 5/2008 | Sivadas |
| 2008/0126100 | A1 | 5/2008 | Grost et al. |
| 2008/0126491 | A1 | 5/2008 | Portele et al. |
| 2008/0129520 | A1 | 6/2008 | Lee |
| 2008/0130867 | A1 | 6/2008 | Bowen |
| 2008/0131006 | A1 | 6/2008 | Oliver |
| 2008/0132221 | A1 | 6/2008 | Willey et al. |
| 2008/0133215 | A1 | 6/2008 | Sarukkai |
| 2008/0133228 | A1 | 6/2008 | Rao |
| 2008/0133230 | A1 | 6/2008 | Herforth et al. |
| 2008/0133241 | A1 | 6/2008 | Baker et al. |
| 2008/0133956 | A1 | 6/2008 | Fadell |
| 2008/0140413 | A1 | 6/2008 | Millman et al. |
| 2008/0140416 | A1 | 6/2008 | Shostak |
| 2008/0140652 | A1 | 6/2008 | Millman et al. |
| 2008/0140657 | A1 | 6/2008 | Azvine et al. |
| 2008/0140702 | A1 | 6/2008 | Reed et al. |
| 2008/0141125 | A1 | 6/2008 | Ghassabian et al. |
| 2008/0141180 | A1 | 6/2008 | Reed et al. |
| 2008/0141182 | A1 | 6/2008 | Barsness et al. |
| 2008/0146245 | A1 | 6/2008 | Appaji |
| 2008/0146290 | A1 | 6/2008 | Sreeram et al. |
| 2008/0147408 | A1 | 6/2008 | Da Palma et al. |
| 2008/0147411 | A1 | 6/2008 | Dames et al. |
| 2008/0147874 | A1 | 6/2008 | Yoneda et al. |
| 2008/0150900 | A1 | 6/2008 | Han |
| 2008/0154577 | A1 | 6/2008 | Kim et al. |
| 2008/0154600 | A1 | 6/2008 | Tian et al. |

(56) References Cited

U.S. PATENT DOCUMENTS

| | | | |
|---|---|---|---|
| 2008/0154612 | A1 | 6/2008 | Evermann et al. |
| 2008/0154828 | A1 | 6/2008 | Antebi et al. |
| 2008/0157867 | A1 | 7/2008 | Krah |
| 2008/0161113 | A1 | 7/2008 | Hansen et al. |
| 2008/0162120 | A1 | 7/2008 | Mactavish et al. |
| 2008/0163119 | A1 | 7/2008 | Kim et al. |
| 2008/0163131 | A1 | 7/2008 | Hirai et al. |
| 2008/0165144 | A1 | 7/2008 | Forstall et al. |
| 2008/0165980 | A1 | 7/2008 | Pavlovic et al. |
| 2008/0165994 | A1 | 7/2008 | Caren et al. |
| 2008/0167013 | A1 | 7/2008 | Novick et al. |
| 2008/0167858 | A1 | 7/2008 | Christie et al. |
| 2008/0168366 | A1 | 7/2008 | Kocienda et al. |
| 2008/0183473 | A1 | 7/2008 | Nagano et al. |
| 2008/0186960 | A1 | 8/2008 | Kocheisen et al. |
| 2008/0189099 | A1 | 8/2008 | Friedman et al. |
| 2008/0189106 | A1 | 8/2008 | Low et al. |
| 2008/0189110 | A1 | 8/2008 | Freeman et al. |
| 2008/0189114 | A1 | 8/2008 | Fail et al. |
| 2008/0189606 | A1 | 8/2008 | Rybak |
| 2008/0195312 | A1 | 8/2008 | Aaron et al. |
| 2008/0195388 | A1 | 8/2008 | Bower et al. |
| 2008/0195391 | A1 | 8/2008 | Marple et al. |
| 2008/0195601 | A1 | 8/2008 | Ntoulas et al. |
| 2008/0195630 | A1 | 8/2008 | Exartier et al. |
| 2008/0195940 | A1 | 8/2008 | Gail et al. |
| 2008/0200142 | A1 | 8/2008 | Abdel-Kader et al. |
| 2008/0201306 | A1 | 8/2008 | Cooper et al. |
| 2008/0201375 | A1 | 8/2008 | Khedouri et al. |
| 2008/0204379 | A1 | 8/2008 | Perez-Noguera |
| 2008/0207176 | A1 | 8/2008 | Brackbill et al. |
| 2008/0208585 | A1 | 8/2008 | Ativanichayaphong et al. |
| 2008/0208587 | A1 | 8/2008 | Ben-David et al. |
| 2008/0208864 | A1 | 8/2008 | Cucerzan et al. |
| 2008/0212796 | A1 | 9/2008 | Denda |
| 2008/0219641 | A1 | 9/2008 | Sandrew et al. |
| 2008/0221866 | A1 | 9/2008 | Katragadda et al. |
| 2008/0221879 | A1 | 9/2008 | Cerra et al. |
| 2008/0221880 | A1 | 9/2008 | Cerra et al. |
| 2008/0221887 | A1 | 9/2008 | Rose et al. |
| 2008/0221889 | A1 | 9/2008 | Cerra et al. |
| 2008/0221903 | A1 | 9/2008 | Kanevsky et al. |
| 2008/0222118 | A1 | 9/2008 | Scian et al. |
| 2008/0226130 | A1 | 9/2008 | Kansal et al. |
| 2008/0228463 | A1 | 9/2008 | Mori et al. |
| 2008/0228485 | A1 | 9/2008 | Owen |
| 2008/0228490 | A1 | 9/2008 | Fischer et al. |
| 2008/0228495 | A1 | 9/2008 | Cross et al. |
| 2008/0228496 | A1 | 9/2008 | Yu et al. |
| 2008/0228928 | A1 | 9/2008 | Donelli et al. |
| 2008/0229185 | A1 | 9/2008 | Lynch |
| 2008/0229218 | A1 | 9/2008 | Maeng |
| 2008/0235017 | A1 | 9/2008 | Satomura et al. |
| 2008/0235024 | A1 | 9/2008 | Goldberg et al. |
| 2008/0235027 | A1 | 9/2008 | Cross |
| 2008/0240569 | A1 | 10/2008 | Tonouchi |
| 2008/0242280 | A1 | 10/2008 | Shapiro et al. |
| 2008/0244390 | A1 | 10/2008 | Fux et al. |
| 2008/0244446 | A1 | 10/2008 | Lefevre et al. |
| 2008/0247519 | A1 | 10/2008 | Abella et al. |
| 2008/0247529 | A1 | 10/2008 | Barton et al. |
| 2008/0248797 | A1 | 10/2008 | Freeman et al. |
| 2008/0249770 | A1 | 10/2008 | Kim et al. |
| 2008/0249778 | A1 | 10/2008 | Barton et al. |
| 2008/0253577 | A1 | 10/2008 | Eppolito |
| 2008/0254425 | A1 | 10/2008 | Cohen et al. |
| 2008/0255837 | A1 | 10/2008 | Kahn et al. |
| 2008/0255842 | A1 | 10/2008 | Simhi et al. |
| 2008/0255845 | A1 | 10/2008 | Bennett |
| 2008/0256613 | A1 | 10/2008 | Grover |
| 2008/0259022 | A1 | 10/2008 | Mansfield et al. |
| 2008/0262828 | A1 | 10/2008 | Och et al. |
| 2008/0262838 | A1 | 10/2008 | Nurminen et al. |
| 2008/0262846 | A1 | 10/2008 | Burns et al. |
| 2008/0263139 | A1 | 10/2008 | Martin |
| 2008/0270118 | A1 | 10/2008 | Kuo et al. |
| 2008/0270138 | A1 | 10/2008 | Knight et al. |
| 2008/0270139 | A1 | 10/2008 | Shi et al. |
| 2008/0270140 | A1 | 10/2008 | Hertz et al. |
| 2008/0270151 | A1 | 10/2008 | Mahoney et al. |
| 2008/0277473 | A1 | 11/2008 | Kotlarsky et al. |
| 2008/0281510 | A1 | 11/2008 | Shahine |
| 2008/0288259 | A1 | 11/2008 | Chambers et al. |
| 2008/0288460 | A1 | 11/2008 | Poniatowski et al. |
| 2008/0292112 | A1 | 11/2008 | Valenzuela et al. |
| 2008/0294418 | A1 | 11/2008 | Cleary et al. |
| 2008/0294651 | A1 | 11/2008 | Masuyama et al. |
| 2008/0294981 | A1 | 11/2008 | Balzano et al. |
| 2008/0298563 | A1 | 12/2008 | Rondeau et al. |
| 2008/0298766 | A1 | 12/2008 | Wen et al. |
| 2008/0299523 | A1 | 12/2008 | Chai et al. |
| 2008/0300871 | A1 | 12/2008 | Gilbert |
| 2008/0300878 | A1 | 12/2008 | Bennett |
| 2008/0303645 | A1 | 12/2008 | Seymour et al. |
| 2008/0306727 | A1 | 12/2008 | Thurmair et al. |
| 2008/0312909 | A1 | 12/2008 | Hermansen et al. |
| 2008/0312928 | A1 | 12/2008 | Goebel et al. |
| 2008/0313335 | A1 | 12/2008 | Jung et al. |
| 2008/0316183 | A1 | 12/2008 | Westerman et al. |
| 2008/0319738 | A1 | 12/2008 | Liu et al. |
| 2008/0319753 | A1 | 12/2008 | Hancock |
| 2008/0319763 | A1 | 12/2008 | Di Fabbrizio et al. |
| 2008/0319783 | A1 | 12/2008 | Yao et al. |
| 2009/0003115 | A1 | 1/2009 | Lindahl et al. |
| 2009/0005012 | A1 | 1/2009 | Van Heugten |
| 2009/0005891 | A1 | 1/2009 | Batson et al. |
| 2009/0006097 | A1 | 1/2009 | Etezadi et al. |
| 2009/0006099 | A1 | 1/2009 | Sharpe et al. |
| 2009/0006100 | A1 | 1/2009 | Badger et al. |
| 2009/0006343 | A1 | 1/2009 | Platt et al. |
| 2009/0006345 | A1 | 1/2009 | Platt et al. |
| 2009/0006488 | A1 | 1/2009 | Lindahl et al. |
| 2009/0006671 | A1 | 1/2009 | Batson et al. |
| 2009/0007001 | A1 | 1/2009 | Morin et al. |
| 2009/0011709 | A1 | 1/2009 | Akasaka et al. |
| 2009/0012748 | A1 | 1/2009 | Beish et al. |
| 2009/0012775 | A1 | 1/2009 | El Hady et al. |
| 2009/0018828 | A1 | 1/2009 | Nakadai et al. |
| 2009/0018829 | A1 | 1/2009 | Kuperstein |
| 2009/0018834 | A1 | 1/2009 | Cooper et al. |
| 2009/0018835 | A1 | 1/2009 | Cooper et al. |
| 2009/0018839 | A1 | 1/2009 | Cooper et al. |
| 2009/0018840 | A1 | 1/2009 | Lutz et al. |
| 2009/0022329 | A1 | 1/2009 | Mahowald |
| 2009/0024595 | A1 | 1/2009 | Chen |
| 2009/0028435 | A1 | 1/2009 | Wu et al. |
| 2009/0030800 | A1 | 1/2009 | Grois |
| 2009/0030978 | A1 | 1/2009 | Johnson et al. |
| 2009/0043580 | A1 | 2/2009 | Mozer et al. |
| 2009/0043583 | A1 | 2/2009 | Agapi et al. |
| 2009/0043763 | A1 | 2/2009 | Peng |
| 2009/0044094 | A1 | 2/2009 | Rapp et al. |
| 2009/0048821 | A1 | 2/2009 | Yam et al. |
| 2009/0048845 | A1 | 2/2009 | Burckart et al. |
| 2009/0049067 | A1 | 2/2009 | Murray |
| 2009/0055168 | A1 | 2/2009 | Wu et al. |
| 2009/0055175 | A1 | 2/2009 | Terrell et al. |
| 2009/0055179 | A1 | 2/2009 | Cho et al. |
| 2009/0055186 | A1 | 2/2009 | Lance et al. |
| 2009/0055381 | A1 | 2/2009 | Wu et al. |
| 2009/0058823 | A1 | 3/2009 | Kocienda |
| 2009/0058860 | A1 | 3/2009 | Fong et al. |
| 2009/0060351 | A1 | 3/2009 | Li et al. |
| 2009/0060472 | A1 | 3/2009 | Bull et al. |
| 2009/0063974 | A1 | 3/2009 | Bull et al. |
| 2009/0064031 | A1 | 3/2009 | Bull et al. |
| 2009/0070097 | A1 | 3/2009 | Wu et al. |
| 2009/0070102 | A1 | 3/2009 | Maegawa |
| 2009/0070109 | A1 | 3/2009 | Didcock et al. |
| 2009/0070114 | A1 | 3/2009 | Staszak |
| 2009/0074214 | A1 | 3/2009 | Bradford et al. |
| 2009/0076792 | A1 | 3/2009 | Lawson-Tancred |
| 2009/0076796 | A1 | 3/2009 | Daraselia |
| 2009/0076819 | A1 | 3/2009 | Wouters et al. |

(56) References Cited

U.S. PATENT DOCUMENTS

2009/0076821 A1 3/2009 Brenner et al.
2009/0076825 A1 3/2009 Bradford et al.
2009/0077165 A1 3/2009 Rhodes et al.
2009/0079622 A1 3/2009 Seshadri et al.
2009/0083034 A1 3/2009 Hernandez et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0089058 A1 4/2009 Bellegarda
2009/0092239 A1 4/2009 Macwan
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0112572 A1 4/2009 Thorn
2009/0112576 A1 4/2009 Jackson et al.
2009/0112592 A1 4/2009 Candelore et al.
2009/0112677 A1 4/2009 Rhett
2009/0112892 A1 4/2009 Cardie et al.
2009/0119587 A1 5/2009 Allen et al.
2009/0123021 A1 5/2009 Jung et al.
2009/0123071 A1 5/2009 Iwasaki
2009/0125477 A1 5/2009 Lu et al.
2009/0128505 A1 5/2009 Partridge et al.
2009/0132253 A1 5/2009 Bellegarda
2009/0132255 A1 5/2009 Lu
2009/0137286 A1 5/2009 Luke et al.
2009/0138736 A1 5/2009 Chin
2009/0138828 A1 5/2009 Schultz et al.
2009/0144049 A1 6/2009 Haddad et al.
2009/0144428 A1 6/2009 Bowater et al.
2009/0144609 A1 6/2009 Liang et al.
2009/0146848 A1 6/2009 Ghassabian
2009/0150147 A1 6/2009 Jacoby et al.
2009/0150156 A1 6/2009 Kennewick et al.
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0158200 A1 6/2009 Palahnuk et al.
2009/0158323 A1 6/2009 Bober et al.
2009/0158423 A1 6/2009 Orlassino et al.
2009/0160803 A1 6/2009 Hashimoto
2009/0164301 A1 6/2009 O'Sullivan et al.
2009/0164441 A1 6/2009 Cheyer
2009/0164655 A1 6/2009 Pettersson et al.
2009/0164937 A1 6/2009 Alviar et al.
2009/0167508 A1 7/2009 Fadell et al.
2009/0167509 A1 7/2009 Fadeii et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0187402 A1 7/2009 Scholl
2009/0187577 A1 7/2009 Reznik et al.
2009/0187950 A1 7/2009 Nicas et al.
2009/0191895 A1 7/2009 Singh et al.
2009/0192782 A1 7/2009 Drewes
2009/0192787 A1 7/2009 Roon
2009/0198497 A1 8/2009 Kwon
2009/0204409 A1 8/2009 Mozer et al.
2009/0204478 A1 8/2009 Kaib et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215503 A1 8/2009 Zhang et al.
2009/0216396 A1 8/2009 Yamagata
2009/0216540 A1 8/2009 Tessel et al.
2009/0216704 A1 8/2009 Zheng et al.
2009/0221274 A1 9/2009 Venkatakrishnan et al.
2009/0222257 A1 9/2009 Sumita et al.
2009/0222270 A2 9/2009 Likens et al.
2009/0222488 A1 9/2009 Boerries et al.
2009/0228126 A1 9/2009 Spielberg et al.
2009/0228273 A1 9/2009 Wang et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0234638 A1 9/2009 Ranjan et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.
2009/0248182 A1 10/2009 Logan et al.
2009/0248395 A1 10/2009 Alewine et al.
2009/0248420 A1 10/2009 Basir et al.
2009/0248422 A1 10/2009 Li et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259969 A1 10/2009 Pallakoff
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0281789 A1 11/2009 Waibel et al.
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299745 A1 12/2009 Kennewick et al.
2009/0299849 A1 12/2009 Cao et al.
2009/0300391 A1 12/2009 Jessup et al.
2009/0300488 A1 12/2009 Salamon et al.
2009/0304198 A1 12/2009 Herre et al.
2009/0306967 A1 12/2009 Nicolov et al.
2009/0306969 A1 12/2009 Goud et al.
2009/0306979 A1 12/2009 Jaiswal et al.
2009/0306980 A1 12/2009 Shin
2009/0306981 A1 12/2009 Cromack et al.
2009/0306985 A1 12/2009 Roberts et al.
2009/0306988 A1 12/2009 Chen et al.
2009/0306989 A1 12/2009 Kaji

(56) References Cited

U.S. PATENT DOCUMENTS

2009/0307162 A1 12/2009 Bui et al.
2009/0307201 A1 12/2009 Dunning et al.
2009/0307584 A1 12/2009 Davidson et al.
2009/0313014 A1 12/2009 Shin et al.
2009/0313023 A1 12/2009 Jones
2009/0313026 A1 12/2009 Coffman et al.
2009/0313544 A1 12/2009 Wood et al.
2009/0313564 A1 12/2009 Rottler et al.
2009/0316943 A1 12/2009 Frigola Munoz et al.
2009/0318119 A1 12/2009 Basir et al.
2009/0318198 A1 12/2009 Carroll
2009/0319266 A1 12/2009 Brown et al.
2009/0326923 A1 12/2009 Yan et al.
2009/0326936 A1 12/2009 Nagashima
2009/0326938 A1 12/2009 Marila et al.
2009/0326949 A1 12/2009 Douthitt et al.
2009/0327977 A1 12/2009 Bachfischer et al.
2010/0004918 A1 1/2010 Lee et al.
2010/0004931 A1 1/2010 Ma et al.
2010/0005081 A1 1/2010 Bennett
2010/0010803 A1 1/2010 Ishikawa et al.
2010/0010814 A1 1/2010 Patel
2010/0013760 A1 1/2010 Hirai et al.
2010/0013796 A1 1/2010 Abileah et al.
2010/0017212 A1 1/2010 Attwater et al.
2010/0017382 A1 1/2010 Katragadda et al.
2010/0019834 A1 1/2010 Zerbe et al.
2010/0023318 A1 1/2010 Lemoine
2010/0023320 A1 1/2010 Di Cristo et al.
2010/0026526 A1 2/2010 Yokota
2010/0030549 A1 2/2010 Lee et al.
2010/0030928 A1 2/2010 Conroy et al.
2010/0031143 A1 2/2010 Rao et al.
2010/0036653 A1 2/2010 Kim et al.
2010/0036655 A1 2/2010 Cecil et al.
2010/0036660 A1 2/2010 Bennett
2010/0037183 A1 2/2010 Miyashita et al.
2010/0042400 A1 2/2010 Block et al.
2010/0042576 A1 2/2010 Roettger et al.
2010/0046842 A1 2/2010 Conwell et al.
2010/0049498 A1 2/2010 Cao et al.
2010/0049514 A1 2/2010 Kennewick et al.
2010/0050064 A1 2/2010 Liu et al.
2010/0054512 A1 3/2010 Solum
2010/0057457 A1 3/2010 Ogata et al.
2010/0057461 A1 3/2010 Neubacher et al.
2010/0057643 A1 3/2010 Yang
2010/0060646 A1 3/2010 Unsal et al.
2010/0063804 A1 3/2010 Sato et al.
2010/0063825 A1 3/2010 Williams et al.
2010/0063961 A1 3/2010 Guiheneuf et al.
2010/0064113 A1 3/2010 Lindahl et al.
2010/0064218 A1 3/2010 Bull et al.
2010/0067723 A1 3/2010 Bergmann et al.
2010/0067867 A1 3/2010 Lin et al.
2010/0070281 A1 3/2010 Conkie et al.
2010/0070899 A1 3/2010 Hunt et al.
2010/0071003 A1 3/2010 Bychkov et al.
2010/0076760 A1 3/2010 Kraenzel et al.
2010/0076993 A1 3/2010 Klawitter et al.
2010/0077350 A1 3/2010 Lim et al.
2010/0079501 A1 4/2010 Ikeda et al.
2010/0080398 A1 4/2010 Waldmann
2010/0080470 A1 4/2010 Deluca et al.
2010/0081456 A1 4/2010 Singh et al.
2010/0081487 A1 4/2010 Chen et al.
2010/0082286 A1 4/2010 Leung
2010/0082327 A1 4/2010 Rogers et al.
2010/0082328 A1 4/2010 Rogers et al.
2010/0082329 A1 4/2010 Silverman et al.
2010/0082346 A1 4/2010 Rogers et al.
2010/0082347 A1 4/2010 Rogers et al.
2010/0082348 A1 4/2010 Silverman et al.
2010/0082349 A1 4/2010 Bellegarda et al.
2010/0082970 A1 4/2010 Lindahl et al.
2010/0086152 A1 4/2010 Rank et al.
2010/0086153 A1 4/2010 Hagen et al.
2010/0086156 A1 4/2010 Rank et al.
2010/0088020 A1 4/2010 Sano et al.
2010/0088093 A1 4/2010 Lee et al.
2010/0088100 A1 4/2010 Lindahl
2010/0098231 A1 4/2010 Wohlert et al.
2010/0100212 A1 4/2010 Lindahl et al.
2010/0100384 A1 4/2010 Ju et al.
2010/0100816 A1 4/2010 Mccloskey et al.
2010/0103776 A1 4/2010 Chan
2010/0106486 A1 4/2010 Hua et al.
2010/0106498 A1 4/2010 Morrison et al.
2010/0106500 A1 4/2010 McKee et al.
2010/0106503 A1 4/2010 Farrell et al.
2010/0114856 A1 5/2010 Kuboyama
2010/0121637 A1 5/2010 Roy et al.
2010/0125456 A1 5/2010 Weng et al.
2010/0125458 A1 5/2010 Franco et al.
2010/0125460 A1 5/2010 Mellott et al.
2010/0125811 A1 5/2010 Moore et al.
2010/0131269 A1 5/2010 Park et al.
2010/0131273 A1 5/2010 Aley-Raz et al.
2010/0131498 A1 5/2010 Linthicum et al.
2010/0131899 A1 5/2010 Hubert
2010/0138215 A1 6/2010 Williams
2010/0138224 A1 6/2010 Bedingfield, Sr.
2010/0138416 A1 6/2010 Bellotti
2010/0138680 A1 6/2010 Brisebois et al.
2010/0138759 A1 6/2010 Roy
2010/0142740 A1 6/2010 Roerup
2010/0145694 A1 6/2010 Ju et al.
2010/0145700 A1 6/2010 Kennewick et al.
2010/0146442 A1 6/2010 Nagasaka et al.
2010/0150321 A1 6/2010 Harris et al.
2010/0153115 A1 6/2010 Klee et al.
2010/0153448 A1 6/2010 Harpur et al.
2010/0161313 A1 6/2010 Karttunen
2010/0161554 A1 6/2010 Datuashvili et al.
2010/0164897 A1 7/2010 Morin et al.
2010/0169075 A1 7/2010 Raffa et al.
2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185448 A1 7/2010 Meisel
2010/0185949 A1 7/2010 Jaeger
2010/0191520 A1 7/2010 Gruhn et al.
2010/0197359 A1 8/2010 Harris
2010/0199180 A1 8/2010 Brichter et al.
2010/0199215 A1 8/2010 Seymour et al.
2010/0204986 A1 8/2010 Kennewick et al.
2010/0211199 A1 8/2010 Naik et al.
2010/0216509 A1 8/2010 Riemer et al.
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225809 A1 9/2010 Connors et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0241418 A1 9/2010 Maeda et al.
2010/0250542 A1 9/2010 Fujimaki
2010/0250599 A1 9/2010 Schmidt et al.

(56) References Cited

U.S. PATENT DOCUMENTS

2010/0255858 A1 10/2010 Juhasz
2010/0257160 A1 10/2010 Cao
2010/0257478 A1 10/2010 Longe et al.
2010/0262599 A1 10/2010 Nitz
2010/0268539 A1 10/2010 Xu et al.
2010/0269040 A1 10/2010 Lee
2010/0274753 A1 10/2010 Liberty et al.
2010/0277579 A1 11/2010 Cho et al.
2010/0278320 A1 11/2010 Arsenault et al.
2010/0278453 A1 11/2010 King
2010/0280983 A1 11/2010 Cho et al.
2010/0281034 A1 11/2010 Petrou et al.
2010/0286985 A1 11/2010 Kennewick et al.
2010/0287514 A1 11/2010 Cragun et al.
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0304705 A1 12/2010 Hursey et al.
2010/0305807 A1 12/2010 Basir et al.
2010/0305947 A1 12/2010 Schwarz et al.
2010/0312547 A1 12/2010 Van Os et al.
2010/0312566 A1 12/2010 Odinak et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325158 A1 12/2010 Oral et al.
2010/0325573 A1 12/2010 Estrada et al.
2010/0325588 A1 12/2010 Reddy et al.
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0010178 A1 1/2011 Lee et al.
2011/0010644 A1 1/2011 Merrill et al.
2011/0016150 A1 1/2011 Engstrom et al.
2011/0018695 A1 1/2011 Bells et al.
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0029616 A1 2/2011 Wang et al.
2011/0033064 A1 2/2011 Johnson et al.
2011/0035144 A1 2/2011 Okamoto et al.
2011/0035434 A1 2/2011 Lockwood
2011/0038489 A1 2/2011 Visser et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0050591 A1 3/2011 Kim et al.
2011/0050592 A1 3/2011 Kim et al.
2011/0054647 A1 3/2011 Chipchase
2011/0054894 A1 3/2011 Phillips et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0065456 A1 3/2011 Brennan et al.
2011/0066366 A1 3/2011 Ellanti et al.
2011/0066468 A1 3/2011 Huang et al.
2011/0066634 A1 3/2011 Phillips et al.
2011/0072492 A1 3/2011 Mohler et al.
2011/0076994 A1 3/2011 Kim et al.
2011/0082688 A1 4/2011 Kim et al.
2011/0083079 A1 4/2011 Farrell et al.
2011/0087491 A1 4/2011 Wittenstein et al.
2011/0090078 A1 4/2011 Kim et al.
2011/0093261 A1 4/2011 Angott
2011/0093265 A1 4/2011 Stent et al.
2011/0093271 A1 4/2011 Bernard et al.
2011/0099000 A1 4/2011 Rai et al.
2011/0103682 A1 5/2011 Chidlovskii et al.
2011/0106736 A1 5/2011 Aharonson et al.
2011/0106892 A1 5/2011 Nelson et al.
2011/0110502 A1 5/2011 Daye et al.
2011/0112827 A1 5/2011 Kennewick et al.
2011/0112837 A1 5/2011 Kurki-Suonio et al.
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0141141 A1 6/2011 Kankainen
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153330 A1 6/2011 Yazdani et al.
2011/0153373 A1 6/2011 Dantzig et al.
2011/0157029 A1 6/2011 Tseng
2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0167350 A1 7/2011 Hoellwarth
2011/0175810 A1 7/2011 Markovic et al.
2011/0179002 A1 7/2011 Dumitru et al.
2011/0179372 A1 7/2011 Moore et al.
2011/0183650 A1 7/2011 Mckee et al.
2011/0184721 A1 7/2011 Subramanian et al.
2011/0184730 A1 7/2011 LeBeau et al.
2011/0191271 A1 8/2011 Baker et al.
2011/0191344 A1 8/2011 Jin et al.
2011/0195758 A1 8/2011 Damale et al.
2011/0197128 A1 8/2011 Assadollahi et al.
2011/0201385 A1 8/2011 Higginbotham et al.
2011/0201387 A1 8/2011 Paek et al.
2011/0202526 A1 8/2011 Lee et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwala et al.
2011/0231182 A1 9/2011 Weider et al.
2011/0231184 A1 9/2011 Kerr

(56) References Cited

U.S. PATENT DOCUMENTS

| | | | |
|---|---|---|---|
| 2011/0231188 | A1 | 9/2011 | Kennewick et al. |
| 2011/0231432 | A1 | 9/2011 | Sata et al. |
| 2011/0231474 | A1 | 9/2011 | Locker et al. |
| 2011/0238407 | A1 | 9/2011 | Kent |
| 2011/0238408 | A1 | 9/2011 | Larcheveque et al. |
| 2011/0238676 | A1 | 9/2011 | Liu et al. |
| 2011/0239111 | A1 | 9/2011 | Grover |
| 2011/0242007 | A1 | 10/2011 | Gray et al. |
| 2011/0246471 | A1 | 10/2011 | Rakib et al. |
| 2011/0249144 | A1 | 10/2011 | Chang |
| 2011/0250570 | A1 | 10/2011 | Mack |
| 2011/0258188 | A1 | 10/2011 | Abdalmageed et al. |
| 2011/0260861 | A1 | 10/2011 | Singh et al. |
| 2011/0264643 | A1 | 10/2011 | Cao |
| 2011/0274303 | A1 | 11/2011 | Filson et al. |
| 2011/0276598 | A1 | 11/2011 | Kozempel |
| 2011/0276944 | A1 | 11/2011 | Bergman et al. |
| 2011/0279368 | A1 | 11/2011 | Klein et al. |
| 2011/0282888 | A1 | 11/2011 | Koperski et al. |
| 2011/0282906 | A1 | 11/2011 | Wong |
| 2011/0288861 | A1 | 11/2011 | Kurzweil et al. |
| 2011/0298585 | A1 | 12/2011 | Barry |
| 2011/0301943 | A1 | 12/2011 | Patch |
| 2011/0302162 | A1 | 12/2011 | Xiao et al. |
| 2011/0306426 | A1 | 12/2011 | Novak et al. |
| 2011/0307241 | A1 | 12/2011 | Waibel et al. |
| 2011/0307491 | A1 | 12/2011 | Fisk et al. |
| 2011/0307810 | A1 | 12/2011 | Hilerio et al. |
| 2011/0313775 | A1 | 12/2011 | Laligand et al. |
| 2011/0314032 | A1 | 12/2011 | Bennett et al. |
| 2011/0314404 | A1 | 12/2011 | Kotler et al. |
| 2011/0320187 | A1 | 12/2011 | Motik et al. |
| 2012/0002820 | A1 | 1/2012 | Leichter |
| 2012/0005602 | A1 | 1/2012 | Anttila et al. |
| 2012/0008754 | A1 | 1/2012 | Mukherjee et al. |
| 2012/0010886 | A1 | 1/2012 | Razavilar |
| 2012/0011138 | A1 | 1/2012 | Dunning et al. |
| 2012/0013609 | A1 | 1/2012 | Reponen et al. |
| 2012/0015629 | A1 | 1/2012 | Olsen et al. |
| 2012/0016678 | A1 | 1/2012 | Gruber et al. |
| 2012/0019400 | A1 | 1/2012 | Patel et al. |
| 2012/0020490 | A1 | 1/2012 | Leichter |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022872 | A1 | 1/2012 | Gruber et al. |
| 2012/0022874 | A1 | 1/2012 | Lloyd et al. |
| 2012/0022876 | A1 | 1/2012 | LeBeau et al. |
| 2012/0022967 | A1 | 1/2012 | Bachman et al. |
| 2012/0023088 | A1 | 1/2012 | Cheng et al. |
| 2012/0023095 | A1 | 1/2012 | Wadycki et al. |
| 2012/0023462 | A1 | 1/2012 | Rosing et al. |
| 2012/0029661 | A1 | 2/2012 | Jones et al. |
| 2012/0029910 | A1 | 2/2012 | Medlock et al. |
| 2012/0034904 | A1 | 2/2012 | LeBeau et al. |
| 2012/0035907 | A1 | 2/2012 | Lebeau et al. |
| 2012/0035908 | A1 | 2/2012 | Lebeau et al. |
| 2012/0035924 | A1 | 2/2012 | Jitkoff et al. |
| 2012/0035925 | A1 | 2/2012 | Friend et al. |
| 2012/0035926 | A1 | 2/2012 | Ambler |
| 2012/0035931 | A1 | 2/2012 | LeBeau et al. |
| 2012/0035932 | A1 | 2/2012 | Jitkoff et al. |
| 2012/0036556 | A1 | 2/2012 | LeBeau et al. |
| 2012/0039539 | A1 | 2/2012 | Boiman et al. |
| 2012/0041752 | A1 | 2/2012 | Wang et al. |
| 2012/0042014 | A1 | 2/2012 | Desai et al. |
| 2012/0042343 | A1 | 2/2012 | Laligand et al. |
| 2012/0053815 | A1 | 3/2012 | Montanari et al. |
| 2012/0053945 | A1 | 3/2012 | Gupta et al. |
| 2012/0056815 | A1 | 3/2012 | Mehra |
| 2012/0059655 | A1 | 3/2012 | Cartales |
| 2012/0066581 | A1 | 3/2012 | Spalink |
| 2012/0078624 | A1 | 3/2012 | Yook et al. |
| 2012/0078627 | A1 | 3/2012 | Wagner |
| 2012/0082317 | A1 | 4/2012 | Pance et al. |
| 2012/0083286 | A1 | 4/2012 | Kim et al. |
| 2012/0084086 | A1 | 4/2012 | Gilbert et al. |
| 2012/0084634 | A1 | 4/2012 | Wong et al. |
| 2012/0088219 | A1 | 4/2012 | Briscoe et al. |
| 2012/0108221 | A1 | 5/2012 | Thomas et al. |
| 2012/0116770 | A1 | 5/2012 | Chen et al. |
| 2012/0117499 | A1 | 5/2012 | Mori et al. |
| 2012/0124126 | A1 | 5/2012 | Alcazar et al. |
| 2012/0128322 | A1 | 5/2012 | Shaffer et al. |
| 2012/0136572 | A1 | 5/2012 | Norton |
| 2012/0136985 | A1 | 5/2012 | Popescu et al. |
| 2012/0137367 | A1 | 5/2012 | Dupont et al. |
| 2012/0149394 | A1 | 6/2012 | Singh et al. |
| 2012/0150580 | A1 | 6/2012 | Norton |
| 2012/0158293 | A1 | 6/2012 | Burnham |
| 2012/0158422 | A1 | 6/2012 | Burnham et al. |
| 2012/0159380 | A1 | 6/2012 | Kocienda et al. |
| 2012/0163710 | A1 | 6/2012 | Skaff et al. |
| 2012/0166196 | A1 | 6/2012 | Ju et al. |
| 2012/0173464 | A1 | 7/2012 | Tur et al. |
| 2012/0174121 | A1 | 7/2012 | Treat et al. |
| 2012/0179457 | A1 | 7/2012 | Newman et al. |
| 2012/0185237 | A1 | 7/2012 | Gajic et al. |
| 2012/0185781 | A1 | 7/2012 | Guzman et al. |
| 2012/0191461 | A1 | 7/2012 | Lin et al. |
| 2012/0192096 | A1 | 7/2012 | Bowman et al. |
| 2012/0197743 | A1 | 8/2012 | Grigg et al. |
| 2012/0197995 | A1 | 8/2012 | Caruso |
| 2012/0197998 | A1 | 8/2012 | Kessel et al. |
| 2012/0201362 | A1 | 8/2012 | Crossan et al. |
| 2012/0209853 | A1 | 8/2012 | Desai et al. |
| 2012/0209874 | A1 | 8/2012 | Wong et al. |
| 2012/0214141 | A1 | 8/2012 | Raya et al. |
| 2012/0214517 | A1 | 8/2012 | Singh et al. |
| 2012/0215762 | A1 | 8/2012 | Hall et al. |
| 2012/0221339 | A1 | 8/2012 | Wang et al. |
| 2012/0221552 | A1 | 8/2012 | Reponen et al. |
| 2012/0223889 | A1 | 9/2012 | Medlock et al. |
| 2012/0223936 | A1 | 9/2012 | Aughey et al. |
| 2012/0232885 | A1 | 9/2012 | Barbosa et al. |
| 2012/0232886 | A1 | 9/2012 | Capuozzo et al. |
| 2012/0232906 | A1 | 9/2012 | Lindahl et al. |
| 2012/0239661 | A1 | 9/2012 | Giblin |
| 2012/0242482 | A1 | 9/2012 | Elumalai et al. |
| 2012/0245719 | A1 | 9/2012 | Story, Jr. et al. |
| 2012/0245941 | A1 | 9/2012 | Cheyer |
| 2012/0245944 | A1 | 9/2012 | Gruber et al. |
| 2012/0246064 | A1 | 9/2012 | Balkow |
| 2012/0250858 | A1 | 10/2012 | Iqbal et al. |
| 2012/0252367 | A1 | 10/2012 | Gaglio et al. |
| 2012/0252540 | A1 | 10/2012 | Kirigaya |
| 2012/0254143 | A1 | 10/2012 | Varma et al. |
| 2012/0254152 | A1 | 10/2012 | Park et al. |
| 2012/0254290 | A1 | 10/2012 | Naaman |
| 2012/0265528 | A1 | 10/2012 | Gruber et al. |
| 2012/0265535 | A1 | 10/2012 | Bryant-Rich et al. |
| 2012/0271625 | A1 | 10/2012 | Bernard |
| 2012/0271634 | A1 | 10/2012 | Lenke |
| 2012/0271635 | A1 | 10/2012 | Ljolje |
| 2012/0271640 | A1 | 10/2012 | Basir |
| 2012/0271676 | A1 | 10/2012 | Aravamudan et al. |
| 2012/0275377 | A1 | 11/2012 | Lehane et al. |
| 2012/0284027 | A1 | 11/2012 | Mallett et al. |
| 2012/0290300 | A1 | 11/2012 | Lee et al. |
| 2012/0295708 | A1 | 11/2012 | Hernandez-Abrego et al. |
| 2012/0296649 | A1 | 11/2012 | Bansal et al. |
| 2012/0296654 | A1 | 11/2012 | Hendrickson et al. |
| 2012/0296891 | A1 | 11/2012 | Rangan |
| 2012/0297348 | A1 | 11/2012 | Santoro |
| 2012/0303369 | A1 | 11/2012 | Brush et al. |
| 2012/0304124 | A1 | 11/2012 | Chen et al. |
| 2012/0309363 | A1 | 12/2012 | Gruber et al. |
| 2012/0310642 | A1 | 12/2012 | Cao et al. |
| 2012/0310649 | A1 | 12/2012 | Cannistraro et al. |
| 2012/0310652 | A1 | 12/2012 | O'Sullivan |
| 2012/0311478 | A1 | 12/2012 | Van Os et al. |

(56) References Cited

U.S. PATENT DOCUMENTS

| | | | |
|---|---|---|---|
| 2012/0311583 | A1 | 12/2012 | Gruber et al. |
| 2012/0311584 | A1 | 12/2012 | Gruber et al. |
| 2012/0311585 | A1 | 12/2012 | Gruber et al. |
| 2012/0316878 | A1 | 12/2012 | Singleton et al. |
| 2012/0317194 | A1 | 12/2012 | Tian |
| 2012/0317498 | A1 | 12/2012 | Logan et al. |
| 2012/0321112 | A1 | 12/2012 | Schubert et al. |
| 2012/0324391 | A1 | 12/2012 | Tocci et al. |
| 2012/0327009 | A1 | 12/2012 | Fleizach |
| 2012/0330660 | A1 | 12/2012 | Jaiswal |
| 2012/0330661 | A1 | 12/2012 | Lindahl |
| 2012/0330990 | A1 | 12/2012 | Chen et al. |
| 2013/0005405 | A1 | 1/2013 | Prociw |
| 2013/0006633 | A1 | 1/2013 | Grokop et al. |
| 2013/0006637 | A1 | 1/2013 | Kanevsky et al. |
| 2013/0006638 | A1 | 1/2013 | Lindahl |
| 2013/0007648 | A1 | 1/2013 | Gamon et al. |
| 2013/0013313 | A1 | 1/2013 | Shechtman et al. |
| 2013/0027875 | A1 | 1/2013 | Zhu et al. |
| 2013/0030804 | A1 | 1/2013 | Zavaliagko et al. |
| 2013/0030815 | A1 | 1/2013 | Madhvanath et al. |
| 2013/0035942 | A1 | 2/2013 | Kim et al. |
| 2013/0035961 | A1 | 2/2013 | Yegnanarayanan |
| 2013/0041647 | A1 | 2/2013 | Ramerth et al. |
| 2013/0041654 | A1 | 2/2013 | Walker et al. |
| 2013/0041661 | A1 | 2/2013 | Lee et al. |
| 2013/0041968 | A1 | 2/2013 | Cohen et al. |
| 2013/0054550 | A1 | 2/2013 | Bolohan |
| 2013/0054609 | A1 | 2/2013 | Rajput et al. |
| 2013/0054613 | A1 | 2/2013 | Bishop |
| 2013/0054706 | A1 | 2/2013 | Graham et al. |
| 2013/0055099 | A1 | 2/2013 | Yao et al. |
| 2013/0055147 | A1 | 2/2013 | Vasudev et al. |
| 2013/0066832 | A1 | 3/2013 | Sheehan et al. |
| 2013/0067307 | A1 | 3/2013 | Tian et al. |
| 2013/0073286 | A1 | 3/2013 | Bastea-Forte et al. |
| 2013/0080152 | A1 | 3/2013 | Brun et al. |
| 2013/0080162 | A1 | 3/2013 | Chang et al. |
| 2013/0080167 | A1 | 3/2013 | Mozer |
| 2013/0080177 | A1 | 3/2013 | Chen |
| 2013/0085755 | A1 | 4/2013 | Bringert et al. |
| 2013/0085761 | A1 | 4/2013 | Bringert et al. |
| 2013/0090921 | A1 | 4/2013 | Liu et al. |
| 2013/0091090 | A1 | 4/2013 | Spivack et al. |
| 2013/0095805 | A1 | 4/2013 | Lebeau et al. |
| 2013/0097566 | A1 | 4/2013 | Berglund |
| 2013/0103391 | A1 | 4/2013 | Millmore et al. |
| 2013/0106742 | A1 | 5/2013 | Lee et al. |
| 2013/0110505 | A1 | 5/2013 | Gruber et al. |
| 2013/0110515 | A1 | 5/2013 | Guzzoni et al. |
| 2013/0110518 | A1 | 5/2013 | Gruber et al. |
| 2013/0110519 | A1 | 5/2013 | Cheyer et al. |
| 2013/0110520 | A1 | 5/2013 | Cheyer et al. |
| 2013/0111348 | A1 | 5/2013 | Gruber et al. |
| 2013/0111487 | A1 | 5/2013 | Cheyer et al. |
| 2013/0115927 | A1 | 5/2013 | Gruber et al. |
| 2013/0117022 | A1 | 5/2013 | Chen et al. |
| 2013/0124189 | A1 | 5/2013 | Baldwin et al. |
| 2013/0132871 | A1 | 5/2013 | Zeng et al. |
| 2013/0144594 | A1 | 6/2013 | Bangalore et al. |
| 2013/0144616 | A1 | 6/2013 | Bangalore et al. |
| 2013/0151339 | A1 | 6/2013 | Kim et al. |
| 2013/0152092 | A1 | 6/2013 | Yadgar et al. |
| 2013/0158977 | A1 | 6/2013 | Senior |
| 2013/0165232 | A1 | 6/2013 | Nelson et al. |
| 2013/0166442 | A1 | 6/2013 | Nakajima et al. |
| 2013/0170738 | A1 | 7/2013 | Capuozzo et al. |
| 2013/0172022 | A1 | 7/2013 | Seymour et al. |
| 2013/0176592 | A1 | 7/2013 | Sasaki |
| 2013/0179440 | A1 | 7/2013 | Gordon |
| 2013/0185059 | A1 | 7/2013 | Riccardi et al. |
| 2013/0185074 | A1 | 7/2013 | Gruber et al. |
| 2013/0185081 | A1 | 7/2013 | Cheyer et al. |
| 2013/0185336 | A1 | 7/2013 | Singh et al. |
| 2013/0191117 | A1 | 7/2013 | Atti et al. |
| 2013/0197911 | A1 | 8/2013 | Wei et al. |
| 2013/0218553 | A1 | 8/2013 | Fujii et al. |
| 2013/0218560 | A1 | 8/2013 | Hsiao et al. |
| 2013/0225128 | A1 | 8/2013 | Gomar |
| 2013/0231917 | A1 | 9/2013 | Naik |
| 2013/0235987 | A1 | 9/2013 | Arroniz-Escobar et al. |
| 2013/0238647 | A1 | 9/2013 | Thompson |
| 2013/0244615 | A1 | 9/2013 | Miller et al. |
| 2013/0246048 | A1 | 9/2013 | Nagase et al. |
| 2013/0253911 | A1 | 9/2013 | Petri et al. |
| 2013/0253912 | A1 | 9/2013 | Medlock et al. |
| 2013/0275117 | A1 | 10/2013 | Winer |
| 2013/0275164 | A1 | 10/2013 | Gruber et al. |
| 2013/0275875 | A1 | 10/2013 | Gruber et al. |
| 2013/0275899 | A1 | 10/2013 | Schubert et al. |
| 2013/0283168 | A1 | 10/2013 | Brown et al. |
| 2013/0289991 | A1 | 10/2013 | Eshwar et al. |
| 2013/0289993 | A1 | 10/2013 | Rao et al. |
| 2013/0289994 | A1 | 10/2013 | Newman et al. |
| 2013/0297319 | A1 | 11/2013 | Kim |
| 2013/0297348 | A1 | 11/2013 | Cardoza et al. |
| 2013/0304479 | A1 | 11/2013 | Teller et al. |
| 2013/0304758 | A1 | 11/2013 | Gruber et al. |
| 2013/0304815 | A1 | 11/2013 | Puente et al. |
| 2013/0307855 | A1 | 11/2013 | Lamb et al. |
| 2013/0307997 | A1 | 11/2013 | O'Keefe et al. |
| 2013/0308922 | A1 | 11/2013 | Sano et al. |
| 2013/0322634 | A1 | 12/2013 | Bennett et al. |
| 2013/0325443 | A1 | 12/2013 | Begeja et al. |
| 2013/0325448 | A1 | 12/2013 | Levien et al. |
| 2013/0325481 | A1 | 12/2013 | Van Os et al. |
| 2013/0325484 | A1 | 12/2013 | Chakladar et al. |
| 2013/0325979 | A1 | 12/2013 | Mansfield et al. |
| 2013/0329023 | A1 | 12/2013 | Suplee, III et al. |
| 2013/0332164 | A1 | 12/2013 | Nalk |
| 2013/0332168 | A1 | 12/2013 | Kim et al. |
| 2013/0332400 | A1 | 12/2013 | González |
| 2013/0339256 | A1 | 12/2013 | Shroff |
| 2013/0346068 | A1 | 12/2013 | Solem et al. |
| 2014/0006012 | A1 | 1/2014 | Zhou et al. |
| 2014/0006025 | A1 | 1/2014 | Krishnan et al. |
| 2014/0006027 | A1 | 1/2014 | Kim et al. |
| 2014/0006153 | A1 | 1/2014 | Thangam et al. |
| 2014/0012580 | A1 | 1/2014 | Ganong et al. |
| 2014/0019116 | A1 | 1/2014 | Lundberg et al. |
| 2014/0019133 | A1 | 1/2014 | Bao et al. |
| 2014/0028735 | A1 | 1/2014 | Williams et al. |
| 2014/0033071 | A1 | 1/2014 | Gruber et al. |
| 2014/0039894 | A1 | 2/2014 | Shostak |
| 2014/0040274 | A1 | 2/2014 | Aravamudan et al. |
| 2014/0040748 | A1 | 2/2014 | Lemay et al. |
| 2014/0040918 | A1 | 2/2014 | Li et al. |
| 2014/0052791 | A1 | 2/2014 | Chakra et al. |
| 2014/0053082 | A1 | 2/2014 | Park et al. |
| 2014/0059030 | A1 | 2/2014 | Hakkani-Tur et al. |
| 2014/0067371 | A1 | 3/2014 | Liensberger |
| 2014/0068751 | A1 | 3/2014 | Last et al. |
| 2014/0074470 | A1 | 3/2014 | Jansche et al. |
| 2014/0074472 | A1 | 3/2014 | Lin et al. |
| 2014/0074815 | A1 | 3/2014 | Plimton |
| 2014/0078065 | A1 | 3/2014 | Akkok et al. |
| 2014/0080428 | A1 | 3/2014 | Rhoads et al. |
| 2014/0081633 | A1 | 3/2014 | Badaskar et al. |
| 2014/0082501 | A1 | 3/2014 | Bae et al. |
| 2014/0086458 | A1 | 3/2014 | Rogers et al. |
| 2014/0087711 | A1 | 3/2014 | Geyer et al. |
| 2014/0095171 | A1 | 4/2014 | Lynch et al. |
| 2014/0098247 | A1 | 4/2014 | Rao et al. |
| 2014/0108017 | A1 | 4/2014 | Mason et al. |
| 2014/0114554 | A1 | 4/2014 | Lagassey |
| 2014/0118155 | A1 | 5/2014 | Bowers et al. |
| 2014/0122086 | A1 | 5/2014 | Kapur et al. |
| 2014/0135036 | A1 | 5/2014 | Bonanni et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0142923 | A1 | 5/2014 | Jones et al. |
| 2014/0143721 | A1 | 5/2014 | Suzuki et al. |

(56) References Cited

U.S. PATENT DOCUMENTS

| | | | |
|---|---|---|---|
| 2014/0146200 | A1 | 5/2014 | Scott et al. |
| 2014/0152577 | A1 | 6/2014 | Yuen et al. |
| 2014/0155031 | A1 | 6/2014 | Lee et al. |
| 2014/0157422 | A1 | 6/2014 | Livshits et al. |
| 2014/0163951 | A1 | 6/2014 | Nikoulina et al. |
| 2014/0164532 | A1 | 6/2014 | Lynch et al. |
| 2014/0180689 | A1 | 6/2014 | Kim et al. |
| 2014/0188477 | A1 | 7/2014 | Zhang |
| 2014/0195251 | A1 | 7/2014 | Zeinstra et al. |
| 2014/0195252 | A1 | 7/2014 | Gruber et al. |
| 2014/0203939 | A1 | 7/2014 | Harrington et al. |
| 2014/0207582 | A1 | 7/2014 | Flinn et al. |
| 2014/0218372 | A1 | 8/2014 | Missig et al. |
| 2014/0222436 | A1 | 8/2014 | Binder et al. |
| 2014/0223377 | A1 | 8/2014 | Shaw et al. |
| 2014/0223481 | A1 | 8/2014 | Fundament |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0244257 | A1 | 8/2014 | Colibro et al. |
| 2014/0244258 | A1 | 8/2014 | Song et al. |
| 2014/0244271 | A1 | 8/2014 | Lindahl |
| 2014/0247383 | A1 | 9/2014 | Dave et al. |
| 2014/0247926 | A1 | 9/2014 | Gainsboro et al. |
| 2014/0249817 | A1 | 9/2014 | Hart et al. |
| 2014/0250046 | A1 | 9/2014 | Winn et al. |
| 2014/0267022 | A1 | 9/2014 | Kim |
| 2014/0267599 | A1 | 9/2014 | Drouin et al. |
| 2014/0274203 | A1 | 9/2014 | Ganong et al. |
| 2014/0274211 | A1 | 9/2014 | Sejnoha et al. |
| 2014/0278391 | A1 | 9/2014 | Braho et al. |
| 2014/0278406 | A1 | 9/2014 | Tsumura et al. |
| 2014/0278413 | A1 | 9/2014 | Pitschel et al. |
| 2014/0278435 | A1 | 9/2014 | Ganong et al. |
| 2014/0278443 | A1 | 9/2014 | Gunn et al. |
| 2014/0278513 | A1 | 9/2014 | Prakash et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0281983 | A1 | 9/2014 | Xian et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0297281 | A1 | 10/2014 | Togawa et al. |
| 2014/0297284 | A1 | 10/2014 | Gruber et al. |
| 2014/0304605 | A1 | 10/2014 | Ohmura et al. |
| 2014/0316585 | A1 | 10/2014 | Boesveld et al. |
| 2014/0317502 | A1 | 10/2014 | Brown et al. |
| 2014/0337048 | A1 | 11/2014 | Brown et al. |
| 2014/0337266 | A1 | 11/2014 | Wolverton et al. |
| 2014/0337814 | A1 | 11/2014 | Kalns et al. |
| 2014/0351760 | A1 | 11/2014 | Skory et al. |
| 2014/0358519 | A1 | 12/2014 | Mirkin et al. |
| 2014/0365209 | A1 | 12/2014 | Evermann |
| 2014/0365227 | A1 | 12/2014 | Cash et al. |
| 2014/0365880 | A1 | 12/2014 | Bellegarda |
| 2014/0365895 | A1 | 12/2014 | Paulson et al. |
| 2014/0370817 | A1 | 12/2014 | Luna |
| 2015/0003797 | A1 | 1/2015 | Schmidt |
| 2015/0006178 | A1 | 1/2015 | Peng et al. |
| 2015/0006199 | A1 | 1/2015 | Snider et al. |
| 2015/0012271 | A1 | 1/2015 | Peng et al. |
| 2015/0019219 | A1 | 1/2015 | Tzirkel-Hancock et al. |
| 2015/0039292 | A1 | 2/2015 | Suleman et al. |
| 2015/0039305 | A1 | 2/2015 | Huang |
| 2015/0045003 | A1 | 2/2015 | Vora et al. |
| 2015/0046537 | A1 | 2/2015 | Rakib |
| 2015/0050633 | A1 | 2/2015 | Christmas et al. |
| 2015/0058013 | A1 | 2/2015 | Pakhomov et al. |
| 2015/0065200 | A1 | 3/2015 | Namgung et al. |
| 2015/0066506 | A1 | 3/2015 | Romano et al. |
| 2015/0066516 | A1 | 3/2015 | Nishikawa et al. |
| 2015/0067485 | A1 | 3/2015 | Kim et al. |
| 2015/0073804 | A1 | 3/2015 | Senior et al. |
| 2015/0088511 | A1 | 3/2015 | Bharadwaj et al. |
| 2015/0095031 | A1 | 4/2015 | Conkie et al. |
| 2015/0100316 | A1 | 4/2015 | Williams et al. |
| 2015/0113407 | A1 | 4/2015 | Hoffert et al. |
| 2015/0127350 | A1 | 5/2015 | Agiomyrgiannakis |
| 2015/0133109 | A1 | 5/2015 | Freeman et al. |
| 2015/0142420 | A1 | 5/2015 | Sarikaya et al. |
| 2015/0142447 | A1 | 5/2015 | Kennewick et al. |
| 2015/0148013 | A1 | 5/2015 | Baldwin et al. |
| 2015/0149354 | A1 | 5/2015 | Mccoy |
| 2015/0149469 | A1 | 5/2015 | Xu et al. |
| 2015/0161370 | A1 | 6/2015 | North et al. |
| 2015/0170664 | A1 | 6/2015 | Doherty et al. |
| 2015/0172463 | A1 | 6/2015 | Quast et al. |
| 2015/0178388 | A1 | 6/2015 | Winnemoeller et al. |
| 2015/0186012 | A1 | 7/2015 | Coleman et al. |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0195379 | A1 | 7/2015 | Zhang et al. |
| 2015/0199960 | A1 | 7/2015 | Huo et al. |
| 2015/0205858 | A1 | 7/2015 | Xie et al. |
| 2015/0228281 | A1 | 8/2015 | Raniere |
| 2015/0234636 | A1 | 8/2015 | Barnes, Jr. |
| 2015/0234800 | A1 | 8/2015 | Patrick et al. |
| 2015/0243278 | A1 | 8/2015 | Kibre et al. |
| 2015/0245154 | A1 | 8/2015 | Dadu et al. |
| 2015/0255071 | A1 | 9/2015 | Chiba |
| 2015/0256873 | A1 | 9/2015 | Klein et al. |
| 2015/0261496 | A1 | 9/2015 | Faaborg et al. |
| 2015/0279360 | A1 | 10/2015 | Mengibar et al. |
| 2015/0287409 | A1 | 10/2015 | Jang |
| 2015/0294516 | A1 | 10/2015 | Chiang |
| 2015/0309997 | A1 | 10/2015 | Lee et al. |
| 2015/0324041 | A1 | 11/2015 | Varley et al. |
| 2015/0331711 | A1 | 11/2015 | Huang et al. |
| 2015/0339049 | A1 | 11/2015 | Kasemset et al. |
| 2015/0339391 | A1 | 11/2015 | Kang et al. |
| 2015/0340040 | A1 | 11/2015 | Mun et al. |
| 2015/0340042 | A1 | 11/2015 | Sejnoha et al. |
| 2015/0347382 | A1 | 12/2015 | Dolfing et al. |
| 2015/0347393 | A1 | 12/2015 | Futrell et al. |
| 2015/0348547 | A1 | 12/2015 | Paulik et al. |
| 2015/0348548 | A1 | 12/2015 | Piernot et al. |
| 2015/0348549 | A1 | 12/2015 | Giuli et al. |
| 2015/0370531 | A1 | 12/2015 | Faaborg |
| 2015/0370780 | A1 | 12/2015 | Wang et al. |
| 2016/0027431 | A1 | 1/2016 | Kurzweil et al. |
| 2016/0028666 | A1 | 1/2016 | Li |
| 2016/0091967 | A1 | 3/2016 | Prokofieva et al. |
| 2016/0093291 | A1 | 3/2016 | Kim |
| 2016/0093304 | A1 | 3/2016 | Kim et al. |
| 2016/0094979 | A1 | 3/2016 | Naik et al. |
| 2016/0147725 | A1 | 5/2016 | Patten et al. |
| 2016/0155443 | A1 | 6/2016 | Khan et al. |
| 2016/0180844 | A1 | 6/2016 | Vanblon et al. |
| 2016/0189717 | A1 | 6/2016 | Kannan et al. |
| 2016/0212488 | A1 | 7/2016 | Os et al. |
| 2016/0260436 | A1 | 9/2016 | Lemay et al. |

FOREIGN PATENT DOCUMENTS

| | | | |
|---|---|---|---|
| CN | 1263385 | A | 8/2000 |
| CN | 1274440 | A | 11/2000 |
| CN | 1369858 | A | 9/2002 |
| CN | 1378156 | A | 11/2002 |
| CN | 1383109 | A | 12/2002 |
| CN | 1407795 | A | 4/2003 |
| CN | 1125436 | C | 10/2003 |
| CN | 1471098 | A | 1/2004 |
| CN | 1494695 | A | 5/2004 |
| CN | 1535519 | A | 10/2004 |
| CN | 1640191 | A | 7/2005 |
| CN | 1673939 | A | 9/2005 |
| CN | 1864204 | A | 11/2006 |
| CN | 1898721 | A | 1/2007 |
| CN | 2865153 | Y | 1/2007 |
| CN | 1959628 | A | 5/2007 |

(56) References Cited

FOREIGN PATENT DOCUMENTS

| | | | |
|---|---|---|---|
| CN | 1975715 | A | 6/2007 |
| CN | 1995917 | A | 7/2007 |
| CN | 101008942 | A | 8/2007 |
| CN | 101162153 | A | 4/2008 |
| CN | 101179754 | A | 5/2008 |
| CN | 101183525 | A | 5/2008 |
| CN | 101188644 | A | 5/2008 |
| CN | 101228503 | A | 7/2008 |
| CN | 101233741 | A | 7/2008 |
| CN | 101246020 | A | 8/2008 |
| CN | 101297541 | A | 10/2008 |
| CN | 101427244 | A | 5/2009 |
| CN | 101535983 | A | 9/2009 |
| CN | 101632316 | A | 1/2010 |
| CN | 101636736 | A | 1/2010 |
| CN | 101673544 | A | 3/2010 |
| CN | 101847405 | A | 9/2010 |
| CN | 101894547 | A | 11/2010 |
| CN | 101939740 | A | 1/2011 |
| CN | 101951553 | A | 1/2011 |
| CN | 102160043 | A | 8/2011 |
| CN | 102246136 | A | 11/2011 |
| CN | 202035047 | U | 11/2011 |
| CN | 202092650 | U | 12/2011 |
| CN | 104284257 | A | 1/2015 |
| DE | 3837590 | A1 | 5/1990 |
| DE | 4126902 | A1 | 2/1992 |
| DE | 4334773 | A1 | 4/1994 |
| DE | 4445023 | A1 | 6/1996 |
| DE | 102004029203 | A1 | 12/2005 |
| DE | 19841541 | B4 | 12/2007 |
| DE | 102008024258 | A1 | 11/2009 |
| EP | 30390 | A1 | 6/1981 |
| EP | 57514 | A1 | 8/1982 |
| EP | 59880 | A2 | 9/1982 |
| EP | 138061 | A1 | 4/1985 |
| EP | 140777 | A1 | 5/1985 |
| EP | 218859 | A2 | 4/1987 |
| EP | 262938 | A1 | 4/1988 |
| EP | 138061 | B1 | 6/1988 |
| EP | 283995 | A2 | 9/1988 |
| EP | 293259 | A2 | 11/1988 |
| EP | 299572 | A2 | 1/1989 |
| EP | 313975 | A2 | 5/1989 |
| EP | 314908 | A2 | 5/1989 |
| EP | 327408 | A2 | 8/1989 |
| EP | 389271 | A2 | 9/1990 |
| EP | 411675 | A2 | 2/1991 |
| EP | 441089 | A2 | 8/1991 |
| EP | 464712 | A2 | 1/1992 |
| EP | 476972 | A2 | 3/1992 |
| EP | 534410 | A2 | 3/1993 |
| EP | 558312 | A1 | 9/1993 |
| EP | 559349 | A1 | 9/1993 |
| EP | 570660 | A1 | 11/1993 |
| EP | 575146 | A2 | 12/1993 |
| EP | 578604 | A1 | 1/1994 |
| EP | 586996 | A2 | 3/1994 |
| EP | 609030 | A1 | 8/1994 |
| EP | 651543 | A2 | 5/1995 |
| EP | 679005 | A1 | 10/1995 |
| EP | 795811 | A1 | 9/1997 |
| EP | 476972 | B1 | 5/1998 |
| EP | 845894 | A2 | 6/1998 |
| EP | 852052 | A1 | 7/1998 |
| EP | 863453 | A1 | 9/1998 |
| EP | 863469 | A2 | 9/1998 |
| EP | 867860 | A2 | 9/1998 |
| EP | 869697 | A2 | 10/1998 |
| EP | 559349 | B1 | 1/1999 |
| EP | 889626 | A1 | 1/1999 |
| EP | 917077 | A2 | 5/1999 |
| EP | 691023 | B1 | 9/1999 |
| EP | 946032 | A2 | 9/1999 |
| EP | 981236 | A1 | 2/2000 |
| EP | 982732 | A1 | 3/2000 |
| EP | 984430 | A2 | 3/2000 |
| EP | 1001588 | A2 | 5/2000 |
| EP | 1014277 | A1 | 6/2000 |
| EP | 1028425 | A2 | 8/2000 |
| EP | 1028426 | A2 | 8/2000 |
| EP | 1047251 | A2 | 10/2000 |
| EP | 1052566 | A1 | 11/2000 |
| EP | 1076302 | A1 | 2/2001 |
| EP | 1091615 | A1 | 4/2001 |
| EP | 1094406 | A2 | 4/2001 |
| EP | 1107229 | A2 | 6/2001 |
| EP | 1229496 | A2 | 8/2002 |
| EP | 1233600 | A2 | 8/2002 |
| EP | 1245023 | A1 | 10/2002 |
| EP | 1246075 | A2 | 10/2002 |
| EP | 1280326 | A1 | 1/2003 |
| EP | 1291848 | A2 | 3/2003 |
| EP | 1311102 | A1 | 5/2003 |
| EP | 1315084 | A1 | 5/2003 |
| EP | 1315086 | A1 | 5/2003 |
| EP | 1347361 | A1 | 9/2003 |
| EP | 1368961 | A2 | 12/2003 |
| EP | 1379061 | A2 | 1/2004 |
| EP | 1432219 | A1 | 6/2004 |
| EP | 1435620 | A1 | 7/2004 |
| EP | 1480421 | A1 | 11/2004 |
| EP | 1517228 | A2 | 3/2005 |
| EP | 1536612 | A1 | 6/2005 |
| EP | 1566948 | A1 | 8/2005 |
| EP | 1650938 | A1 | 4/2006 |
| EP | 1675025 | A2 | 6/2006 |
| EP | 1693829 | A1 | 8/2006 |
| EP | 1699042 | A1 | 9/2006 |
| EP | 1739546 | A2 | 1/2007 |
| EP | 1181802 | B1 | 2/2007 |
| EP | 1818786 | A1 | 8/2007 |
| EP | 1892700 | A1 | 2/2008 |
| EP | 1912205 | A2 | 4/2008 |
| EP | 1939860 | A1 | 7/2008 |
| EP | 651543 | B1 | 9/2008 |
| EP | 1909263 | B1 | 1/2009 |
| EP | 1335620 | B1 | 3/2009 |
| EP | 2069895 | A1 | 6/2009 |
| EP | 2094032 | A1 | 8/2009 |
| EP | 2107553 | A1 | 10/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2400373 | A1 | 12/2011 |
| EP | 2431842 | A2 | 3/2012 |
| EP | 2551784 | A1 | 1/2013 |
| EP | 2555536 | A1 | 2/2013 |
| EP | 2575128 | A2 | 4/2013 |
| EP | 2733598 | A2 | 5/2014 |
| EP | 2801890 | A1 | 11/2014 |
| EP | 2801972 | A1 | 11/2014 |
| EP | 2940556 | A1 | 11/2015 |
| FR | 2911201 | A1 | 7/2008 |
| GB | 2293667 | A | 4/1996 |
| GB | 2310559 | A | 8/1997 |
| GB | 2323694 | A | 9/1998 |
| GB | 2342802 | A | 4/2000 |
| GB | 2343285 | A | 5/2000 |
| GB | 2346500 | A | 8/2000 |
| GB | 2352377 | A | 1/2001 |
| GB | 2384399 | A | 7/2003 |
| GB | 2402855 | A | 12/2004 |
| GB | 2445436 | A | 7/2008 |
| IT | FI20010199 | A1 | 4/2003 |
| JP | 55-80084 | A | 6/1980 |
| JP | 57-41731 | A | 3/1982 |
| JP | 59-57336 | A | 4/1984 |
| JP | 62-153326 | A | 7/1987 |
| JP | 1-500631 | A | 3/1989 |
| JP | 1-254742 | A | 10/1989 |
| JP | 2-86397 | A | 3/1990 |
| JP | 2-153415 | A | 6/1990 |

(56) References Cited

FOREIGN PATENT DOCUMENTS

JP 3-113578 A 5/1991
JP 4-236624 A 8/1992
JP 5-79951 A 3/1993
JP 5-165459 A 7/1993
JP 5-293126 A 11/1993
JP 6-19965 A 1/1994
JP 6-69954 A 3/1994
JP 6-274586 A 9/1994
JP 6-332617 A 12/1994
JP 7-199379 A 8/1995
JP 7-219961 A 8/1995
JP 7-320051 A 12/1995
JP 7-320079 A 12/1995
JP 8-63330 A 3/1996
JP 8-185265 A 7/1996
JP 8-223281 A 8/1996
JP 8-227341 A 9/1996
JP 9-18585 A 1/1997
JP 9-27000 A 1/1997
JP 9-55792 A 2/1997
JP 9-259063 A 10/1997
JP 9-265457 A 10/1997
JP 10-31497 A 2/1998
JP 10-78952 A 3/1998
JP 10-105324 A 4/1998
JP 10-274997 A 10/1998
JP 10-320169 A 12/1998
JP 11-06743 A 1/1999
JP 11-45241 A 2/1999
JP 11-136278 A 5/1999
JP 11-231886 A 8/1999
JP 11-265400 A 9/1999
JP 2000-32140 A 1/2000
JP 2000-90119 A 3/2000
JP 2000-99225 A 4/2000
JP 2000-134407 A 5/2000
JP 2000-163031 A 6/2000
JP 2000-207167 A 7/2000
JP 2000-216910 A 8/2000
JP 2000-224663 A 8/2000
JP 2000-272349 A 10/2000
JP 2000-331004 A 11/2000
JP 2000-339137 A 12/2000
JP 2000-352988 A 12/2000
JP 2000-352989 A 12/2000
JP 2001-13978 A 1/2001
JP 2001-14319 A 1/2001
JP 2001-22498 A 1/2001
JP 2001-34289 A 2/2001
JP 2001-34290 A 2/2001
JP 2001-56233 A 2/2001
JP 2001-109493 A 4/2001
JP 2001-125896 A 5/2001
JP 2001-148899 A 5/2001
JP 2001-273283 A 10/2001
JP 2001-282813 A 10/2001
JP 2001-296880 A 10/2001
JP 2002-14954 A 1/2002
JP 2002-24212 A 1/2002
JP 2002-30676 A 1/2002
JP 2002-41276 A 2/2002
JP 2002-41624 A 2/2002
JP 2002-82748 A 3/2002
JP 2002-82893 A 3/2002
JP 2002-132804 A 5/2002
JP 2002-169588 A 6/2002
JP 2002-230021 A 8/2002
JP 2002-524806 A 8/2002
JP 2002-281562 A 9/2002
JP 2002-342033 A 11/2002
JP 2002-342212 A 11/2002
JP 2002-344880 A 11/2002
JP 2002-542501 A 12/2002
JP 2003-15682 A 1/2003
JP 2003-44091 A 2/2003
JP 2003-84877 A 3/2003
JP 2003-517158 A 5/2003
JP 2003-233568 A 8/2003
JP 2003-244317 A 8/2003
JP 2003-527656 A 9/2003
JP 2003-288356 A 10/2003
JP 2003-533909 A 11/2003
JP 2004-48804 A 2/2004
JP 2004-54080 A 2/2004
JP 2004-505322 A 2/2004
JP 2004-505525 A 2/2004
JP 2004-86356 A 3/2004
JP 2004-94936 A 3/2004
JP 2004-117905 A 4/2004
JP 2004-152063 A 5/2004
JP 2004-523004 A 7/2004
JP 2004-295837 A 10/2004
JP 2004-534268 A 11/2004
JP 2004-347786 A 12/2004
JP 2005-55782 A 3/2005
JP 2005-63257 A 3/2005
JP 2005-70645 A 3/2005
JP 2005-80094 A 3/2005
JP 2005-86624 A 3/2005
JP 2005-506602 A 3/2005
JP 2005-92441 A 4/2005
JP 2005-149481 A 6/2005
JP 2005-181386 A 7/2005
JP 2005-189454 A 7/2005
JP 2005-221678 A 8/2005
JP 2005-283843 A 10/2005
JP 2005-311864 A 11/2005
JP 2005-332212 A 12/2005
JP 2006-4274 A 1/2006
JP 2006-23860 A 1/2006
JP 2006-30447 A 2/2006
JP 2006-31092 A 2/2006
JP 2006-59094 A 3/2006
JP 2006-80617 A 3/2006
JP 2006-107438 A 4/2006
JP 2006-146008 A 6/2006
JP 2006-146182 A 6/2006
JP 2006-155368 A 6/2006
JP 2006-189394 A 7/2006
JP 2006-195637 A 7/2006
JP 2006-201870 A 8/2006
JP 2006-208696 A 8/2006
JP 2006-244296 A 9/2006
JP 2006-267328 A1 10/2006
JP 2006-302091 A 11/2006
JP 2006-526185 A 11/2006
JP 2007-4633 A 1/2007
JP 2007-17990 A 1/2007
JP 2007-500903 A 1/2007
JP 2007-53796 A 3/2007
JP 2007-79690 A 3/2007
JP 2007-171534 A 7/2007
JP 2007-193794 A 8/2007
JP 2007-206317 A 8/2007
JP 2007-264471 A 10/2007
JP 2007-264792 A 10/2007
JP 2007-264892 A 10/2007
JP 2007-299352 A 11/2007
JP 2007-325089 A 12/2007
JP 2008-21002 A 1/2008
JP 2008-26381 A 2/2008
JP 2008-39928 A 2/2008
JP 2008-58813 A 3/2008
JP 2008-90545 A 4/2008
JP 2008-97003 A 4/2008
JP 2008-134949 A 6/2008
JP 2008-526101 A 7/2008
JP 2008-185693 A 8/2008
JP 2008-198022 A 8/2008
JP 2008-217468 A 9/2008
JP 2008-228129 A 9/2008
JP 2008-233678 A 10/2008
JP 2008-236448 A 10/2008
JP 2008-252161 A 10/2008

(56) References Cited

FOREIGN PATENT DOCUMENTS

| | | | |
|---|---|---|---|
| JP | 2008-268684 | A | 11/2008 |
| JP | 2008-271481 | A | 11/2008 |
| JP | 2009-503623 | A | 1/2009 |
| JP | 2009-36999 | A | 2/2009 |
| JP | 2009-47920 | A | 3/2009 |
| JP | 2009-98490 | A | 5/2009 |
| JP | 2009-140444 | A | 6/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-294913 | A | 12/2009 |
| JP | 2009-294946 | A | 12/2009 |
| JP | 2010-66519 | A | 3/2010 |
| JP | 2010-78979 | A | 4/2010 |
| JP | 2010-108378 | A | 5/2010 |
| JP | 2010-518526 | A | 5/2010 |
| JP | 2010-157207 | A | 7/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2013-511214 | A | 3/2013 |
| JP | 2013-517566 | A | 5/2013 |
| JP | 2013-527947 | A | 7/2013 |
| KR | 10-1999-0073234 | A | 10/1999 |
| KR | 2001-0093654 | A | 10/2001 |
| KR | 10-2001-0102132 | A | 11/2001 |
| KR | 2002-0013984 | A | 2/2002 |
| KR | 2002-0057262 | A | 7/2002 |
| KR | 2002-0064149 | A | 8/2002 |
| KR | 2002-0069952 | A | 9/2002 |
| KR | 2003-0016993 | A | 3/2003 |
| KR | 10-2004-0014835 | A | 2/2004 |
| KR | 10-2004-0044632 | A | 5/2004 |
| KR | 10-2005-0083561 | A | 8/2005 |
| KR | 10-2005-0090568 | A | 9/2005 |
| KR | 10-2006-0011603 | A | 2/2006 |
| KR | 10-2006-0012730 | A | 2/2006 |
| KR | 10-2006-0055313 | A | 5/2006 |
| KR | 10-2006-0073574 | A | 6/2006 |
| KR | 10-2006-0091469 | A | 8/2006 |
| KR | 10-2007-0024262 | A | 3/2007 |
| KR | 10-2007-0071675 | A | 7/2007 |
| KR | 10-2007-0094767 | A | 9/2007 |
| KR | 10-0757496 | B1 | 9/2007 |
| KR | 10-2007-0100837 | A | 10/2007 |
| KR | 10-0776800 | B1 | 11/2007 |
| KR | 10-0801227 | B1 | 2/2008 |
| KR | 10-0810500 | B1 | 3/2008 |
| KR | 10-2008-0033070 | A | 4/2008 |
| KR | 10-2008-0049647 | A | 6/2008 |
| KR | 10-2008-0059332 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2010-0015958 | A | 2/2010 |
| KR | 10-2010-0048571 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0113414 | A | 10/2011 |
| KR | 10-2011-0115134 | A | 10/2011 |
| KR | 10-2012-0031722 | A | 4/2012 |
| KR | 10-2012-0120316 | A | 11/2012 |
| KR | 10-2012-0137435 | A | 12/2012 |
| KR | 10-2012-0138826 | A | 12/2012 |
| KR | 10-1193668 | B1 | 12/2012 |
| NL | 1014847 | C | 10/2001 |
| RU | 2273106 | C2 | 3/2006 |
| RU | 2349970 | C2 | 3/2009 |
| RU | 2353068 | C2 | 4/2009 |
| RU | 2364917 | C2 | 8/2009 |
| TW | 468323 | B | 12/2001 |
| TW | 200601264 | A | 1/2006 |
| TW | 200638337 | A | 11/2006 |
| TW | 200643744 | A | 12/2006 |
| TW | 200801988 | A | 1/2008 |
| TW | I301373 | B | 9/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201227715 | A1 | 7/2012 |
| TW | 201245989 | A1 | 11/2012 |
| TW | 201312548 | A1 | 3/2013 |
| WO | 1993/020640 | A1 | 10/1993 |
| WO | 1994/016434 | A1 | 7/1994 |
| WO | 1994/029788 | A1 | 12/1994 |
| WO | 1995/002221 | A1 | 1/1995 |
| WO | 1995/016950 | A1 | 6/1995 |
| WO | 1995/017746 | A1 | 6/1995 |
| WO | 1997/010586 | A1 | 3/1997 |
| WO | 1997/026612 | A1 | 7/1997 |
| WO | 1997/029614 | A1 | 8/1997 |
| WO | 1997/038488 | A1 | 10/1997 |
| WO | 1997/049044 | A1 | 12/1997 |
| WO | 1998/009270 | A1 | 3/1998 |
| WO | 1998/033111 | A1 | 7/1998 |
| WO | 1998/041956 | A1 | 9/1998 |
| WO | 1999/001834 | A1 | 1/1999 |
| WO | 1999/008238 | A1 | 2/1999 |
| WO | 1999/016181 | A1 | 4/1999 |
| WO | 1999/056227 | A1 | 11/1999 |
| WO | 2000/014727 | A1 | 3/2000 |
| WO | 2000/014728 | A1 | 3/2000 |
| WO | 2000/019697 | A1 | 4/2000 |
| WO | 2000/022820 | A1 | 4/2000 |
| WO | 2000/029964 | A1 | 5/2000 |
| WO | 2000/030070 | A2 | 5/2000 |
| WO | 2000/038041 | A1 | 6/2000 |
| WO | 2000/044173 | A1 | 7/2000 |
| WO | 2000/060435 | A2 | 10/2000 |
| WO | 2000/060435 | A3 | 10/2000 |
| WO | 2000/063766 | A1 | 10/2000 |
| WO | 2000/068936 | A1 | 11/2000 |
| WO | 2001/006489 | A1 | 1/2001 |
| WO | 2001/030046 | A2 | 4/2001 |
| WO | 2001/030047 | A2 | 4/2001 |
| WO | 2001/033569 | A1 | 5/2001 |
| WO | 2001/035391 | A1 | 5/2001 |
| WO | 2001/044912 | A2 | 6/2001 |
| WO | 2001/046946 | A1 | 6/2001 |
| WO | 2001/065413 | A1 | 9/2001 |
| WO | 2001/067753 | A1 | 9/2001 |
| WO | 2001/071480 | A2 | 9/2001 |
| WO | 2002/010900 | A2 | 2/2002 |
| WO | 2002/025610 | A1 | 3/2002 |
| WO | 2002/031814 | A1 | 4/2002 |
| WO | 2002/037469 | A2 | 5/2002 |
| WO | 2002/049253 | A2 | 6/2002 |
| WO | 2002/071259 | A1 | 9/2002 |
| WO | 2002/073603 | A1 | 9/2002 |
| WO | 2003/003152 | A2 | 1/2003 |
| WO | 2003/003765 | A1 | 1/2003 |
| WO | 2003/023786 | A2 | 3/2003 |
| WO | 2003/036457 | A2 | 5/2003 |
| WO | 2003/041364 | A2 | 5/2003 |
| WO | 2003/049494 | A1 | 6/2003 |

(56) References Cited

FOREIGN PATENT DOCUMENTS

| | | | |
|---|---|---|---|
| WO | 2003/056789 | A1 | 7/2003 |
| WO | 2003/067202 | A2 | 8/2003 |
| WO | 2003/084196 | A1 | 10/2003 |
| WO | 2003/094489 | A1 | 11/2003 |
| WO | 2003/105125 | A1 | 12/2003 |
| WO | 2003/107179 | A1 | 12/2003 |
| WO | 2004/008801 | A1 | 1/2004 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/084413 | A2 | 9/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/034082 | A1 | 4/2005 |
| WO | 2005/034085 | A1 | 4/2005 |
| WO | 2005/041455 | A1 | 5/2005 |
| WO | 2005/059895 | A1 | 6/2005 |
| WO | 2005/064592 | A1 | 7/2005 |
| WO | 2005/069171 | A1 | 7/2005 |
| WO | 2005/101176 | A2 | 10/2005 |
| WO | 2006/020305 | A2 | 2/2006 |
| WO | 2006/037545 | A2 | 4/2006 |
| WO | 2006/054724 | A1 | 5/2006 |
| WO | 2006/056822 | A1 | 6/2006 |
| WO | 2006/078246 | A1 | 7/2006 |
| WO | 2006/084144 | A2 | 8/2006 |
| WO | 2006/101649 | A2 | 9/2006 |
| WO | 2006/129967 | A1 | 12/2006 |
| WO | 2006/133571 | A1 | 12/2006 |
| WO | 2007/002753 | A2 | 1/2007 |
| WO | 2007/036762 | A1 | 4/2007 |
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/109835 | A2 | 8/2008 |
| WO | 2008/120036 | A1 | 10/2008 |
| WO | 2008/130095 | A1 | 10/2008 |
| WO | 2008/140236 | A1 | 11/2008 |
| WO | 2008/142472 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/075623 | A1 | 7/2010 |
| WO | 2010/141802 | A1 | 12/2010 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2012/154317 | A1 | 11/2012 |
| WO | 2012/155079 | A2 | 11/2012 |
| WO | 2012/167168 | A2 | 12/2012 |
| WO | 2013/022135 | A1 | 2/2013 |
| WO | 2013/048880 | A1 | 4/2013 |
| WO | 2013/169842 | A2 | 11/2013 |
| WO | 2013/173511 | A2 | 11/2013 |
| WO | 2013/184953 | A1 | 12/2013 |
| WO | 2014/028797 | A1 | 2/2014 |
| WO | 2014/031505 | A1 | 2/2014 |
| WO | 2014/078965 | A1 | 5/2014 |
| WO | 2014/143959 | A2 | 9/2014 |
| WO | 2014/144579 | A1 | 9/2014 |
| WO | 2014/197336 | A1 | 12/2014 |
| WO | 2015/030796 | A1 | 3/2015 |
| WO | 2015/084659 | A1 | 6/2015 |
| WO | 2017/044629 | A1 | 3/2017 |
| WO | 2017/053311 | A1 | 3/2017 |

OTHER PUBLICATIONS

Invitation to Pay Additional Fee Received for PCT Patent Application No. PCT/US2016/051927, dated Nov. 15, 2016, 2 pages.

2004 Chrysler Pacifica: U-Connect Hands-Free Communication System, The Best and Brightest of 2004, Brief Article, Automotive Industries, Sep. 2003, 1 page.

2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.

Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.

ABF Software, "Lens—Magnifying Glass 1.5", available at <http://download.com/3000-2437-10262078.html?tag=1st-0-1>, retrieved on Feb. 11, 2004, 1 page.

Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.

Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.

Acero et al., "Environmental Robustness in Automatic Speech Recognition", International Conference on Acoustics, Speech and Signal Processing (ICASSP'90), Apr. 1990, 4 pages.

Acero et al., "Robust Speech Recognition by Normalization of the Acoustic Space", International Conference on Acoustics, Speech and Signal Processing, 1991, 4 pages.

Adium, "AboutAdium—Adium X—Trac", available at <http://web.archive.org/web/20070819113247/http://trac.adiumx.com/wiki/AboutAdium>, retrieved on Nov. 25, 2011, 2 pages.

adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.

Agnas et al., "Spoken Language Translator: First-Year Report", SICS (ISSN 0283-3638), SRI and Telia Research AB, Jan. 1994, 161 pages.

Ahlberg et al., "The Alphaslider: a Compact and Rapid Selector", CHI '94 Proceedings of the SIGCHI Conference on Human Factors in Computing Systems, Apr. 1994, pp. 365-371.

Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.

Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.

Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.

Ahmed et al., "Intelligent Natural Language Query Processor", TENCON '89, Fourth IEEE Region 10 International Conference, Nov. 22-24, 1989, pp. 47-49.

Ahuja et al., "A Comparison of Application Sharing Mechanisms in Real-Time Desktop Conferencing Systems", At&T Bell Laboratories, 1990, pp. 238-248.

(56) References Cited

OTHER PUBLICATIONS

Aikawa et al., "Generation for Multilingual MT", available at <http://mtarchive.info/MTS-2001-Aikawa.pdf>, retrieved on Sep. 18, 2001, 6 pages.
Aikawa et al., "Speech Recognition Using Time-Warping Neural Networks", Proceedings of the 1991, IEEE Workshop on Neural Networks for Signal Processing, 1991, 10 pages.
Aikawa, K. "Time-Warping Neural Network for Phoneme Recognition", IEEE International Joint Conference on Neural Networks, vol. 3, Nov. 18-21, 1991, pp. 2122-2127.
Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Allen et al., "Automated Natural Spoken Dialog", Computer, vol. 35, No. 4, Apr. 2002, pp. 51-56.
Allen, J., "Natural Language Understanding", 2nd Edition, The Benjamin/Cummings Publishing Company, Inc., 1995, 671 pages.
Alleva et al., "Applying SPHINX-II to DARPA Wall Street Journal CSR Task", Proceedings of Speech and Natural Language Workshop, Feb. 1992, pp. 393-398.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems,Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFL YTEK Co. Ltd., "Flytek Research Center Information Datasheet", available at <http://www.iflttek.com/english/Research.htm>, retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
API.AI, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc., "iTunes 2, Playlist Related Help Screens", iTunes v2.0, 2000-2001, 8 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode- emploi/APPLE/IPHONE%2D%5FE#>, Retrieved on Mar. 27, 2008, Jun. 2007, 137 pages.
Apple, "VoiceOver", available at <http://www.apple.com/accessibility/voiceover/>, Feb. 2009, 5 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
AppleEvent Manager, which is described in the publication Inside Macintosh vol. VI, available from Addison-Wesley Publishing Company, 1985.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.

(56) References Cited

OTHER PUBLICATIONS

Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Barrett et al., "How to Personalize the Web", 1997 in proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction—INTERACT, 1987, pp. 581-585.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.

(56) References Cited

OTHER PUBLICATIONS

Berry et al., "PTIME: Personalized Assistance for Calendaring", ACM Transactions on Intelligent Systems and Technology, vol. 2, No. 4, Article 40, Jul. 2011, pp. 1-22.

Berry et al., "Symantec", New version of MORE.TM, Apr. 10, 1990, 1 page.

Berry et al., "Task Management under Change and Uncertainty Constraint Solving Experience with the CALO Project", Proceedings of CP'05 Workshop on Constraint Solving under Change, 2005, 5 pages.

Bertulucci, Jeff, "Google Adds Voice Search to Chrome Browser", PC World, Jun. 14, 2011.

Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.

Betts et al., "Goals and Objectives for User Interface Software", Computer Graphics, vol. 21, No. 2, Apr. 1987, pp. 73-78.

Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.

Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.

Bier et al., "Toolglass and Magic Lenses: The See-Through Interface", Computer Graphics (SIGGRAPH '93 Proceedings), vol. 27, 1993, pp. 73-80.

Birrell, Andrew, "Personal Jukebox (PJB)", available at <http://birrell.org/andrew/talks/pjb-overview.ppt>, Oct. 13, 2000, 6 pages.

Black et al., "Automatically Clustering Similar Units for Unit Selection in Speech Synthesis", Proceedings of Eurospeech, vol. 2, 1997, 4 pages.

Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.

Blair et al., "An Evaluation of Retrieval Effectiveness for a Full-Text Document-Retrieval System", Communications of the ACM, vol. 28, No. 3, Mar. 1985, 11 pages.

Bleher et al., "A Graphic Interactive Application Monitor", IBM Systems Journal, vol. 19, No. 3, Sep. 1980, pp. 382-402.

BluePhoneElite: About, available at <http://www.reelintelligence.com/BluePhoneElite>, retrieved on Sep. 25, 2006, 2 pages.

BluePhoneElite: Features, available at <http://www.reelintelligence.com/BluePhoneElite/features.shtml,>, retrieved on Sep. 25, 2006, 2 pages.

Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.

Bobrow et al., "Knowledge Representation for Syntactic/Semantic Processing", From: AAA-80 Proceedings, Copyright 1980, AAAI, 1980, 8 pages.

Bocchieri et al., "Use of Geographical Meta-Data in ASR Language and Acoustic Models", IEEE International Conference on Acoustics Speech and Signal Processing, 2010, pp. 5118-5121.

Bociurkiw, Michael, "Product Guide: Vanessa Matz", available at <http://www.forbes.com/asap/2000/1127/vmartz_print.html>, retrieved on Jan. 23, 2003, 2 pages.

Borden IV, G.R., "An Aural User Interface for Ubiquitous Computing", Proceedings of the 6th International Symposium on Wearable Computers, IEEE, 2002, 2 pages.

Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.

Bouchou et al., "Using Transducers in Natural Language Database Query", Proceedings of 4th International Conference on Applications of Natural Language to Information Systems, Austria, Jun. 1999, 17 pages.

Boy, Guy A., "Intelligent Assistant Systems", Harcourt Brace Jovanovicy, 1991, 1 page.

Boyer et al., "A Fast String Searching Algorithm", Communications of the ACM, vol. 20, 1977, pp. 762-772.

Brain, Marshall, "How MP3 Files Work", available at <http://www.howstuffworks.com>, retrieved on Mar. 19, 2007, 4 pages.

Bratt et al., "The SRI Telephone-Based ATIS System", Proceedings of ARPA Workshop on Spoken Language Technology, 1995, 3 pages.

Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.

Brown et al., "Browing Graphs Using a Fisheye View", Apple Inc., Video Clip, Systems Research Center, CHI '92 Continued Proceedings on a CD, 1992.

Brown et al., "Browsing Graphs Using a Fisheye View", CHI '93 Proceedings of the INTERACT '93 and CHI '93 Conference on Human Factors in Computing Systems, 1993, p. 516.

Bulyko et al., "Error-Correction Detection and Response Generation in a Spoken Dialogue System", Speech Communication, vol. 45, 2005, pp. 271-288.

Bulyko et al., "Joint Prosody Prediction and Unit Selection for Concatenative Speech Synthesis", Electrical Engineering Department, University of Washington, Seattle, 2001, 4 pages.

Burger, D., "Improved Access to Computers for the Visually Handicapped: New Prospects and Principles", IEEE Transactions on Rehabilitation Engineering, vol. 2, No. 3, Sep. 1994, pp. 111-118.

Burke et al., "Question Answering from Frequently Asked Question Files", AI Magazine, vol. 18, No. 2, 1997, 10 pages.

Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.

Busemann et al., "Natural Language Diaglogue Service for Appointment Scheduling Agents", Technical Report RR-97-02, Deutsches Forschungszentrum fur Kunstliche Intelligenz GmbH, 1997, 8 pages.

Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.

Bussler et al., "Web Service Execution Environment (WSMX)", retrieved from Internet on Sep. 17, 2012, available at <http://www.w3.org/Submission/WSMX>, Jun. 3, 2005, 29 pages.

Butcher, Mike, "EVI Arrives in Town to go Toe-to-Toe with Siri", TechCrunch, Jan. 23, 2012, 2 pages.

Butler, Travis, "Archos Jukebox 6000 Challenges Nomad Jukebox", available at <http://tidbits.com/article/6521>, Aug. 13, 2001, 5 pages.

Butler, Travis, "Portable MP3: The Nomad Jukebox", available at <http://tidbits.com/article/6261>, Jan. 8, 2001, 4 pages.

Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.

Buzo et al., "Speech Coding Based Upon Vector Quantization", IEEE Transactions on Acoustics, Speech and Signal Processing, vol. ASSP-28, No. 5, Oct. 1980, 13 pages.

Call Centre, "Word Prediction", The Call Centre & Scottish Executive Education Dept., 1999, pp. 63-73.

Caminero-Gil et al., "Data-Driven Discourse Modeling for Semantic Interpretation", Proceedings of the IEEE International Conference on Acoustics, Speech and Signal Processing, May 1996, 6 pages.

Campbell et al., "An Expandable Error-Protected 4800 BPS CELP Coder (U.S. Federal Standard 4800 BPS Voice Coder)", (Proceed-

(56) References Cited

OTHER PUBLICATIONS ings of IEEE Int'l Acoustics, Speech, and Signal Processing Conference, May 1983), as reprinted in Vector Quantization (IEEE Press, 1990), 1990, pp. 328-330.
Cao et al., "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Casner et al., "N-Way Conferencing with Packet Video", The Third International Workshop on Packet Video, Mar. 22-23, 1990, pp. 1-6.
Castleos, "Whole House Voice Control Demonstration", available online at : https://www.youtube.com/watch?v=9SRCoxrZ_W4, Jun. 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chen et al., "An Improved Method for Image Retrieval Using Speech Annotation", The 9th International Conference on Multi-Media Modeling, Jan. 2003, pp. 1-17.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.compaq.com/SRC/pjb/>, 2001, 3 pages.
Conkie et al., "Preselection of Candidate Units in a Unit Selection-Based Text-to-Speech Synthesis System", ISCA, 2000, 4 pages.

(56) References Cited

OTHER PUBLICATIONS

Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, BLOC Publishing Corporation, 1991, 1 page.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.
Creative Technology Ltd., "Creative NOMAD® II: Getting Started—User Guide (on Line Version)", available at <http://ec1.images-amazon.com/media/i3d/01/A/man-migrate/MANUAL000026434.pdf>, Apr. 2000, 46 pages.
Creative Technology Ltd., "Creative NOMAD®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Nomad Jukebox", User Guide, Version 1.0, Aug. 2000, 52 pages.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative. com/products/product.asp?category=213&subcategory=216&product=4983, 2004, 1 page.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cucerzan et al., "Bootstrapping a Multilingual Part-of-Speech Tagger in One Person-Day", In Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Database WPI Section Ch, Week 8733, Derwent Publications Ltd., London, GB; Class A17, AN 87-230826 & JP, A, 62 153 326 (Sanwa Kako KK (SANS) Sanwa Kako Co), Jul. 8, 1987.
Database WPI Section Ch, Week 8947, Derwent Publications Ltd., London, GB; Class A17, AN 89-343299 & JP, A, 1 254 742 (Sekisui Plastics KK), Oct. 11, 1989.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deerwester et al., "Indexing by Latent Semantic Analysis", Journal of the American Society for Information Science, vol. 41, No. 6, Sep. 1990, 19 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Deller, Jr. et al., "Discrete-Time Processing of Speech Signals", Prentice Hall, ISBN: 0-02-328301-7, 1987, 14 pages.
Diagrammaker, Action Software, 1989.
Diagram-Master, Ashton-Tate, 1989.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Audio in the New Era, Electronic Design and Application, No. 6, Jun. 30, 2003, 3 pages.
Digital Equipment Corporation, "Open VMS Software Overview", Software Manual, Dec. 1995, 159 pages.
Digital Equipment Corporation, "OpenVMS RTL DECtalk (DTK$) Manual", May 1993, 56 pages.
Dittenbach et al., "A Natural Language Query Interface for Tourism Information", In: Information and Communication Technologies in Tourism 2003, XP055114393, Feb. 14, 2003, pp. 152-162.
Dobrisek et al., "Evolution of the Information-Retrieval System for Blind and Visually-Impaired People", International Journal of Speech Technology, Kluwer Academic Publishers, Bo, vol. 6, No. 3, pp. 301-309.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.
Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.
Dourish et al., "Portholes: Supporting Awareness in a Distributed Work Group", CHI 1992;, May 1992, pp. 541-547.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Dragon Naturally Speaking Version 11 Users Guide, Nuance Communications, Inc., Copyright @2002-2010, 132 pages.
Dual Rate Speech Coder for Multimedia Communications Transmitting at 5.3 and 6.3 kbit/s, International Telecommunication Union Recommendation G.723, 7 pages.
Dusan et al., "Multimodal Interaction on PDA's Integrating Speech and Pen Inputs", Eurospeech Geneva, 2003, 4 pages.
dyslexic.com, "AlphaSmart 3000 with CoWriter SmartApplet: Don Johnston Special Needs", available at <http://www.dyslexic.com/

(56) References Cited

OTHER PUBLICATIONS procuts.php?catid-2&pid=465&PHPSESSID=2511b800000f7da>, retrieved on Dec. 6, 2005, 13 pages.
Eagle et al., "Social Serendipity: Proximity Sensing and Cueing", MIT Media Laboratory Technical Note 580, May 2004, 18 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elio et al., "On Abstract Task Models and Conversation Policies", Proc. Workshop on Specifying and Implementing Conversation Policies, Autonomous Agents'99 Conference, 1999, pp. 1-10.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin'", available at <http://db.tidbits.com/getbits.acgi?tbart=05988>, Jun. 19, 2000, 3 pages.
Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Ericsson Inc., "Cellular Phone with Integrated MP3 Player", Research Disclosure Journal No. 41815, Feb. 1999, 2 pages.
Erol et al., "Multimedia Clip Generation From Documents for Browsing on Mobile Devices", IEEE Transactions on Multimedia, vol. 10, No. 5, Aug. 2008, 13 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
European Search Report received for European Patent Application No. 01201774.5, dated Sep. 14, 2001, 3 pages.
European Search Report received for European Patent Application No. 99107544.1, dated Jul. 8, 1999, 4 pages.
European Search Report received for European Patent Application No. 99107545.8, dated Jul. 1, 1999, 3 pages.
Evermann et al., "Posterior Probability Decoding, Confidence Estimation and System Combination", Proceedings Speech Transcription Workshop, 2000, 4 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Extended European Search Report (includes European Search Report and European Search Opinion) received for European Patent Application No. 06256215.2, dated Feb. 20, 2007, 6 pages.
Extended European Search Report (includes European Search Report and European Search Opinion) received for European Patent Application No. 12186113.2, dated Apr. 28, 2014, 14 pages.
Extended European Search Report (includes Partial European Search Report and European Search Opinion) received for European Patent Application No. 13169672.6, dated Aug. 14, 2013, 11 pages.
Extended European Search Report (includes Partial European Search Report and European Search Opinion) received for European Patent Application No. 15169349.6, dated Jul. 28, 2015, 8 pages.
Extended European Search Report (includes Partial European Search Report and European Search Opinion) received for European Patent Application No. 15196748.6, dated Apr. 4, 2016.
Extended European Search Report (includes Partial European Search Report and European Search Opinion) received for European Patent Application No. 16150079.8, dated Feb. 18, 2016, 7 pages.
Extended European Search Report (includes Supplementary European Search Report and Search Opinion) received for European Patent Application No. 07863218.9, dated Dec. 9, 2010, 7 pages.
Extended European Search Report (includes Supplementary European Search Report and Search Opinion) received for European Patent Application No. 12727027.0, dated Sep. 26, 2014, 7 pages.
Extended European Search Report (inclusive of the Partial European Search Report and European Search Opinion) received for European Patent Application No. 12729332.2, dated Oct. 31, 2014, 6 pages.
Extended European Search Report and Search Opinion received for European Patent Application No. 12185276.8, dated Dec. 18, 2012, 4 pages.
Extended European Search Report received for European Patent Application No. 11159884.3, dated May 20, 2011, 8 pages.
Extended European Search Report received for European Patent Application No. 12186663.6, dated Jul. 16, 2013, 6 pages.
Extended European Search Report received for European Patent Application No. 13726938.7, dated Dec. 14, 2015, 8 pages.
Extended European Search Report received for European Patent Application No. 13770552.1, dated Jan. 7, 2016, 5 pages.
Extended European Search Report received for European Patent Application No. 14737370.8, dated May 19, 2016, 12 pages.
Fanty et al., "A Comparison of DFT, PLP and Cochleagram for Alphabet Recognition", IEEE, Nov. 1991.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.

(56) References Cited

OTHER PUBLICATIONS

Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
GMAIL, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf!icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 page.
Gong et al., "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10, Oct. 1984, pp. 1032-1043.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSIWIS Groupware", CHI '96 Companion, Vancouver, Canada, Apr. 13-18, 1996, 2 pages.
Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "TEAM: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, No. 5-6, Nov. 1995, pp. 907-928.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., U.S. Appl. No. 61/657,744, filed Jun. 9, 2012 titled "Automatically Adapting User Interfaces for Hands-Free Interaction", 40 pages.
Gruber, Thomas R., et al., U.S. Appl. No. 07/976,970, filed Nov. 16, 1992 titled "Status Bar for Application Windows".
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.

(56) References Cited

OTHER PUBLICATIONS

Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement-Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semanic Web Conference, Nov. 2006, 38 pages.
Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM.Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hashimoto, Yoshiyuki , "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full APP Download for Android, Blackberry, iPhone, 11 pages.
Hear voice from Google translate, Available on URL:https://www.youtube.com/watch?v=18AvMhFqD28, Jan. 28, 2011.
Heger et al., "KNOWBOT: An Adaptive Data Base Interface", Nuclear Science and Engineering, V. 107, No. 2, Feb. 1991, pp. 142-157.
Helm et al., "Building Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Discrete Algorithms and Mathematics Department, Sandia National Labs, Albuquerque, NM, Sep. 21, 2006, 12 pages.
Hendrix et al., "Developing a Natural Language Interface to Complex Data", ACM Transactions on Database Systems, vol. 3, No. 2, Jun. 1978, pp. 105-147.

(56) References Cited

OTHER PUBLICATIONS

Hendrix et al., "The Intelligent Assistant: Technical Considerations Involved in Designing Q&A's Natural-Language Interface", Byte Magazine, Issue 14, Dec. 1987, 1 page.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Henrich et al., "Language Identification for the Automatic Grapheme-to-Phoneme Conversion of Foreign Words in a German Text-to-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories,4 CSCW 90 Proceedings, Oct. 1990, pp. 13-26.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "A Novel Approach to Robust Speech Endpoint Detection in Car Environments", Acoustics, Speech, and Signal Processing 2000, ICASSP '00, Proceeding S. 2000 IEEE International Conference on Jun. 5-9, 2000, vol. 3, Jun. 5, 2000, pp. 1751-1754.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
iAP Sports Lingo 0x09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Interactive Voice, available at <http://www.helloivee.com/company/>, retrieved on Feb. 10, 2014, 2 pages.
International Preliminary Report on Patentability received for PCT Patent Application No. PCT/GB2009/051684, dated Jun. 23, 2011, 10 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.

(56) References Cited

OTHER PUBLICATIONS

International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2005/030234, dated Mar. 20, 2007, 9 pages.
International Preliminary Report on Patentability received for PCT Patent Application No. PCT/US2008/000042, dated Jul. 7, 2009, 6 pages.
International Preliminary Report on Patentability received for PCT Patent Application No. PCT/US2008/000043, dated Jul. 7, 2009, 8 pages.
International Preliminary Report on Patentability received for PCT Patent Application No. PCT/US2008/000047, dated Jul. 7, 2009, 8 pages.
International Preliminary Report on Patentability received for PCT Patent Application No. PCT/US2009/051954, dated Mar. 24, 2011, 8 pages.
International Preliminary Report on Patentability received for PCT Patent Application No. PCT/US2009/055577, completed on Aug. 6, 2010, 12 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/020861, dated Aug. 2, 2012, 11 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/029810, dated Oct. 3, 2013, 9 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040571, dated Dec. 19, 2013, 10 pages.
International Preliminary Report on Patentability received for PCT Patent Application No. PCT/US2012/040801, dated Dec. 19, 2013, 16 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
International Preliminary Report on Patentability received for PCT Patent Application No. PCT/US2012/043100, dated Jan. 9, 2014, 7 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/041233, dated Nov. 18, 2014, 8 pages.
International Preliminary Report on Patentability received for PCT Patent Application No. PCT/US2013/044574, dated Dec. 9, 2014, 8 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Preliminary Report on Patentability received for PCT Patent Application No. PCT/US2014/023822, dated Sep. 24, 2015, 12 pages.
International Preliminary Report on Patentability received for PCT Patent Application No. PCT/US2014/023826, dated Sep. 24, 2015, 9 pages.
International Preliminary Report on Patentability received for PCT Patent Application No. PCT/US2014/026871, dated Sep. 24, 2015, 7 pages.
International Preliminary Report on Patentability received for PCT Patent Application No. PCT/US2014/026873, dated Sep. 24, 2015, 9 pages.
International Preliminary Report on Patentability received for PCT Patent Application No. PCT/US2014/028785, dated Sep. 24, 2015, 15 pages.
International Preliminary Report on Patentability received for PCT Patent Application No. PCT/US2014/028950, dated Sep. 24, 2015, 8 pages.
International Preliminary Report on Patentability received for PCT Patent Application No. PCT/US2014/029050, dated Sep. 24, 2015, 7 pages.
International Preliminary Report on Patentability received for PCT Patent Application No. PCT/US2014/029562, dated Sep. 24, 2015, 16 pages.
International Preliminary Report on Patentability received for PCT Patent Application No. PCT/US2014/040393, dated Dec. 8, 2015, 15 pages.
International Preliminary Report on Patentability received for PCT Patent Application No. PCT/US2014/040394, dated Dec. 23, 2015, 7 pages.
International Preliminary Report on Patentability received for PCT Patent Application No. PCT/US2014/040397, dated Dec. 17, 2015, 8 pages.
International Preliminary Report on Patentability received for PCT Patent Application No. PCT/US2014/040401, dated Dec. 8, 2015, 6 pages.

(56) References Cited

OTHER PUBLICATIONS

International Preliminary Report on Patentability received for PCT Patent Application No. PCT/US2014/040403 dated Dec. 23, 2015, 7 pages.
International Preliminary Report on Patentability received for PCT Patent Application No. PCT/US2014/040961, dated Dec. 17, 2015, 20 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
International Preliminary Report on Patentability received for PCT Patent Application No. PCT/US2014/049568, dated Feb. 18, 2016, 10 pages.
International Search Report & Written Opinion received for PCT Patent Application No. PCT/US2016/021410, dated Jul. 26, 2016, 19 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2004/016519, dated Nov. 3, 2005, 6 pages.
International Search Report and Written Opinion received for PCT Patent Application No. PCT/US2005/030234, dated Mar. 17, 2006, 11 pages.
International Search Report and Written Opinion received for PCT Patent Application No. PCT/US2005/038819, dated Apr. 5, 2006, 12 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2009/051954, dated Oct. 30, 2009, 10 pages.
International Search Report and Written Opinion received for PCT Patent Application No. PCT/US2009/055577, dated Jan. 26, 2010, 9 pages.
International Search Report and Written Opinion received for PCT Patent Application No. PCT/US2010/037378, dated Aug. 25, 2010, 14 pages.
International Search Report and Written Opinion received for PCT Patent Application No. PCT/US2011/020350, dated Jun. 30, 2011, 17 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/040801, dated Oct. 22, 2012, 20 pages.
International Search Report and Written Opinion received for PCT Patent Application No. PCT/US2012/040931, dated Feb. 1, 2013, 4 pages (International Search Report only).
International Search Report and Written Opinion received for PCT Patent Application No. PCT/US2012/043098, dated Nov. 14, 2012, 9 pages.
International Search Report and Written Opinion received for PCT Patent Application No. PCT/US2012/043100, dated Nov. 15, 2012, 8 pages.
International Search Report and Written Opinion received for PCT Patent Application No. PCT/US2012/056382, dated Dec. 20, 2012, 11 pages.
International Search Report and Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/040971, dated Nov. 12, 2013, 11 pages.
International Search Report and Written Opinion received for PCT Patent Application No. PCT/US2013/041225, dated Aug. 23, 2013, 3 pages (International Search Report only).
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2013/047668, dated Feb. 13, 2014, 17 pages.

(56) References Cited

OTHER PUBLICATIONS

International Search Report and Written Opinion received for PCT Patent Application No. PCT/US2013/052558, dated Jan. 30, 2014, 15 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2013/060121, dated Dec. 6, 2013, 8 pages.
International Search Report and Written Opinion received for PCT Patent Application No. PCT/US2014/015418, dated Aug. 26, 2014, 17 pages.
International Search Report and Written Opinion received for PCT Patent Application No. PCT/US2014/016988, dated Apr. 29, 2014, 10 pages.
International Search Report and Written Opinion received for PCT Patent Application No. PCT/US2014/023822, dated Sep. 25, 2014, 14 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040393, mailed on Dec. 08, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2014/040401, dated Sep. 4, 2014, 10 pages.
International Search Report and Written Opinion received for PCT Patent Application No. PCT/US2014/040403, dated Sep. 23, 2014, 9 pages.
International Search Report and Written Opinion received for PCT Patent Application No. PCT/US2014/040961, dated Mar. 10, 2015, 5 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/049568, dated Nov. 14, 2014, 12 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/023089, dated Aug. 20, 2015. 16 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/029554, dated Jul. 16, 2015, 11 pages.
International Search Report and Written Opinion received for PCT Patent Application No. PCT/US2015/032470, dated Oct. 1, 2015, 13 pages.
International Search Report and Written Opinion received for PCT Patent Application No. PCT/US2015/032724, dated Jul. 27, 2015, 11 pages.
International Search Report and Written Opinion received for PCT Patent Application No. PCT/US2015/033051, dated Aug. 5, 2015, 14 pages.
International Search Report and Written Opinion received for PCT Patent Application No. PCT/US2015/047062, dated Jan. 13, 2016, 25 pages.
International Search Report and Written Opinion received for PCT Patent Application No. PCT/US2015/047064, dated Nov. 13, 2015, 13 pages.
International Search Report and Written Opinion received for PCT Patent Application No. PCT/US2015/047281, dated Dec. 17, 2015, 19 pages.
International Search Report and Written Opinion received for PCT Patent Application No. PCT/US2015/047553, dated Jan. 5, 2016, 10 pages.
International Search Report and Written opinion received for PCT Patent Application No. PCT/US2015/047583, dated Feb. 3, 2016, 11 pages.
International Search Report and Written Opinion received for PCT Patent Application No. PCT/US2015/047584, dated Nov. 9, 2015, 10 pages.
International Search Report and Written Opinion received for PCT Patent Application No. PCT/US2015/053365, dated Mar. 10, 2016, 20 pages.
International Search Report and Written Opinion received for PCT Patent Application No. PCT/US2015/053366, dated Apr. 26, 2016, 16 pages.
International Search Report and Written Opinion received for PCT Patent Application No. PCT/US2016/021103, dated Jun. 8, 2016, 15 pages.
International Search Report and Written Opinion received for PCT Patent Application No. PCT/US2016/021104, dated Jun. 8, 2016, 15 pages.
International Search Report and Written opinion received for PCT Patent Application No. PCT/US2016/021409, dated May 26, 2016, 22 pages.

(56) References Cited

OTHER PUBLICATIONS

International Search report and Written Opinion received for PCT Patent Application No. PCT/US2016/024666, dated Jun. 10, 2016, 13 pages.
International Search Report and Written Opinion received for PCT Patent Application No. PCT/US2016/025404, dated Jun. 24, 2016, 21 pages.
International Search Report and Written Opinion received for PCT Patent Application No. PCT/US2016/025407, dated Jun. 23, 2016, 18 pages.
International Search Report and Written Opinion received for PCT Patent Application No. PCT/US2016/025408, dated Aug. 11, 2016, 19 pages.
International Search Report and Written Opinion received for PCT Patent Application No. PCT/US2016/031059, dated Aug. 8, 2016, 11 pages.
International Search Report and Written Opinion received for PCT Patent Application No. PCT/US2016/031549, dated Aug. 5, 2016, 35 pages.
International Search Report and Written Opinion received for PCT Patent Application No. PCT/US2016/031550, dated Aug. 4, 2016, 13 pages.
International Search Report and Written Opinion received for PCT Patent Application No. PCT/US2016/035105, dated Aug. 29, 2016, 25 pages.
International Search Report and Written Opinion received for PCT Patent Application No. PCT/US2016/035107, dated Aug. 31, 2016, 26 pages.
International Search Report and Written Opinion received for PCT Patent Application No. PCT/US2016/035112, dated Aug. 22, 2016, 21 pages.
International Search Report received for PCT Patent Application No. PCT/GB2009/051684, dated Mar. 12, 2010, 4 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
International Search Report received for PCT Patent Application No. PCT/US2002/033330, dated Feb. 4, 2003, 6 pages.
International Search Report received for PCT Patent Application No. PCT/US2005/046797, dated Nov. 24, 2006, 6 pages.
International Search Report received for PCT Patent Application No. PCT/US2011/037014, dated Oct. 4, 2011, 6 pages.
International Search Report received for PCT Patent Application No. PCT/US2013/041233, dated Nov. 22, 2013, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2004/016519, dated Aug. 4, 2005, 6 pages.
Invitation to Pay Additional Fees and Partial International Search Report received for PCT Patent Application No. PCT/US2005/046797, dated Jul. 3, 2006, 6 pages.
Invitation to Pay Additional Fees and Partial International Search Report received for PCT Patent Application No. PCT/US2006/048738, dated Jul. 10, 2007, 4 pages.
Invitation to Pay Additional Fees and Partial International Search Report received for PCT Patent Application No. PCT/US2011/020350, dated Apr. 14, 2011, 5 pages.
Invitation to Pay Additional Fees and Partial International Search Report received for PCT Patent Application No. PCT/US2015/023089, dated Jun. 17, 2015, 7 pages.
Invitation to Pay Additional Fees received for PCT Application No. PCT/US2016/021410, dated Apr. 28, 2016, 2 pages.
Invitation to Pay Additional Fees received for PCT Patent Application No. PCT/US2008/000043, dated Jun. 27, 2008, 4 pages.
Invitation to Pay Additional Fees received for PCT Patent Application No. PCT/US2008/000047, dated Jul. 4, 2008, 4 pages.
Invitation to Pay Additional Fees received for PCT Patent Application No. PCT/US2011/037014, dated Aug. 2, 2011, 6 pages.
Invitation to Pay Additional Fees received for PCT Patent Application No. PCT/US2012/040801, dated Aug. 8, 2012, 2 pages.
Invitation to Pay Additional Fees received for PCT Patent Application No. PCT/US2013/047659, dated Feb. 27, 2014, 7 pages.
Invitation to Pay Additional Fees received for PCT Patent Application No. PCT/US2013/052558, dated Nov. 7, 2013, 6 pages.
Invitation to pay additional fees received for PCT Patent Application No. PCT/US2014/029562,dated Jul. 4, 2014, 7 pages.
Invitation to Pay Additional Fees received for PCT Patent Application No. PCT/US2014/040393, dated Sep. 17, 2014, 7 pages.
Invitation to Pay Additional Fees received for PCT Patent Application No. PCT/US2014/040961, dated Jan. 14, 2015, 3 pages.
Invitation to Pay Additional Fees received for PCT Patent Application No. PCT/US2015/047281, dated Oct. 8, 2015, 6 pages.
Invitation to Pay Additional Fees received for PCT Patent Application No. PCT/US2015/053366, dated Feb. 19, 2016, 8 pages.
Invitation to Pay Additional Fees received for PCT Patent Application No. PCT/US2016/025408, dated May 13, 2016, 2 pages.
Invitation to Pay Additional Fees received for PCT Patent Application No. PCT/US2014/028785, dated Jul. 4, 2014, 7 pages.
Invitation to pay additional fees received for the PCT Patent Application No. PCT/US2014/015418, dated May 26, 2014, 5 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Iphone Hacks, "Native iPhone MMS Application Released", available at <http://www.iphonehacks.com/2007/12/iphone-mms-app.html>, retrieved on Dec. 25, 2007, 5 pages.
Iphonechat, "iChat for iPhone in JavaScript", available at <http://www.publictivity.com/iPhoneChat/>, retrieved on Dec. 25, 2007, 2 pages.
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
JABRA Corporation, "FreeSpeak: BT200 User Manual", 2002, 42 pages.
JABRA, "Bluetooth Headset: User Manual", 2005, 17 pages.
JABRA, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.

(56) References Cited

OTHER PUBLICATIONS

Jeffay et al., "Kernel Support for Live Digital Audio and Video", In Proc. of the Second Intl. Workshop on Network and Operating System Support for Digital Audio and Video, vol. 614, Nov. 1991, pp. 10-21.

Jelinek et al., "Interpolated Estimation of Markov Source Parameters from Sparse Data", In Proceedings of the Workshop on Pattern Recognition in Practice,, May 1980, pp. 381-397.

Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.

Jennings et al., "A Personal News Service Based on a User Model Neural Network", IEICE Transactions on Information and Systems, vol. E75-D, No. 2, Mar. 1992, 12 pages.

Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.

Jiang et al., "A Syllable-based Name Transliteration System", Proc. of the 2009 Named Entities Workshop, Aug. 7, 2009, pp. 96-99.

Johnson, Jeff A., "A Comparison of User Interfaces for Panning on a Touch-Controlled Display", CHI '95 Proceedings, 1995, 8 pages.

Johnson, Julia Ann., "A Data Management Strategy for Transportable Natural Language Interfaces", Doctoral Thesis Submitted to the Department of Computer Science, University of British Columbia, Canada, Jun. 1989, 285 pages.

Jones, J., "Speech Recognition for Cyclone", Apple Computer, Inc., E.R.S. Revision 2.9, Sep. 10, 1992, 93 pages.

Jouvet et al., "Evaluating Grapheme-to-phoneme Converters in Automatic Speech Recognition Context", IEEE,, 2012,, pp. 4821-4824.

Julia et al., "http://www.speech.sri.com/demos/atis.html", Proceedings of AAAI, Spring Symposium, 1997, 5 pages.

Julia et al., "Un Editeur Interactif De Tableaux Dessines a Main Levee (An Interactive Editor for Hand-Sketched Tables)", Traitement du Signal, vol. 12, No. 6, 1995, pp. 619-626.

Kaeppner et al., "Architecture of HeiPhone: A Testbed for Audio/Video Teleconferencing", IBM European Networking Center, 1993.

Kahn et al., "CoABS Grid Scalability Experiments", Autonomous Agents and Multi-Agent Systems, vol. 7, 2003, pp. 171-178.

Kamba et al., "Using Small Screen Space More Efficiently", CHI '96 Proceedings of the SIGCHI Conference on Human Factors in Computing Systems, Apr. 13-18, 1996, pp. 383-390.

Kamel et al., "A Graph Based Knowledge Retrieval System", IEEE International Conference on Systems, Man and Cybernetics, 1990, pp. 269-275.

Kanda et al., "Robust Domain Selection Using Dialogue History in Multi-domain Spoken Dialogue Systems", Journal of Information Processing Society, vol. 48, No. 5, May 15, 2007, pp. 1980-1989. (English Abstract Submitted).

Kanda et al., "Spoken Language Understanding Using Dialogue Context in Database Search Task", Journal of Information Processing Society of Japan, vol. 47, No. 6, Jun. 15, 2016, pp. 1802-1811. (English Abstract Submitted).

Kane et al., "Slide Rule: Making Mobile Touch Screens Accessible to Blind People Using Multi-Touch Interaction Techniques", Assets, Oct. 13-15, 2008, pp. 73-80.

Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.

Karp, P. D., "A Generic Knowledge-Base Access Protocol", Available online at <http://lecture.cs.buu.ac.th/-f50353/Document/gfp.pdf>, May 12, 1994, 66 pages.

Katz et al., "Exploiting Lexical Regularities in Designing Natural Language Systems", Proceedings of the 12th International Conference on Computational Linguistics, 1988, pp. 1-22.

Katz et al., "REXTOR: A System for Generating Relations from Natural Language", Proceedings of the ACL Workshop on Natural Language Processing and Information Retrieval (NLP&IR), Oct. 2000, 11 pages.

Katz, Boris, "A Three-Step Procedure for Language Generation", Massachusetts Institute of Technology, A.I. Memo No. 599, Dec. 1980, pp. 1-40.

Katz, Boris, "Annotating the World Wide Web Using Natural Language", Proceedings of the 5th RIAO Conference on Computer Assisted Information Searching on the Internet, 1997, 7 pages.

Katz, Boris, "Using English for Indexing and Retrieving", Proceedings of the 1st RIAO Conference on User-Oriented Content-Based Text and Image Handling, 1988, pp. 314-332.

Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.

Kazemzadeh et al., "Acoustic Correlates of User Response to Error in Human-Computer Dialogues", Automatic Speech Recognition and Understanding, 2003, pp. 215-220.

Kazmucha, Allyson, "How to Send Map Locations Using iMessage", iMore.com, Available at <http://www.imore.com/how-use-imessage-share-your-location-your-iphone>, Aug. 2, 2012, 6 pages.

Keahey et al., "Non-Linear Image Magnification", Apr. 24, 1996, 11 pages.

Keahey et al., "Nonlinear Magnification Fields", Proceedings of the 1997 IEEE Symposium on Information Visualization, 1997, 12 pages.

Keahey et al., "Techniques for Non-Linear Magnification Transformations", IEEE Proceedings of Symposium on Information Visualization, Oct. 1996, pp. 38-45.

Keahey et al., "Viewing Text With Non-Linear Magnification: An Experimental Study", Department of Computer Science, Indiana University, Apr. 24, 1996, pp. 1-9.

Kennedy, P J., "Digital Data Storage Using Video Disc", IBM Technical Disclosure Bulletin, vol. 24, No. 2, Jul. 1981, p. 1171.

Kerr, "An Incremental String Search in C: This Data Matching Algorithm Narrows the Search Space with each Keystroke", Computer Language, vol. 6, No. 12, Dec. 1989, pp. 35-39.

Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.

Kikui, Gen-Itiro, "Identifying the Coding System and Language of On-Line Documents on the Internet", International Conference on Computational, Aug. 1996, pp. 652-657.

Kim, E.A. S., "The Structure and Processing of Fundamental Frequency Contours", University of Cambridge, Doctoral Thesis, Apr. 1987, 378 pages.

Kirstein et al., "Piloting of Multimedia Integrated Communications for European Researchers", Proc. INET '93, 1993, pp. 1-12.

Kitano, H., "PhiDM-Dialog, An Experimental Speech-to-Speech Dialog Translation System", Computer, vol. 24, No. 6, Jun. 1991, 13 pages.

Kitaoka et al., "Detection and Recognition of Correction Utterances on Misrecognition of Spoken Dialog System", Systems and Computers in Japan, vol. 36, No. 11 Oct. 2005, pp. 24-33.

Kjelldahl et al., "Multimedia—Principles, Systems, and Applications", Proceedings of the 1991 Eurographics Workshop on Multimedia Systems, Applications, and Interaction, Apr. 1991.

Klabbers et al., "Reducing Audible Spectral Discontinuities", IEEE Transactions on Speech and Audio Processing, vol. 9, No. 1, Jan. 2001, 13 pages.

Klatt et al., "Linguistic Uses of Segmental Duration in English: Acoustic and Perpetual Evidence", Journal of the Acoustical Society of America, vol. 59, No. 5, May 1976, 16 pages.

Kline et al., "Improving GUI Accessibility for People with Low Vision", CHI '95 Proceedings of the SIGCHI Conference on Human Factors in Computing Systems, May 7-11, 1995, pp. 114-121.

Kline et al., "UnWindows 1.0: X Windows Tools for Low Vision Users", ACM SIGCAPH Computers and the Physically Handicapped, No. 49, Mar. 1994, pp. 1-5.

Knight et al., "Heuristic Search", Production Systems, Artificial Intelligence, 2nd ed., McGraw-Hill, Inc., 1983-1991.

(56) References Cited

OTHER PUBLICATIONS

Knownav, "Knowledge Navigator", YouTube Video available at <http://www.youtube.com/watch?v=QRH8eimU_20>, Apr. 29, 2008, 1 page.
Kohler, Joachim, "Multilingual Phone Models for Vocabulary-Independent Speech Recognition Tasks", Speech Communication, vol. 35, No. 1-2, Aug. 2001, pp. 21-30.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition Vlsi", IEEE Int. Symp. Circuits and Systems, Jun. 1994, pp. 3862-3865.
Kurlander et al., "Comic Chat", [Online], 1996 [Retrieved on: Feb. 4th 2013], SIGRAPH '96 Proceedings of the 23rd annual conference on Computer graphics and interactive techniques, [Retrieved from: http://delivery.acm.org/10.1145/240000/237260/p225-kurlander.pdf],1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "SOAR: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA 2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>,, Dec. 31, 2003, 4 pages.
Li et al., "A Phonotactic Language model for Spoken Language Identification", Proceedings of the 43rd Annual Meeting of the ACL, Jun. 25, 2005, pp. 515-522.
Lieberman et al., "Out of Context: Computer Systems that Adapt to, and Learn from, Context", IBM Systems Journal, vol. 39, No. 3 & 4, 2000, pp. 617-632.

(56) References Cited

OTHER PUBLICATIONS

Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Macchi, Marian, "Issues in Text-to-Speech Synthesis" Proceedings of IEEE International Joint Symposia on Intelligence and Systems, May 21, 1998, pp. 318-325.
Mackenzie et al., "Alphanumeric Entry on Pen-Based Computers", International Journal of Human-Computer Studies, vol. 41, 1994, pp. 775-792.
Mackinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "KeyStrokes 3.5 for Mac OS X Boosts Word Prediction", available at <http://www.mactech.com/news/?p=1007129>, retrieved on Jan. 7, 2008, 3 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Mahedero et al., "Natural Language Processing of Lyrics", In Proceedings of the 13th Annual ACM International Conference on Multimedia, ACM, Nov. 6-11, 2005, 4 pages.
Mangu et al., "Finding Consensus in Speech Recognition: Word Error Minimization and Other Applications of Confusion Networks", Computer Speech and Language, vol. 14, No. 4, 2000, pp. 291-294.
Manning etal, "Foundations of Statistical Natural Language Processing", The MIT Press, Cambridge Massachusetts, 1999, pp. 10-11.
Marcus et al., "Building a Large Annotated Corpus of English: The Penn Treebank", Computational Linguistics, vol. 19, No. 2, 1993, pp. 313-330.
Markel et al., "Linear Prediction of Speech", Springer-Verlag, Berlin, Heidelberg, New York, 1976, 12 pages.
Markel et al., "Linear Production of Speech", Reviews, 1976, pp. xii, 288.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf> >, retrieved from internet on Jan.-Mar. 1999.
Martin et al., "Transportability and Generality in a Natural-Language Interface System", Proceedings of the Eighth International Joint Conference on Artificial Intelligence, Technical Note 293, Aug. 1983, 21 pages.
Martins et al., "Extracting and Exploring the Geo-Temporal Semantics of Textual Resources", Semantic Computing, IEEE International Conference, 2008, pp. 1-9.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matiasek et al., "Tamic-P: A System for NL Access to Social Insurance Database", 4th International Conference on Applications of Natural Language to Information Systems, Jun. 1999, 7 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
McGuire et al., "SHADE: Technology for Knowledge-Based Collaborative Engineering", Journal of Concurrent Engineering Applications and Research (CERA), 1993, 18 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mellinger, David K., "Feature-Map Methods for Extracting Sound Frequency Modulation", IEEE Computer Society Press, 1991, pp. 795-799.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Meng et al., "Wheels: A Conversational System in the Automobile Classified Domain", Proceedings of Fourth International Conference on Spoken Language, ICSLP 96, vol. 1, Oct. 1996, 4 pages.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.

(56) References Cited

OTHER PUBLICATIONS

Merlin et al., "Non Directly Acoustic Process for Costless Speaker Recognition and Indexation", International Workshop on Intelligent Communication Technologies and Applications, Jan. 1, 1999, 5 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "PaperWorks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pp. MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft, "Turn on and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing, Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.
Moore et al., "Combining Linguistic and Statistical Knowledge Sources in Natural-Language Processing for ATIS", SRI International, Artificial Intelliqence Center, 1995, 4 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Morton, Philip, "Checking If an Element Is Hidden", StackOverflow, Available at <http://stackoverflow.com/questions/178325/checking-if-an-element-is-hidden>, Oct. 7, 2008, 12 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muller et al., "CSCW'92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases/?year=1998&release=2>, May 18, 1998, 2 pages.
Muthesamy et al., "Speaker-Independent Vowel Recognition: Spectograms versus Cochleagrams", IEEE, Apr. 1990.

(56) References Cited

OTHER PUBLICATIONS

My Cool Aids, "What's New", available at <http://www.mycoolaids.com/>, 2012, 1 page.

Myers, Brad A., "Shortcutter for Palm", available at <http://www.cs.cmu.edu/~pebbles/v5/shortcutter/palm/index.html>, retrieved on Jun. 18, 2014, 10 pages.

N200 Hands-Free Bluetooth Car Kit, available at <www.wirelessground.com>, retrieved on Mar. 19, 2007, 3 pages.

Nadoli et al., "Intelligent Agents in the Simulation of Manufacturing Systems", Proceedings of the SCS Multiconference on AI and Simulation, 1989, 1 page.

Nakagawa et al., "Speaker Recognition by Combining MFCC and Phase Information", IEEE International Conference on Acoustics, Speech and Signal Processing (ICASSP), Mar. 2010, 4 pages.

Nakagawa et al., "Unknown Word Guessing and Part-of-Speech Tagging Using Support Vector Machines", Proceedings of the 6th NLPRS, 2001, pp. 325-331.

Naone, Erica, "TR10: Intelligent Software Assistant", Technology Review, Mar.-Apr. 2009, 2 pages.

Navigli, Roberto, "Word Sense Disambiguation: A Survey", ACM Computing Surveys, vol. 41, No. 2, Feb. 2009, 70 pages.

NCIP Staff, "Magnification Technology", available at <http://www2.edc.org/ncip/library/vi/magnifi.htm>, 1994, 6 pages.

NCIP, "NCIP Library: Word Prediction Collection", available at <http://www2.edc.org/ncip/library/wp/toc.htm>, 1998, 4 pages.

NCIP, "What is Word Prediction?", available at <http://www2.edc.org/NCIP/library/wp/what_is.htm>, 1998, 2 pages.

NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.

Neches et al., "Enabling Technology for Knowledge Sharing", Fall, 1991, pp. 37-56.

Newton, Harry, "Newton's Telecom Dictionary", Mar. 1998, pp. 62, 155, 610-611, 771.

NG, Simon, "Google's Task List Now Comes to Iphone", SimonBlog, Available at <http://www.simonblog.com/2009/02/04/googles-task-list-now-comes-to-iphone/>, Feb. 4, 2009, 33 pages.

Nguyen et al., "Generic Manager for Spoken Dialogue Systems", In DiaBruck: 7th Workshop on the Semantics and Pragmatics of Dialogue, Proceedings, 2003, 2 pages.

Niesler et al., "A Variable-Length Category-Based N-Gram Language Model", IEEE International Conference on Acoustics, Speech and Signal Processing (ICASSP'96), vol. 1, May 1996, 6 pages.

Nilsson, B. A., "Microsoft Publisher is an Honorable Start for DTP Beginners", Computer Shopper, Feb. 1, 1992, 2 pages.

Noik, Emanuel G., "Layout-Independent Fisheye Views of Nested Graphs", IEEE Proceedings of Symposium on Visual Languages, 1993, 6 pages.

Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.

Northern Telecom, "Meridian Mail PC User Guide", 1988, 17 Pages.

Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.

Noth et al., "Verbmobil: The Use of Prosody in the Linguistic Components of a Speech Understanding System", IEEE Transactions on Speech and Audio Processing, vol. 8, No. 5, Sep. 2000, pp. 519-532.

O'Connor, Rory J., "Apple Banking on Newton's Brain", San Jose Mercury News, Apr. 22, 1991.

Odubiyi et al., "SAIRE—A Scalable Agent-Based Information Retrieval Engine", Proceedings of the First International Conference on Autonomous Agents, 1997, 12 pages.

Ohsawa et al., "A computational Model of an Intelligent Agent Who Talks with a Person", Research Reports on Information Sciences, Series C, No. 92, Apr. 1989, pp. 1-18.

Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.

Okazaki et al., "Multi-Fisheye Transformation Method for Large-Scale Network Maps", IEEE Japan, vol. 44, No. 6, 1995, pp. 495-500.

Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.

Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.

Oregon Scientific, "Waterproof Music Player with FM Radio and Pedometer (M P121)—User Manual", 2005, 24 pages.

Osxdaily, "Get a List of Siri Commands Directly from Siri", Available at <http://osxdaily.com/2013/02/05/list-siri-commands/>, Feb. 5, 2013, 15 pages.

Owei et al., "Natural Language Query Filtration in the Conceptual Query Language", IEEE, 1997, pp. 539-549.

Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.

Palay et al., "The Andrew Toolkit: An Overview", Information Technology Center, Carnegie-Mellon University, 1988, pp. 1-15.

Palm, Inc., "User Guide: Your Palm® Treo.TM. 755p Smartphone", 2005-2007, 304 pages.

Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.

Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.

Pannu et al., "A Learning Personal Agent for Text Filtering and Notification", Proceedings of the International Conference of Knowledge Based Systems, 1996, pp. 1-11.

Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.

Parks et al., "Classification of Whale and Ice Sounds with a cochlear Model", IEEE, Mar. 1992.

Parson, T. W., "Voice and Speech Processing", Pitch and Formant Estimation, McGraw-Hill, Inc., ISBN: 0-07-0485541-0, 1987, 15 pages.

Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.

Patent Abstracts of Japan, vol. 014, No. 273 (E-0940)Jun. 13, 1990 (Jun. 13, 1990)—& JP 02 086057 A (Japan Storage Battery Co Ltd), Mar. 27, 1990 (Mar. 27, 1990).

Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.

Patterson et al., "Rendezvous: An Architecture for Synchronous Multi-User Applications", CSCW '90 Proceedings, 1990, pp. 317-328.

Pearl, Amy, "System Support for Integrated Desktop Video Conferencing", Sunmicrosystems Laboratories, Dec. 1992, pp. 1-15.

Penn et al., "Ale for Speech: A Translation Prototype", Bell Laboratories, 1999, 4 pages.

Pereira, Fernando, "Logic for Natural Language Analysis", SRI International, Technical Note 275, Jan. 1983, 194 pages.

Perrault et al., "Natural-Language Interfaces", SRI International, Technical Note 393, Aug. 22, 1986, 48 pages.

PhatNoise, Voice Index on Tap, Kenwood Music Keg, available at <http://www. phatnoise.com/kenwood/kenwoodssamail.html>, retrieved on Jul. 13, 2006, 1 page.

(56) References Cited

OTHER PUBLICATIONS

Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man-Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Pollock, Stephen, "A Rule-Based Message Filtering System", Published in: Journal, ACM Transactions on Information Systems (TOIS), vol. 6, Issue 3, Jul. 1988, pp. 232-254.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Powell, Josh, "Now You See Me . . . Show/Hide Performance", available at http://www.learningjquery.com/2010/05/now-you-see-me-showhide-performance, May 4, 2010.
Public Safety Technologies, "Tracer 2000 Computer", available at <http://www.pst911.com/tracer.html>, retrieved on Dec. 19, 2002, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm, Communications of the ACM, 33(8), 1990, pp. 132-142.
Rabiner et al., "Digital Processing of Speech Signals", Prentice Hall, 1978, pp. 274-277.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddi, "The Parser".
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration-Hypertext?", In Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.

(56) References Cited

OTHER PUBLICATIONS

Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Bobbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II, and III, Addison-Wesley Publishing Company, Inc., Jul. 1988, 1284 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91- 202, Thesis Submitted in Partial Fulfillment of the Requirements for the Degree of Doctor of Philosophy in Computer Science at Carnegie Mellon University, Dec. 1991, 285 pages.
Ruch et al., "Using Lexical Disambiguation and Named-Entity Recognition to Improve Spelling Correction in the Electronic Patient Record", Artificial Intelligence in Medicine, Sep. 2003, pp. 169-184.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al., "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation,, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.
Sarvas et al., "Metadata Creation System for Mobile Images", Conference Proceedings, The Second International Conference on Mobile Systems, Applications and Services, Jun. 6, 2004, pp. 36-48.
Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.

(56) References Cited

OTHER PUBLICATIONS

Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", by Eve Schooler, et al; ACM SIGOIS Bulletin, Vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.
Schütze, H., "Dimensions of Meaning", Proceedings of Supercomputing'92 Conference, Nov. 1992, 10 pages.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seide et al., "Improving Speech Understanding by Incorporating Database Constraints and Dialogue History", Proceedings of Fourth International Conference on Philadelphia,, 1996, pp. 1017-1020.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shklar et al., "InfoHarness: Use of Automatically Generated Metadata for Search and Retrieval of Heterogeneous Information", Proceedings of CAiSE'95, Finland, 1995, 14 pages.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.

(56) References Cited

OTHER PUBLICATIONS

Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simkovitz, Daniel, "LP-DOS Magnifies the PC Screen", IEEE, 1992, pp. 203-204.
Simonite, Tom, "One Easy Way to Make Siri Smarter", Technology Review, Oct. 18, 2011, 2 pages.
Singh et al., "Automatic Generation of Phone Sets and Lexical Transcriptions", Acoustics, Speech and Signal Processing (ICASSP'00), 2000, 1 page.
Singh, N., "Unifying Heterogeneous Information Models", Communications of the ACM, 1998, 13 pages.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_1&z . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
SRI International, "The Open Agent Architecture TM 1.0 Distribution", Open Agent Architecture (OAA), 1999, 2 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input in Automated Image Annotation and Content-based Retrieval", Proceedings of Spie, International Society for Optical Engineering, vol. 2420, Feb. 9, 1995., pp. 249-260.
Srinivas et al., "Monet: A Multi-Media System for Conferencing and Application Sharing in Distributed Systems", CERC Technical Report Series Research Note, Feb. 1992.
Starr et al., "Knowledge-Intensive Query Processing", Proceedings of the 5th KRDB Workshop, Seattle, May 31, 1998, 6 pages.
Stealth Computer Corporation, "Peripherals for Industrial Keyboards & Pointing Devices", available at <http://www.stealthcomputercom/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Stifleman, L., "Not Just Another Voice Mail System", Proceedings of 1991 Conference, American Voice, Atlanta GA, Sep. 24-26, 1991, pp. 21-26.
Stone et al., "The Movable Filter as a User Interface Tool", CHI '94 Human Factors in Computing Systems, 1994, pp. 306-312.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al., "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo TX 256MB", available at <http://www.t3.co.uk/reviews/entertainment/mp3_player/creative_muvo_tx_256mb>, Aug. 17, 2004, 1 page.
Taos, "Taos, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988.
Tenenbaum et al., "Data Structure Using Pascal", Prentice-Hall, Inc., 1981, 34 pages.
TextnDrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.

(56) References Cited

OTHER PUBLICATIONS

Tidwell, Jenifer, "Animated Transition", Designing Interfaces, Patterns for effective Interaction Design, Nov. 2005, First Edition, 4 pages.

Timothy et al., "Speech-Based Annotation and Retrieval of Digital Photographs", Interspeech. 8th Annual Conference of the International Speech Communication Association, Aug. 27, 2007, pp. 2165-2168.

Tofel, Kevin C., "SpeakTolt: A Personal Assistant for Older iPhones, iPads", Apple News, Tips and Reviews, Feb. 9, 2012, 7 pages.

Tombros et al., "Users' Perception of Relevance of Spoken Documents", Journal of the American Society for Information Science, New York, Aug. 2000, pp. 929-939.

Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.

Touch, Joseph, "Zoned Analog Personal Teleconferencing", USC / Information Sciences Institute, 1993, pp. 1-19.

Toutanova et al., "Feature-Rich Part-of-Speech Tagging with a Cyclic Dependency Network", Computer Science Dept., Stanford University, Stanford CA 94305-9040, 2003, 8 pages.

Trigg et al., "Hypertext Habitats: Experiences of Writers in NoteCards", Hypertext '87 Papers; Intelligent Systems Laboratory, Xerox Palo Alto Research Center, 1987, pp. 89-108.

Trowbridge, David, "Using Andrew for Development of Educational Applications", Center for Design of Educational Computing, Carnegie-Mellon University (CMU-ITC-85-065), Jun. 2, 1985, pp. 1-6.

Tsai et al., "Attributed Grammar-A Tool for Combining Syntactic and Statistical Approaches to Pattern Recognition", IEEE Transactions on Systems, Man and Cybernetics, vol. SMC-10, No. 12, Dec. 1980, 13 pages.

Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.

Tucker, Joshua, "Too Lazy to Grab Your TV Remote? Use Siri Instead", Engadget, Nov. 30, 2011, 8 pages.

Tur et al., "The CALO Meeting Assistant System", IEEE Transactions on Audio, Speech and Language Processing, vol. 18, No. 6, Aug. 2010, pp. 1601-1611.

Tur et al., "The CALO Meeting Speech Recognition and Understanding System", Proc. IEEE Spoken Language Technology Workshop, 2008, 4 pages.

Turletti, Thierry, "The INRIA Videoconferencing System (IVS)", Oct. 1994, pp. 1-7.

Tyson et al., "Domain-Independent Task Specification in the TACITUS Natural Language System", SRI International, Artificial Intelligence Center, May 1990, 16 pages.

Udell, J., "Computer Telephony", BYTE, vol. 19, No. 7, Jul. 1994, 9 pages.

Uslan et al., "A Review of Henter-Joyce's MAGic for Windows NT", Journal of Visual Impairment and Blindness, Dec. 1999, pp. 666-668.

Uslan et al., "A Review of Supernova Screen Magnification Program for Windows", Journal of Visual Impairment & Blindness, Feb. 1999, pp. 108-110.

Uslan et al., "A Review of Two Screen Magnification Programs for Windows 95: Magnum 95 and LP-Windows", Journal of Visual Impairment & Blindness, Sep.-Oct. 1997, pp. 9-13.

Van Santen, J. P.H., "Contextual Effects on Vowel Duration", Journal Speech Communication, vol. 11, No. 6, Dec. 1992, pp. 513-546.

Veiga, Alex, "AT&T Wireless Launching Music Service", available at <http://bizyahoo.com/ap/041005/at_t_mobile_music_5.html?printer=1>, Oct. 5, 2004, 2 pages.

Vepa et al., "New Objective Distance Measures for Spectral Discontinuities in Concatenative Speech Synthesis", Proceedings of the IEEE 2002 Workshop on Speech Synthesis, 2002, 4 pages.

Verschelde, Jan, "MATLAB Lecture 8. Special Matrices in MATLAB", UIC, Dept. of Math, Stat. & CS, MCS 320, Introduction to Symbolic Computation, 2007, 4 pages.

Viegas et al., "Chat Circles", SIGCHI Conference on Human Factors in Computing Systems, May 15-20, 1999, pp. 9-16.

Viikki et al., "Speaker- and Language-Independent Speech Recognition in Mobile Communication Systems", IEEE, vol. 1, 2001, pp. 5-8.

Vingron, Martin, "Near-Optimal Sequence Alignment", Current Opinion in Structural Biology, vol. 6, No. 3, 1996, pp. 346-352.

Vlingo Incar, "Distracted Driving Solution with Vlingo InCar", YouTube Video, Available online at <http://www.youtube.com/watch?v=Vqs8XfXxgz4>, Oct. 2010, 2 pages.

Vlingo, "Vlingo Launches Voice Enablement Application on Apple App Store", Press Release, Dec. 3, 2008, 2 pages.

Vogel et al., "Shift: A Technique for Operating Pen-Based Interfaces Using Touch", CHI '07 Proceedings, Mobile Interaction Techniques I, Apr. 28-May 3, 2007, pp. 657-666.

Voiceassist, "Send Text, Listen to and Send E-Mail by Voice", YouTube Video, Available online at <http://www.youtube.com/watch?v=0tEU61nHHA4>, Jul. 30, 2009, 1 page.

VoiceontheGo, "Voice on the Go (BlackBerry)", YouTube Video, available online at <http://www.youtube.com/watch?v=pJqpWgQS98w>, Jul. 27, 2009, 1 page.

W3C Working Draft, "Speech Synthesis Markup Language Specification for the Speech Interface Framework", available at <http://www.w3org./TR/speech-synthesis>, retrieved on Dec. 14, 2000, 42 pages.

Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.

Wahlster et al., "Smartkom: Multimodal Communication with a Life-Like Character", Eurospeech-Scandinavia, 7th European Conference on Speech Communication and Technology, 2001, 5 pages.

Waibel, Alex, "Interactive Translation of Conversational Speech", Computer, vol. 29, No. 7, Jul. 1996, pp. 41-48.

Waldinger et al., "Deductive Question Answering from Multiple Resources", New Directions in Question Answering, Published by AAAI, Menlo Park, 2003, 22 pages.

Walker et al., "Natural Language Access to Medical Text", SRI International, Artificial Intelligence Center, Mar. 1981, 23 pages.

Walker et al., "The LOCUS Distributed Operating System 1", University of California Los Angeles, 1983, pp. 49-70.

Waltz, D., "An English Language Question Answering System for a Large Relational Database", ACM, vol. 21, No. 7, 1978, 14 pages.

Wang et al., "An Industrial-Strength Audio Search Algorithm", In Proceedings of the International Conference on Music Information Retrieval (ISMIR), 2003, 7 pages.

Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.

Wang et al., "Tone Recognition of Continuous Mandarin Speech Based on Hidden Markov Model", International Journal of Pattern Recognition and Artificial Intelligence, vol. 8, 1994, pp. 233-245.

Ward et al., "A Class Based Language Model for Speech Recognition", IEEE, 1996, 3 pages.

Ward et al., "Recent Improvements in the CMU Spoken Language Understanding System", ARPA Human Language Technology Workshop, 1994, 4 pages.

Ward, Wayne, "The CMU Air Travel Information Service: Understanding Spontaneous Speech", Proceedings of the Workshop on Speech and Natural Language, HLT '90, 1990, pp. 127-129.

Ware et al., "The DragMag Image Magnifier Prototype I", Apple Inc., Video Clip, Marlon, on a CD, Applicant is not Certain about the Date for the Video Clip., 1995.

Ware et al., "The DragMag Image Magnifier", CHI '95 Mosaic of Creativity, May 7-11, 1995, pp. 407-408.

Warren et al., "An Efficient Easily Adaptable System for Interpreting Natural Language Queries", American Journal of Computational Linguistics, vol. 8, No. 3-4, 1982, 11 pages.

(56) References Cited

OTHER PUBLICATIONS

Watabe et al., "Distributed Multiparty Desktop Conferencing System: Mermaid", CSCW 90 Proceedings, Oct. 1990, pp. 27-38.
Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on a Multi-Touch Surface", Doctoral Dissertation, 1999, 363 Pages.
What is Fuzzy Logic?, available at <http://www.cs.cmu.edu>, retrieved on Apr. 15, 1993, 5 pages.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the ARTFUL Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, dated Nov. 24, 2006, 9 pages.
Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yarowsky, David, "Homograph Disambiguation in Text-to-Speech Synthesis", Chapter 12, Progress in Speech Synthesis, 1997, pp. 157-172.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young, S. J., "The HTK Book", Available on <http://htk.eng.cam.ac.uk>, 4 pages.
Youtube, "New bar search for Facebook", Available at "https://www.youtube.com/watch?v=vwgN1WbvCas", 1 page.
Yunker, John, "Beyond Borders: Web Globalization Strategies", New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
Zovato et al., "Towards Emotional Speech Synthesis: A Rule based Approach", Proceedings of 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.

(56) References Cited

OTHER PUBLICATIONS

Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.
Certification of Examination received for Australian Patent Application No. 2017100486, dated Jan. 2, 2018, 2 pages.
Notice of Allowance received for Danish Patent Application No. PA201670554, dated Apr. 25, 2018, 2 pages.
Office Action received for Australian Patent Application No. 2017100486, dated Aug. 2, 2017, 5 pages.
Office Action received for Australian Patent Application No. 2018100187, dated Apr. 17, 2018, 3 pages.
Office Action received for Danish Patent Application No. PA201670554, dated Apr. 5, 2017, 3 pages.
Office Action received for Danish Patent Application No. PA201670554, dated Oct. 3, 2017, 2 pages.
Office Action received for Danish Patent Application No. PA201670554, dated Oct. 12, 2016, 8 pages.
Office Action received for Chinese Patent Application No. 201710392871.6, dated Apr. 23, 2018, 14 pages (5 pages of English Translation and 9 pages of Official Copy).

* cited by examiner

1000
(cont.)

IN ACCORDANCE WITH A DETERMINATION THAT THE FIRST ELECTRONIC DEVICE IS NOT TO RESPOND TO THE AUDIO INPUT, DETERMINING, WITH THE FIRST ELECTRONIC DEVICE, WHETHER A TYPE OF THE FIRST ELECTRONIC DEVICE MEETS A REQUIREMENT OF THE TASK
1030

RECEIVING, WITH THE FIRST ELECTRONIC DEVICE, DATA INDICATIVE OF THE REQUIREMENT OF THE TASK FROM A SERVER
1032

IN ACCORDANCE WITH A DETERMINATION THAT THE TYPE OF THE FIRST ELECTRONIC DEVICE DOES NOT MEET THE REQUIREMENT OF THE TASK, FOREGOING RESPONDING TO THE AUDIO INPUT WITH THE FIRST ELECTRONIC DEVICE
1040

IN ACCORDANCE WITH A DETERMINATION THAT THE TYPE OF THE FIRST ELECTRONIC DEVICE DOES NOT MEET THE REQUIREMENT OF THE TASK, DETERMINING WHETHER TO RESPOND TO THE AUDIO INPUT WITH THE FIRST ELECTRONIC DEVICE BASED ON THE FIRST SET OF ONE OR MORE VALUES, THE SECOND SET OF ONE OR MORE VALUES, AND THE REQUIREMENT OF THE TASK
1034

IN ACCORDANCE WITH A DETERMINATION TO NOT RESPOND TO THE AUDIO INPUT WITH THE FIRST ELECTRONIC DEVICE, FOREGOING RESPONDING TO THE AUDIO INPUT WITH THE FIRST ELECTRONIC DEVICE
1038

IN ACCORDANCE WITH A DETERMINATION TO RESPOND TO THE AUDIO INPUT WITH THE FIRST ELECTRONIC DEVICE, RESPONDING TO THE AUDIO INPUT WITH THE FIRST ELECTRONIC DEVICE
1036

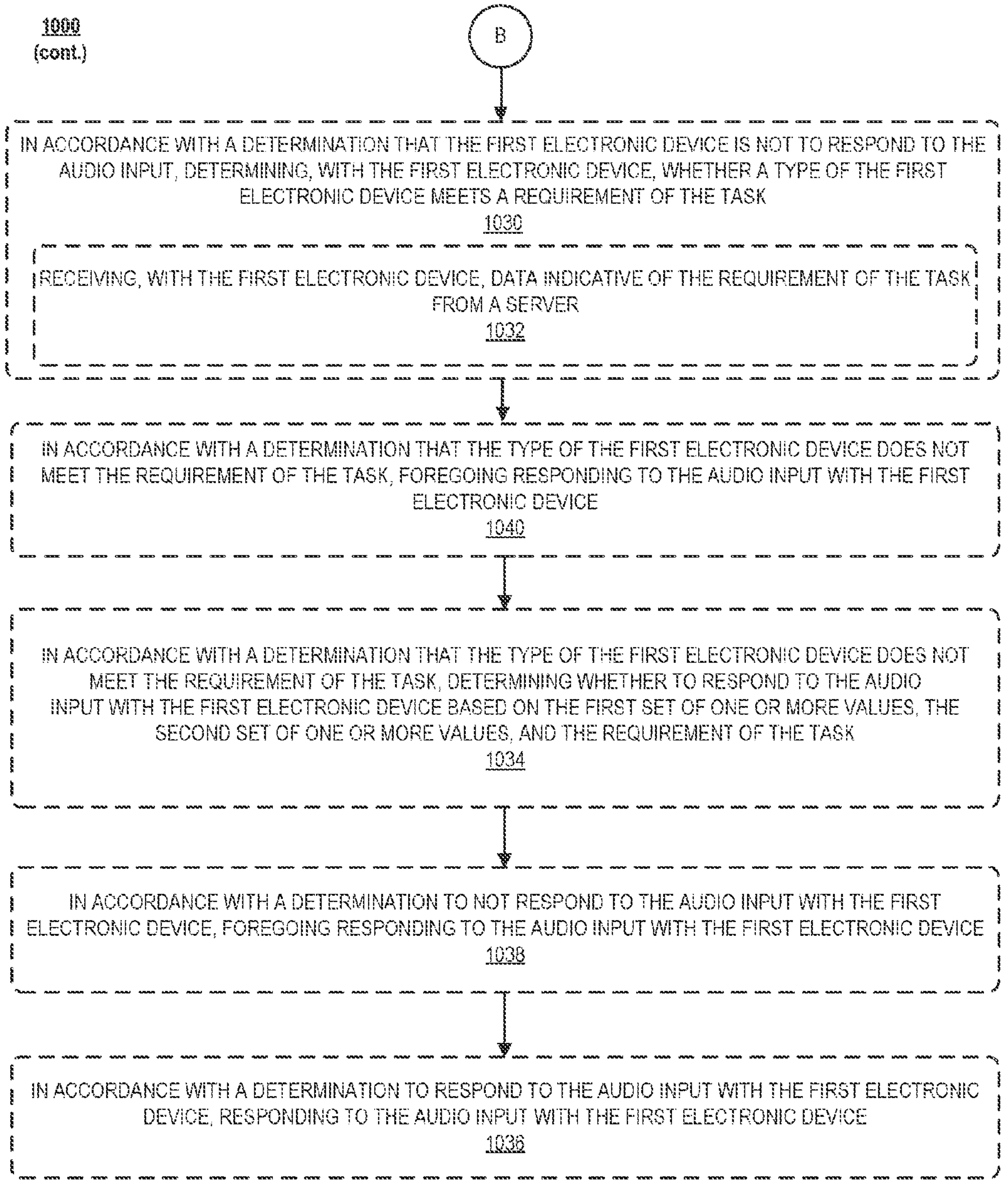

*FIG. 10C*

INTELLIGENT DEVICE ARBITRATION AND CONTROL

CROSS-REFERENCE TO RELATED APPLICATIONS

This application claims priority to U.S. Provisional Patent Application Ser. No. 62/348,896, "INTELLIGENT DEVICE ARBITRATION AND CONTROL," filed on Jun. 11, 2016. The content of this application is hereby incorporated by reference for all purposes.

FIELD

The present disclosure relates generally to multi-device systems and, more specifically, to intelligent arbitration and control of devices in multi-device systems.

BACKGROUND

Many contemporary electronic devices offer virtual assistant services to perform various tasks in response to spoken user inputs. In some circumstances, multiple electronic devices having virtual assistant services may concurrently operate in a shared environment. As a result, a user input may cause each of the multiple electronic devices to respond when the user input contains a trigger phrase or command recognized by each of the virtual assistant services on the electronic devices. This in turn may result in a confusing experience for the user, as multiple electronic devices may simultaneously begin to listen and/or prompt for additional input. Further, the multiple electronic devices may perform duplicative or conflicting operations based on the same user input.

Additionally, a user input can identify one or more particular electronic devices to perform a task. For example, the user may issue a command to a virtual assistant service in order to remotely control home electronic devices by referring to the devices by location ("in my living room"), by a device type ("on my TV"), or by a type of task the device needs to perform ("play the Beatles"). However, the user input, by itself, often does not provide sufficient information for the virtual assistant service to identify, control, and/or manage the electronic devices.

BRIEF SUMMARY

Example methods are disclosed herein. An example method includes, at a first electronic device having a microphone, sampling, with the microphone at the first electronic device, an audio input; broadcasting, with the first electronic device, a first set of one or more values based on the sampled audio input; receiving, with the first electronic device, a second set of one or more values from a second electronic device, where the second set of one or more values are based on the audio input; and determining, with the first electronic device, whether the first electronic device is to respond to the audio input based on the first set of one or more values and the second set of one or more values. In accordance with a determination that the first electronic device is to respond to the audio input, the first electronic device responds to the audio input. In accordance with a determination that the first electronic device is not to respond to the audio input, the first electronic device foregoes responding to the audio input.

Example non-transitory computer readable storage media are disclosed herein. An example non-transitory computer readable medium stores one or more programs. The one or more programs comprise instructions, which when executed by one or more processors of an electronic device with a microphone, cause the electronic device to sample, with the microphone at the electronic device, an audio input; broadcast a first set of one or more values based on the sampled audio input; receive a second set of one or more values from a second electronic device, where the second set of one or more values are based on the audio input; and determine whether the electronic device is to respond to the audio input based on the first set of one or more values and the second set of one or more values. The instructions further cause the electronic device to, in accordance with a determination that the electronic device is to respond to the audio input, respond to the audio input; in accordance with a determination that the electronic device is not to respond to the audio input, forego responding to the audio input.

Example devices are disclosed herein. An example device comprises a microphone; one or more processors; a memory; and one or more programs, where the one or more programs are stored in the memory and configured to be executed by the one or more processors. The one or more programs include instructions for sampling, with the microphone at the electronic device, an audio input; broadcasting a first set of one or more values based on the sampled audio input; receiving a second set of one or more values from a second electronic device, where the second set of one or more values are based on the audio input; and determining whether the electronic device is to respond to the audio input based on the first set of one or more values and the second set of one or more values. The one or more programs further include instructions for, in accordance with a determination that the electronic device is to respond to the audio input, responding to the audio input; and in accordance with a determination that the electronic device is not to respond to the audio input, foregoing responding to the audio input.

An example electronic device comprises a microphone; means for sampling, with the microphone at the electronic device, an audio input; means for broadcasting a first set of one or more values based on the sampled audio input; means for receiving a second set of one or more values from a second electronic device, where the second set of one or more values are based on the audio input; means for determining whether the electronic device is to respond to the audio input based on the first set of one or more values and the second set of one or more values; means for, in accordance with a determination that the electronic device is to respond to the audio input, responding to the audio input; and means for, in accordance with a determination that the electronic device is not to respond to the audio input, foregoing responding to the audio input.

An example method for controlling user devices using a virtual assistant on a first user device comprises, at an electronic device, receiving, with the electronic device, data corresponding to an audio input from the first user device; obtaining, with the electronic device, an identification of a second user device based on the data corresponding to the audio input; obtaining, with the electronic device, an identification of a media item based on the data corresponding to the audio input; and providing, with the electronic device, a command including the identification of the media item and the identification of the second user device to the first user device.

An example non-transitory computer readable storage medium stores one or more programs. The one or more programs comprise instructions, which when executed by one or more processors of an electronic device, cause the electronic device to receive data corresponding to an audio input from a first user device; obtain an identification of a second user device based on the data corresponding to the audio input; obtain an identification of a media item based on the data corresponding to the audio input; and provide a command including the identification of the media item and the identification of the second user device to the first user device.

An example electronic device comprises one or more processors; a memory; and one or more programs, where the one or more programs are stored in the memory and configured to be executed by the one or more processors, the one or more programs including instructions for receiving data corresponding to an audio input from a first user device; obtaining an identification of a second user device based on the data corresponding to the audio input; obtaining an identification of a media item based on the data corresponding to the audio input; and providing a command including the identification of the media item and the identification of the second user device to the first user device.

An example electronic device comprises means for receiving data corresponding to an audio input from a first user device; means for obtaining an identification of a second user device based on the data corresponding to the audio input; means for obtaining an identification of a media item based on the data corresponding to the audio input; and means for providing a command including the identification of the media item and the identification of the second user device to the first user device.

DESCRIPTION OF THE FIGURES

For a better understanding of the various described embodiments, reference should be made to the Detailed Description below, in conjunction with the following drawings in which like reference numerals refer to corresponding parts throughout the figures.

FIGS. 10A-C illustrate an exemplary process for device arbitration according to various examples.

DETAILED DESCRIPTION

In the following description of the disclosure and embodiments, reference is made to the accompanying drawings in which it is shown by way of illustration of specific embodiments that can be practiced. It is to be understood that other embodiments and examples can be practiced and changes can be made without departing from the scope of the disclosure.

Techniques for intelligent device arbitration and control are desirable. As described herein, described techniques improve the user's ability to interact with multiple electronic devices, thereby enhancing productivity. Further, such techniques can reduce computational demand and battery power otherwise consumed as a result of redundant responses by electronic devices to user inputs.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be outputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
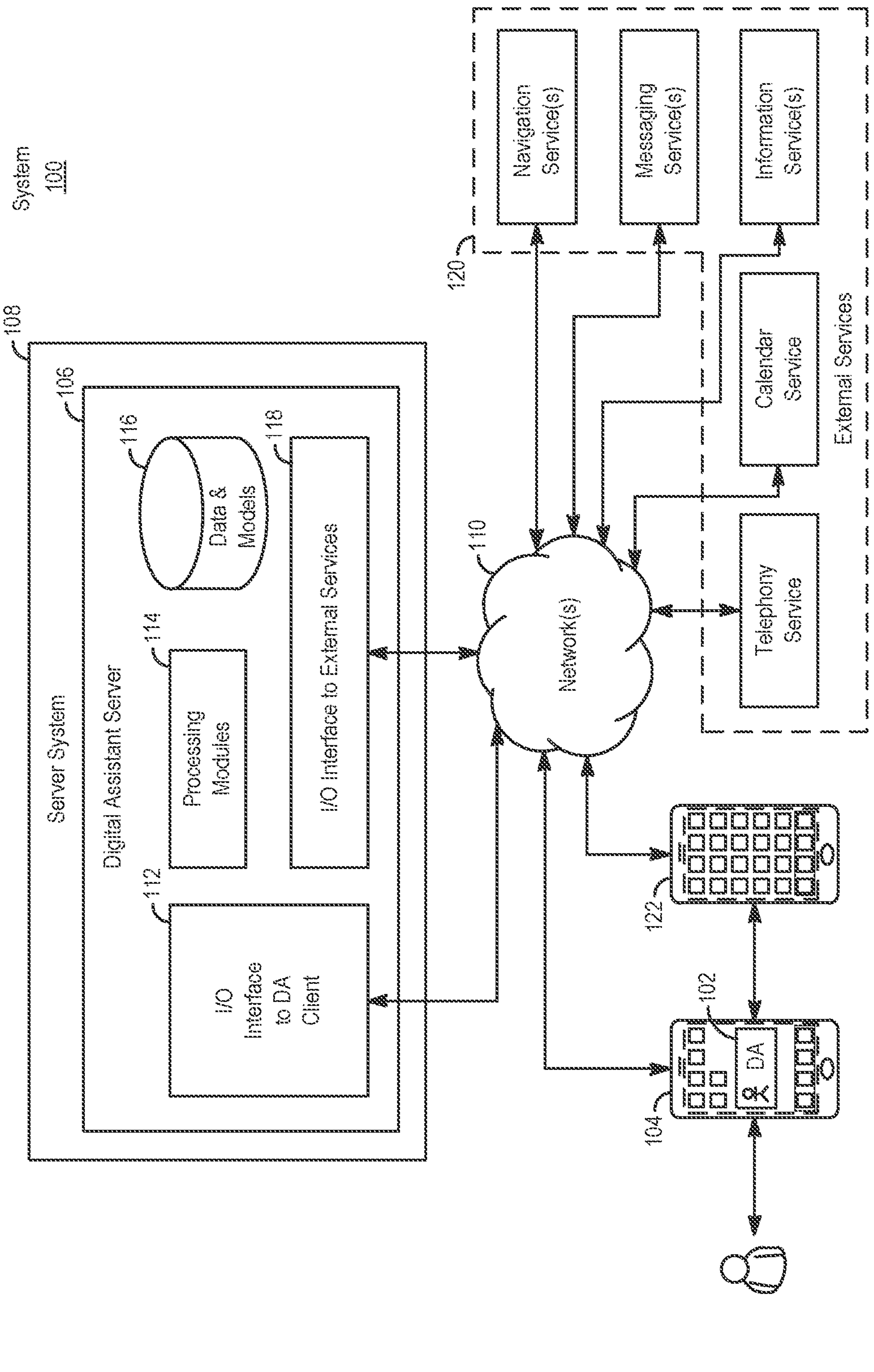
FIG. 1 is a block diagram illustrating a system and environment for implementing a digital assistant according to various examples.

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it will be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
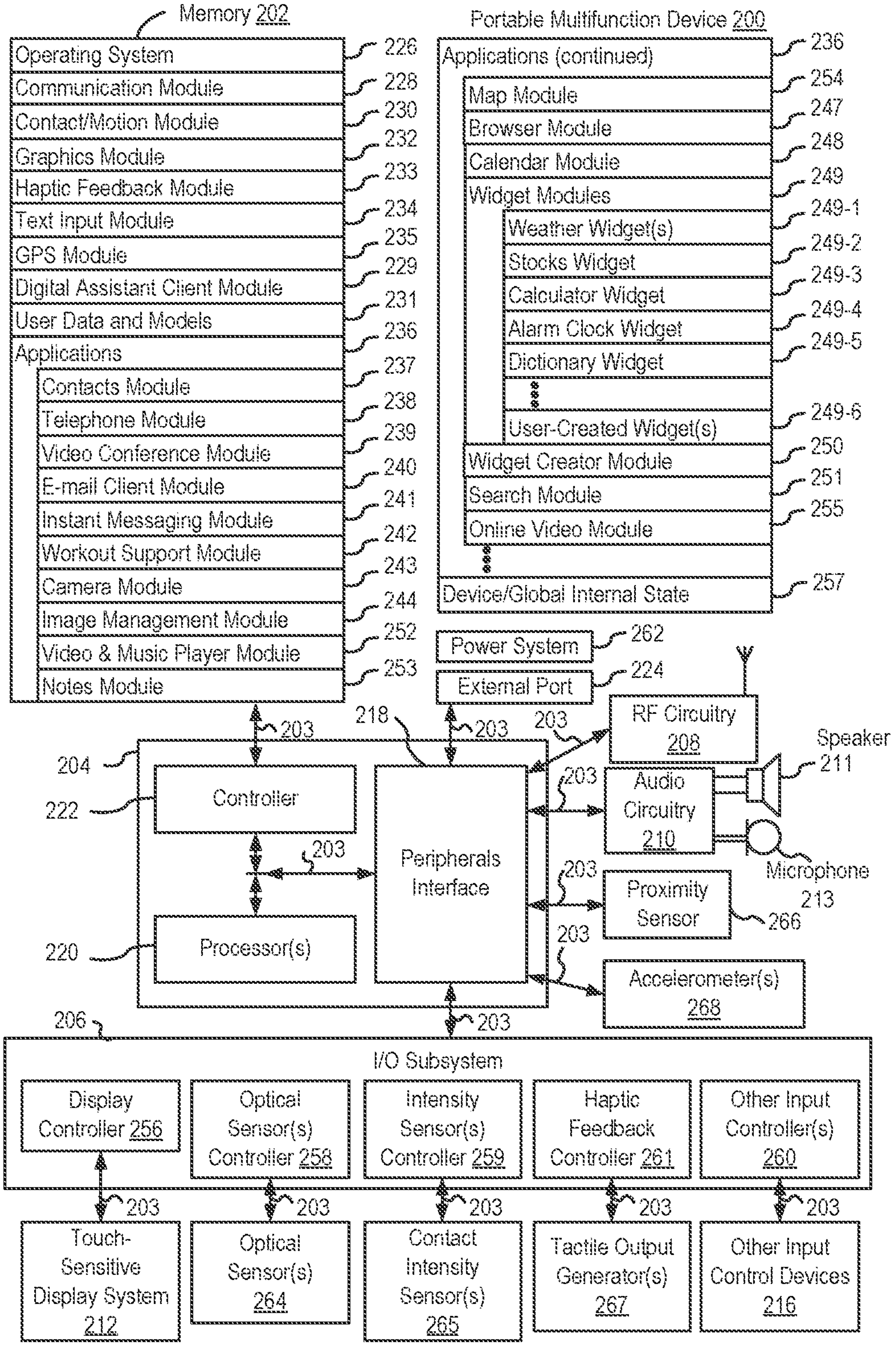
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It will be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of processes 1000 and 1100, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of processes 1000 and 1100, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
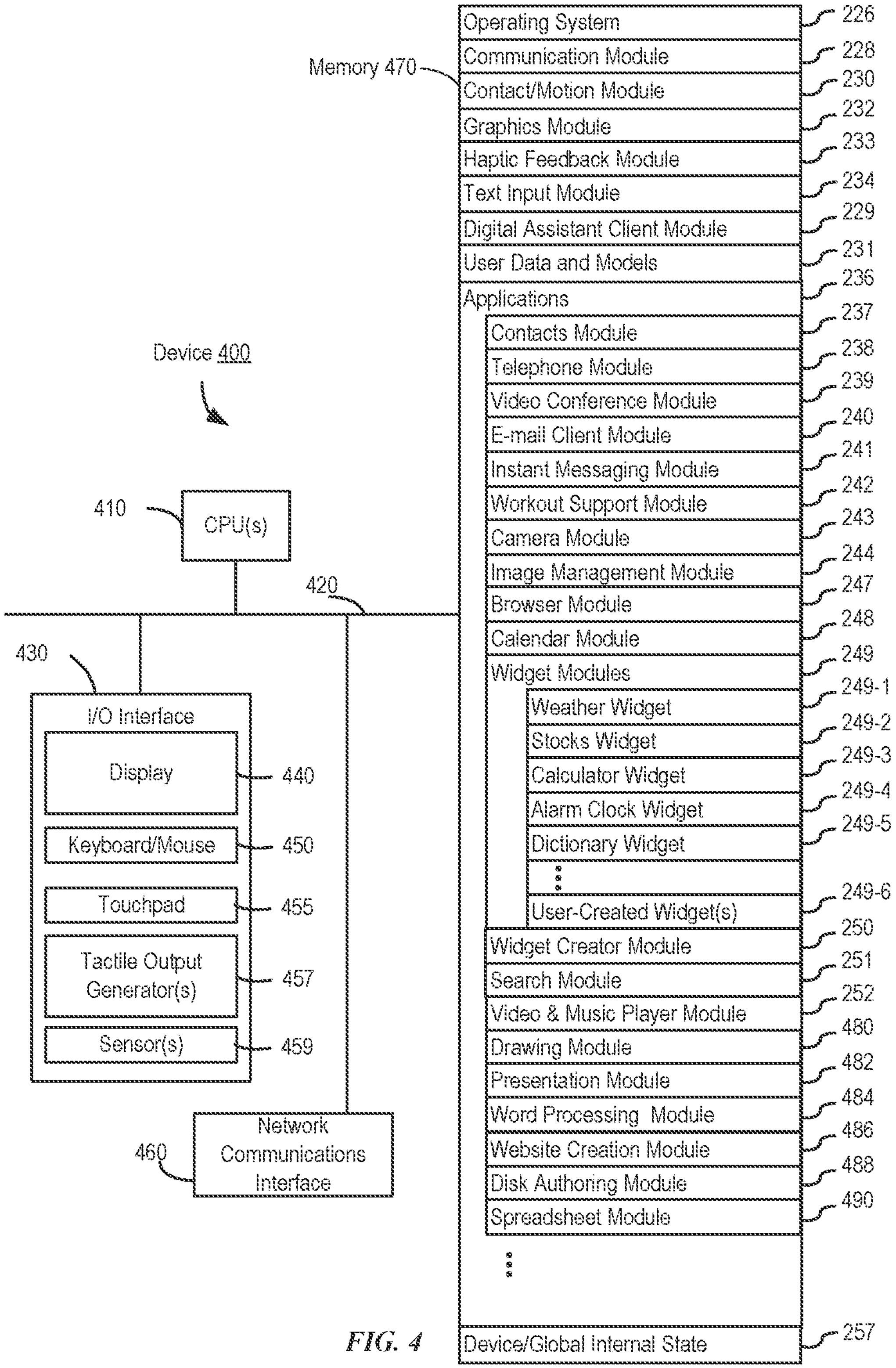
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device

200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);

Telephone module 238;
Video conference module 239;
Email client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
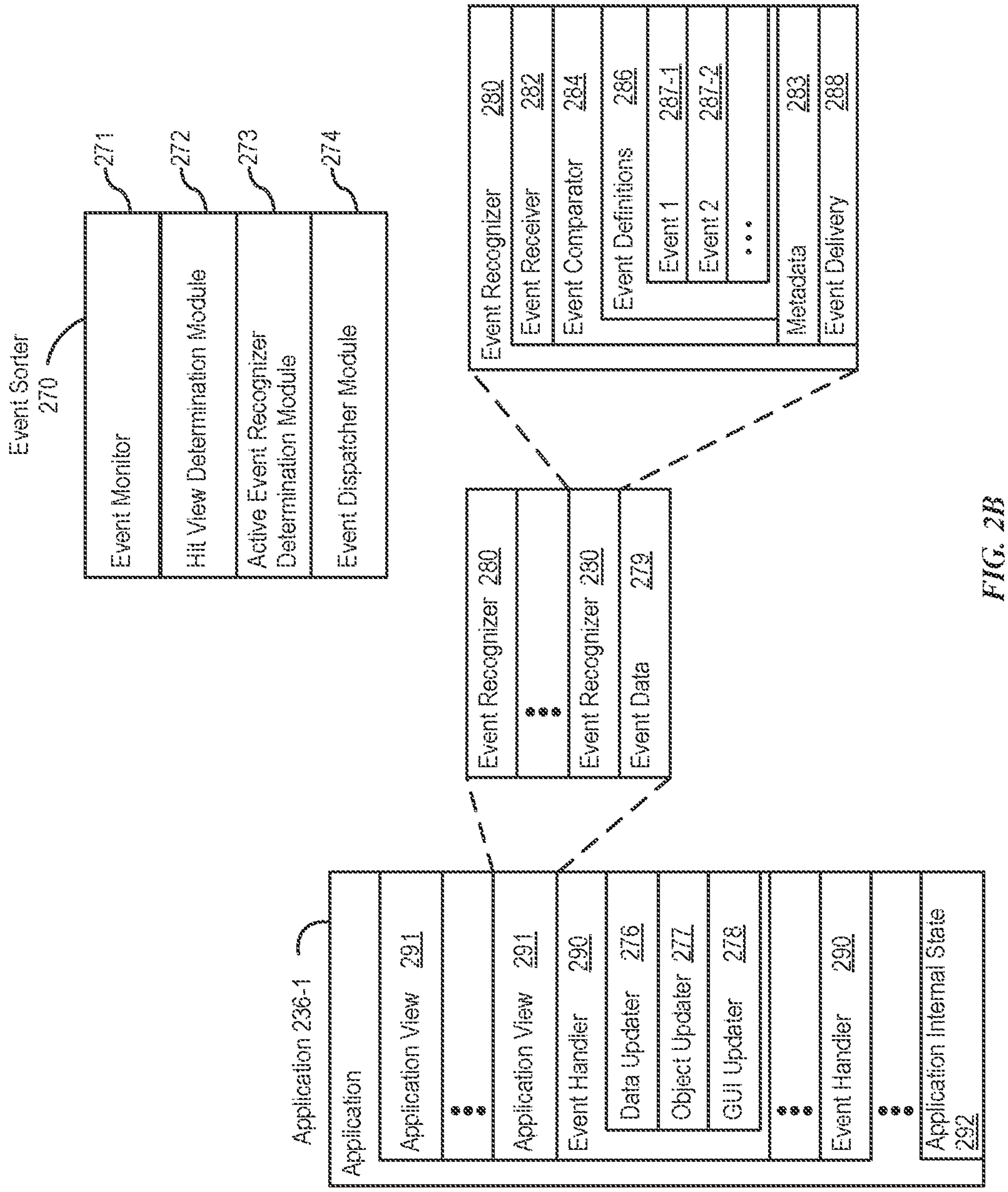
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
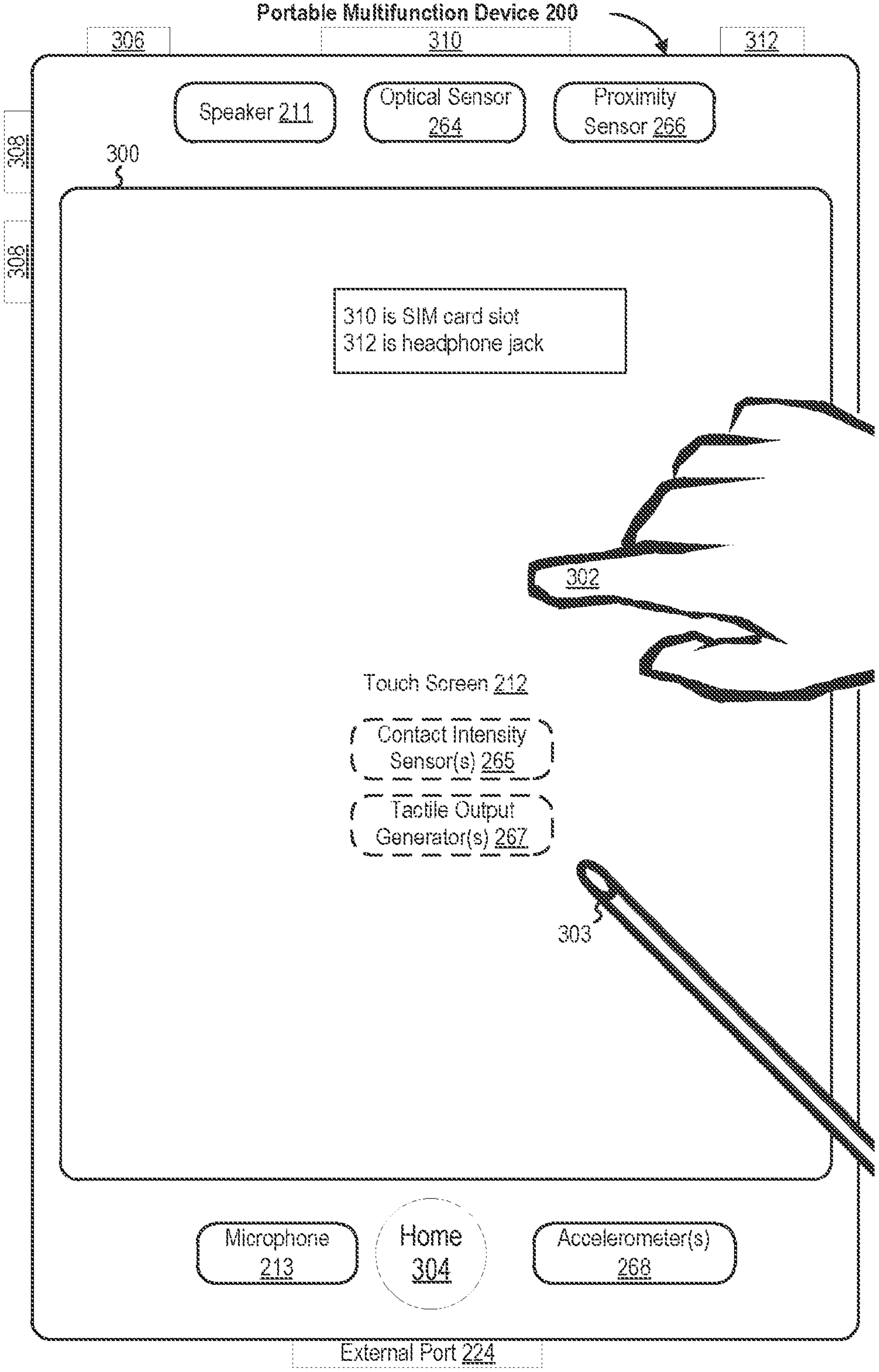
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
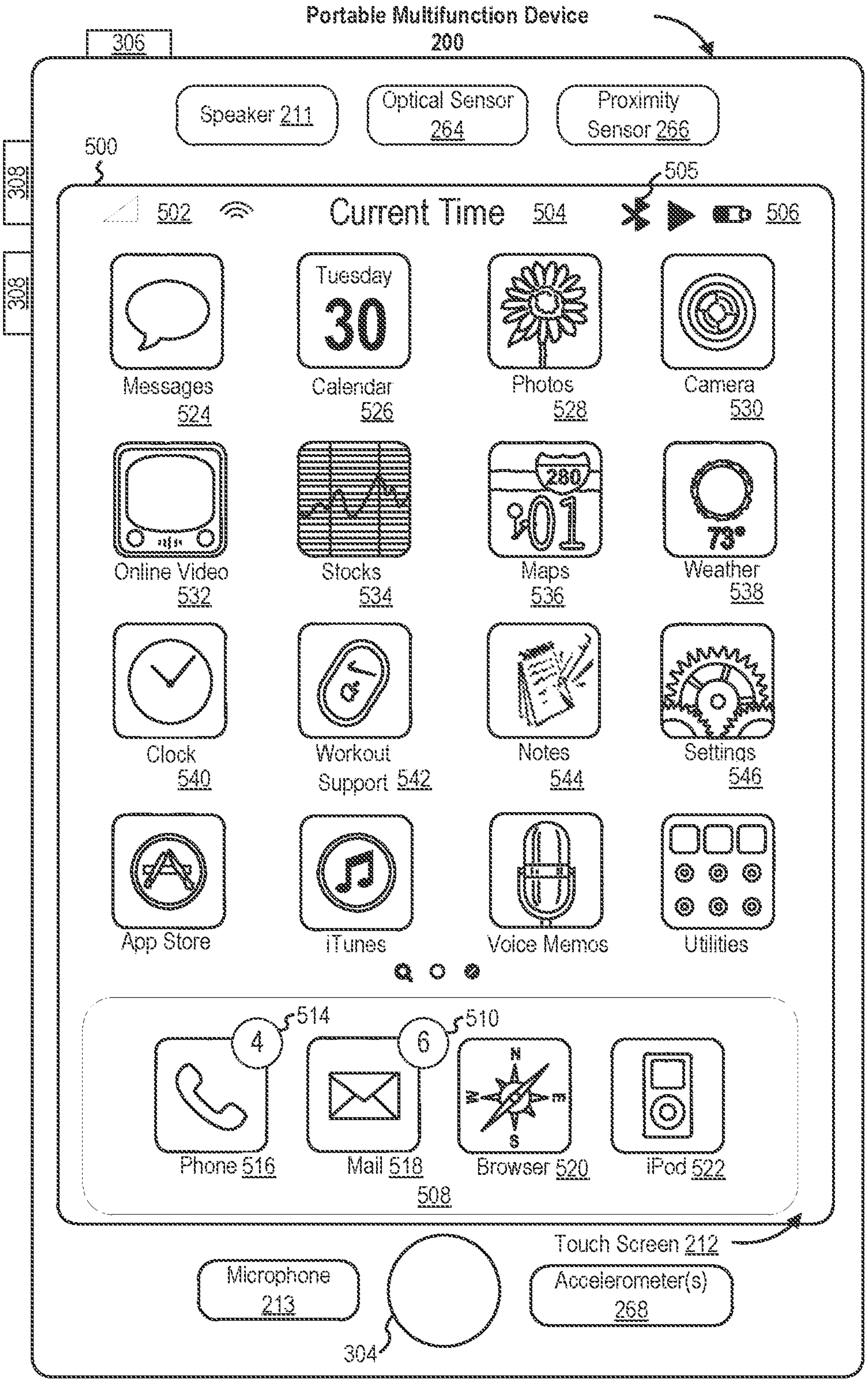
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for email client module 240, labeled "Mail," which optionally includes an indicator 510 of the number of unread emails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
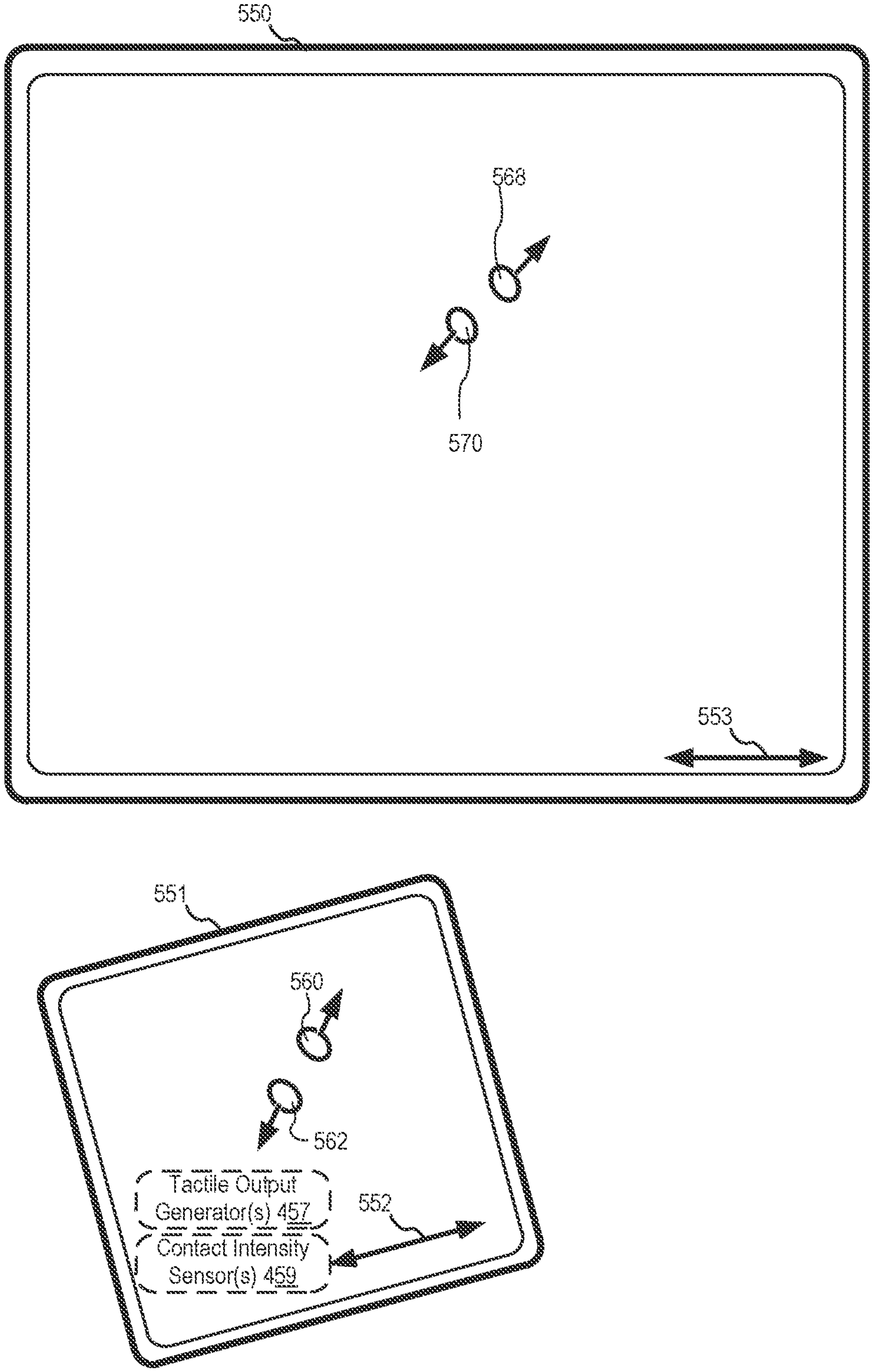
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
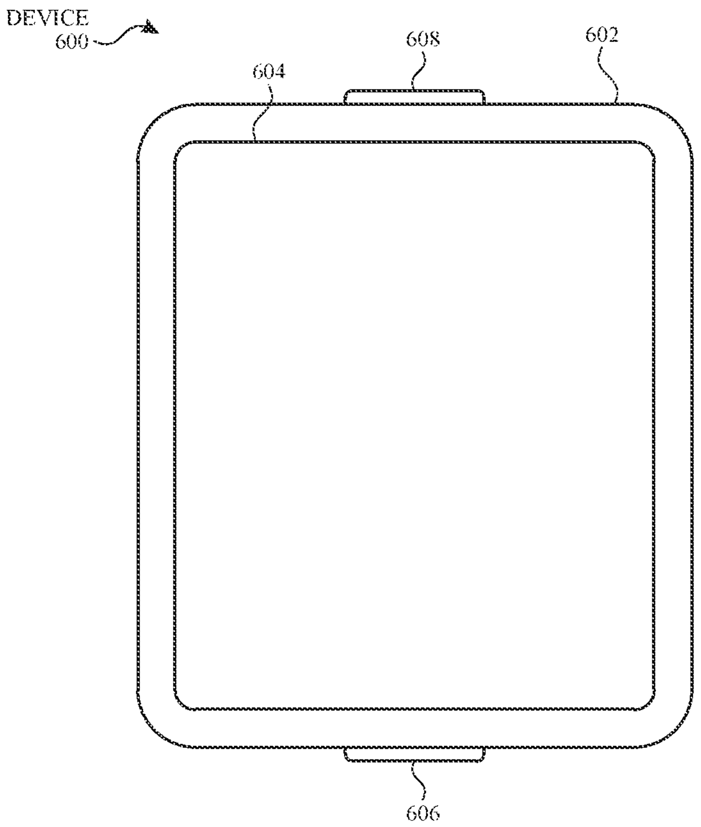
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
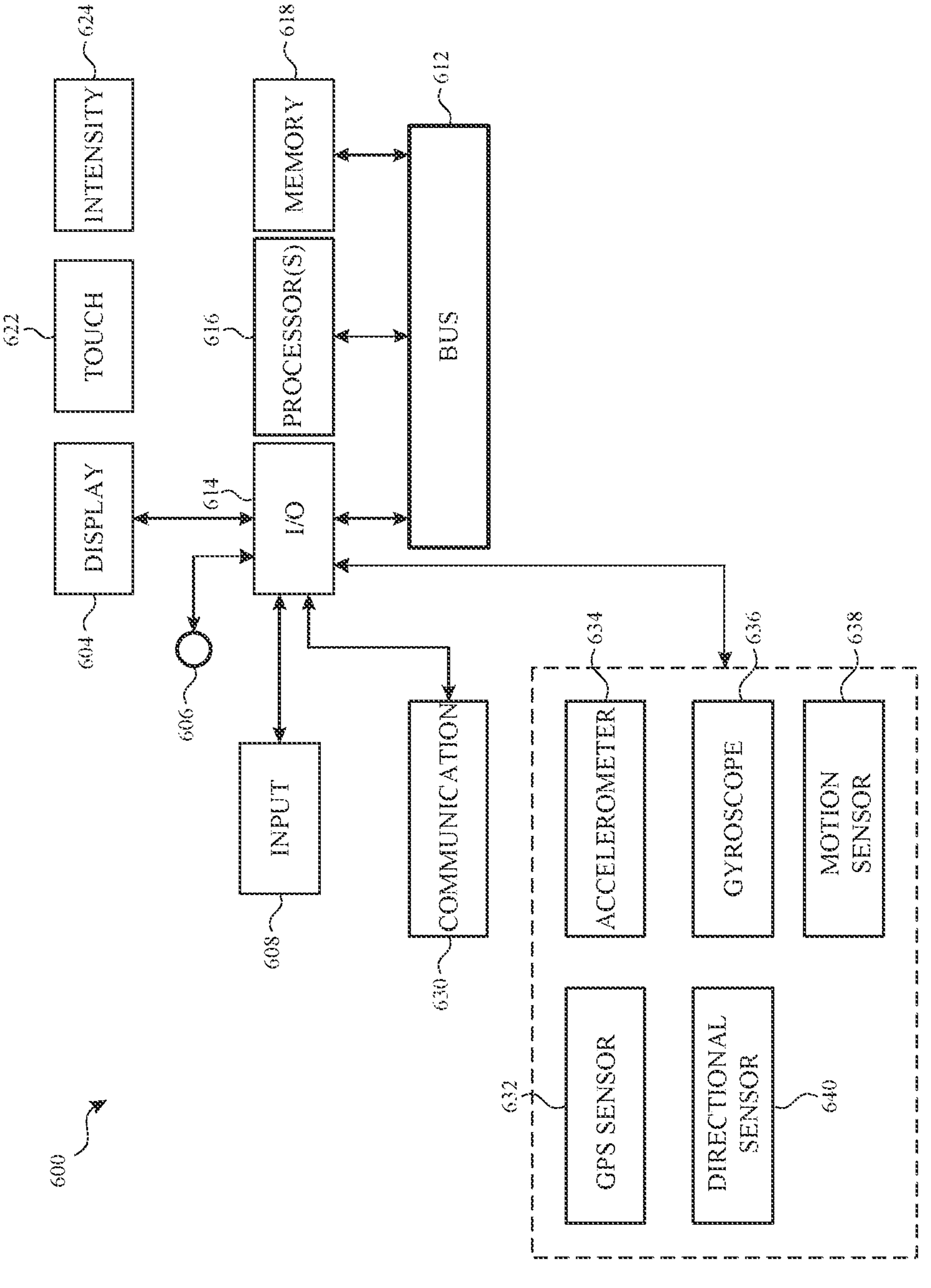
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can include one or more non-transitory computer-readable storage mediums, for storing computer-executable instructions, which, when executed by one or more computer processors 616, for example, can cause the computer processors to perform the techniques described below, including processes 1000 and 1100 (FIGS. 10-11). Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
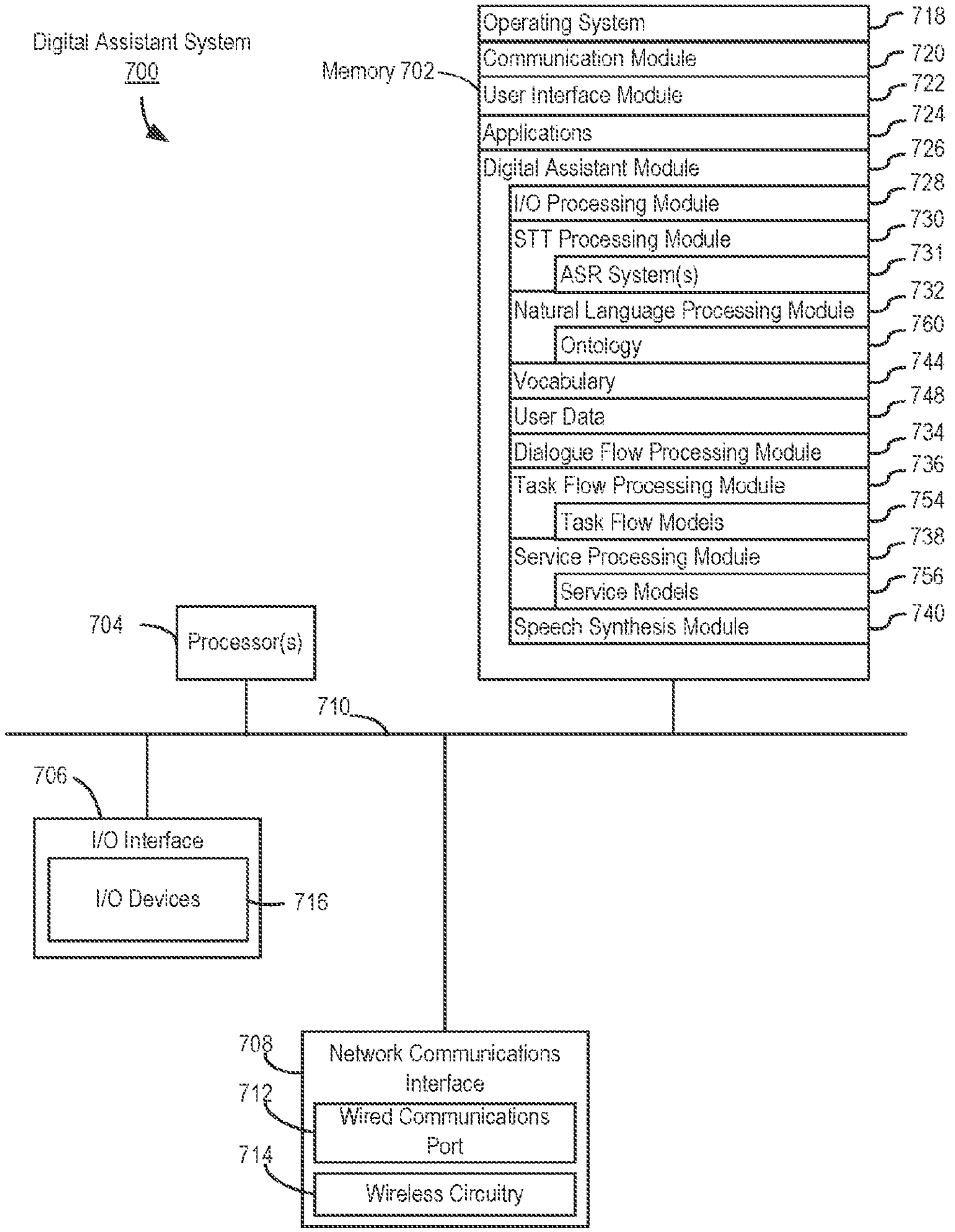
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing processes 1000 and 1100, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
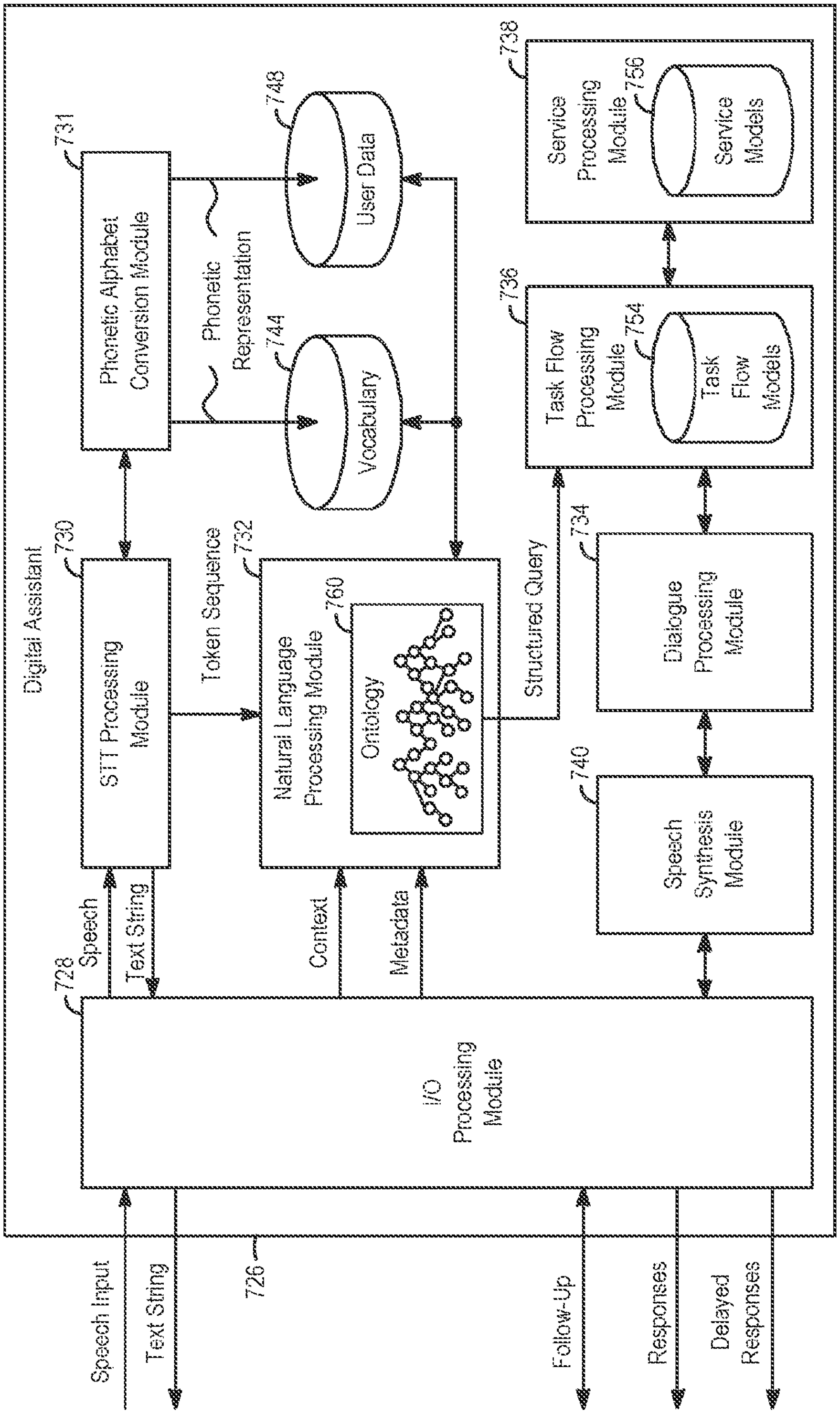
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪɾoʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪɾoʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪɾoʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪɾoʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪɾoʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /tə'mɛɪɾoʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
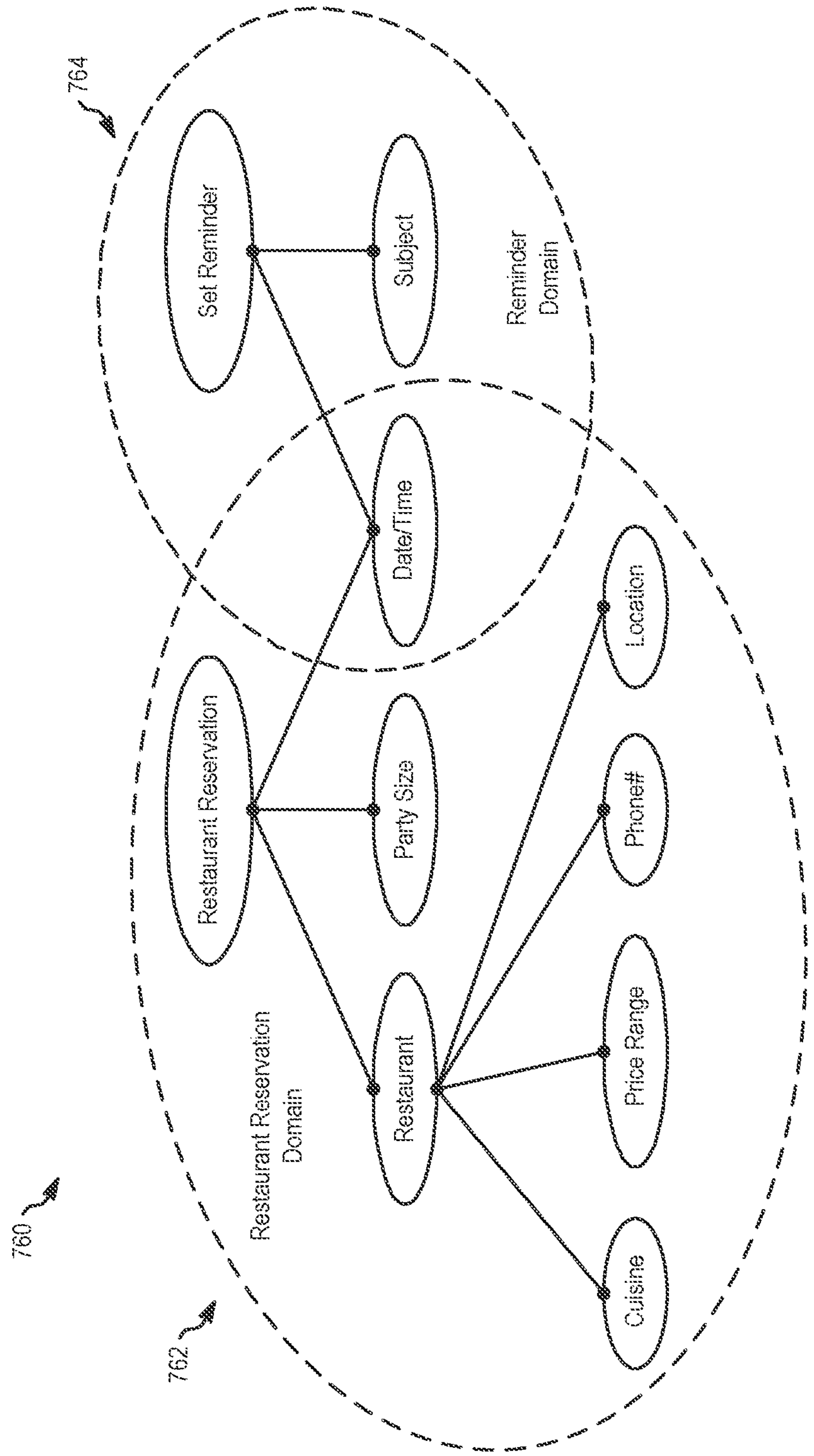
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine 32 "Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, U.S. Utility application Ser. No. 13/251,088, entitled "Generating and Processing Task Items That Represent Tasks to Perform," filed Sep. 30, 2011, U.S. Utility application Ser. No. 15/144,618, entitled "Intelligent Device Identification", filed May 2, 2016, and U.S. Utility application Ser. No. 14/503,105, entitled "Intelligent Assistant for Home Automation", filed Sep. 30, 2014, the entire disclosures of which are incorporated herein by reference.

4. Exemplary Techniques for Intelligent Device Arbitration

Figure 8A:
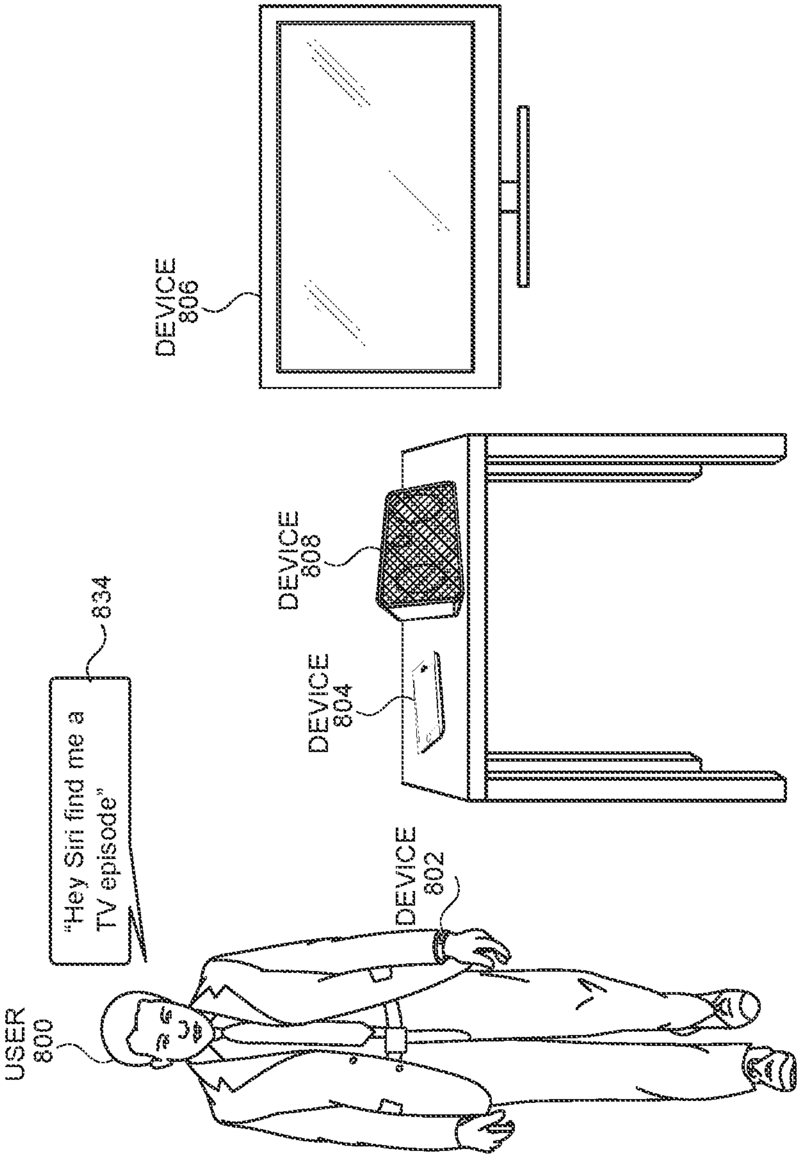
FIGS. 8A-C illustrate a plurality of electronic devices according to various examples.
Figure 8B:
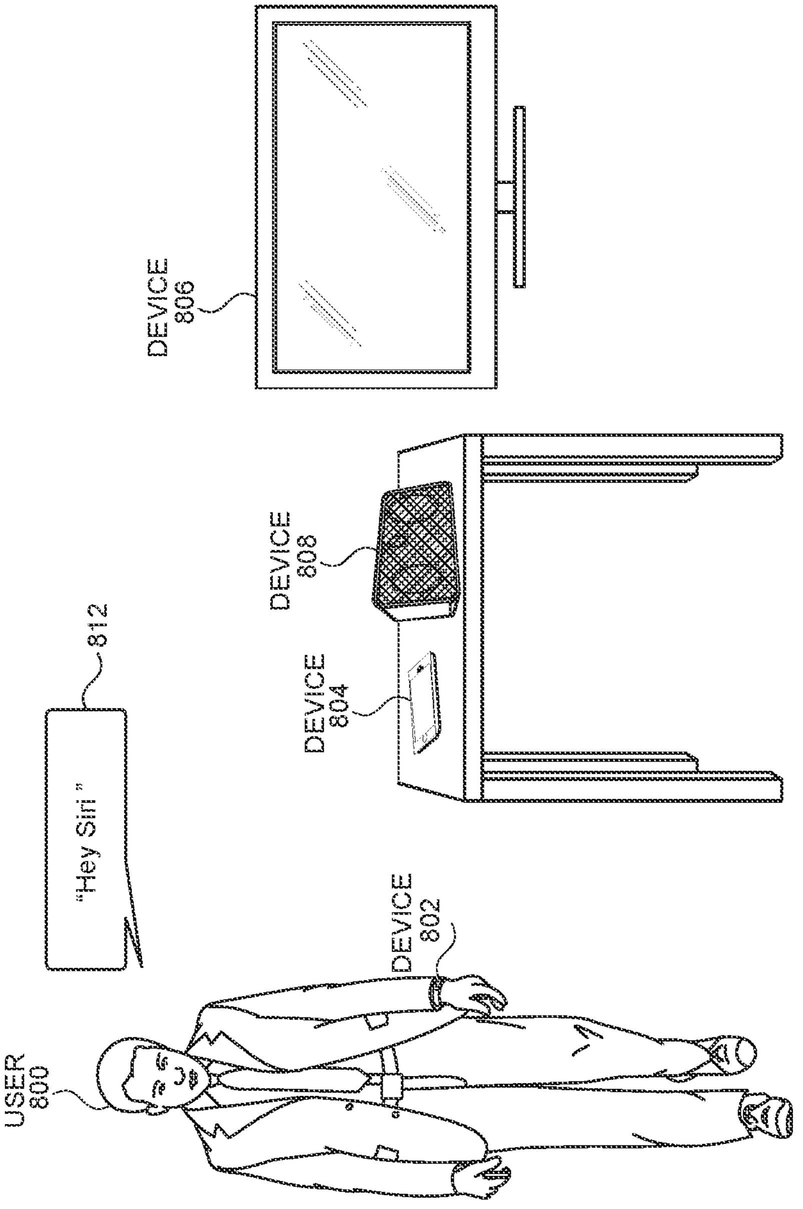
Figure 8C:
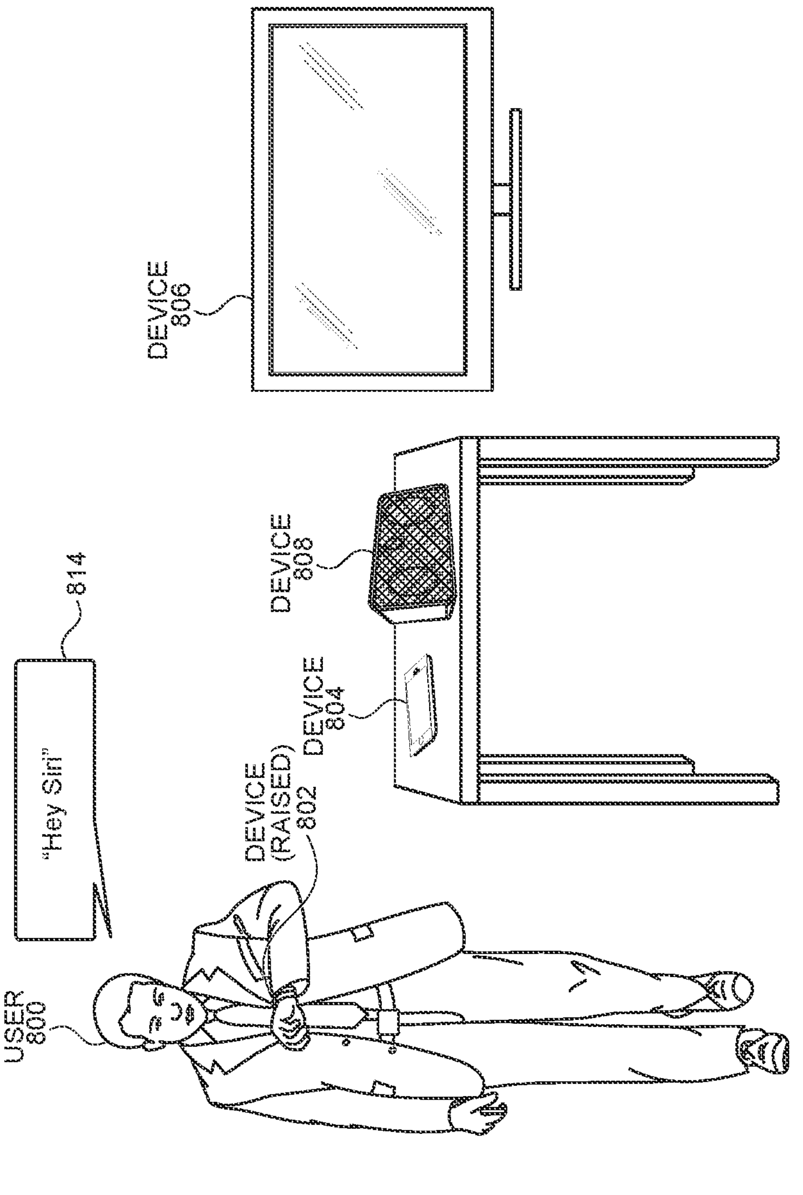

FIGS. 8A-C illustrate exemplary techniques for intelligent device arbitration in accordance with some embodiments. These figures are also used to illustrate the processes described below, including the processes in FIGS. 10A-C.

FIG. 8A illustrates electronic devices 802, 804, 806, and 808 of user 800. One or more of the devices 802-808 may be any of devices 104, 122, 200, 400, 600, and 1200 (FIGS. 1, 2A, 3, 4, 5A, 6A-6B, and 12) in some embodiments. In some examples, electronic device 802 is a wearable electronic device, such as a smart watch, and is, optionally, powered off when in a lowered position, as illustrated. In some examples, electronic device 804 is a mobile device, such as a mobile phone; electronic device 806 is an electronic device having relatively large display capabilities, such as a television; electronic device 808 is a device having auditory output capabilities, such as a speaker dock. While the illustrated example is described herein with reference to electronic devices 802-808, it should be appreciated that a fewer or greater number of devices may be used in other implementations. Further, electronic devices 802-808 may be associated with different users (not shown).

Each of the electronic devices 802-808 is capable of sampling audio inputs from user 800. For example, electronic device 804 samples audio inputs through its microphone to listen for spoken instructions from user 800. In some examples, one or more of electronic devices 802-808 continuously sample audio input. In some examples, one or more of electronic devices 802-808 begin to sample audio input in response to detecting proximity of user 800. In some examples, one or more of electronic devices 802-808 begin to sample audio input in response to a particular input by user 800, such as a spoken trigger. FIG. 8A illustrates user 800 providing spoken instruction 834, "Hey Siri find me a TV episode". In one embodiment, each of electronic devices 802-808 samples audio input and detects spoken instruction 834, respectively.

In response to detecting spoken instruction 834, electronic devices 802-808 initiate an arbitration process to identify (e.g., determine) an electronic device for responding to the spoken instruction 834 from user 800. By way of example, each of electronic devices 802-808 broadcasts a set of values based on the audio input as sampled on the respective device. Each set of values may include one or more values. For example, electronic device 804 (implemented as a mobile phone) broadcasts a first set of one or more values based on the spoken instruction 834 as sampled on electronic device 804, while electronic device 808 (implemented as a speaker dock) broadcasts a second set of one or more values based on the spoken instruction 834 as sampled on electronic device 808. Electronic devices 802 and 806 broadcast respective sets of one or more values as well. The sets of one or more values can be broadcasted by electronic devices 802-808 via any unidirectional broadcast communications standards, protocols, and/or technologies known now or in the future. In some examples, one or more sets of one or more values are broadcasted using Bluetooth Low Energy (BTLE) advertising mode. Other communication methods can be used, including but not limited to WiFi (e.g., any 802.11 compliant communication), NFC, infrared, sound wave, etc., or any combination thereof.

In some examples, a set of one or more values broadcasted by an electronic device includes any number of values. One exemplary value indicates an energy level of the audio input as sampled on the electronic device. The energy level of the sampled audio input may, for instance, be indicative of the proximity of the electronic device to the user. In some examples, the energy level is measured using known metrics for audio quality, such as signal-to-noise ratio, sound pressure, or a combination thereof.

Another exemplary value indicates an acoustic fingerprint of the audio input, that is, whether the audio input is likely provided by a particular user. In some examples, the electronic device analyzes the audio input and calculates a confidence value that expresses the likelihood that the audio input originates from the particular user (e.g., a user that has enrolled in the virtual assistant service on the electronic device). In some examples, the electronic device determines whether the audio input is from an authorized user by comparing the confidence value with a predetermined threshold value, and broadcasts a value based on the comparison. In some examples, the set of one or more values may include a value corresponding to the confidence value as well.

Another exemplary value indicates a type of the electronic device. For example, as illustrated in FIG. 8A, the electronic device 804 is a mobile phone. It will be appreciated that predetermined values can be used by electronic devices 802-808 to indicate different device types, including but not limited to, speaker, television, smart watch, laptop, tablet, mobile device, set-top box, headphones, or any combination thereof. In some examples, each of the electronic devices 802-808 broadcasts a "device type" value only when the spoken instruction specifies a task to be performed, as discussed in more details below.

Another exemplary value indicates a state of the electronic device. In some examples, the value can, for instance, be indicative of whether the electronic device has been in an active state (e.g., having received a user input) within a predetermined amount of time before receiving the audio input. In at least one example, the value can indicate whether the electronic device is in a locked state. In some examples, the value can also indicate whether the user has recently activated the device or the virtual assistant service on the device. In some examples, the value can convey details regarding the recent user input, such as a time stamp, a type of input (e.g., a physical touch, a raising gesture), etc.

Another exemplary value indicates location information of an electronic device. In some examples, the value indicates a geographic location of the electronic device, for example, using GPS coordinates of the electronic device, or indicates a named location of the electronic device (e.g., the user's living room).

The above-discussed exemplary values correspond to various metrics relevant to implementing intelligent device arbitration as described herein. It will be appreciated that any number of values corresponding to these metrics can be broadcasted and/or that some or all of the values can be used to provide a single value using one or more functions. The single value may thereafter be broadcasted during device arbitration as described herein. It will be further appreciated that the one or more functions can assign different weights to different values, respectively.

In some examples, the electronic device determines respective values and/or broadcasts the values in response to detecting a spoken trigger. With reference to FIGS. 8A-C, the spoken trigger is the phrase "Hey Siri". In response to the spoken trigger "Hey Siri", each of the electronic devices 802-808 broadcasts the respective set of one or more values, as described. If an audio input does not contain a spoken trigger, the electronic device foregoes determining and/or broadcasting a set of one or more values.

Each of the electronic devices 802-808 may receive sets of values from other devices. By way of example, the electronic device 802 may receive sets of values from electronic devices 804-808, the electronic device 804 may receive sets of values from electronic devices 802, 806, 808, and so on. After sets of values have been exchanged among electronic devices 802-808, each device determines whether it is to respond to the audio input by analyzing the sets of values, as discussed below.

In some examples, each device determines whether to respond to the spoken instruction 834 based on the energy level values broadcasted by electronic devices 802-808. Each of the electronic devices 802-808 compares a respective "energy level" value with the "energy level" values broadcasted by other electronic devices. In some examples, an electronic device responds to the audio input if the electronic device has broadcasted the highest "energy level" value. As discussed above, a higher "energy level" value can be indicative of greater proximity to the user. Because a device closest to a user may be associated with a highest energy level value, it is beneficial to have an electronic device that has broadcasted the highest "energy level" value respond to the spoken instruction 934.

In some examples, each device determines whether to respond to the spoken instruction 834 based on the state values broadcasted by electronic devices 802-808. Each of the electronic devices 802-808 compares a respective "state" value with the "state" values broadcasted by other electronic devices. As discussed above, the "state" value(s) of an electronic device can encompass information regarding the operation of the electronic device, such as whether it is locked, whether it has been recently activated, whether it has recently received particular user inputs. In some examples, an electronic device responds to the audio input if the user has recently provided an input indicative of an intent to interact with the particular electronic device. Exemplary inputs include an active gesture (e.g. on a wearable electronic device), a physical touch (e.g. on a touch-sensitive screen of a device), etc. In some examples, an electronic device responds to the audio input if, based on the broadcasted "state" values, the electronic device is the only device that is in an unlocked state.

In some examples, each device determines whether to respond to the spoken instruction 834 based on the acoustic fingerprint values broadcasted by electronic devices 802-808. Each of the electronic devices 802-808 compares a respective "acoustic fingerprint" value with the values broadcasted by other electronic devices. In some examples, an electronic device responds to the audio input if, based on the broadcasted values, it is the only electronic device that has recognized the user who provided the audio input as an authorized user. For example, if user 800 has enrolled in the virtual assistant service only on electronic device 802 (implemented as a smart watch), electronic device 802 responds to the audio inputs from user 800.

In some examples, each of the electronic devices 802-808 determines whether to respond to the spoken instruction based on the device type values broadcasted by electronic devices 802-808. Each of the electronic devices 802-808 compares a respective "device type" value(s) with the values broadcasted by other electronic devices. Device type is particularly relevant to intelligent device arbitration when the user's input specifies a task to be performed, such as "Hey Siri, find me a TV episode" or "Hey Siri, drive me there". In some examples, the electronic device is to respond to the audio input if, based on the broadcasted values, the electronic device is the only device of a type that can handle the task specified in the audio input.

In some examples, the electronic device obtains a list of acceptable device types that can handle the specified task (e.g., by locally analyzing the audio input and/or by receiving the list from one or more servers), and determines whether the electronic device is to respond to the audio input based on the broadcasted "device type" values and the list of acceptable device types. In some examples, one or more servers receive data representing the sampled audio input from one or more of electronic devices 802-808, derive a user intent based on the data, and identify a task having one or more parameters based on the user intent In some examples, once the one or more servers determine the task based on the audio input, the one or more servers transmit the task, parameters (if any), and a list of acceptable device types for handling the task to the electronic devices that have sampled the audio input (e.g., electronic devices 802-808). Additional details regarding the identification of a task from a natural language input can be found, for example, in U.S. Utility application Ser. No. 15/144,618, entitled "Intelligent Device Identification", filed May 2, 2016, which is hereby incorporated by reference in its entirety.

It will be appreciated that the arbitration processes described herein are exemplary, and that, using one or more numerical and/or logical functions and algorithms, some or all of the values above can be factored, alone or in combination, into the determination of whether an electronic device is to respond to an audio input. In some examples, each of electronic devices 802-808 broadcasts multiple values (e.g., an aggregated score and a "device type" value). Accordingly, electronic devices 802-808 may arbitrate in accordance with one or more predetermined algorithms. In some examples, each of electronic devices 802-808 broadcasts a single score, which is calculated according to one or more functions using some or all of the above-discussed values. For example, a single score for broadcasting can be calculated based on a predetermined weighting of received audio quality (e.g., signal-to-noise ratio), type of device, ability to perform task, and device state. Further, it will be appreciated that a variety of logical and/or numerical functions and algorithms can be used by each of electronic devices 802-808. It should be further appreciated that adjustments to the functions and algorithms can be implemented to adjust the prioritization of the above-described factors.

The electronic device can respond to an audio input by providing a visual output (e.g., a display notification or LED toggle), an auditory output, a haptic output, or a combination thereof, in some examples. For example, electronic device 804 can respond to the audio input with a visual output (e.g. displaying a transcript of the audio input) and an audio output (e.g., "Looking for episodes . . . "). If the electronic device determines not to respond to the audio input, the electronic device can forego responding to the audio input by entering an inactive mode (e.g. sleep mode).

With reference to FIG. 8A, each of electronic device 802 (implemented as a smart watch), electronic device 804 (implemented as a mobile phone), electronic device 808 (implemented as a speaker dock), and electronic device 806 (implemented as a television) generates and broadcasts a set of one or more values after sampling spoken instruction 834 from user 800. In this example, each set of one or more values includes an "energy level" value and a "device type" value. By comparing the broadcasted "energy level" values, electronic device 804 determines that it has broadcasted the highest "energy level" value among electronic devices 802-808, indicating that electronic device 804 is in relatively close proximity to user 800.

However, electronic device 804 further analyzes the broadcasted "device type" values in light of the task specified in the spoken instruction 834. As discussed above, spoken instruction 834 can be processed and resolved into one or more tasks locally or remotely. For example, electronic device 804 can resolve the spoken instruction 834 into a task locally, or receive the task along with a list of acceptable device types for handling the task from one or more servers. In this example, electronic device 804 determines that it is not of an acceptable (or preferred) device type for handling the task specified in the audio input (i.e., playback of a video). As such, electronic device 804 foregoes responding to the audio input.

In some examples, electronic device 804 further determines whether any of the rest of the electronic devices can handle the specified task. Electronic device 804 makes the determination based on the device types broadcasted by the other electronic devices and the list of acceptable device types. In some examples, if electronic device 804 determines that none of the other electronic devices are of an acceptable device type for handling the task, electronic device 804 outputs an error message to the user or prompts the user for additional input (e.g., "would you like the video playback on your iPhone?").

Similarly, electronic device 806 (implemented as a television) receives respective sets of one or more values from electronic devices 802 (implemented as a smart watch), 808 (implemented as a speaker dock), and 804 (implemented as a mobile phone). By analyzing the broadcasted sets of values, electronic device 806 determines that it has not broadcasted the highest "energy level" value. But, electronic device 806 further determines that it is of a device type that can handle the task of video playback. In accordance with the determination, electronic device 806 makes an additional determination of whether it is to respond to the audio input despite not having broadcasted the highest "energy level" value. For example, if electronic device 806 determines that none of the electronic devices that have broadcasted higher "energy level" values (e.g. electronic device 804) are of acceptable device types for handling the task, electronic device 806 responds to the audio input. On the other hand, if electronic device 806 determines that there is at least one electronic device that has broadcasted a higher "energy level" value and is of an acceptable device type for handling the task, electronic device 806 foregoes responding to the audio input. Forgoing responding to the audio input may include entering an inactive mode in some examples.

Turning to FIG. 8B, user 800 provides audio input 812, which includes only a spoken trigger ("Hey Siri") and does not specify a task. In response, each of electronic devices 802-808 generates and broadcasts a set of one or more values, as described. In some examples, each of electronic devices 802-808 broadcasts an "energy level" value to each other. In some examples, each of electronic devices 802-808 calculates a single value aggregating some or all of the exemplary values disclosed herein. In this example, electronic device 804 determines that it has broadcasted the highest "energy level" value, indicating that electronic device 804 is closer to user 800 than the other electronic devices. Accordingly, electronic device 804 responds to the audio input 812, and the rest of the electronic devices forego responding to the audio input.

In some examples, because audio input 812 ("Hey Siri") does not specify a task, electronic devices 802-808 may forego broadcasting "device type" values and rely on "energy level" values solely in the arbitration process. In some examples, electronic devices 802-808 forego broadcasting the "device type" values upon determining that the user has not provided another utterance after the spoken trigger (e.g., "Hey Siri") for a predetermined period of time. It will be appreciated that, after an electronic device determines to respond to audio input 812 ("Hey Siri"), the electronic device can receive an utterance specifying a task and can cause the task to be performed at a second electronic device if the electronic device is not of a type for performing the specified task or is otherwise better suited for performing the specified task.

Turning to FIG. 8C, user 800 lifts electronic device 802 (implemented as a smart watch) into a raised position and then provides audio input 814 ("Hey Siri"). In some examples, the set of one or more values broadcasted by electronic device 802 includes value(s) indicative of the user's gesture input at electronic device 802. The value(s) can be a single value indicative of the presence of a recent user input, or can include detailed information regarding the user input, such as a time stamp, an input type, etc. In view of the broadcasted "state" value(s) of electronic device 802, electronic devices 804-808 forego responding to the audio input and electronic device 802 responds to the audio input. In some examples, an electronic device that has broadcasted value(s) indicative of a user input of a particular type (e.g. an active gesture, a physical touch) at the electronic device is to respond to the audio input, regardless of the other values broadcasted. In some examples, when multiple electronic devices have broadcasted values indicative of user inputs of particular types at the respective devices, the electronic device that has broadcasted a value (e.g., time stamp) indicative of the most recent user input is to respond to the audio input, regardless of the other values broadcasted.

In some examples, if an electronic device broadcasts a set of one or more values and does not receive any set of one or more values from another electronic device, the electronic device responds to the audio input regardless of the values broadcasted.

5. Exemplary Techniques for Intelligent Device Control

Figure 9A:
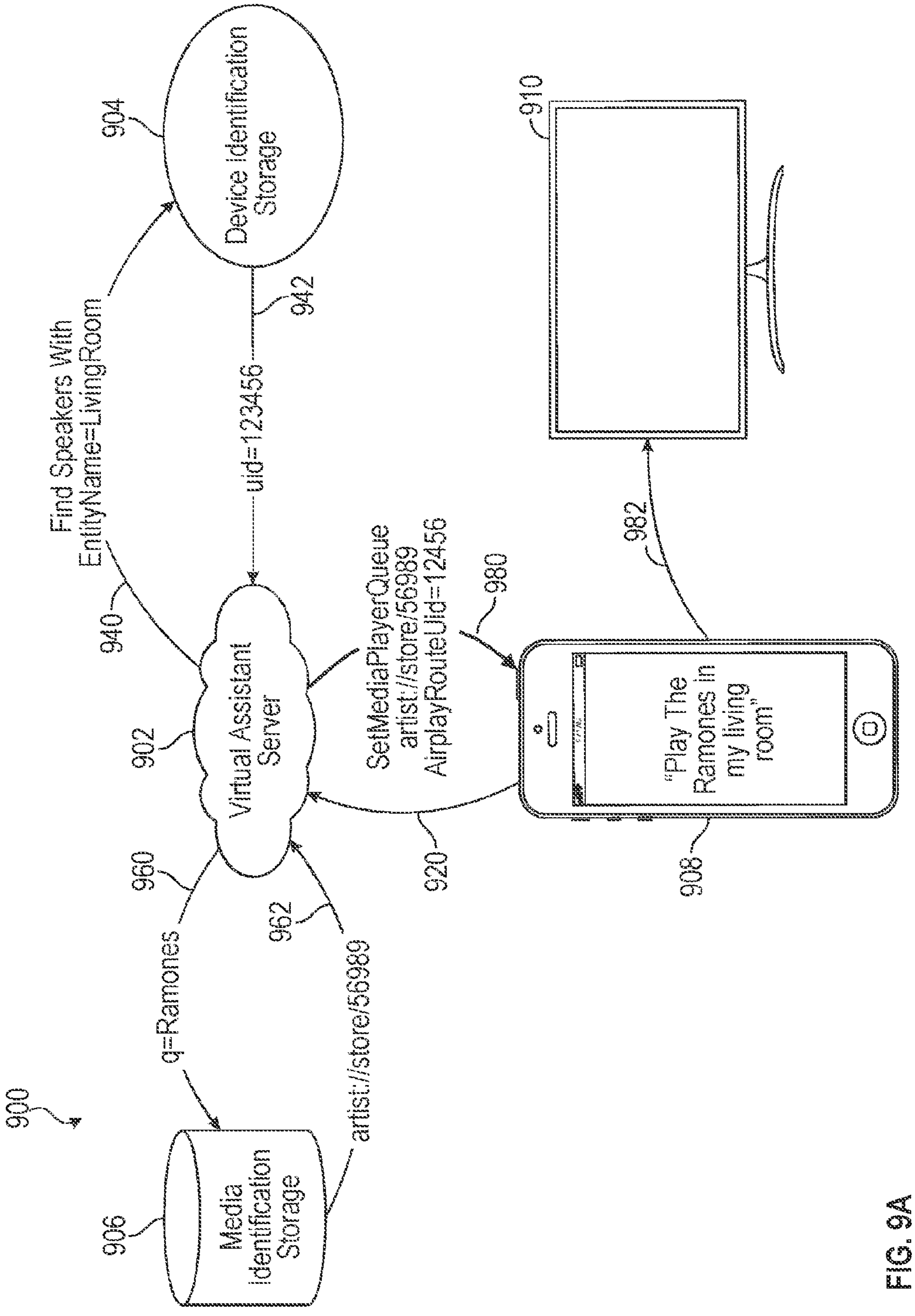
FIGS. 9A-9C illustrate exemplary system and environment for controlling electronic devices according to various examples.
Figure 9B:
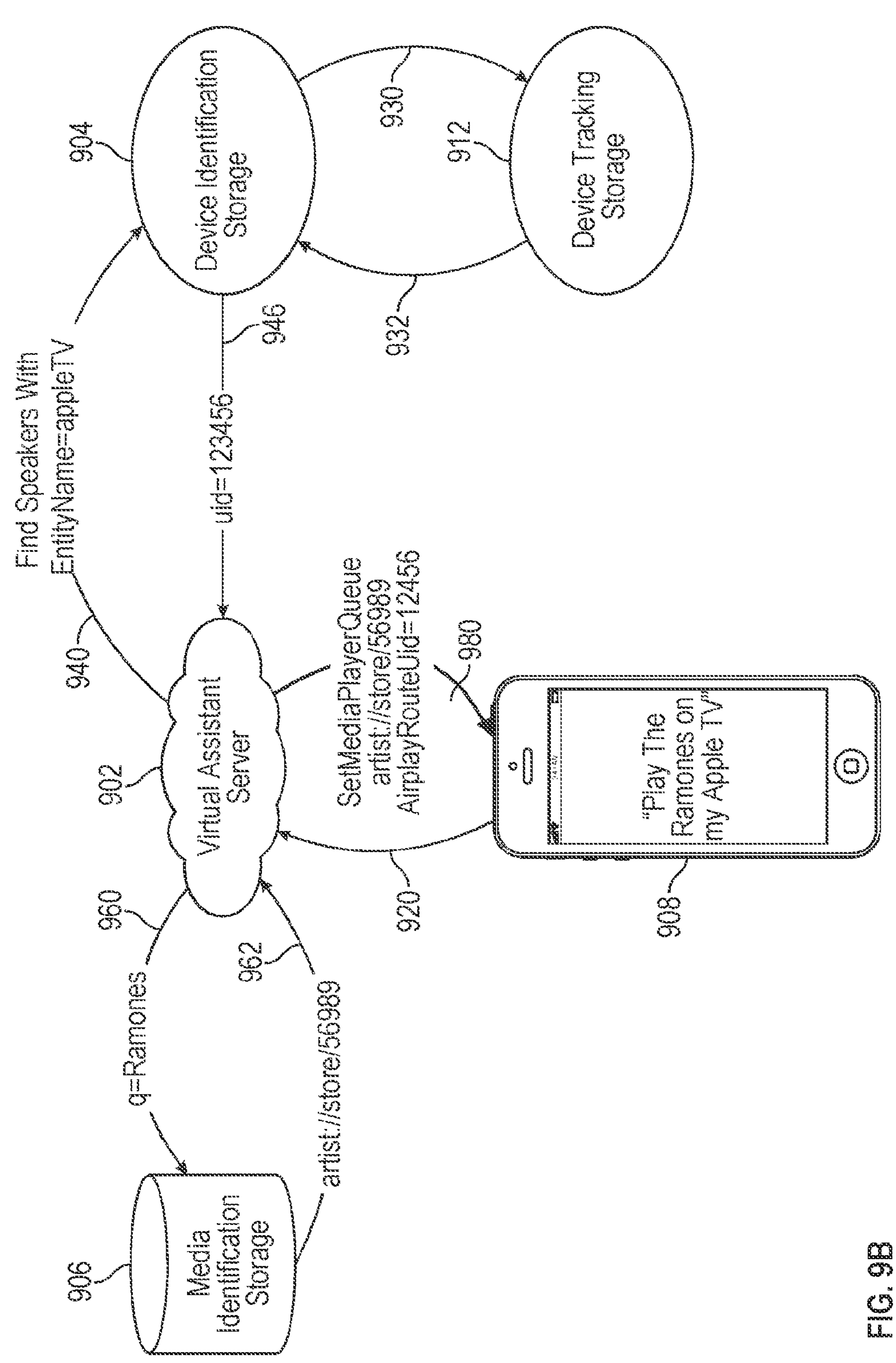
Figure 9C:
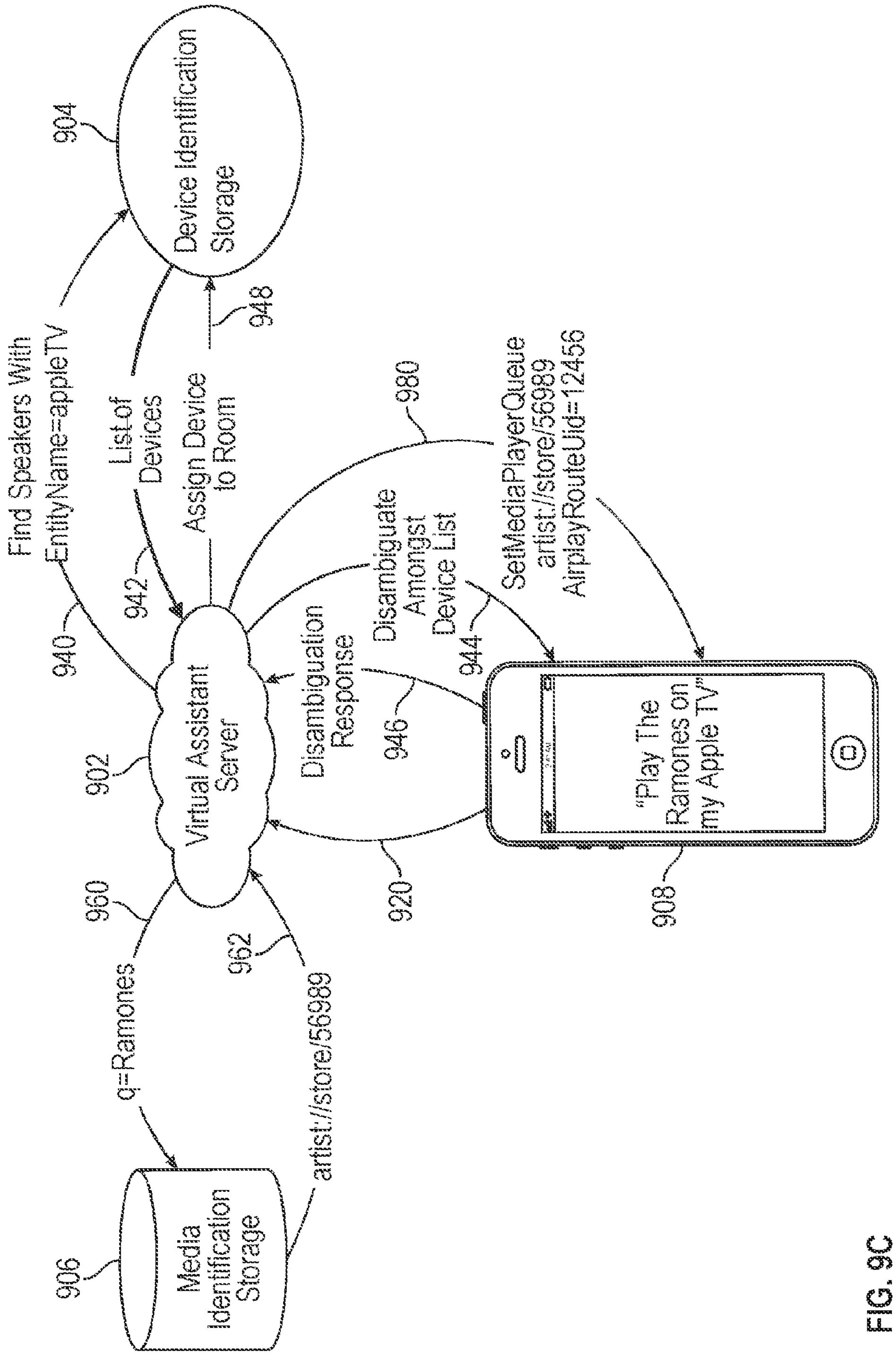

FIGS. 9A-9C illustrate exemplary techniques for intelligent device control in accordance with some embodiment. These figures are also used to illustrate the processes described below, including the processes in FIGS. 11A-E.

FIG. 9A illustrates an exemplary system and environment 900 for controlling electronic devices using a virtual assistant. A first user device 908 and a second user device 910 may be any of devices 104, 122, 200, 400, 600, and 1330 (FIGS. 1, 2A, 3, 4, 5A, 6A-6B, and 13) in some embodiments. In some examples, each of user devices 908 and 910 may be a television, a set-top box, an audio speaker, a mobile phone, a smart watch, a laptop, a desktop computer, a tablet, or a combination thereof. Virtual assistant server 902 may be implemented using any system described herein, such as system 108 of FIG. 1. Each of media identification storage 906 and device identification storage 904 may reside on virtual assistant server 902, the first user device 908, the second user device 910, or any other device or system in communication with virtual assistant server 902.

As illustrated in FIG. 9A, in operation, the first user device 908 receives a user input (e.g., "Play The Ramones in my living room"). In some examples, the user input includes user speech and the first user device 908 receives the user input using a microphone of the first electronic device 908. In some examples, the first electronic device 908 converts the user input into a representation of the audio input. The representation of the audio input may be an analog or digital representation. In some examples, the representation is a textual representation and the first electronic device 908 converts the user input into a textual representation using speech-to-text conversion. The user speech can be converted using any known speech-to-text conversation process.

At 920, the user input, or a representation thereof, is provided (e.g., transmitted) to virtual assistant server 902 by the first electronic device 908 for processing.

Based on the user input, the virtual assistant server 902 identifies one or more tasks and parameters. For instance, virtual assistant server 902 interprets the textual representation of the user's input to derive an intent and operationalizes the intent into one or more tasks. In the depicted example, based on the user input "Play The Ramones in my living room", virtual assistant server 902 identifies the task to be adding one or more media items to a media playback queue at a desired electronic device. The task can be identified in any number of ways. Techniques for identifying tasks can be found, for example, in U.S. Utility application Ser. No. 14/503,105, entitled "Intelligent Assistant for Home Automation", filed Sep. 30, 2014, and U.S. Provisional Patent Application Ser. No. 62/348,015, entitled "Intelligent Automated Assistant in a Home Environment," filed Jun. 9, 2016, the entire disclosures of which are incorporated herein by reference.

Further, virtual assistant server 902 identifies relevant parameters needed to complete the task(s). In some examples, the parameters include an indication of media item(s) to be played, such as song titles and media file names. In some examples, the parameters include an indication of the type of media item(s) to be played, such as audio, video, and text. In some examples, the parameters include an indication of a location of the desired electronic device, such as named locations and configurations associated with a user ("living room", "garage", "upstairs") or GPS coordinates. In some examples, the parameters include an indication of a type of the desired electronic device, such as television, speaker dock, and smart watch. In the depicted example, virtual assistant server 902 identifies the parameters to be "Ramones" and "LivingRoom".

At 940, virtual assistant server 902 transmits a request for identification of one or more user devices to device identification storage 904. The request includes one or more parameters for identifying the one or more user devices. In some examples, the one or more parameters may specify a named location (e.g., "LivingRoom"), a type of device (e.g., "AppleTV"), and/or one or more attributes of a media item, such as the type of the media item (e.g., "audio" and "video").

Device identification storage 904 can store data and/or models for a variety of attributes and relevant information associated with various electronic devices. Attributes that can be stored for an electronic device include, but are not limited to, a unique identifier, a state, a type, a location, media types supported, and ownership. As an example, device identification storage 904 may store information associating a device with a type "AppleTV", a named location "LivingRoom", and supported media types "audio" and "video". As another example, device identification storage 904 may store information associating a device with a type "speaker", a named location "garage", and supported media type "audio".

Device identification storage 904 may be implemented via hardware, software, or a combination thereof. In some examples, device identification storage 904 may reside on one or more of the above-described electronic devices including the first user device 908 and the second user device 910. Device identification storage 904 may reside on the same electronic device(s) that host any of media identification storage 906 and virtual assistant server 902.

At device identification storage 904, one or more user devices are identified based on the parameter(s) provided in the request from virtual assistant server 902. In some examples, device identification storage 804 determines whether any of the electronic devices having an entry in the database has attributes matching the parameter(s). In the depicted example, user device 910 is identified by device identification storage 904 based on the request received at 940. Additional details regarding the identification of electronic devices can be found, for example, in U.S. Utility application Ser. No. 14/503,105, entitled "Intelligent Assistant for Home Automation", filed Sep. 30, 2014, the entire disclosures of which is incorporated herein by reference.

In response to the request for identification of one or more devices, at 942, virtual assistant server 902 receives identification information of the one or more devices. In the depicted example, the identification information includes a unique identifier corresponding to the identified user device 910 (e.g., "uid=123456").

At 960, virtual assistant server 902 transmits a request for identification of one or more media items to media identification storage 906. The request includes one or more parameters allowing for identification of the one or more media items, such as the parameter "Ramones". Media identification storage 906 includes a database relating (e.g., cataloging) a set of media items by one or more attributes, including title, artist, genre, length, and any other relevant information associated with the media items. By way of example, one or more media items are identified based on the parameter "Ramones" at media identification storage 906.

In response to the request for identification of one or more media items, at 962, virtual assistant server 902 receives identification information of the one or more media items identified from media identification storage 906. In some examples, the identification information includes a unique identifier corresponding to the identified one or more media items, such as "artist://store/56989". The unique identifier of the one or more media items can be used to identify, and thereafter access, the one or more identified media items, for instance using one or more application supporting media playback. Media identification storage 906 may reside on any local or remote electronic device(s), such as the same electronic device(s) where virtual assistant server 902 resides. It will be appreciated that while operation at 940 is described as occurring prior to operation at 960, operation corresponding to 960 and 940 may be performed in any chronological order or simultaneously.

At 980, virtual assistant server 902 provides a unified command to the first user device 908. The command includes the identification information of the one or more media items and the identification information of user device 910. In the depicted example in FIG. 9A, the unified command includes a text string "SetMediaPlayerQueue artist://store/56989 AirplayRouteUid=12456". In response to receiving the unified command, at 982, user device 908 causes playback of the identified one or more media items (e.g., media pertaining to the Ramones) at the identified user device (e.g., second user device 910, implemented as a television). In some examples, the first user device 908 transmits the relevant information derived from the unified command to the second user device 910.

With reference to FIG. 9B, in some examples, device identification storage 904 provides (e.g., generates) and/or updates entries in its database of electronic devices by communicating with device tracking storage 912. Device tracking storage 912 provides for the discovery of electronic devices having certain attributes and communicates with device identification storage 904 to update the database of device identification storage 904. Device tracking storage 912 may be implemented via hardware, software, or a combination thereof. Furthermore, device tracking storage 912 may reside on any of the electronic devices described herein, such as first user device 908 or second user device 910. Device tracking storage 912 may reside on the same electronic device(s) that host any of media identification storage 906, virtual assistant server 902, device identification storage 904, or any device or system in communication with device identification storage 904.

In some examples, device identification storage 904 provides and/or updates entries for electronic devices in its database in response to a user input (e.g., "Play the Ramones on my Apple TV"). As illustrated in FIG. 9B, in response to receiving a request for identification of one or more user devices (940), device identification storage 904 communicates with device tracking storage 912 at 930 to cause discovery of all electronic devices having one or more attributes as specified in or derived from the request. In some examples, discovery of devices is performed responsive to the device identification storage 904 failing to identify a device having parameters matching those provided in the request from virtual assistant server 902. At 932, device tracking storage 912 passes a list of newly discovered electronic devices to device identification storage 904. Based on the discovered electronic devices and the corresponding attributes, device identification storage 904 updates the relevant entries in its database. In some examples, data corresponding to the discovered electronic devices and the corresponding attributes is at least partially cached, either at device tracking storage 912 or device identification storage 904, for a period of time (e.g., a few minutes).

In some examples, device identification storage 904 automatically and/or periodically provides and/or updates entries for electronic devices in its database. For example, device tracking storage 912 can facilitate a discovery of electronic devices without a request from virtual assistant server 902 and without any communication from device identification storage 904.

In some examples, after sending a request to device identification storage 904 at 940, virtual assistant server 902 receives identification information that requires input from the user. In one example, user input is required in response to device identification storage 904 having identified multiple user devices corresponding to the parameters of the request. As such, the user is prompted to provide a disambiguation input by, in some instances, selecting a device out of the multiple identified user devices. As another example, user input is required to authenticate devices which are, for instance, discovered in response to the device identification storage 904 failing to identify devices matching parameters of a request.

As illustrated in FIG. 9C, virtual assistant server 902 receives identification information of multiple identified electronic devices from device identification storage 904 at 942. At 944, virtual assistant server 902 provides (e.g., transmits) the identification information to user device 908 for user disambiguation. Accordingly, the user device 908 presents (e.g., displays) a list of the multiple identified electronic devices to the user and prompts the user to provide an input including a selection of a device from the list. In some examples, the device list includes differentiating attributes of the devices, such as color and model.

An indication of the selected device is transmitted from user device 908 to virtual assistant server 902 at 946. Based on the received data, virtual assistant server 902 generates a unified command and provides the command to user device 908 at 980. The command includes identification information of one or more media items and identification information of the device selected by the user. As an example, in FIG. 9C, the command is a text string "SetMediaPlayerQueue artist://store/56989 AirplayRouteUid=12456".

In some examples, virtual assistant server 902 receives identification information of one or more electronic device that requires user authentication. As discussed above, device identification storage 904 may fail to identify user devices with attributes matching the parameters in a request provided by virtual assistant server 902 and, in response, may identify devices by way of discovery. The virtual assistant server 902 provides (e.g., transmits) identification information of devices identified in this manner to user device 908 for user authentication.

At user device 908, the user is prompted to authenticate the candidate device and/or provide relevant information to be associated with the candidate device. For example, the user may be prompted with an output (e.g., audio output) "Is this speaker in your living room?" In response, user device 908 receives an input from the user confirming or rejecting the candidate device and transmits data corresponding to the user's input to virtual assistant server 902. If the user confirms the candidate device, virtual assistant server 902 generates a unified command accordingly and provides the command to user device 908, as described. If the user rejects the candidate device, user device 908 outputs an error message, and, in some instances, communicates the user's rejection of candidate device to virtual assistant server 902.

In some examples, the database of device identification storage 904 is updated in response to the user's input at user device 908. The virtual assistant server 902 can, for instance, receive the user's input and, in response, cause the device identification storage 904 to update the database of electronic devices. By way of example, virtual assistant server 902 receives a disambiguation response at 946 and, at 948, cause entry of the user-selected device to be created and/or updated at the database of device identification storage 904. For example, the user-selected device is thereafter associated with an existing configuration (e.g., the "living room" configuration) based on the user input. Additional details regarding the creation and management of configurations can be found, for example, in U.S. Utility application Ser. No. 14/503,105, entitled "Intelligent Assistant for Home Automation", filed Sep. 30, 2014, the entire disclosures of which are incorporated herein by reference.

6. Processes for Intelligent Device Arbitration

Figure 10A:
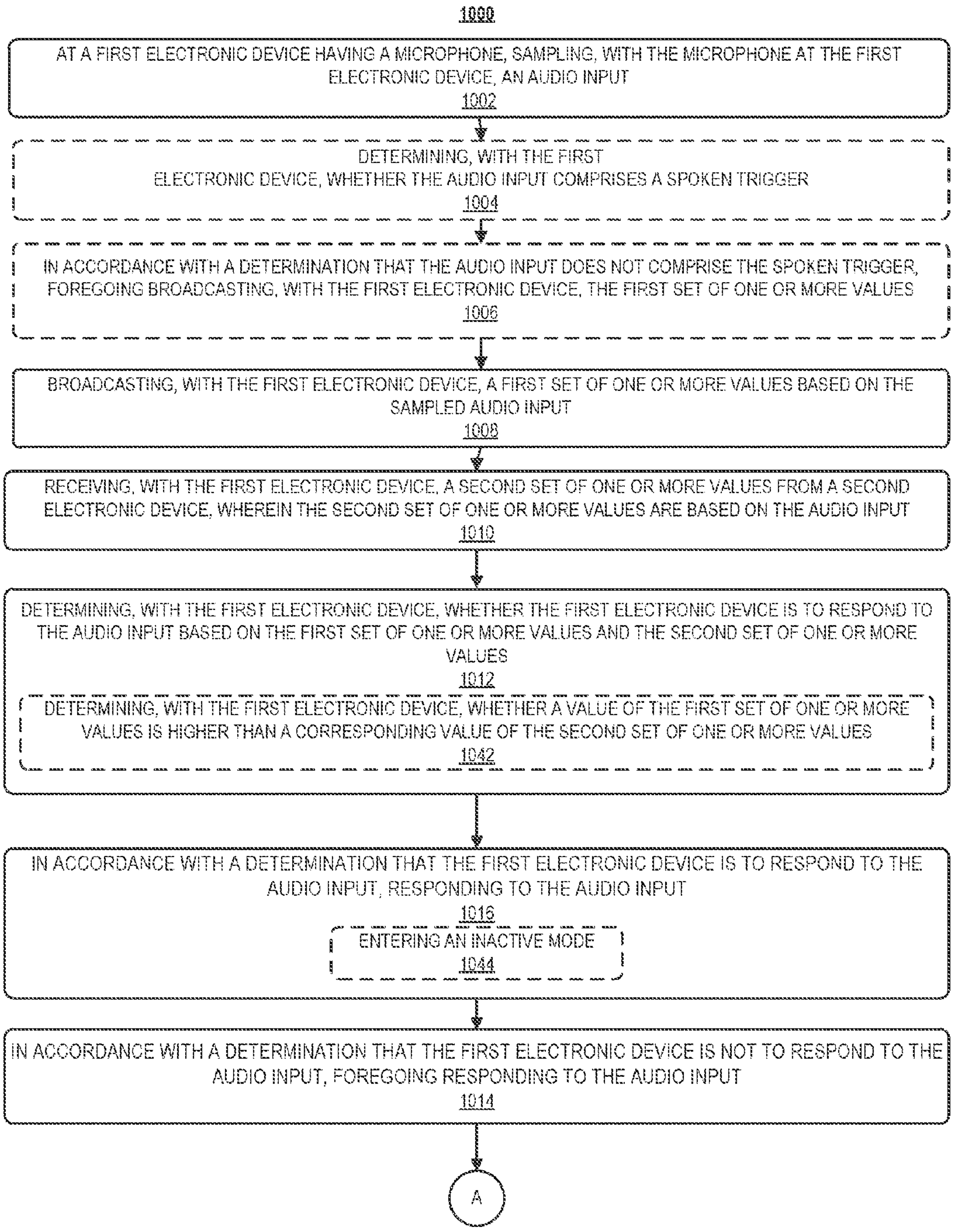
Figure 10B:
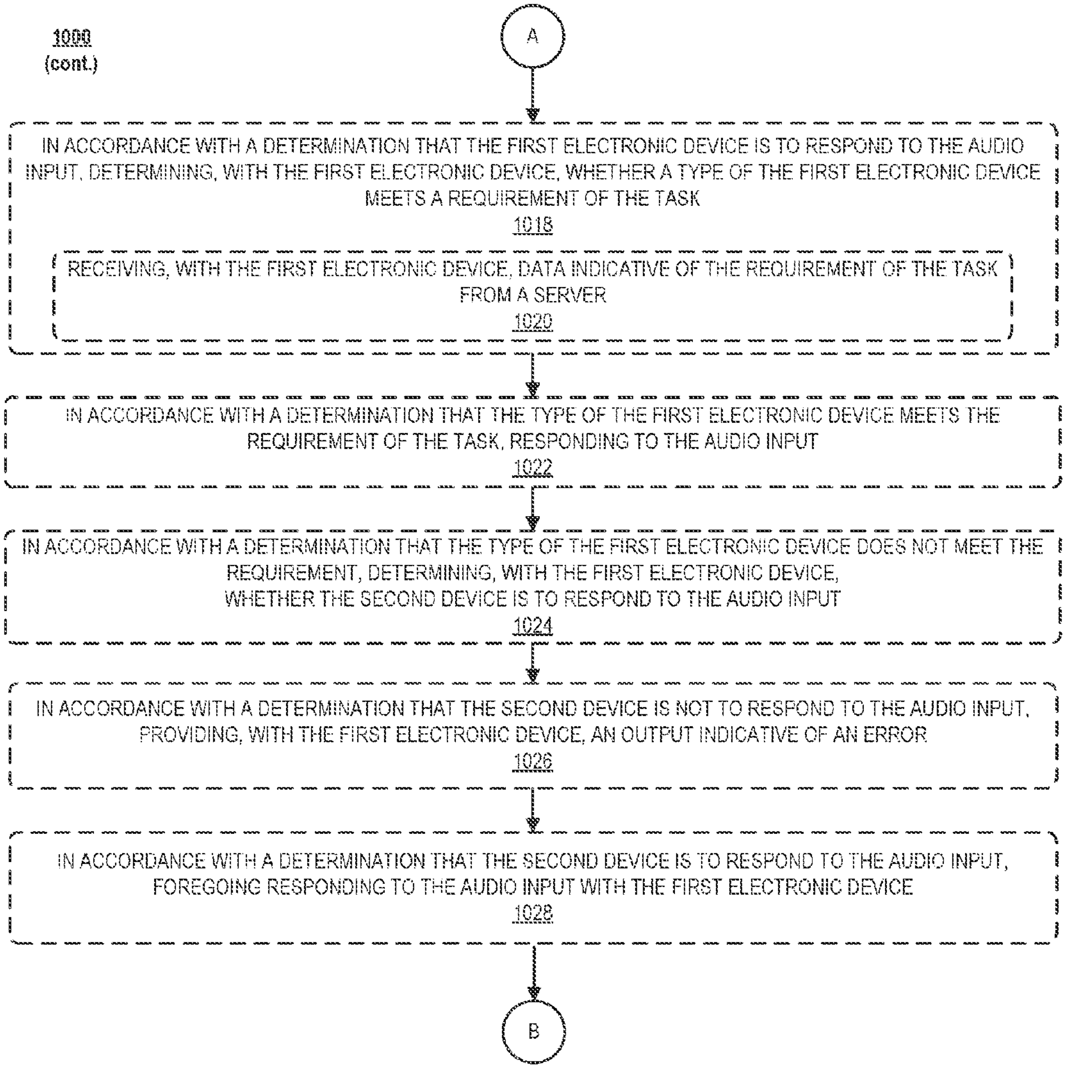

FIGS. 10A-C illustrate process 1000 for operating a digital assistant according to various examples. Process 1000 is performed, for example, using one or more electronic devices (e.g., devices 104, 106, 200, 400, or 600) implementing a digital assistant. In some examples, the processes are performed at a client-server system (e.g., system 100) implementing a digital assistant. The blocks of the processes can be divided up in any manner between the server (e.g., DA server 106) and the client (e.g., user device 104). In process 1000, some blocks are, optionally, combined, the order of some blocks is, optionally, changed, and some blocks are, optionally, omitted. In some examples, only a subset of the features or blocks described below with reference to FIGS. 10A-C is performed.

As described below, method 1000 provides an efficient way for arbitrating among multiple devices for responding a user input. The method reduces the cognitive burden on a user for managing multiple devices, thereby creating a more efficient human-machine interface. For battery-operated computing devices, enabling a user to reach the completion of tasks more efficiently conserves power and increases the time between battery charges.

At block 1002, a first electronic device having a microphone samples an audio input. In some examples, the audio input can be received via a microphone (e.g., microphone 213) of the electronic device. The received audio input can be processed (e.g., using audio circuitry 210 or processor(s) 220) and converted into a representative form such as, for example, an electronic signal (digital or analog) or one or more audio files.

At block 1008, the first electronic device broadcasts a first set of one or more values based on the sampled audio input. In some examples, a value of the first set of values is based on a signal to noise ratio of speech of the audio input sampled with the first electronic device. In some examples, a value of the first set of values is based on a sound pressure of the audio input sampled with the first electronic device. In some examples, the first electronic device identifies a confidence value indicative of a likelihood that the audio input was provided by a particular user, and a value of the first set of values is based on the confidence value. In some examples, the first electronic device identifies a state of the first electronic device, and a value of the first set of values is based on the identified state of the first electronic device. In some examples, the state of the first electronic device is identified based on a user input received with the first electronic device. In some examples, at least one value of the first set of one or more values is based on a type of the first electronic device.

At block 1004, the first electronic device optionally determines whether the audio input comprises a spoken trigger (e.g., "Hey Siri"). At block 1006, in accordance with a determination that the audio input does not comprise the spoken trigger, the first electronic device foregoes broadcasting the first set of one or more values.

At block 1010, the first electronic device receives a second set of one or more values from a second electronic device. The second set of one or more values is based on the audio input sampled at the second electronic device.

At block 1012, the first electronic device determines whether the first electronic device is to respond to the audio input based on the first set of one or more values and the second set of one or more values. In some examples, the first electronic device determines whether the first electronic device is to respond to the audio input by determining whether a value of the first set of one or more values is higher than a corresponding value of the second set of one or more values, at block 1042.

At block 1014, in accordance with a determination that the first electronic device is to respond to the audio input, the first electronic device responds to the audio input. In some examples, the audio input comprises an additional input indicative of a task. At block 1018 (FIG. 10B), the first electronic device additionally determines whether a type of the first electronic device meets a requirement of the task. At block 1020, the first electronic device optionally receives data indicative of the requirement of the task from a server.

At block 1022, in accordance with a determination that the type of the first electronic device meets the requirement of the task, the first electronic device responds to the audio input. At block 1024, in accordance with a determination that the type of the first electronic device does not meet the requirement of the task, the first electronic device may forego responding to the audio input, or optionally, makes an additional determination of whether the second device is to respond to the audio input. At block 1026, in accordance with a determination that the second device is to respond to the audio input, the first electronic device foregoes responding to the audio input with the first electronic device. At block 1028, in accordance with a determination that the second device is not to respond to the audio input, the first electronic device provides an output indicative of an error.

At block 1016 (FIG. 10A), in accordance with a determination that the first electronic device is not to respond to the audio input, the first electronic device foregoes responding to the audio input. In some examples, the audio input comprises an additional input indicative of a task. In block 1030 (FIG. 10C), the first electronic device optionally determines whether a type of the first electronic device meets a requirement of the task. At block 1032, the first electronic device optionally receives data indicative of the requirement of the task from a server.

At block 1034, in accordance with a determination that the type of the first electronic device meets the requirement of the task, the first electronic device determines whether to respond to the audio input with the first electronic device based on the first set of one or more values, the second set of one or more values, and the requirement of the task. At block 1036, in accordance with a determination to respond to the audio input with the first electronic device, the first electronic device responds to the audio input with the first electronic device. At block 1038, in accordance with a determination to not respond to the audio input with the first electronic device, the first electronic device foregoes responding to the audio input with the first electronic device.

At block 1040, in accordance with a determination that the type of the first electronic device does not meet the requirement of the task, the first electronic device foregoes responding to the audio input with the first electronic device. In some examples, foregoing responding to the audio input with the first electronic device comprises entering an inactive mode, as illustrated in block 1044.

In some examples, the first set of one or more values is broadcasted in accordance with a unidirectional broadcast communications protocol, such as BTLE advertising mode.

In some examples, in accordance with the determination that the first electronic device is to respond to the audio input, the first electronic device provides a visual output, an auditory output, a haptic output, or a combination thereof.

7. Processes for Intelligent Device Control

FIGS. 11A-E illustrate process 1100 for operating a digital assistant according to various examples. Process 1100 is performed, for example, using one or more electronic devices (e.g., devices 104, 106, 200, 400, 600, 1300, 1330, or 1360) implementing a digital assistant. In some examples, the processes are performed at a client-server system (e.g., system 100) implementing a digital assistant. The blocks of the processes can be divided up in any manner between the server (e.g., DA server 106) and the client (e.g., user device 104). In process 1100, some blocks are, optionally, combined, the order of some blocks is, optionally, changed, and some blocks are, optionally, omitted. In some examples, only a subset of the features or blocks described below with reference to FIGS. 11A-E is performed.

As described below, method 1100 provides an efficient way for controlling one among multiple devices for responding a user input. The method reduces the cognitive burden on a user for managing multiple devices, thereby creating a more efficient human-machine interface. For battery-operated computing devices, enabling a user to reach the completion of tasks more efficiently conserves power and increases the time between battery charges.

At block 1102, an electronic device receives data corresponding to an audio input from a first user device.

At block 1104, the electronic device obtains an identification of a second user device based on the data corresponding to the audio input. In some examples, the electronic device is a first electronic device and communicates with a second electronic device to obtain the identification of the second user device. In some examples, the second electronic device is the first user device (e.g., implemented using the same hardware).

Optionally, at block 1106, the first electronic device identifies a task and a parameter based on the data corresponding to the audio input. At block 1108, the first electronic device transmits to a second electronic device a request, wherein the request includes the parameter identifying a user device to perform the task.

At block 1110, the second electronic device receives the request including the parameter. At block 1112, the second electronic device, in response to receiving the request, discovers one or more user devices. Optionally at block 1113, the second electronic device discovers a user device associated with an indication of a named location of a user. At block 1114, the second electronic device updates a record based on attributes of the one or more discovered user devices. The record stores a plurality of sets of attributes respectively corresponding to a plurality of user devices. At block 1116, the second electronic device caches attributes of the discovered one or more user devices. In some examples, the steps in blocks 1112-1116 are automatically and/or periodically performed without any request from the first electronic device. At block 1118, the second electronic device obtains data from the record. In some examples, a user device of the plurality of user devices is a computer, a television, a set-top box, an audio speaker, or a phone. At block 1120 (FIG. 11B), the second electronic device determines the identification of the second user device based on the parameter, where the second user device is part of the plurality of user devices. In some examples, the second electronic device determines the identification of the second user device by determining whether at least one attribute of the second user device matches the parameter, at block 1121. At block 1122, the second electronic device transmits the identification of the second user device to the first electronic device.

At block 1124, the first electronic device receives the identification of the second user device from the second electronic device. In some examples, the parameter includes an indication of a named location of a user. In some examples, the parameter includes an indication of a type of a device. In some examples, the parameter includes one or more attributes of the one or more media items.

Optionally, at block 1126, the first electronic device identifies a task and a parameter based on the data corresponding to the audio input. At block 1132, the first electronic device receives a plurality of identifications corresponding to a plurality of user devices from the second electronic device. In some examples, the obtaining of the plurality of identifications at the second electronic device is similar to the steps described with respect to blocks 1108-1122. At block 1134, the first electronic device transmits the plurality of identifications corresponding to the plurality of user devices to the first user device. At block 1136, the first user device receives the plurality of identifications corresponding to the plurality of user devices. At block 1138, the first user device presents the plurality of user devices as selectable options. At block 1140 (FIG. 11C), the first user device receives an input representing the selection of the particular user device of the plurality of user devices. At block 1142, the first user device transmits the data corresponding to the selection of the particular user device to the first electronic device. In some examples, each of the plurality of user devices has an attribute matching the parameter.

At block 1144, the first electronic device receives data corresponding to a selection of a particular user device of the plurality of the user devices from the first user device. At block 1146, the first electronic device obtains the identification of the second user device based on the received data corresponding to the selection of the particular user device of the plurality of the user devices.

Optionally, at block 1148, the first electronic device identifies a task and a parameter based on the data corresponding to the audio input. At block 1150, the second electronic device receives a request for identification of a user device from the first electronic device, wherein the request includes the parameter. At block 1152, the second electronic device obtains data from a record, wherein the record stores a plurality of sets of attributes respectively corresponding to a plurality of user devices. At block 1154 (FIG. 11D), the second electronic device obtains data corresponding to the candidate user device based on the parameter, wherein the candidate user device is not part of the plurality of user devices stored in the record. In some examples, obtaining the data corresponding to the candidate user device based on the parameter at block 1193 further comprises determining, with the second electronic device, that no device of the plurality of user devices has an attribute matching with the parameter at block 1151, and discovering, with the second electronic device, the candidate user device. The candidate user device has an attribute matching the parameter at block 1153. At block 1156, the second electronic device transmits data corresponding to the candidate user device to the first electronic device.

At block 1158, the first electronic device receives data corresponding to a candidate user device from a second electronic device. At block 1160, the first electronic device transmits the data corresponding to the candidate user device to the first user device. At block 1162, the first user device receives the data corresponding to the candidate user device. At block 1164, the first user device presents the candidate user device as a confirmable option. At block 1166, the first user device receives an input representing the confirmation of the candidate user device. At block 1168 (FIG. 11E), the first user device transmits data corresponding to the confirmation of the candidate user device to the first electronic device. In some examples, the first user device receives a rejection of the candidate user device at block 1171. In response, the first user device presents an output indicative of an error at block 1173.

At block 1170, the first electronic device receives data corresponding to a confirmation of the candidate user device from the first user device. At block 1172, the first electronic device, in response to receiving the data corresponding to the confirmation, obtains the identification of the second user device by obtaining an identification of the candidate user device. In some examples, the second electronic device receives the data corresponding to the confirmation of the candidate user device to the first electronic device at block 1171 and, in response to receiving the data corresponding to the confirmation, updates the record at block 1173.

At block 1174, the electronic device obtains an identification of a media item based on the data corresponding to the audio input. Optionally, at block 1176, the first electronic device identifies a task and a parameter based on the data corresponding to the audio input. Optionally, at block 1178, the first electronic device transmits a request to a database, wherein the request includes the parameter identifying one or more media items. Optionally, at block 1180, the first electronic device receives the identification of the one or more media items from the database. In some examples, the identification of the media item includes a unique identifier of the one or more media items.

Figure 12:
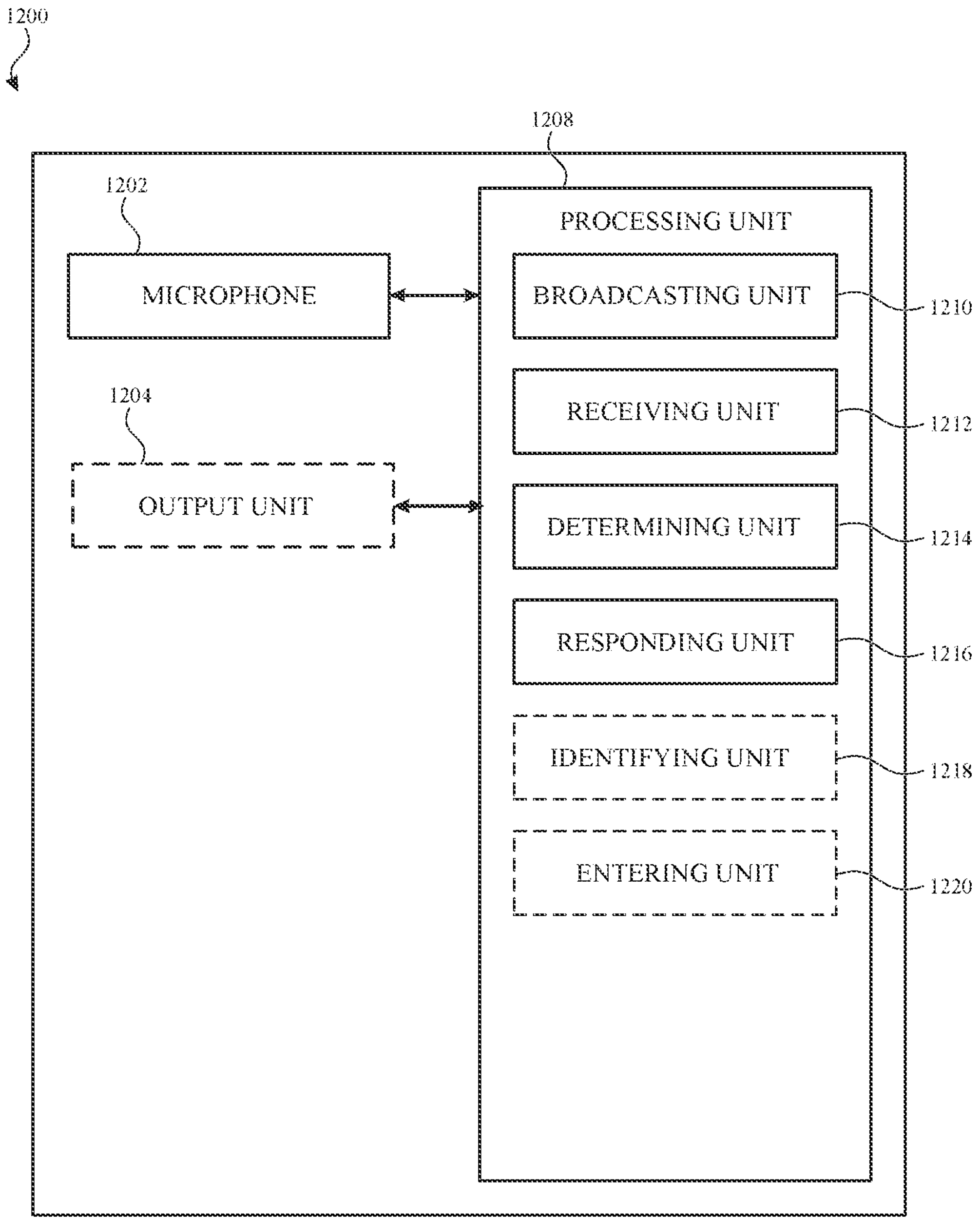
FIG. 12 illustrates a functional block diagram of an electronic device according to various examples.

In accordance with some embodiments, FIG. 12 shows a functional block diagram of an electronic device 1200 configured in accordance with the principles of the various described embodiments, including those described with reference to FIGS. 8A-C and 10A-C. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a microphone unit 1202, optionally an output unit 1204, and a processing unit 1208 coupled to the microphone unit 1202 and optionally the output unit 1204. In some embodiments, the processing unit 1208 includes a broadcasting unit 1210, a receiving unit 1212, a determining unit 1214, a responding unit 1216, and optionally, identifying unit 1218 and entering unit 1220.

In some examples, the processing unit 1208 is configured to: sample (e.g., with the microphone unit 1210) an audio input (e.g., block 1002 of FIG. 10A); broadcast (e.g., with the broadcasting unit 1210) a first set of one or more values based on the sampled audio input (e.g., block 1008 of FIG. 10A); receive (e.g., with the receiving unit 1212) a second set of one or more values from a second electronic device, wherein the second set of one or more values are based on the audio input (e.g., block 1010 of FIG. 10A); determine (e.g., with the determining unit 1214) whether the electronic device is to respond to the audio input based on the first set of one or more values and the second set of one or more values (e.g., block 1012 of FIG. 10A); in accordance with a determination that the electronic device is to respond to the audio input, respond (e.g., with the responding unit 1216) to the audio input (e.g., block 1014 of FIG. 10A); and in accordance with a determination that the electronic device is not to respond to the audio input, forego responding (e.g., with the responding unit 1216) to the audio input (e.g., block 1016 of FIG. 10A).

In some examples, a value of the first set of values is based on a signal to noise ratio of speech of the audio input sampled with the electronic device 1200.

In some examples, a value of the first set of values is based on a sound pressure of the audio input sampled with the electronic device 1200.

In some examples, the processing unit 1208 is further configured to identify (e.g., using the identifying unit 1218) a confidence value indicative of a likelihood that the audio input was provided by a particular user, and a value of the first set of values is based on the confidence value.

In some examples, the processing unit 1208 is further configured to identify (e.g., using the identifying unit 1218) a state of the electronic device 1200, and a value of the first set of values is based on the identified state of the electronic device 1200.

In some examples, the state of the electronic device 1200 is identified based on a user input received with the electronic device 1200.

In some examples, at least one value of the first set of one or more values is based on a type of the electronic device 1200.

In some examples, sampling the audio input comprises determining (e.g., with determining unit 1214) whether the audio input comprises a spoken trigger (e.g., block 1004 of FIG. 10A). The processing unit 1208 is further configured to: in accordance with a determination that the audio input does not comprise the spoken trigger, forego broadcasting (e.g., with the broadcasting unit 1210) the first set of one or more values.

In some examples, the audio input comprises an additional input indicative of a task, and responding to the audio input with the electronic device 1200 further comprises: determining (e.g., with the determining unit 1214) whether a type of the electronic device meets a requirement of the task (e.g., block 1018 of FIG. 10B); in accordance with a determination that the type of the electronic device meets the requirement of the task, respond (e.g., with the responding unit 1216) to the audio input (e.g., block 1022 of FIG. 10B); in accordance with a determination that the type of the electronic device does not meet the requirement of the task, forego responding (e.g., with the responding unit 1216) to the audio input (e.g., block 1024 of FIG. 10B).

In some examples, the processing unit 1208 is further configured to: in accordance with the determination that the type of the electronic device does not meet the requirement, determine (e.g., with the determining unit 1214) whether the second device is to respond to the audio input (e.g., block 1024 of FIG. 10B); in accordance with a determination that the second device is to respond to the audio input, forego responding (e.g., with the responding unit 1216) to the audio input with the electronic device (e.g., block 1028 of FIG. 10B); in accordance with a determination that the second device is not to respond to the audio input, provide (e.g., with the output unit 1204) an output indicative of an error (e.g., block 1026 of FIG. 10B).

In some examples, the processing unit 1208 is further configured to: receive (e.g., with the receiving unit 1212) data indicative of the requirement of the task from a server (e.g., block 1020 of FIG. 10B).

In some examples, the audio input comprises an additional input indicative of a task, and foregoing responding to the audio input with the electronic device further comprises: determining (e.g., with determining unit 1214) whether a type of the electronic device meets a requirement of the task (e.g., block 1030 of FIG. 10C); in accordance with a determination that the type of the electronic device meets the requirement of the task, determining (e.g., with determining unit 1214) whether to respond to the audio input with the electronic device based on the first set of one or more values, the second set of one or more values, and the requirement of the task (e.g., block 1034 of FIG. 10C); in accordance with a determination to respond to the audio input with the electronic device, responding (e.g., with responding unit 1216) to the audio input with the electronic device (e.g., block 1036 of FIG. 10C); and in accordance with a determination to not respond to the audio input with the electronic device, foregoing responding (e.g., with responding unit 1216) to the audio input with the electronic device (e.g., block 1038 of FIG. 10C); and in accordance with a determination that the type of the electronic device does not meet the requirement of the task, foregoing responding (e.g., with responding unit 1216) to the audio input with the electronic device (e.g., block 1040 of FIG. 10C).

In some examples, the processing unit 1208 is further configured to: receive (e.g., with the receiving unit 1212) data indicative of the requirement of the task from a server (e.g., block 1032 of FIG. 10C).

In some examples, foregoing responding to the audio input with the electronic device 1200 comprises entering (e.g., with entering unit 1220) an inactive mode (e.g., block 1044 of FIG. 10A).

In some examples, the first set of one or more values is broadcasted in accordance with a unidirectional broadcast communications protocol.

In some examples, the processing unit 1208 is further configured to: in accordance with the determination that the electronic device is to respond to the audio input, provide (e.g., with the output unit 1204) a visual output, an auditory output, a haptic output, or a combination thereof.

In some examples, determining whether the electronic device is to respond to the audio input comprises: determining (e.g., with determining unit 1214) whether a value of the first set of one or more values is higher than a corresponding value of the second set of one or more values (e.g., block 1042 of FIG. 10A).

The operations described above with respect to FIG. 10A-C are, optionally, implemented by components depicted in FIGS. 1-4, 6A-B, 7A, and 12. For example, sampling operation 1002, determining operation 1004, broadcasting operation 1006, and receiving operation 1010 are optionally implemented by processor(s) 120. It would be clear to a person of ordinary skill in the art how other processes can be implemented based on the components depicted in FIGS. 1-4, 6A-B, 7A, and 12.

Figure 13:
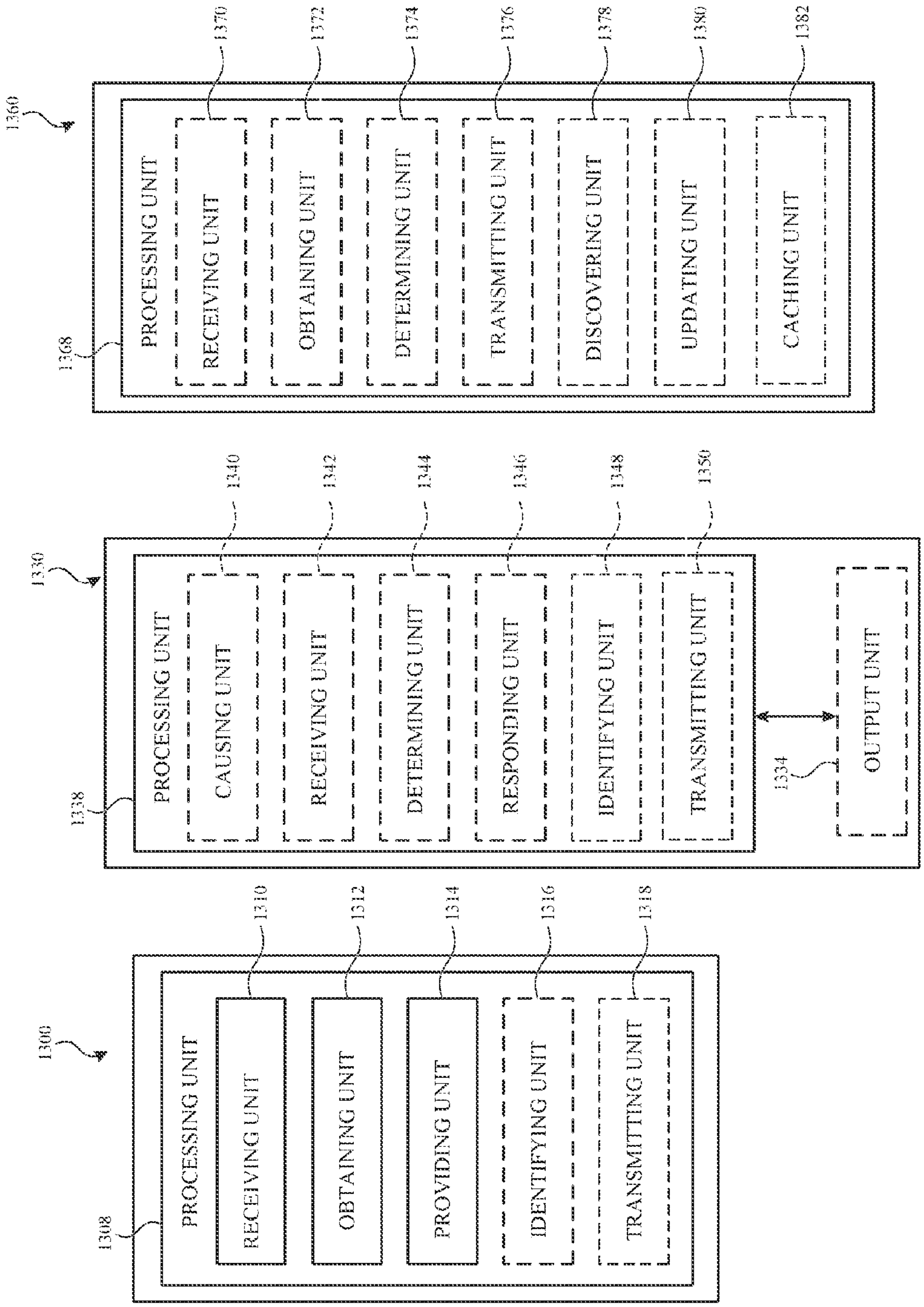
FIG. 13 illustrates functional block diagrams of electronic devices of a system according to various examples.

In accordance with some embodiments, FIG. 13 shows a functional block diagram of a system comprising a first electronic device 1300, a first user device 1330, and a second electronic device 1360, at least one of which is configured in accordance with the principles of the various described embodiments, including those described with reference to FIGS. 9A-C and 11A-E. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, a first electronic device 1300 includes a first processing unit 1308. In some embodiments, the processing unit 1308 includes a receiving unit 1310, an obtaining unit 1312, a providing unit 1314, and optionally, an identifying unit 1316 and a transmitting unit 1318. A first user device 1330 includes a second processing unit 1338 optionally coupled to an optional output unit. The second processing unit 1338 optionally includes a causing unit 1340, a receiving unit 1342, a determining unit 1344, a responding unit 1346, an identifying unit 1348, and a transmitting unit 1350. A second electronic device 1360 includes a third processing unit 1368. The third processing unit 1368 optionally includes a receiving unit 1370, an obtaining unit 1372, a determining unit 1374, a transmitting unit 1376, a discovering unit 1378, an updating unit 1380, and a caching unit 1382.

Figure 11A:
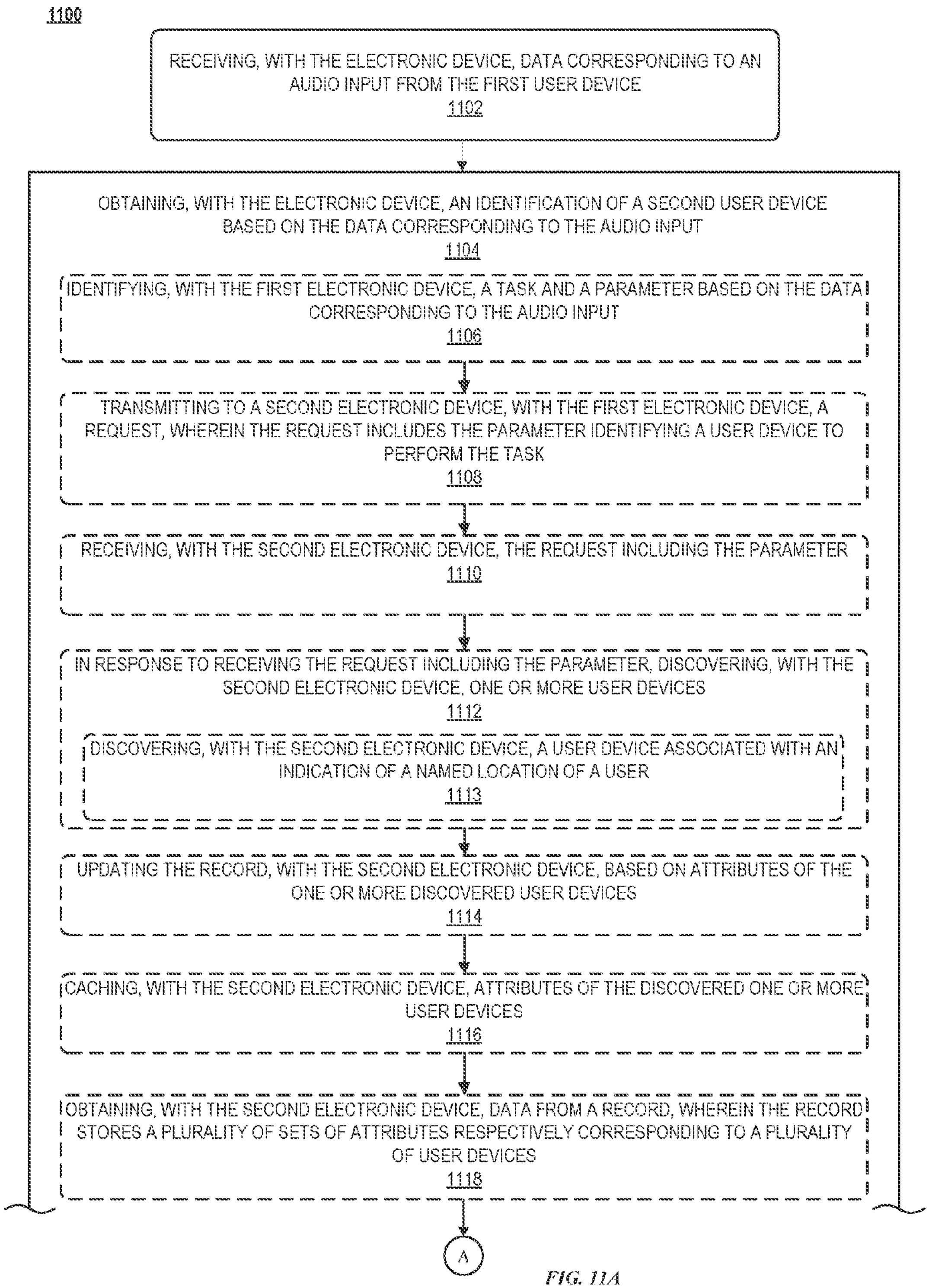
FIGS. 11A-E illustrate an exemplary process for device control according to various examples.
Figure 11B:
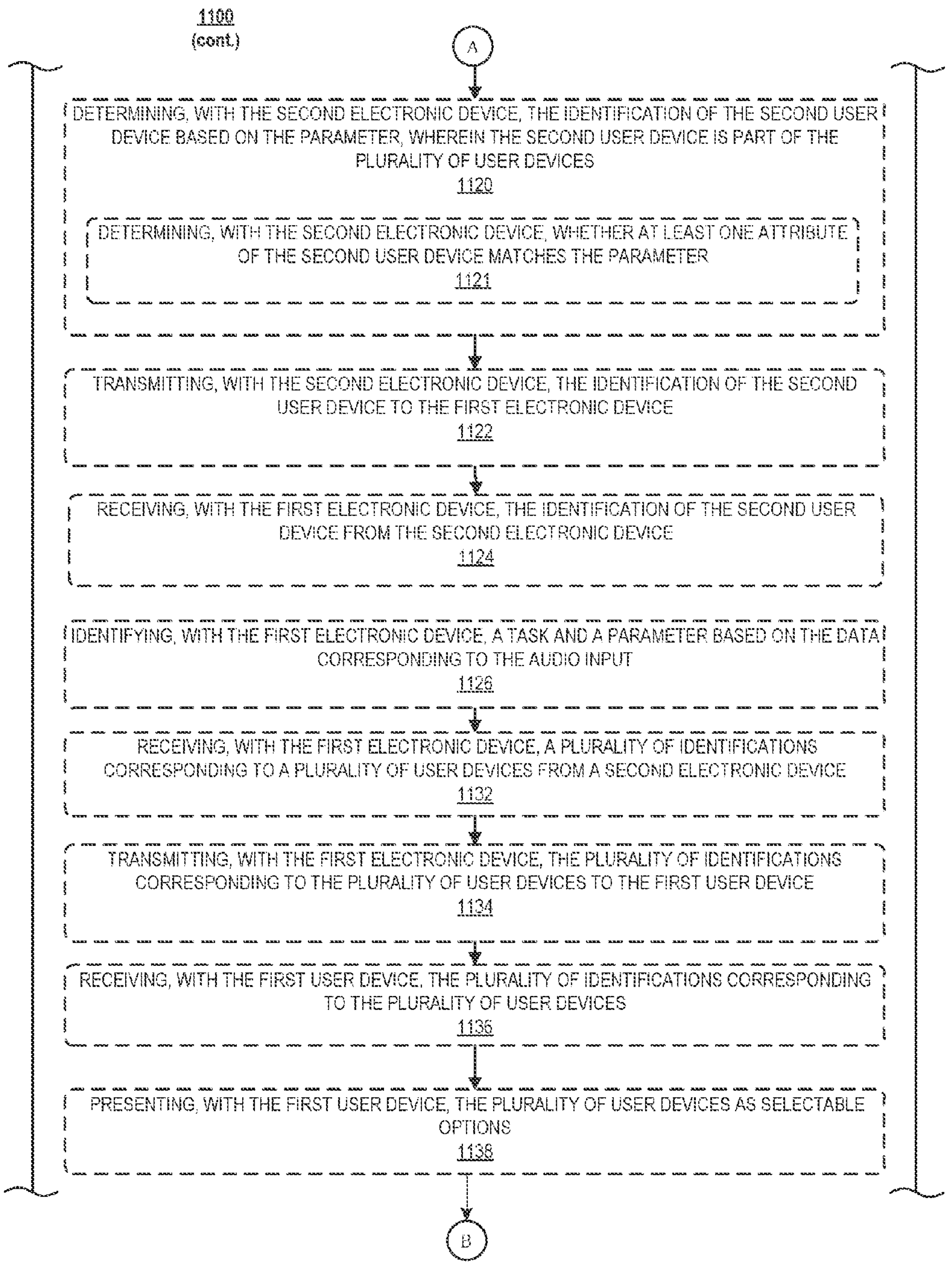
Figure 11C:
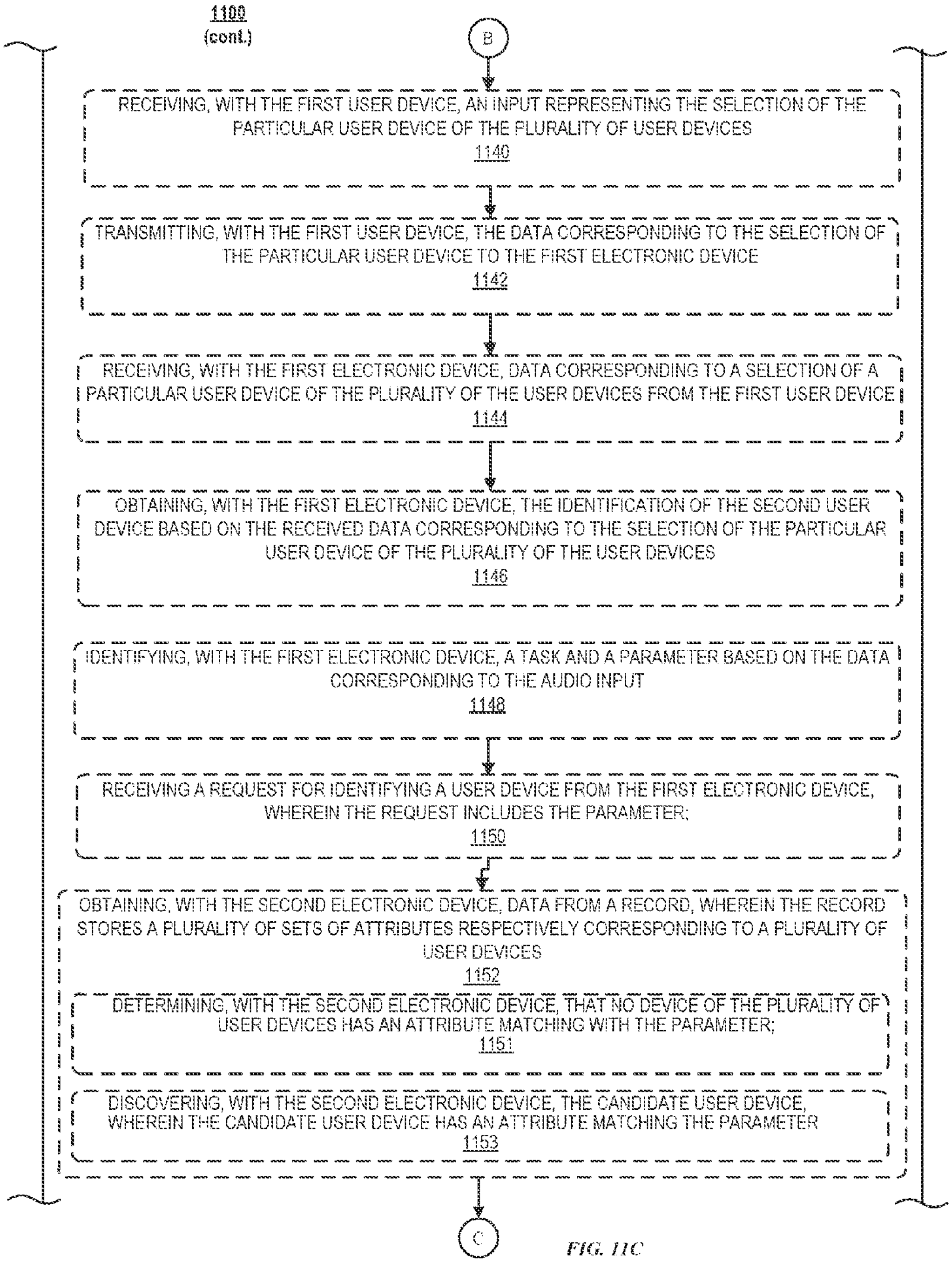
Figure 11D:
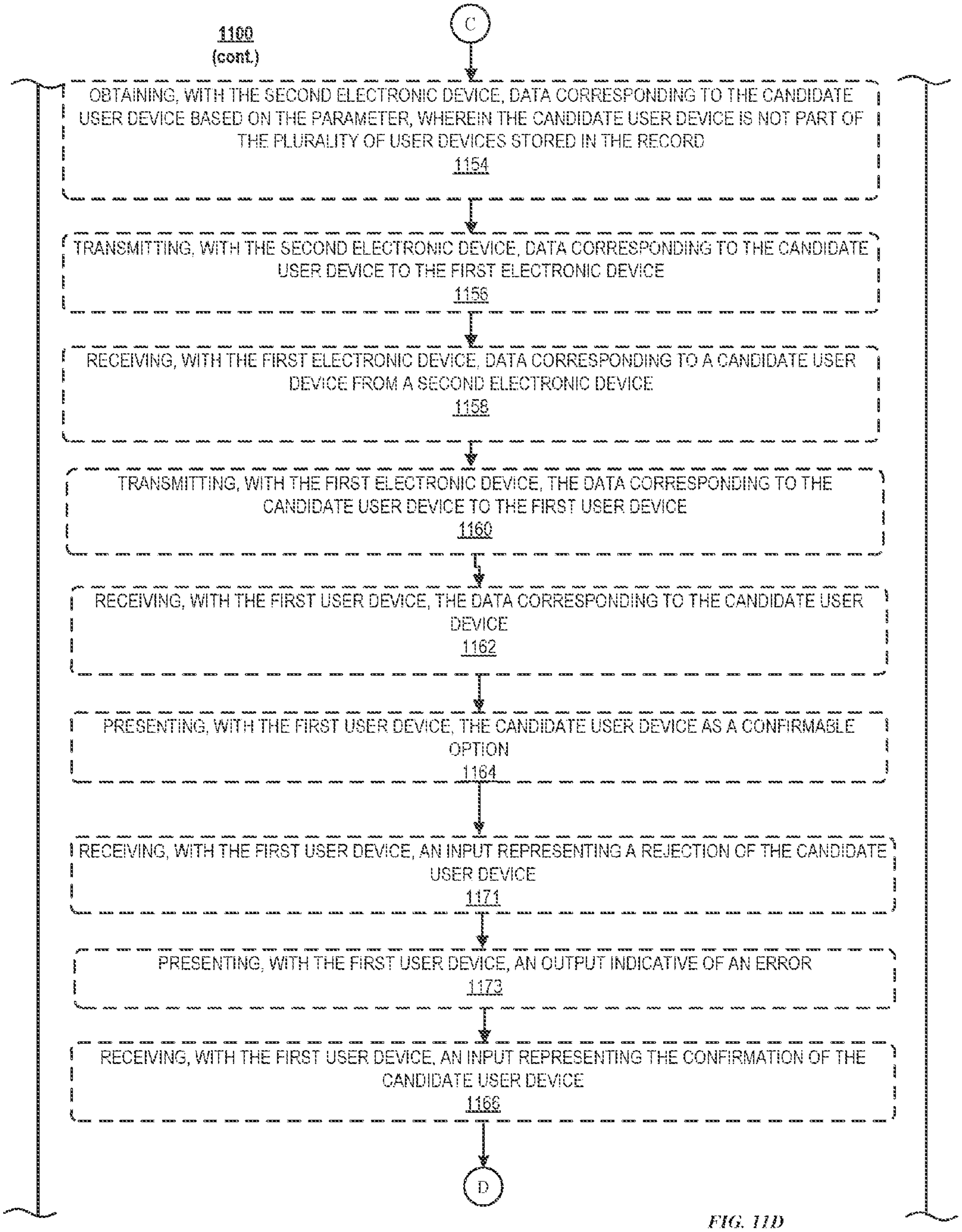
Figure 11E:
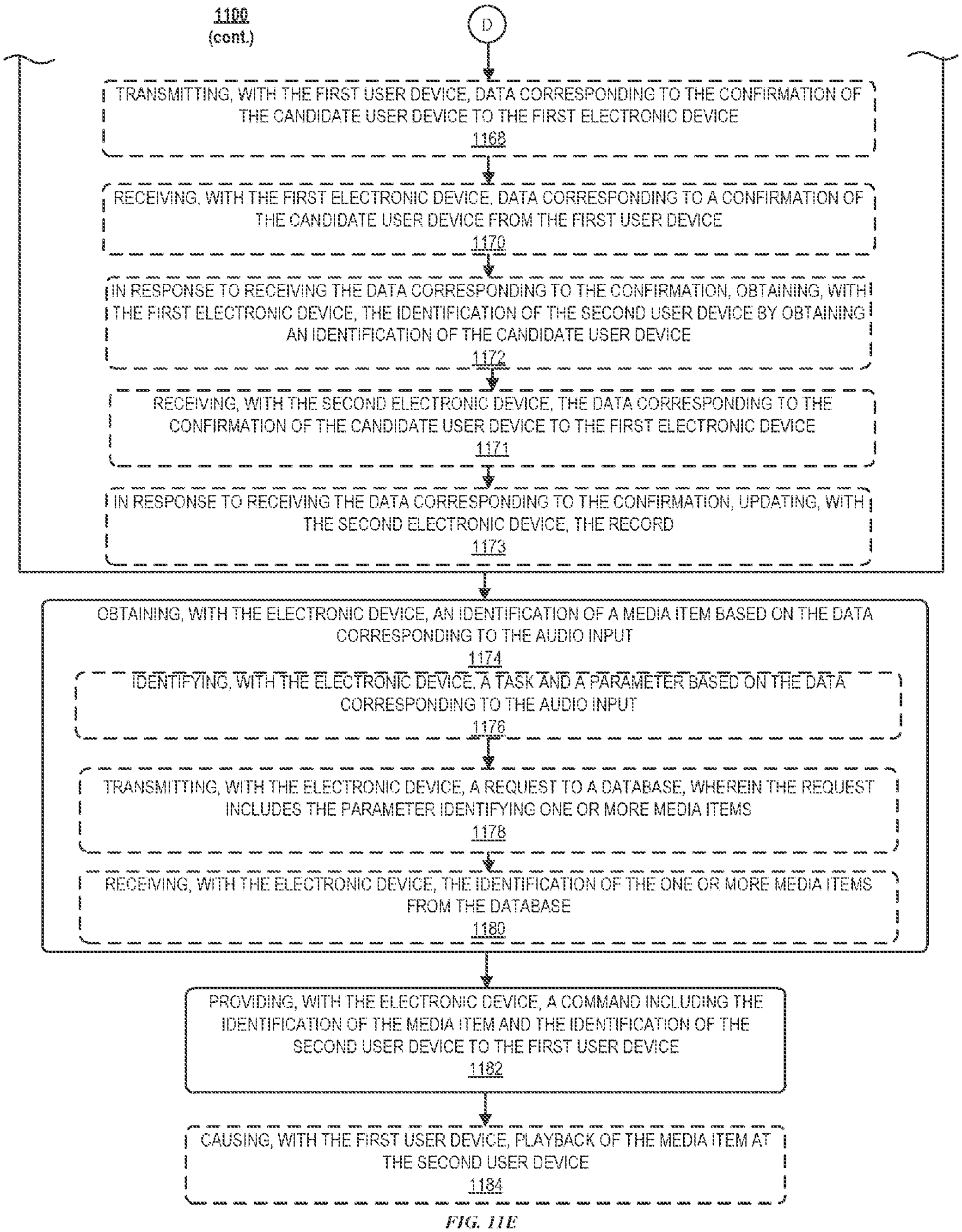

In some examples, the first processing unit 1308 is configured to: receive (e.g., with receiving unit 1330) data corresponding to an audio input from the first user device 1330 (e.g., block 1102 of FIG. 11A); obtain (e.g., with obtaining unit 1312) an identification of a second user device based on the data corresponding to the audio input (e.g., block 1104 of FIG. 11A); obtain (e.g., with obtaining unit 1312) an identification of a media item based on the data corresponding to the audio input (e.g., block 1174 of FIG. 11E); provide (e.g., with providing unit 1314) a command including the identification of the media item and the identification of the second user device to the first user device 1330 (e.g., block 1182 of FIG. 11E).

In some examples, the second processing unit 1338 is configured to cause playback of the media item at the second user device (e.g., block 1184 of FIG. 11E).

In some examples, obtaining the identification of the media item comprises: identifying (e.g., with the identifying unit 1316) a task and a parameter based on the data corresponding to the audio input (e.g., block 1176 of FIG. 11E); transmitting (e.g., with the transmitting unit 1318) a request to a database, wherein the request includes the parameter identifying one or more media items (e.g., block 1178 of FIG. 11E); and receiving (e.g., with the receiving unit 1310) the identification of the one or more media items from the database (e.g., block 1180 of FIG. 11E).

In some examples, the identification of the media item includes a unique identifier of the one or more media items.

In some examples, obtaining the identification of the second user device comprises: identifying (e.g., with the identifying unit 1316) a task and a parameter based on the data corresponding to the audio input (e.g., block 1106 of FIG. 11A); transmitting (e.g., with the transmitting unit 1318) to the second electronic device 1360 a request, wherein the request includes the parameter identifying a user device to perform the task (e.g., block 1108 of FIG. 11A); and receiving (e.g., with the receiving unit 1310) the identification of the second user device from the second electronic device 1360 (e.g., block 1124 of FIG. 11B).

In some examples, the parameter includes an indication of a named location of a user.

In some examples, the parameter includes an indication of a type of a device.

In some examples, the parameter includes one or more attributes of the one or more media items.

In some examples, the second electronic device 1360 is the first user device 1330.

In some examples, the third processing unit 1368 is configured to: receive (e.g., with receiving unit 1370) the request including the parameter (e.g., block 1110 of FIG. 11A); obtain (e.g., with obtaining unit 1372) data from a record, wherein the record stores a plurality of sets of attributes respectively corresponding to a plurality of user devices (e.g., block 1118 of FIG. 11A); determine (e.g., with the determining unit 1374) the identification of the second user device based on the parameter, wherein the second user device is part of the plurality of user devices (e.g., block 1120 of FIG. 11B); and transmit (e.g., with transmitting unit 1376) the identification of the second user device to the first electronic device 1300 (e.g., block 1122 of FIG. 11B).

In some examples, the determining of the identification of the second user device based on the parameter comprises: determining (e.g., with the determining unit 1374) whether at least one attribute of the second user device matches the parameter (e.g., block 1121 of FIG. 11B).

In some examples, a user device of the plurality of user devices is a computer.

In some examples, a user device of the plurality of user devices is a television.

In some examples, a user device of the plurality of user devices is a set-top box.

In some examples, a user device of the plurality of user devices is an audio speaker.

In some examples, a user device of the plurality of user devices is a phone.

In some examples, the third processing unit 1368 is further configured to: discover (e.g., with discovering unit 1378) one or more user devices and update (e.g., with updating unit 1380) the record based on attributes of the one or more discovered user devices. These steps are similar to those performed at blocks 1112 and 1114 (FIG. 11A), but are performed automatically and/or periodically (as opposed to in response to receiving a user request).

In some examples, the third processing unit 1368 is further configured to: in response to receiving the request including the parameter, discover (e.g., with discovering unit 1378) one or more user devices (e.g., block 1112 of FIG. 11A) and update (e.g., with updating unit 1380) the record based on attributes of the one or more discovered user devices (e.g., block 1114 of FIG. 11A).

In some examples, the discovering of the one or more user devices comprises discovering a user device associated with an indication of a named location of a user (e.g., block 1113 of FIG. 11A).

In some examples, the third processing unit 1368 is further configured to cache (e.g., with the caching unit 1382) attributes of the discovered one or more user devices (e.g., block 1118 of FIG. 11A).

In some examples, obtaining the identification of the second user device based on the data corresponding to the audio input further comprises: identifying (e.g., with the identifying unit 1316) a task and a parameter based on the data corresponding to the audio input (e.g., block 1126 of FIG. 11B); receiving (e.g., with the receiving unit 1310) a plurality of identifications corresponding to a plurality of user devices from the second electronic device 1360 (e.g., block 1132 of FIG. 11B); transmitting (e.g., with the transmitting unit 1318) the plurality of identifications corresponding to the plurality of user devices to the first user device 1330 (e.g., block 1134 of FIG. 11B); receiving (e.g., with the receiving unit 1310) data corresponding to a selection of a particular user device of the plurality of the user devices from the first user device 1330 (e.g., block 1144 of FIG. 11C); obtaining (e.g., with the obtaining unit 1312) the identification of the second user device based on the received data corresponding to the selection of the particular user device of the plurality of the user devices (e.g., block 1146 of FIG. 11C).

In some examples, the second processing unit 1338 is further configured to: receive (e.g., with receiving unit 1342) the plurality of identifications corresponding to the plurality of user devices (e.g., block 1136 of FIG. 11B); present (e.g., with output unit 1334) the plurality of user devices as selectable options (e.g., block 1138 of FIG. 11B); receive (e.g., with receiving unit 1342) an input representing the selection of the particular user device of the plurality of user devices (e.g., block 1140 of FIG. 11C); transmit (e.g., with transmitting unit 1350) the data corresponding to the selection of the particular user device to the first electronic device 1300 (e.g., block 1142 of FIG. 11C).

In some examples, each of the plurality of user devices has an attribute matching the parameter.

In some examples, obtaining the identification of the second user device based on the data corresponding to the audio input further comprises: identifying (e.g., with the identifying unit 1316) a task and a parameter based on the data corresponding to the audio input (e.g., block 1148 of FIG. 11C); receiving (e.g., with the receiving unit 1310) data corresponding to a candidate user device from the second electronic device 1360 (e.g., block 1158 of FIG. 11D); transmitting (e.g., with the transmitting unit 1318) the data corresponding to the candidate user device to the first user device 1330 (e.g., block 1160 of FIG. 11D); receiving (e.g., with the receiving unit 1310) data corresponding to a confirmation of the candidate user device from the first user device 1330 (e.g., block 1170 of FIG. 11E); and in response to receiving the data corresponding to the confirmation, obtaining (e.g., with obtaining unit 1312) the identification of the second user device by obtaining an identification of the candidate user device (e.g., block 1172 of FIG. 11E).

In some examples, the second processing unit 1338 is further configured to: receive (e.g., with receiving unit 1342) the data corresponding to the candidate user device (e.g., block 1162 of FIG. 11D); present (e.g., with output unit 1334) the candidate user device as a confirmable option (e.g., block 1164 of FIG. 11D); receive (e.g., with receiving unit 1342) an input representing the confirmation of the candidate user device (e.g., block 1166 of FIG. 11D); and transmit (e.g., with transmitting unit 1350) data corresponding to the confirmation of the candidate user device to the first electronic device 1300 (e.g., block 1168 of FIG. 11E).

In some examples, the second processing unit 1338 is further configured to: receive (e.g., with receiving unit 1342) the data corresponding to the candidate user device; present (e.g., with output unit 1334) the candidate user device as a confirmable option; receive (e.g., with receiving unit 1342) an input representing a rejection of the candidate user device (e.g., block 1171 of FIG. 11D); present (e.g., with output unit 1334) an output indicative of an error (e.g., block 1173 of FIG. 11D).

In some examples, the third processing unit 1368 is further configured to: receive (e.g., with receiving unit 1370) a request for identification of a user device from the first electronic device 1300, wherein the request includes the parameter (e.g., block 1150 of FIG. 11C); obtain (e.g., with obtaining unit 1372) data from a record, wherein the record stores a plurality of sets of attributes respectively corresponding to a plurality of user devices (e.g., block 1152 of FIG. 11C); obtain (e.g., with obtaining unit 1372) data corresponding to the candidate user device based on the parameter, wherein the candidate user device is not part of the plurality of user devices stored in the record (e.g., block 1154 of FIG. 11D); and transmit (e.g., with transmitting unit 1376) data corresponding to the candidate user device to the first electronic device 1300 (e.g., block 1156 of FIG. 11D).

In some examples, obtaining the data corresponding to the candidate user device based on the parameter further comprises: determining (e.g., with determining unit 1374) that no device of the plurality of user devices has an attribute matching with the parameter (e.g., block 1151 in FIG. 11C); and discovering (e.g., with the discovering unit 1378) the candidate user device, wherein the candidate user device has an attribute matching the parameter (e.g., block 1153 in FIG. 11C).

In some examples, the third processing unit 1368 is further configured to: receive (e.g., with receiving unit 1370) the data corresponding to the confirmation of the candidate user device to the first electronic device 1300 (e.g., block 1171 of FIG. 11E); in response to receiving the data corresponding to the confirmation, update (e.g., with updating unit 1380) the record (e.g., block 1173 of FIG. 11E).

The operations described above with respect to FIGS. 11A-E are, optionally, implemented by components depicted in FIGS. 1-4, 6A-B, 7A, and 13. For example, receiving operation 1102, obtaining operation 1104, and providing operation 1182 are optionally implemented by processor(s) 120. It would be clear to a person of ordinary skill in the art how other processes can be implemented based on the components depicted in FIGS. 1-4, 6A-B, 7A, and 13.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device comprising:

a microphone;

one or more processors;

a memory; and one or more programs, wherein the one or more programs are stored in the memory and configured to be executed by the one or more processors, the one or more programs including instructions for:

sampling, with the microphone at the electronic device, an audio input specifying a task, wherein the electronic device is a first electronic device;

identifying, with the first electronic device, a confidence value indicative of a likelihood that the audio input was provided by a particular user;

broadcasting a first set of one or more values based on the sampled audio input, wherein a first value of the first set of values is based on the confidence value;

receiving a second set of one or more values from a second electronic device, wherein the second set of one or more values is based on the audio input;

determining, with the first electronic device, whether a type of the first electronic device meets a requirement of the task; and in accordance with a determination that the type of the first electronic device meets the requirement of the task:

determining whether the first electronic device is to respond to the audio input based on the first set of one or more values, the second set of one or more values, and the requirement of the task;

in accordance with a determination that the first electronic device is to respond to the audio input, responding to the audio input; and in accordance with a determination that the first electronic device is not to respond to the audio input, foregoing responding to the audio input; and in accordance with a determination that the type of the first electronic device does not meet the requirement of the task, foregoing responding to the audio input with the first electronic device.

2. The electronic device of claim 1, wherein a value of the first set of values is based on a signal to noise ratio of speech of the audio input sampled with the first electronic device.

3. The electronic device of claim 1, wherein a value of the first set of values is based on a sound pressure of the audio input sampled with the first electronic device.

4. The electronic device of claim 1, wherein the one or more programs further include instructions for:

identifying, with the first electronic device, a state of the first electronic device, wherein a value of the first set of values is based on the identified state of the first electronic device.

5. The electronic device of claim 4, wherein the state of the first electronic device is identified based on a user input received with the first electronic device.

6. The electronic device of claim 1, wherein at least one value of the first set of one or more values is based on a type of the first electronic device.

7. The electronic device of claim 1, wherein sampling the audio input comprises determining, with the first electronic device, whether the audio input comprises a spoken trigger and wherein the one or more programs further include instructions for:

in accordance with a determination that the audio input does not comprise the spoken trigger, foregoing broadcasting, with the first electronic device, the first set of one or more values.

8. The electronic device of claim 1, wherein the one or more programs further include instructions for:

in accordance with the determination that the type of the first electronic device does not meet the requirement, determining, with the first electronic device, whether the second device is to respond to the audio input, in accordance with a determination that the second device is to respond to the audio input, foregoing responding to the audio input with the first electronic device;

in accordance with a determination that the second device is not to respond to the audio input, providing, with the first electronic device, an output indicative of an error.

9. The electronic device of claim 1, wherein the one or more programs further include instructions for:

receiving, with the first electronic device, data indicative of the requirement of the task from a server.

10. The electronic device of claim 1, wherein foregoing responding to the audio input with the first electronic device comprises entering, with the first electronic device, an inactive mode.

11. The electronic device of claim 1, wherein the first set of one or more values is broadcasted in accordance with a unidirectional broadcast communications protocol.

12. The electronic device of claim 1, wherein the one or more programs further include instructions for:

in accordance with the determination that the first electronic device is to respond to the audio input, providing, with the first electronic device, a visual output, an auditory output, a haptic output, or a combination thereof.

13. The electronic device of claim 1, wherein determining whether the first electronic device is to respond to the audio input comprises:

determining, with the first electronic device, whether a value of the first set of one or more values is higher than a corresponding value of the second set of one or more values.

14. A non-transitory computer readable storage medium storing one or more programs, the one or more programs comprising instructions, which when executed by one or more processors of a first electronic device with a microphone, cause the first electronic device to:

sample, with the microphone at the first electronic device, an audio input specifying a task;

identify, with the first electronic device, a confidence value indicative of a likelihood that the audio input was provided by a particular user;

broadcast a first set of one or more values based on the sampled audio input, wherein a first value of the first set of one or more values is based on the confidence value;

receive a second set of one or more values from a second electronic device, wherein the second set of one or more values is based on the audio input;

determine, with the first electronic device, whether a type of the first electronic device meets a requirement of the task; and in accordance with a determination that the type of the first electronic device meets the requirement of the task:

determine whether the first electronic device is to respond to the audio input based on the first set of one or more values, the second set of one or more values, and the requirement of the task;

in accordance with a determination that the first electronic device is to respond to the audio input, respond to the audio input;

in accordance with a determination that the first electronic device is not to respond to the audio input, forego responding to the audio input; and in accordance with a determination that the type of the first electronic device does not meet the requirement of the task, forego responding to the audio input with the first electronic device.

15. The non-transitory computer readable storage medium of claim 14, wherein a value of the first set of values is based on a signal to noise ratio of speech of the audio input sampled with the first electronic device.

16. The non-transitory computer readable storage medium of claim 14, wherein a value of the first set of values is based on a sound pressure of the audio input sampled with the first electronic device.

17. The non-transitory computer readable storage medium of claim 14, wherein the instructions, which when executed by the electronic device, further cause the electronic device to:

identify, with the first electronic device, a state of the first electronic device, wherein a value of the first set of values is based on the identified state of the first electronic device.

18. The non-transitory computer readable storage medium of claim 17, wherein the state of the first electronic device is identified based on a user input received with the first electronic device.

19. The non-transitory computer readable storage medium of claim 14, wherein at least one value of the first set of one or more values is based on a type of the first electronic device.

20. The non-transitory computer readable storage medium of claim 14, wherein sampling the audio input comprises determining, with the first electronic device, whether the audio input comprises a spoken trigger and wherein the instructions, which when executed by the electronic device, further case the electronic device to:

in accordance with a determination that the audio input does not comprise the spoken trigger, forego broadcasting, with the first electronic device, the first set of one or more values.

21. The non-transitory computer readable storage medium of claim 14, wherein the instructions, which when executed by the electronic device, further cause the electronic device to:

in accordance with the determination that the type of the first electronic device does not meet the requirement, determine, with the first electronic device, whether the second device is to respond to the audio input;

in accordance with a determination that the second device is to respond to the audio input, forego responding to the audio input with the first electronic device;

in accordance with a determination that the second device is not to respond to the audio input, provide, with the first electronic device, an output indicative of an error.

22. The non-transitory computer readable storage medium of claim 14, wherein the instructions, which when executed by the electronic device, further cause the electronic device to:

receive, with the first electronic device, data indicative of the requirement of the task from a server.

23. The non-transitory computer readable storage medium of claim 14, wherein foregoing responding to the audio input with the first electronic device comprises entering, with the first electronic device, an inactive mode.

24. The non-transitory computer readable storage medium of claim 14, wherein the first set of one or more values is broadcasted in accordance with a unidirectional broadcast communications protocol.

25. The non-transitory computer readable storage medium of claim 14, wherein the instructions, which when executed by the electronic device, further cause the electronic device to:

in accordance with the determination that the first electronic device is to respond to the audio input, provide, with the first electronic device, a visual output, an auditory output, a haptic output, or a combination thereof.

26. The non-transitory computer readable storage medium of claim 14, wherein determining whether the first electronic device is to respond to the audio input comprises:

determining, with the first electronic device, whether a value of the first set of one or more values is higher than a corresponding value of the second set of one or more values.

27. A method comprising:

at a first electronic device having a microphone:

sampling, with the microphone at the first electronic device, an audio input specifying a task;

identifying, with the first electronic device, a confidence value indicative of a likelihood that the audio input was provided by a particular user;

broadcasting, with the first electronic device, a first set of one or more values based on the sampled audio input, wherein a first value of the first set of values is based on the confidence value;

receiving, with the first electronic device, a second set of one or more values from a second electronic device, wherein the second set of one or more values is based on the audio input;

determining, with the first electronic device, whether a type of the first electronic device meets a requirement of the task; and in accordance with a determination that the type of the first electronic device meets the requirement of the task;

determining, with the first electronic device, whether the first electronic device is to respond to the audio input based on the first set of one or more values, the second set of one or more values, and the requirement of the task;

in accordance with a determination that the first electronic device is to respond to the audio input, responding to the audio input;

in accordance with a determination that the first electronic device is not to respond to the audio input, foregoing responding to the audio input; and in accordance with a determination that the type of the first electronic device does not meet the requirement of the task, foregoing responding to the audio input with the first electronic device.

28. The method of claim 27, wherein a value of the first set of values is based on a signal to noise ratio of speech of the audio input sampled with the first electronic device.

29. The method of claim 27, wherein a value of the first set of values is based on a sound pressure of the audio input sampled with the first electronic device.

30. The method of claim 27, further comprising:

identifying, with the first electronic device, a state of the first electronic device, wherein a value of the first set of values is based on the identified state of the first electronic device.

31. The method of claim 30, wherein the state of the first electronic device is identified based on a user input received with the first electronic device.

32. The method of claim 27, wherein at least one value of the first set of one or more values is based on a type of the first electronic device.

33. The method of claim 27, wherein sampling the audio input comprises determining, with the first electronic device, whether the audio input comprises a spoken trigger, the method further comprising:

in accordance with a determination that the audio input does not comprise the spoken trigger, foregoing broadcasting, with the first electronic device, the first set of one or more values.

34. The method of claim 27, further comprising:

in accordance with the determination that the type of the first electronic device does not meet the requirement, determining, with the first electronic device, whether the second. device is to respond to the audio input, in accordance with a determination that the second device is to respond to the audio input, foregoing responding to the audio input with the first electronic device;

in accordance with a determination that the second device is not to respond to the audio input, providing, with the first electronic device, an output indicative of an error.

35. The method of claim 27, further comprising:

receiving, with the first electronic device, data indicative of the requirement of the task from a server.

36. The method of claim 27, wherein foregoing responding to the audio input with the first electronic device comprises entering, with the first electronic device, an inactive mode.

37. The method of claim 27, wherein the first set of one or more values is broadcasted in accordance with a unidirectional broadcast communications protocol.

38. The method of claim 27, further comprising:

in accordance with the determination that the first electronic device is to respond to the audio input, providing, with the first electronic device, a visual output, an auditory output, a haptic output, or a combination thereof.

39. The method of claim 27, wherein determining whether the first electronic device is to respond to the audio input comprises:

determining, with the first electronic device, whether a value of the first set of one or more values is higher than a corresponding value of the second set of one or more values.

* * * * *

UNITED STATES PATENT AND TRADEMARK OFFICE

CERTIFICATE OF CORRECTION

PATENT NO. : 10,089,072 B2
APPLICATION NO. : 15/268338
DATED : October 2, 2018
INVENTOR(S) : Kurt W. Piersol et al.

It is certified that error appears in the above-identified patent and that said Letters Patent is hereby corrected as shown below:

In the Claims

In Claim 21, Column 65, Line 27, delete "input;" and insert -- input, --, therefor.

In Claim 27, Column 66, Line 20, delete "task;" and insert -- task: --, therefor.

In Claim 34, Column 66, Line 67, delete "second." and insert -- second --, therefor.

Signed and Sealed this
Twelfth Day of February, 2019

Andrei Iancu
*Director of the United States Patent and Trademark Office*